United States Patent
Tomici et al.

(10) Patent No.: US 8,588,793 B2
(45) Date of Patent: Nov. 19, 2013

(54) BANDWIDTH MANAGEMENT FOR A CONVERGED GATEWAY IN A HYBRID NETWORK

(75) Inventors: John L. Tomici, Southold, NY (US); John Cartmell, Lynbrook, NY (US); Prabhakar R. Chitrapu, Blue Bell, PA (US); Rocco Di Girolamo, Laval (CA); Jean-Louis Gauvreau, La Prairie (CA); Aravind Kamarajugadda, San Diego, CA (US); Chunxuan Ye, Wayne, PA (US); Alexander Reznik, Titusville, NJ (US); Arty Chandra, Manhasset Hills, NY (US); Kenneth F. Lynch, Wayne, PA (US); Scott C. Hergenhan, Collegeville, PA (US); Kushanava Laha, Gurgaon (IN); Reeteshkumar Varshney, Gurgaon (IN); Nicholas J. Podias, Brooklyn, NY (US); Alpaslan Y. Demir, East Meadow, NY (US); Martino Freda, Laval (CA); Dale N. Seed, Allentown, PA (US); Michael F. Starsinic, Newtown, PA (US); Athmane Touag, Laval (CA); Onkarnath Upadhyay, Maharajpur (IN); Paul L. Russell, Pennington, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 12/960,128

(22) Filed: Dec. 3, 2010

(65) Prior Publication Data
US 2012/0071168 A1 Mar. 22, 2012

Related U.S. Application Data

(60) Provisional application No. 61/266,726, filed on Dec. 4, 2009, provisional application No. 61/308,538, filed (Continued)

(51) Int. Cl.
*H04W 40/00* (2009.01)
*H04B 1/38* (2006.01)
*H04W 72/00* (2009.01)
*H04W 4/00* (2009.01)
*H04M 1/00* (2006.01)

(52) U.S. Cl.
USPC ........ 455/445; 455/558; 455/450; 455/552.1; 370/331; 370/338

(58) Field of Classification Search
USPC ........ 455/445, 558, 450, 552.1; 370/331, 338
See application file for complete search history.

(56) References Cited

U.S. PATENT DOCUMENTS 7,539,175 B2   5/2009  White et al.
2005/0135311 A1*  6/2005  Maillard ................. 370/331

(Continued)

FOREIGN PATENT DOCUMENTS

WO   WO 2009/132824 A2   11/2009

OTHER PUBLICATIONS

3rd Generation Partnership Project (3GPP), R3-080775, "3G HomeNB Architecture Discussion", Vodafone Group, 3GPP TSG RAN WG3, Meeting #59bis, Shenzhen, China, Mar. 31-Apr. 4, 2008, 8 pages.

(Continued)

*Primary Examiner* — Christopher M Brandt
*Assistant Examiner* — Muthuswamy Manoharan
(74) *Attorney, Agent, or Firm* — Condo Roccia LLP

(57) ABSTRACT

Systems and methods for integrating bandwidth management (BWM) equipment into a network in order to manage the use of bandwidth over multiple radio access technologies (RATs) relating to communications between a wireless transmit receive unit and a mobile core network (MCN). When integrating itself into the network, a BWM server may be placed between a MCN and an femto access point. In order for WTRUs to communicate with the MCN through the femto access point and a BWM server, a BWM server may need deep packet inspection capabilities.

20 Claims, 83 Drawing Sheets

Related U.S. Application Data

(60) on Feb. 26, 2010, provisional application No. 61/314,046, filed on Mar. 15, 2010, provisional application No. 61/314,064, filed on Mar. 15, 2010, provisional application No. 61/321,933, filed on Apr. 8, 2010, provisional application No. 61/322,245, filed on Apr. 8, 2010, provisional application No. 61/334,747, filed on May 14, 2010.

(56) References Cited

U.S. PATENT DOCUMENTS

| | | | | |
|---|---|---|---|---|
| 2009/0124284 | A1* | 5/2009 | Scherzer et al. | 455/552.1 |
| 2009/0156213 | A1* | 6/2009 | Spinelli et al. | 455/436 |
| 2009/0198996 | A1* | 8/2009 | Lie et al. | 713/155 |
| 2009/0252158 | A1* | 10/2009 | Maag et al. | 370/352 |
| 2009/0296655 | A1* | 12/2009 | Tamura | 370/331 |
| 2010/0085978 | A1* | 4/2010 | Ramankutty et al. | 370/401 |
| 2011/0002246 | A1* | 1/2011 | Li et al. | 370/310 |
| 2011/0111767 | A1* | 5/2011 | Livanos | 455/452.2 |
| 2012/0076047 | A1* | 3/2012 | Turanyi et al. | 370/254 |

OTHER PUBLICATIONS

3$^{rd}$ Generation Partnership Project (3GPP), S2-096649, "Open Issues and Solution for LIPA/SIPTO Service", Samsung, 3GPP TSG SA WG2, Meeting #76, San Jose Del Cabo, Mexico, Nov. 16-20, 2009, 8 pages.

3$^{Rd}$ Generation Partnership Project (3GPP), TR 23.829, V0.2.1, "3$^{rd}$ Generation Partnership Project; Technical Specification Group Services and System Aspects; Local IP Access and Selected IP Traffic Offload; (Release 10)", Sep. 2009, 20 pages.

3$^{rd}$ Generation Partnership Project (3GPP), SP-080791, "3$^{rd}$ Generation Partnership Project; Updates on WID on Enhanced Home NodeB / eNodeB (EHNB)", 3GPP, Meeting #42, Dec. 8-11, 2008, 3 pages.

3$^{rd}$ Generation Partnership Project (3GPP), TR 23.829, V1.0.1, "3$^{rd}$ Generation Partnership Project; Technical Specification Group Services and System Aspects; Local IP Access and Selected IP Traffic Offload (Release 10)", Mar. 2010, 37 pages.

3$^{rd}$ Generation Partnership Project (3GPP), TR 36.902, V9.0.0, "3$^{rd}$ Generation Partnership Project; Technical Specification Group Radio Access Network; Evolved Universal Terrestrial Radio Access Network (E-UTRAN); Self-Configuring and Self-Optimizing Network Use Cases and Solutions (Release 9)", Sep. 2009, 23 pages.

3$^{rd}$ Generation Partnership Project (3GPP), TR-069, V1.1, "3$^{rd}$ Generation Partnership Project; CPE WAN Management Protocol V1.1", Issue 1, Amendment 2, Dec. 2007, 1-138.

3$^{rd}$ Generation Partnership Project (3GPP), TS 22.220, V10.0.0, "3$^{rd}$ Generation Partnership Project; Technical Specification Group Services and Systems Aspects; Service Requirements for Home NodeBs & Home eNodeBs (Release 10)", Sep. 2009, 22 pages.

3$^{rd}$ Generation Partnership Project (3GPP), TS 22.220, V10.2.0, "3$^{rd}$ Generation Partnership Project; Technical Specification Group Services and System Aspects; Service Requirements for Home Node B (HNB) and Home eNode B (HeNB) (Release 10)", Mar. 2010, 24 pages.

3$^{rd}$ Generation Partnership Project (3GPP), TS 24.008, V3.0.0, "3$^{rd}$ Generation Partnership Project; Technical Specification Group; Universal Mobile Telecommunications System; Mobile Radio Interface Layer 3 Specification, Core Network Protocols—Stage 3 (TS 24.008 Version 3.0.0)", Jul. 1999, 377 pages.

3$^{rd}$ Generation Partnership Project (3GPP), TS 25.331, V9.1.0. "3$^{rd}$ Generation Partnership Project; Technical Specification Group Radio Access Network; Radio Resource Control (RRC); Protocol Specification (Release 9)", Dec. 2009, 1759 pages.

3$^{rd}$ Generation Partnership Project (3GPP), TS 23.060, V9.3.0, "3$^{rd}$ Generation Partnership Project; Technical Specification Group Services and System Aspects; General Packet Radio Service (GPRS); Service Description; Stage 2 (Release 9)", Dec. 2009, 295 pages.

3$^{rd}$ Generation Partnership Project (3GPP), TS 25.467, V9.1.0, "3$^{rd}$ Generation Partnership Project; Technical Specification Group Radio Access Network; UTRAN Architecture for 3G Home NodeB; Stage 2 (Release 9)", Dec. 2009, 32 pages.

3$^{rd}$ Generation Partnership Project (3GPP), TR 21.905, V0.1.0, "3$^{rd}$ Generation Partnership Project; Technical Specification Group Services and Systems Aspects Vocabulary for 3GPP Specifications (3G TR 21.905 Version 0.1.0)", Oct. 1999, 23 pages.

3$^{rd}$ Generation Partnership Project (3GPP), TS 25.323, V0.1.0, "3$^{rd}$ Generation Partnership Project; Technical Specification Group (TSG) RAN; Working Group 2 (WG2); Packet Data Convergence Protocol (PDCP) Specification (3G TS 25.323 Version 0.1.0)", Sep. 1999, 9 pages.

3$^{rd}$ Generation Partnership Project (3GPP), TS 25.401, V1.0.0, "3$^{rd}$ Generation Partnership Project; Technical Specification Group (TSG-RAN); UTRAN Overall Description", Apr. 1999, 44 pages.

3$^{rd}$ Generation Partnership Project (3GPP), TS 25.412, V3.0.0, "3$^{rd}$ Generation Partnership Project; Technical Specification Group (TSG) RAN; UTRAN lu Interface Signalling Transport", Jun. 1999, 9 pages.

3$^{rd}$ Generation Partnership Project (3GPP), TS 25.413, V1.0.0, "3$^{rd}$ Generation Partnership Project; Technical Specification Group (TSG) RAN RANAP Specification", Apr. 1999, 52 pages.

3$^{rd}$ Generation Partnership Project (3GPP), TS 25.468, V1.0.0, "3$^{rd}$ Generation Partnership Project; Technical Specification Group Radio Access Network; UTRAN luh Interface RANAP User Adaption (RUA) Signalling (Release 8)", Nov. 2008, 44 pages.

3$^{rd}$ Generation Partnership Project (3GPP), TS 25.469, V1.0.0, "3$^{rd}$ Generation Partnership Project; Technical Specification Group Radio Access Network; UTRAN luh Interface Home Node B Application Part (HNBAP) Signalling (Release 8)", Nov. 2008, 56 pages.

3$^{rd}$ Generation Partnership Project (3GPP), TS 29.060, V3.0.0, "3$^{rd}$ Generation Partnership Project; Technical Specification Group Core Network; General Packet Radio Service (GPRS); GPRS Tunnelling Protocol (GTP) Across the Gn and Gp Interface (3G TS 29.060 Version 3.0.0)", May 1999, 70 pages.

3$^{rd}$ Generation Partnership Project (3GPP), TS 32.581, V9.2.0, "3$^{rd}$ Generation Partnership Project; Technical Specification Group Services and System Aspects; Telecommunications Management; Home Node B (HNB) Operations, Administration, Maintenance and Provisioning (OAM&P); Concepts and Requirements for Type 1 interface HNB to HNB Management System (HMS) (Release 9)", Mar. 2010, 11 pages.

3$^{rd}$ Generation Partnership Project (3GPP), TS 32.582, V1.0.0, "3$^{rd}$ Generation Partnership Project; Technical Specification Group Services and System Aspects; Telecommunications Management; Home Node B (HNB) Operations, Administration, Maintenance and Provisioning (OAM&P); Information Model for Type 1 Interface HNB to HNB Management System (HMS) (Release 8)", Mar. 2009, 22 pages.

3$^{rd}$ Generation Partnership Project (3GPP), TS 32.583, V9.2.0, "3$^{rd}$ Generation Partnership Project; Technical Specification Group Services and System Aspects; Telecommunications management; Home Node B (HNB) Operations, Administration, Maintenance and Provisioning (OAM&P); Procedure Flows for Type 1 Interface HNB to HNB Management System (HMS) (Release 9)", Dec. 2009, 21 pages.

3$^{rd}$ Generation Partnership Project (3GPP),TS 33.210, V1.0.0, "3$^{rd}$ Generation Partnership Project; Technical Specification Group Services and Systems Aspects; 3G Security; Network Domain Security; IP Network Layer Security (Release 5)", Dec. 2001, 19 pages.

Atkinson, R., "Key Exchange Delegation Record for the DNS", The Internet Engineering Task Force (IETF), #2230, Nov. 1997, 11 pages.

Droma, R., "Dynamic Host Configuration Protocol", The Internet Engineering Task Force (IETF), #2131, Mar. 1997, 45 pages.

European Telecommunications Standards Institute (ETSI), TS 185. 005, V3.2.2, "Telecommunications and Internet Converged Services and Protocols for Advanced Networking (TISPAN); Services Requirements and Capabilities for Customer Networks Connected to TISPAN NGN", Jun. 2010, 24 pages.

Harkins and Carrel, "The Internet Key Exchange (IKE)", The Internet Engineering Task Force (IETF), #2409, Nov. 1998, 41 pages.

Home Gateway Initiative, Technical Requirements: Residential Profile, Version 1.0, Apr. 29, 2008, 145 pages.

(56) References Cited

OTHER PUBLICATIONS

Kaufman, C., "Internet Key Exchange (IKEv2) Protocol", The Internet Engineering Task Force (IETF), #4306, Dec. 2005, 99 pages.
Local IP Access Via Home NodeB, "http://www.ccpu.com/papers/localIPaccess", Mar. 9, 2010, Accessed Mar. 9, 2011, 2 pages.
Macworld, "iphone Data Usage", "http://www.macworld.com/article/145076/2009/12/iphone_data_usage.html?t=104", Dec. 14, 2009, Accessed Mar. 9, 2011, 4 pages.
Maughan et al., "Internet Security Association and Key Management Protocol (ISAKMP)", The Internet Engineering Task Force (IETF), #2408, Nov. 1998, 86 pages.
Piper, D., "The Internet IP Security Domain of Interpretation for ISAKMP", The Internet Engineering Task Force (IETF), #2407, Nov. 1998, 32 pages.
Schulzrinne et al., "RTP: A Transport Protocol for Real-Time Applications", The Internet Engineering Task Force (IETF), #3550, Jul. 2003, 89 pages.
European Telecommunications Standards Institute (ETSI), TS 102 689 V0.2.1, "Machine-to-Machine communications (M2M); M2M service requirements", 2009, 46 pages.
European Telecommunications Standards Institute (ETSI), TS 102 690 V0.0.6, "Machine-to-Machine communications (M2M); Functional architecture", Sep. 2009, 16 pages.

* cited by examiner

Layer Topology without BWM – Control path only

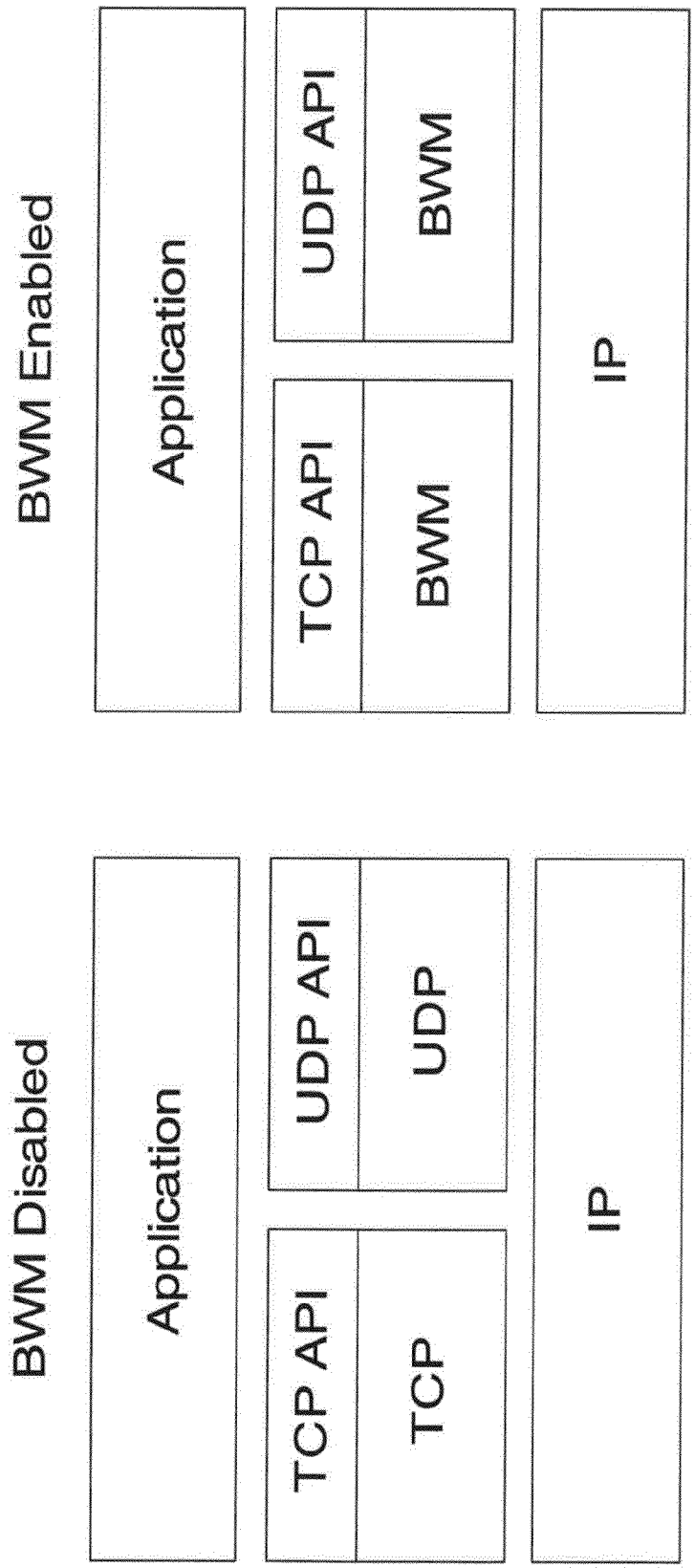

BANDWIDTH MANAGEMENT FOR A CONVERGED GATEWAY IN A HYBRID NETWORK

CROSS REFERENCE TO RELATED APPLICATIONS

This application claims the benefit of U.S. Provisional Application No. 61/266,726, titled "Architecture for Hybrid Network Converged Gateway," filed on Dec. 4, 2009; U.S. Provisional Application No. 61/308,538, titled "Method and Apparatus for Bandwidth Management in a Home Network," filed on Feb. 26, 2010; U.S. Provisional Application No. 61/314,046, titled "Bandwidth Management Solution," filed on Mar. 15, 2010; U.S. Provisional Application No. 61/314,064, titled "Bandwidth Management Solution," filed on Mar. 15, 2010; U.S. Provisional Application No. 61/321,933, titled "Bandwidth Management Solutions for Simultaneous Access across Multiple Radio Links," filed on Apr. 8, 2010. Provisional Application No. 61/322,245, titled "Converged Gateway for M2M and Multimedia Applications in a Hybrid Network," filed on Apr. 8, 2010; and U.S. Provisional Application No. 61/334,747, titled "Bandwidth Management Solutions for Simultaneous Access across Multiple Radio Links," filed on May 14, 2010, the contents of which are hereby incorporated by reference herein.

BACKGROUND

Femto access points (e.g., home nodeBs or evolved home nodeBs) may be customer-premise equipment (CPE) that may connect wireless transmit/receive units (WTRUs) over cellular network wireless air interfaces (e.g., UMTS terrestrial radio access (UTRAN), Long Term Evolution (LTE), and code division multiple access (CDMA)) to a cellular operator's network using a broadband IP backhaul. Wired options for the customer's broadband IP backhaul may include two-wire xDSL (e.g., ADSL, ADSL2, VDSL, VDSL2), coaxial cable (e.g., via DOCSIS 1.1, 2.0, 3.0), optical fiber-to-the-home/premises (FTTH/FTTP), and possibly broadband over power lines (BPL). Currently, innovative uses for femto access points are being explored.

SUMMARY

This disclosure defines a generic architecture for hybrid networks based on a "Converged Gateway" (CGW) for home, neighborhood, and enterprise environments. This hybrid network architecture addresses wireless communications between local devices in conjunction with value-added services provided by wide area network operators, e.g., via a converged gateway based on an evolved 3GPP Home Node B platform.

Disclosed herein is a gateway system that provides various features such as Femtocell access to local networks, public Internet, and private service provider networks, i.e., via 3GPP Home Node B (HNB); offloading, flow mobility, and bandwidth management (BWM) across multiple radio access technologies (RATs), including 3GPP UMTS and IEEE 802.11; machine-to-machine (M2M) networking, including assistance for 802.15.4-based self-organizing networks (SON); and M2M gateway functions towards hierarchical network elements.

Disclosed herein are ways for integrating bandwidth management (BWM) equipment within a network, such as a cellular network. For example, a BWM server may be placed between a mobile core network (MCN) and a HNB and act as a HNB towards a MCN device and act as the MCN device towards the HNB.

BWM entities may be required to decide how to segregate data for transmission (e.g., deciding which data packets to send among each of the multiple RATs). There may be sequence numbers associated with data packets transmitted over the various RATs. The BWM equipment may track the sequence numbers of the separately transmitted data packets in order to maintain a proper sequence between transmitting and receiving equipment (e.g., between the SGSN and WTRU).

This Summary is provided to introduce a selection of concepts in a simplified form that are further described below the Detailed Description. This Summary is not intended to identify key features or essential features of the claimed subject matter, nor is it intended to be used to limit the scope of the claimed subject matter. Furthermore, the claimed subject matter is not confined to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 35B is an exemplary illustration of a procedure for intra HNBGW mobility (LIPA to ELIPA), wherein FIG. 35B is a continuation of 35A;

FIG. 36B is an exemplary illustration of a procedure a UE accessing a home device and moving to a macro network (LIPA to MRA), wherein FIG. 36B is a continuation of FIG. 36A;

FIG. 37B is an exemplary illustration of a procedure for a UE accessing a home device via a macro network and moving to a femto network (MRA to LIPA), wherein FIG. 37B is a continuation of FIG. 37A;

FIG. 47B is an exemplary illustration of procedures for intra HNBGW mobility (LIPA to ELIPA), wherein FIG. 47B is a continuation of FIG. 47A;

FIG. 70A is an exemplary illustration of a data protocol without BWM implemented;

FIG. 70B is an exemplary illustration of a data protocol with BWM;

DETAILED DESCRIPTION OF ILLUSTRATIVE EMBODIMENTS

A detailed description of illustrative embodiments will now be described with reference to the various Figures. Although this description provides a detailed example of possible implementations, it should be noted that the details are intended to serve merely as illustrative examples.

Figure 1A:
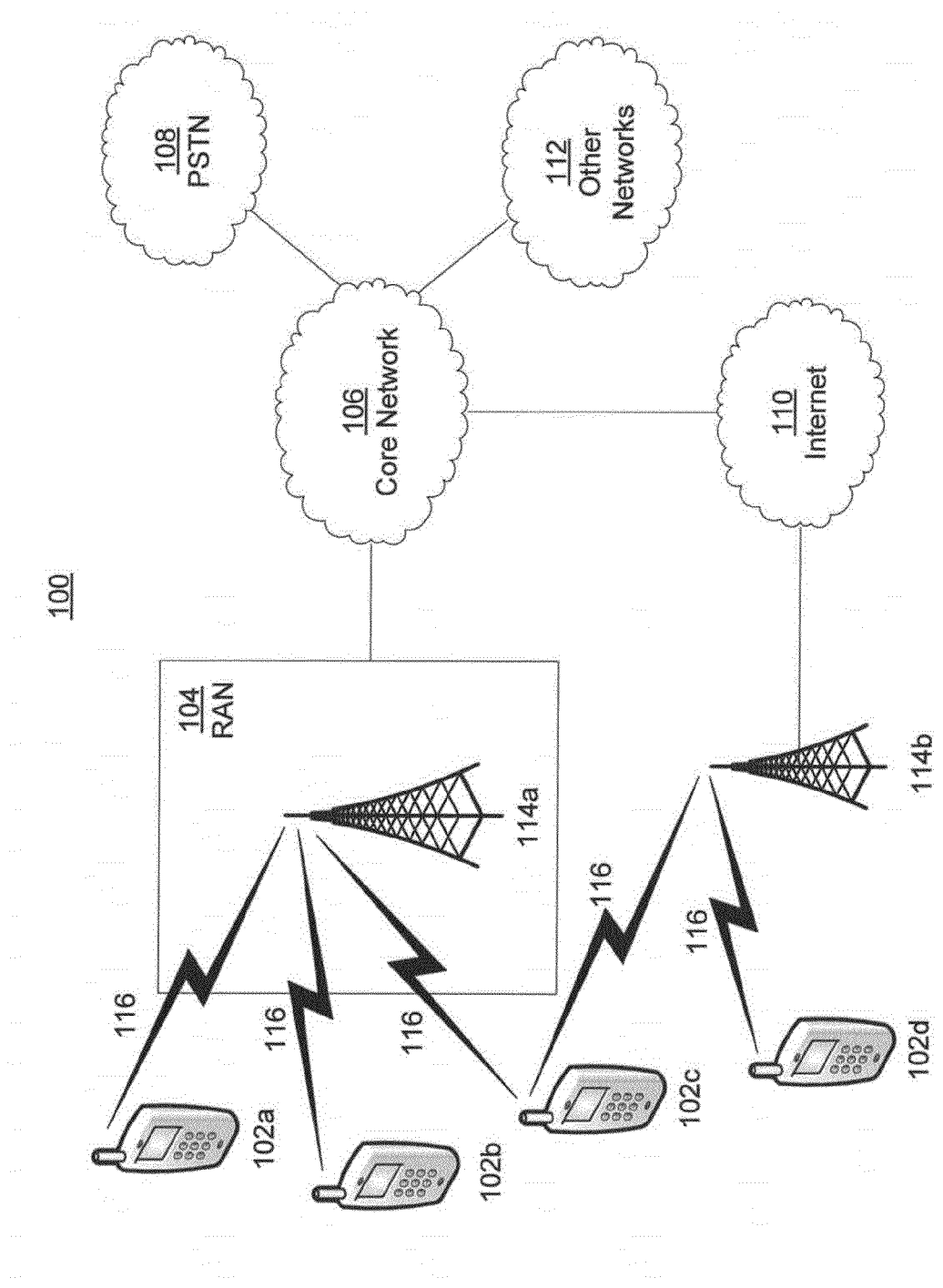
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like. UE may be used herein for exemplary purposes, but any WTRU may be readily applicable for the examples herein.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 1A, the base station 114*b* may have a direct connection to the Internet 110. Thus, the base station 114*b* may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102*a*, 102*b*, 102*c*, 102*d*. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102*a*, 102*b*, 102*c*, 102*d* in the communications system 100 may include multi-mode capabilities, i.e., the WTRUs 102*a*, 102*b*, 102*c*, 102*d* may include multiple transceivers for communicating with different wireless networks over different wireless links. For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
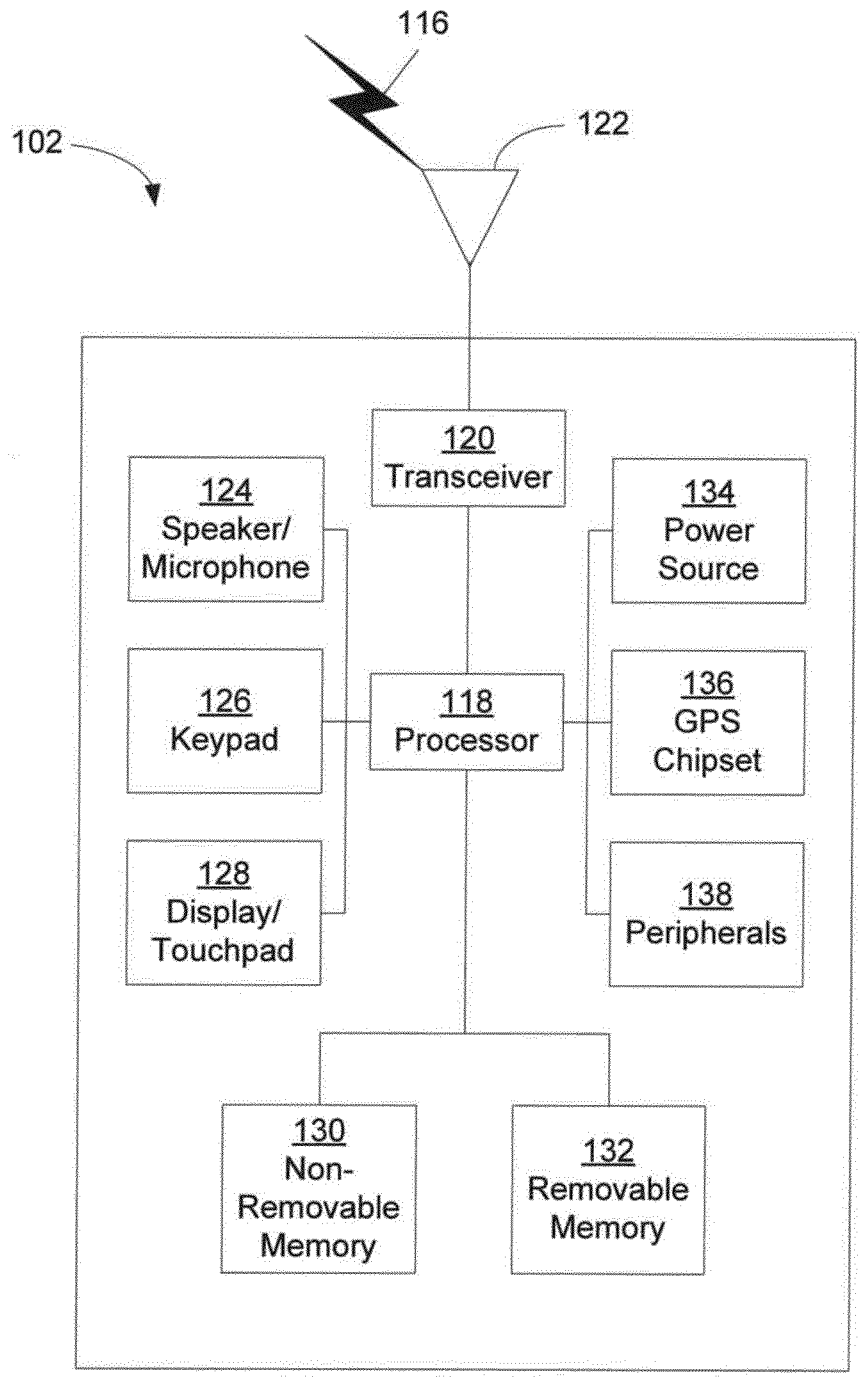
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
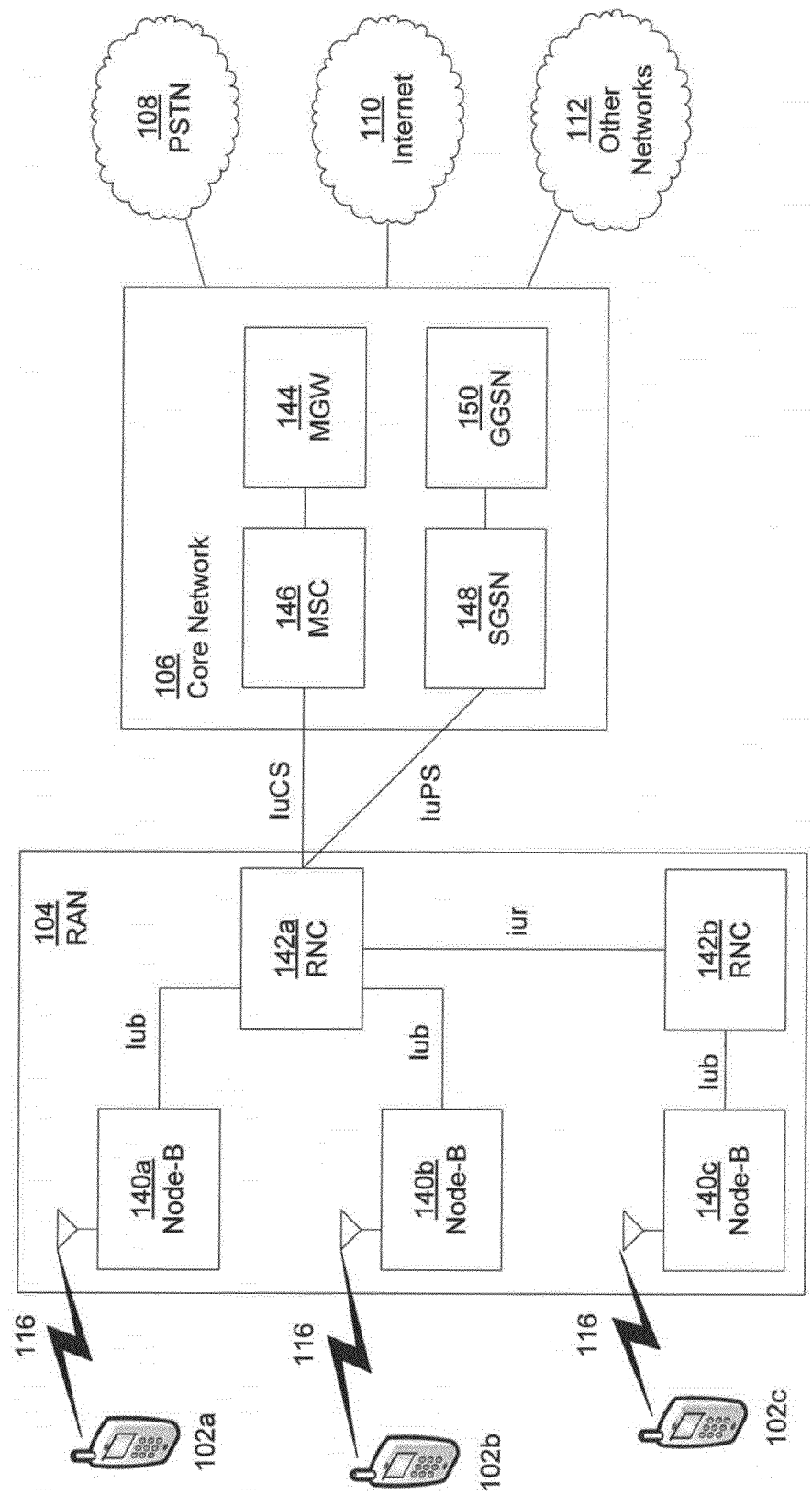
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving general packet radio service (GPRS) support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices. As noted above, the core network 106 may also be connected to the networks 112, which may include other wired or wireless networks that are owned and/or operated by other service providers.

Although many figures herein display UMTS components the examples herein may also apply to other mobile telecommunication technologies such as CDMA, LTE, LTE-A. In the case of LTE, for example, RAN 104 may include eNode-Bs. The core network 106 may include LTE related mobility management gateways (MME), serving gateways, and packet data network (PDN) gateways. Also note that the terms managed remote access (MRA) and remote managed access (RMA) are used interchangeably herein.

Home NodeB (HNB) and Home eNodeB (HeNB), which may be jointly referred to as H(e)NB, are 3GPP terms that are not limited to the home only, but are also applicable to enterprise and metro deployment. The term "Femto Access Point" (FAP) may be considered a more general term that may be considered synonymous with H(e)NB.

A H(e)NB may connect WTRUs over the UMTS terrestrial radio access network (UTRAN) or Long Term Evolution (LTE) wireless air-interface to a cellular operator's network using a broadband IP backhaul. Wired options for the customer's broadband IP backhaul may include two-wire xDSL (e.g., ADSL, ADSL2, VDSL, VDSL2), coaxial cable (e.g., via DOCSIS 1.1, 2.0, 3.0), optical fiber-to-the-home/premises (FTTH/FTTP), and possibly broadband over power lines (BPL).

By providing additional intelligence in an evolved HNB platform and offering new value-added services over the broadband IP backhaul, there may be additional opportunities through integration or interaction of an HNB platform with other digital home/neighborhood/enterprise network elements.

Value-added services may include lower cost communication and entertainment options (e.g., "quadruple play"), simplified home network management including remote access, expanded applications for personal devices including audio/video session transfer and universal remote control capabilities, IP multimedia session (IMS)-enabled "local" services, improved personal/home safety, and leveraging of operator-supported cyber-security.

New capabilities may include wireless broadband backhaul options including 3G technologies, and/or higher bandwidth 4G technologies such as WiMAX, LTE, and LTE-A. "Net-neutrality" regulations notwithstanding, this could also be a hedge against future constraints potentially imposed by terrestrial ISP providers in order to avoid exploitation of their broadband wire/cable/fiber network by cellular operators.

New capabilities may also include HNB support for a large number of machine-to-machine (M2M) devices and/or M2M gateways, coordinated multi-RAT delivery of multimedia data, including simultaneous multi-RAT connections, and interconnection of neighboring HNBs to form a neighborhood-area or enterprise-area network, which may facilitate local P2P communications including access to locally cached content.

In addition, the new capabilities may include the interface between a HNB and a wireless access in vehicular environments (WAVE)-enabled vehicle. This interface may assist in session continuity for the users within a vehicle when they arrive or leave home. There also are other uses for this interface such as the transfer of vehicular data to a network.

The following are examples of service requirements that may be supported by the CGW Hybrid Network Architecture: 1) simplified deployment and operation, including auto configuration; 2) all WTRU services as provided by cellular network operators, including mobility to/from macro-cells, support for IMS, M2M gateways, etc. . . . ; 3) local device communication with signaling and data through the CGW; 4) local device communication with signaling through the CGW, and data through peer-to-peer (P2P) connections between local devices; 5) local IP access from WTRU to home network; 6) remote access from WTRU to home network; 7) extension of public warning system to home network; and 8) extension of cellular network television service (e.g., multimedia broadcast multicast services—MBMS) to home network.

The following are examples of access requirements that may be supported by the CGW Hybrid Network Architecture: 1) IP-based broadband backhaul towards cellular operator core network; 2) support for closed, open, and hybrid subscriber groups for cellular and WLAN access; 3) UMTS air interface, including support for legacy terminals; 4) LTE/LTE-A air interface; 5) 802.11-based WLAN air interface, including support for legacy terminals and 802.11p WAVE devices; 6) M2M using cellular/WLAN interface/gateway, or directly via alternate M2M interface such as ZigBee, Bluetooth, etc. . . . ; 7) support for inter-RAT and inter-HNB access/service transfer; 8) support for Multi-RAT access/service; and 9) local admission control and local resource control.

The CGW design may include the following technology elements: 1) Initialization of CGW components including 3GPP HNB, Local GW, IEEE 802.11 AP, IEEE 802.15.4 WPAN, RF Sensing Module, M2M GW, as well as CGW applications including Dynamic Spectrum Management (DSM); 2) registration of CGW components with external operator network(s) and/or service provider(s), including support for IMS and non-IMS services, external M2M servers, etc. . . . ; 3) local IP access (LIPA) between WTRU and residential/enterprise network via CGW; 4) selected IP traffic offload (SIPTO) via CGW; 5) access to local and mobile core operator (MCN) services via BWM-enhanced CGW; 6) idle and active mobility from HNB to HNB, HNB to macrocell, and macrocell to HNB; 7) proactive interference management (PIM) for Assisted Self Organizing Networks (SON); and 8) M2M Gateway functionality, among other things.

Various IP addressing formats may be used. In one embodiment, the gateway may be designed to conform to IPv4 addressing, in either a static or a dynamic addressing mode. For example, the gateway may obtain a public IP address from an ISP DHCP server, private IP addresses from a local DHCP server within the gateway, and private IP addresses from a remote DHCP server in the Mobile Core Network (MCN). The gateway may also incorporate NAT functionality to translate between the publicly routable ISP-assigned IP address and the private gateway-assigned local IP addresses.

IEEE 802.15.4 Wireless Personal Area Network (WPAN) devices interacting with the gateway via a WPAN Coordinator (WPAN-C) may be "auto-configured" with IPv6 addresses with assistance from the WPAN-C. WPAN devices may be auto-configured based on its MAC addresses and an IPv6 network prefix provided by an IPv6 routing function in the WPAN Coordinator. The HNB functionality in the CGW may be selected to be fully compliant with UMTS HNB standards, and may support IPSec tunnel establishment with the MCN via the public Internet.

Although many figures herein display UMTS components the application also applies to other mobile telecommunication technologies such as LTE and LTE-A. SGSN, HNB-GW, HNB, and LGW may support "direct tunnel" functionality. Support for direct tunneling between LGW and RAN in connected mode are in exemplary embodiments herein. For example, a direct tunnel approach may define procedures for establishing a direct tunnel between RNC and GGSN. In some embodiments, an HNB may look like an RNC and an LGW may look like a GGSN to an SGSN. This may be needed to allow an SGSN to set up a tunnel A LGW may perform the same or similar functions as a GGSN, but on a home or enterprise network.

The following LIPA/SIPTO IP address situations may apply to CGW implementations. An IP address of a WTRU may be assigned by an LGW, acting as a gateway to a local network that a user wishes to access. An IP address may be assigned to a WTRU by an LGW within a home subnet. User mobility (i.e., change of point of radio interface attachment) during an ongoing PS session may not cause a change in the IP address of a WTRU. User mobility during an ongoing PS session may not cause a change of an anchor LGW.

Each LGW may be uniquely resolvable by an APN name. For example, LGWs may have unique names or an SGSN may have the intelligence to identify a particular LGW. Managed remote access (MRA) may include remote access to a user's home network from a macro cell or from a remote HNB.

The LGW may behave like a GGSN, but GGSNs are typically limited in number and may cater to a huge volume of traffic while LGWs may be enormous in number but each individual LGW may cater to a very small amount of traffic. Therefore, a concentration function, such as an LGW Aggregator (similar to an HNB-GW), which may pose as a GGSN to a Core Network, may hide many GGSNs (LGWs) behind it. In many embodiments, an LGW Aggregator may be configured in the MCN, analogous to the HNB-GW.

Traffic on all interfaces owned/managed by MNO may be secured (e.g., HNB to LGW, LGW to MNC). There may also be interfaces which are not managed by an MNO (though such interfaces may emanate from MNO managed elements) and therefore security may not be a concern (e.g., LGW to LIPA network, LGW to SIPTO network, etc.).

Existing standards may address issues of idle mobility. In addition, active HNB mobility may support combined hard handover and serving radio network subsystem (SRNS) relocation procedures including support for lossless handover as described herein.

Bandwidth Management in the CGW may include a Bandwidth Management (BWM) Server that may provide multi-RAT distribution of IP packet data between cellular (e.g., UMTS) and 802.11 air interfaces for devices with BWM Clients that support multi-mode capabilities. Some options for integrating the BWM Server into the CGW include integration of the BWM Server functionality within the HNB, or integration of the BWM Server as a standalone entity between a standard HNB and the MCN. In an another embodiment, the BWM server may be integrated with multiple HNBs, which may be useful in an enterprise deployment.

A BWM server may have the following functionality: 1) DNS Server (or proxy DNS Server); 2) DNS Client; 3) DHCP Client; 4) GTP entities that support 3GPP TS 29.060, v9.1; and 5) IPSec support. In addition, the BWM server may have deep packet inspection capabilities for carrying out the following actions: a) radio access bearer (RAB) Assignment Request; b) RAB Assignment Response; c) DNS Request; d) TR-069 Set Parameter Value; e) RANAP Relocation; f) RANAP Forward SRNS Context; and g) forwarded DL data packets during mobility, among other things.

A home or enterprise network may be configured to have a cable modem or digital subscriber line (DSL) connection to the public internet. It may also have HNBs and BWM servers able to connect to each other in the same Home Area Network (HAN) or Enterprise Area Network (EAN) and HNB and BWM server that have IP address on the HAN or EAN.

The HNB and MCN may be configured to have the following: 1) no change to HNB or MCN element protocols; 2) HNB with initial HNB management system (HMS) fully qualified domain name (FQDN) burnt into memory; 3) HNB configured so that primary DNS server is BWM server; 4) HNB configured to have a pre-shared key in common with the BWM Server for use during IPSec tunnel establishment and use; 4) initial or serving (security gateway) SeGW configured to have a pre-shared key in common with the BWM Server for use during IPSec tunnel establishment and use; and 5) HNB configured to have initial SeGW FQDN burnt into memory, among other things.

A BWM server may be configured so that the initial SeGW FQDN is burnt into memory and so that it may agree with Initial SeGW FQDN in HNB. The BWM server also may be configured to know the location of the "outer" DNS server which may be done as part of the DHCP process of assigning local IP address. "Outer" DNS Server is a DNS Server that may be on the public Internet while a "inner" DNS Server is a DNS Server within the Mobile Core Network. The BWM Server may be powered up and have a local IP address prior to the HNB being powered on. A BWM solution may be provided at a macrocell level and may not be necessarily implemented in all HNBs. The "BWM" layer may reside between the Transport and IP Layers in both the client and server. The embodiments described herein support lossless as well as lossy data services There are multiple ways to trigger the BWM server to establish an IPSec tunnel with the initial or serving SeGW. In general, the BWM server may support the establishment of an IPSec tunnel with the HNB and the BWM Server may have the MCN IP address provided by the initial or serving SeGW during the establishment of its IPSec tunnel with the serving SeGW. Possible ways to trigger the BWM server to establish an IPSec tunnel may include the following: 1) IPSec tunnel from the BWM server to the initial or serving SeGW triggered by the HNB requesting the initial or serving SeGW IP address via DNS; 2) BWM Server may listen to the IKE_SA_INIT message from the HNB and trigger itself to establish an IPSec tunnel with the initial or serving SeGW; and 3) the application of power to the BWM Server may trigger the IPSec tunnel.

Figure 51:
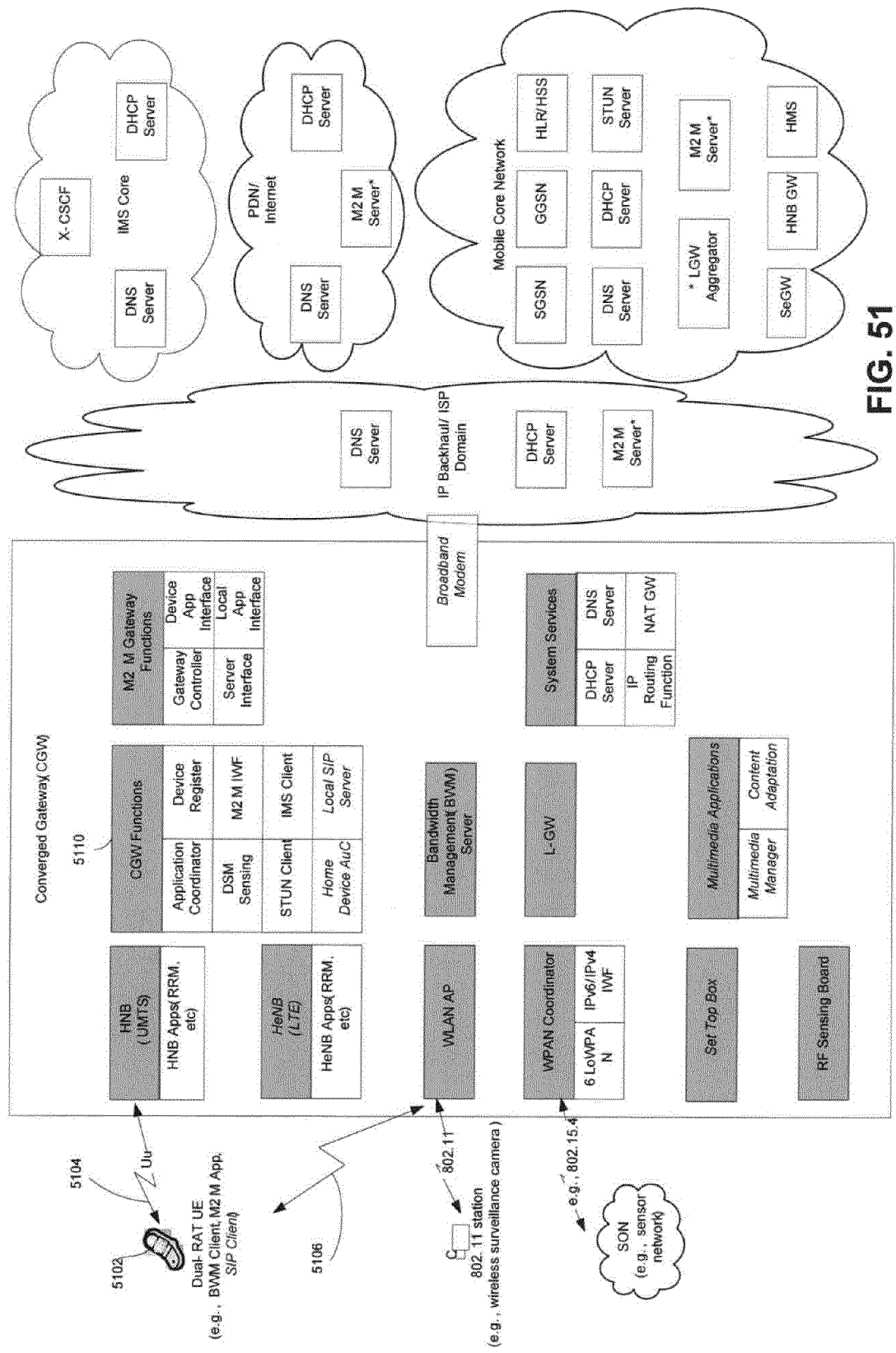
FIG. 51 is an exemplary illustration of an architecture of a CGW Hybrid Network.

FIG. 51 is an exemplary basic architecture of a CGW Hybrid Network. The physical implementations may vary depending on the specific functions of interest. A description of the major components is summarized herein.

An extension to the architecture shown in FIG. 51 is one where a particular interface shown in FIG. 51 (which we shall refer to as a logical interface) may actually be implemented by more than one physical interface. For example, an end device, such as a cell phone or an appliance 5102, may have both WiFi 5106 and a cellular interfaces 5104. In this example, the logical interface would be a physical multi radio access technology (multiRAT). This may facilitate multiple transmissions being used to increase the data rate or to provide link robustness (i.e., multiRAT diversity) or to provide flexibility where each RAT is selected in an adaptive manner depending on the suitability of the RAT to the data being transferred, wherein the suitability may be aspects such as security, data rates supported, QoS supported, cost, etc. Variations are possible wherein subsets of functions are implemented. For example, the body area network (BAN) may be absent in a particular variation.

The CGW Infrastructure may consist of home "core network" elements including any hardwired facilities (e.g., Cat. 5 cable, coax cable, phone line, power line, fiber). The infrastructure elements typically consist of stationary line-powered devices that may also operate via battery-backup in case of temporary power outages, thereby ensuring continuity of critical services involving security, healthcare, and public safety. Such devices may include cable/DSL modems, access points, routers, M2M gateways, media servers, registration/security database servers, and a HNB.

In FIG. 51, some functions of the CGW platform are shown in the box labeled CGW Functions 5110. These functions may logically exist within the CGW platform, but may be implemented in either a centralized fashion, e.g., within the HNB, or distributed among multiple nodes.

Herein the high level components of the CGW infrastructure network may be considered as separate entities in order to facilitate an understanding of the generic architecture. However, commercial implementations of the generic architecture may combine various components for improved performance and reduced size/cost/energy consumption. For instance, the HNB could be physically integrated with a residential gateway, WLAN access point, and TV STB to provide a single-box multi-technology "converged gateway." To further support this, HNBs, broadband modems, and STBs may already share a common application layer protocol for remote management based on the Broadband Forum's TR-069 standard. Additionally, some operators offer both residential broadband and mobile services, so for them there may be an incentive to integrate femtocell base stations with residential gateways and Wi-Fi routers.

Of specific interest to our architecture definition is the HNB's ability to provide WTRU-enabled devices with "Local IP Access" (LIPA) to the home-based network and to the external Internet. In addition, HNB may support logical and/or physical connection to and/or integration with other networks via gateways such as WLAN AP.

The HNB may connect via Ethernet to the customer's residential gateway which may provide access to the cellular operator's core network through broadband cable, fiber, or DSL. Fixed wireless broadband access may also be an option, e.g., WiMAX or LTE cellular technologies may be used. This may be a desirable option if, for example, future policies allow ISP providers to limit and control indiscriminate use of their broadband facilities by H(e)NBs from competing cellular operators.

Non-operator provided WLAN APs may be used in the home network. The CGW may also utilize 802.11n-based APs managed by the cellular operator. This may allow tighter integration with the overall solutions, including support for all of control functions (e.g., security, mobility, network management, DSM, etc. ... ).

M2M devices in the CGW domain may be on the same subnet. IPv4/IPv6 translation may be covered in the WPAN Coordinator, therefore all communication within the home subnet may be IPv4-based. Communication within the WPAN may be IPv6 based. Any IP version (e.g., IPv4 or IPv6) may used to implement the embodiments herein.

M2M Gateways may support multiple interfaces, e.g., they may communicate within wireless capillary networks via short-range low power interfaces, while exchanging information with the CGW, which may further disseminate the information into the WAN. Inter-M2M Gateway communication (e.g., for inter-gateway mobility) may also be accomplished via the CGW, or directly, for example, when the M2M gateways share a common M2M technology. Although end devices such as sensors are typically designed for extremely low power consumption, the M2M Gateways could themselves be plugged into power outlets and may easily support multiple air interfaces with higher duty cycle communications. Note that M2M gateways are potential candidates for reconfigurable hardware technologies based on FPGAs, SDR, and software configurable hardware, such that a single piece of equipment can be marketed to support multiple standards.

Multi-RAT mobile terminals may also act as M2M gateways. For instance, a handset with cellular, WiFi, and Bluetooth capabilities may communicate with healthcare body sensors via Bluetooth or WiFi, and convey the information to a remote network via WiFi or cellular.

The traditional role of a set-top box (STB) is to control and display inter-active subscription TV services provided via coaxial cable, digital subscriber line (xDSL), optical fiber-to-the-home (FTTH), satellite, or possibly via wireless cellular technologies such as WiMAX or future LTE/LTE-A. Herein primarily the delivery of TV (primarily digital TV (DTV)) to the STBs will be assumed. The DTV content may be delivered over modulated radio frequency (RF) channels or as IPTV. Digital TV and digital radio options include "over-the-top" transport using the Internet, subscribed satellite broadcasts, and terrestrial over-the-air.

Audio visual devices (A/V devices) in the multimedia network may be wireless-enabled, and that the STB function may wirelessly transmit subscribed A/V content from the service provider, as well as local content from the integrated home network (e.g., media server, handset, and potentially via the HNB and AP). As such, the role of the STB can be expanded to that of a "media gateway."

In order to support the proposed CGW functions, various nodes such as servers, databases, and storage facilities also may need to be supported. For example, these nodes may contain personal media and data content, identification and addressing registries, as well as security and access control policies.

Figure 52:
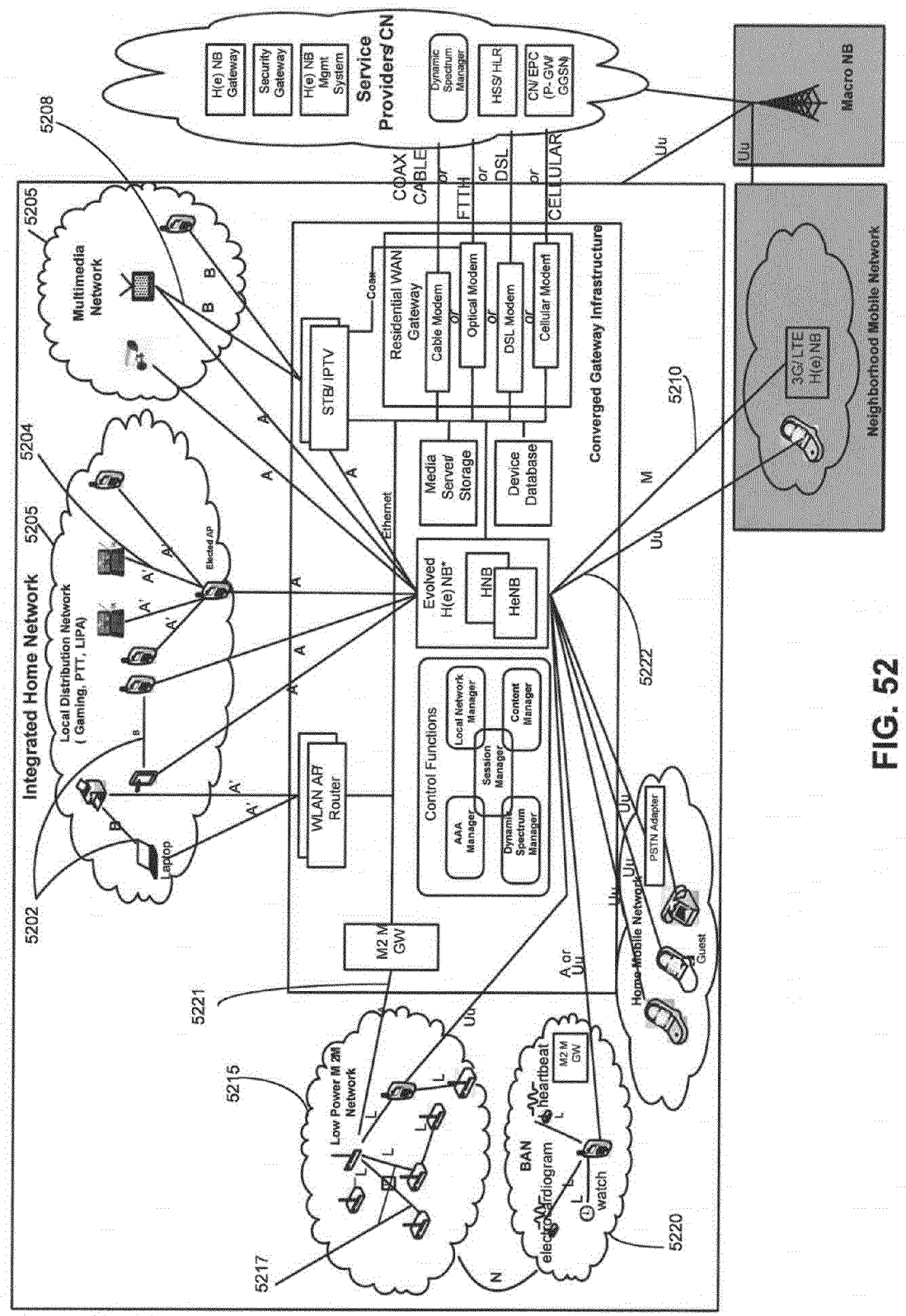
FIG. 52 is an exemplary illustration of an architecture of a CGW Hybrid Network.

FIG. 52 is another exemplary illustration of a CGW architecture. FIG. 52 shows the networks that interact with the CGW. A local distribution network 5205 may include productivity devices that exchange information between local network nodes (e.g., computers, printers, etc.), or externally to other networks via gateway-enabled devices. Such networks may operate in infrastructure modes (e.g., via base stations or access points) or non-infrastructure modes (e.g., peer-to-peer or master-slave), and may be supported by various wireless technologies including WiFi or cellular. For example, applications include file transfer, web browsing, and email, among other things.

There are several variations of this architecture. For example, the interface can be Ethernet, but may be implemented by other means such as backplane, power line networking, etc. Similarly, the interface in FIG. 52, which can be termed as 'M'5210, may be the 3GPP defined X2 interface or possibly an enhancement thereof. An M interface may be considered n inter-H(e)NB interface.

FIG. 52 illustrates an example integration of various local networks, such as low power machine-to-machine (M2M) networks, body-area networks (BAN), multimedia networks, and local data/voice communication networks. In FIG. 52 interfaces are shown between devices in the local distribution network. The interface A' interface 5204, may be an evolved infrastructure mode 802.11-like interface with a centralized Access Point (AP) controlling communications to connected devices. A' may be considered a generic name for high speed Ad Hoc interface between elected cluster head and device. Direct links can be set up between peer devices using a logical B 5202 interface. Typically, the B 5202 interface provides high throughput and low latency.

Low power M2M network 5215 may include wireless sensor and home automation. Such sensors and home automation networks typically involve data gathering devices which convey raw, processed, or aggregated information between local network nodes, and may include external communication with other networks via gateway-enabled devices. Such sensors are usually low data rate, low duty cycle, and power-constrained devices. In addition to passive sensing, some devices may support active control functions such as sounding an alarm or flipping a switch. Cluster formation of the sensor networks may occur via device discovery procedures.

M2M networks may operate in infrastructure modes (e.g., via base stations or access points) or non-infrastructure modes (e.g., peer-to-peer or master-slave), and may be supported by various technologies including ZigBee, Bluetooth, WiFi, or cellular. In FIG. 52, the logical L 5217 interface may represent any of the aforementioned technologies (e.g., Wifi and Zigbee). A L interface may be considered a generic name for a relatively low speed ad hoc interface. The interface typically provides a low throughput, and assumes that the devices are power constrained. Applications may include home security, surveillance, health monitoring, energy management, HVAC control, WAVE, etc.

Somewhat similar to the low power M2M networks, body area networks (BANs) 5220 may include wearable/implantable wireless sensors that may convey information locally to the user or externally to other relevant entities via a CGW. The gateway device may also act as an aggregator of content from the wireless sensors.

Wireless multimedia networks 5206 typically include home entertainment equipment that exchange multimedia information (e.g., audio, video, data) between local network nodes, or externally with other networks via gateway-enabled devices. These devices generally require support for much higher data rates than sensor networks. Such networks may operate in infrastructure modes (e.g., via base stations or access points) or non-infrastructure modes (e.g., peer-to-peer or master-slave) and may be supported by various technologies including WiFi or cellular. Applications include realtime audio/video, playback of locally/remotely stored content, automated sync between devices, live transfer of sessions between devices, etc. In FIG. 52, the logical B 5208 interface may be used between devices in the multimedia network.

The cellular network may overlap with parts of the previously described networks, and may include macro-cell, inter-Home (e)Node B, and intra-Home (e)Node B elements. Devices may include Closed Subscriber Group (CSG) and non-CSG WTRUs, and may be used for traditional services such as voice, text and email. In addition to traditional functionality, the cellular operator's core network may be expected to include support for future value-added services enabled by the evolved CGW platform The CGW may communicate with a number of devices within the local clouds. Note that not all devices in the local clouds need to communicate with the CGW. For instance, some devices may not have the necessary radio access capability. Alternatively, some devices may decide to restrict communication within the local cloud in order to conserve resources (power, storage, etc, . . . ). For devices that are capable and willing to communicate with the CGW, this communication may be via a logical A 5221, interface, that provides synchronization, control, and optionally a data plane functionality. These functions may be achieved through dedicated physical channels, or through shared channels. Synchronization provides the local cloud devices with the reference timing, and optionally an indication of where to find the control information. The control information may provide the signaling (between local cloud device and CGW) to allow local cloud device registration, local cloud device (re)configuration, measurement reporting to CGW, local cloud device assistance, etc. The A 5221 interface may allow a level of centralized control for interference management and load management within the converged gateway network.

The A interface may be implemented using a new air interface, optimized for the specific application and conditions (home, office, industrial, etc. . . . ). Alternatively the functions may be carried over the Uu interface 5222 (e.g., H(e)NB interface) or over an 802.11-like interface (shown as A' 5204 in FIG. 52).

Figure 53:
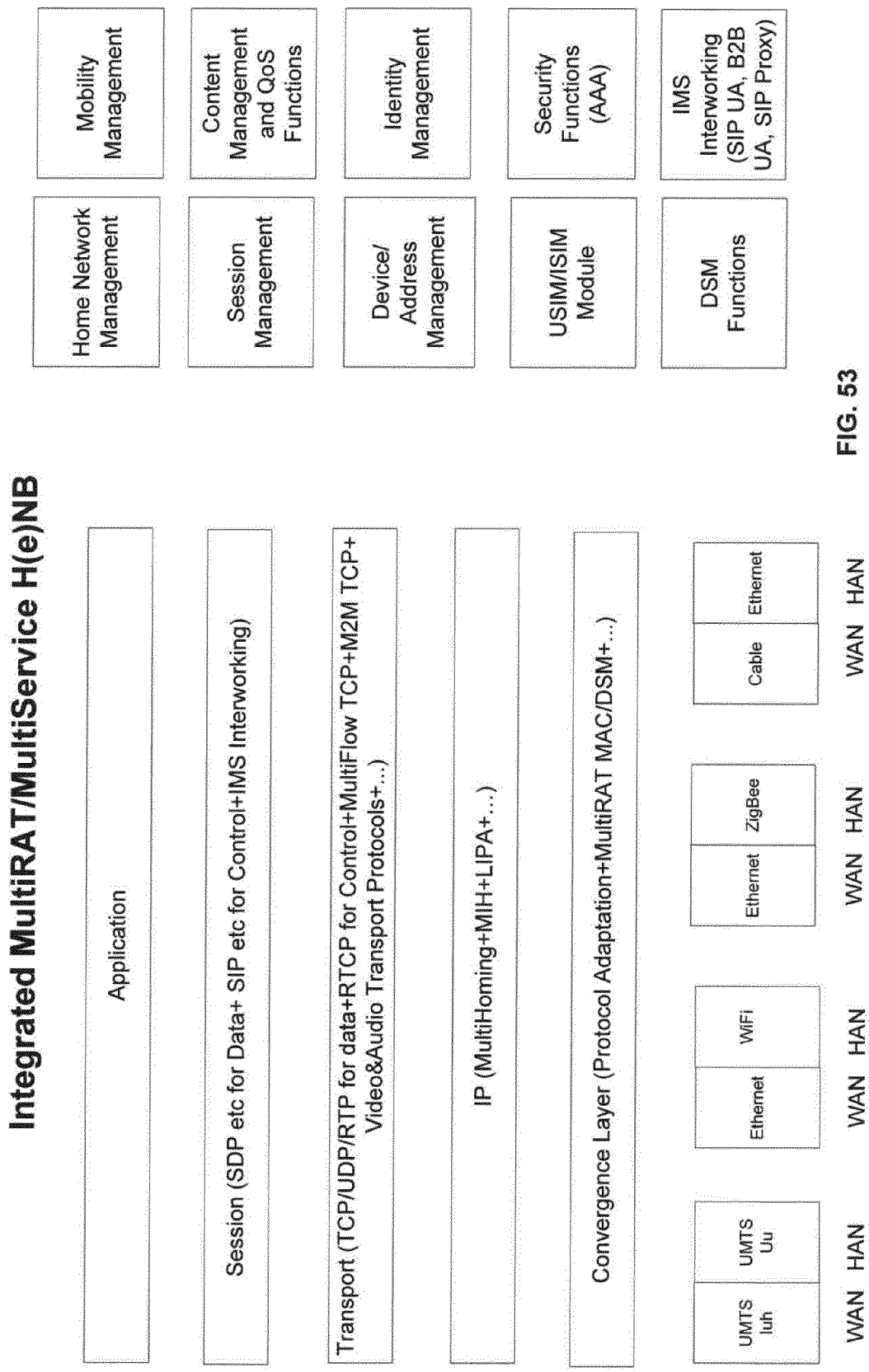
FIG. 53 is an exemplary block diagram that illustrates the high-level architecture of a Converged Gateway.

FIG. 53 is an exemplary block diagram that illustrates the high-level architecture of the Converged Gateway.

The CGW may be the central entity in a home (or enterprise) that contains a Broadband Modem, a Cellular H(e)NB, a WiFi Access Point, an IP Router and possibly other functional and physical entities, and serves to integrate the various sub-Networks in the integrated home network (IHN). The CGW may provide a logical binding to a home, just as a mobile phone may provide a logical binding to a person. A home, with all its devices, sensors, appliances, etc., may become identifiable by a CGW, so that each of the individual home devices may be indirectly addressable via the CGW. In return, the CGW may become a gateway for each home device to communicate with the wide area network (WAN) as well as other devices locally within the IHN.

A CGW may have a unique identifier, and attached to this identifier may be a list of home devices, each of which may have its own identifier. Furthermore, since the CGW, may be a communicating entity, where the communication services may be provided by a network operator, the CGW identifier may also include the identity of the network operator. While the CGW identity may be any alpha-numeric or binary value, it also may be a user friendly identity. For example, the home address may be the CGW identity, coupled with the Network Operator identity. If the home address is 123 Freedom Drive, Happyville, Pa. 10011, USA and the communication services are being provided by Universal Communications Corporation, then the CGW identity may be 123_Freedom_Drive, Happyville, Pa._10011, USA@Universal_Communications.com. Individual Sub-Networks and devices may further be appended to this identity. For example, Thermostat#123_Freedom_Drive, Happyville, Pa._10011, USA@Universal_Communications.com, where the # sign may be used to denote the split in the address.

Other architectures for the CGW are possible, by adding or deleting certain functional entities. For example, the ZigBee modem may be deleted and a Bluetooth modem added.

CGW Architecture may have many elements. For example, the CGW architecture may comprise the following local devices: 802.15.4 devices (WPAN), 802.11 devices, WTRUs, generic IP devices (e.g., printer, digital picture frame, etc.), BWM client enabled multimode devices. Some CGW entities may include HNB, WLAN-AP, WPAN-C, LGW, BWM server, RF sensing module, among other things. CGW applications may include M2M IWF, application coordinator, IMS client, STUN client (e.g., for extended local IP access mobility—ELIPA), and DSM spectrum sensing function (SSF), among other things.

Additional CGW architecture elements may include: M2M gateway; M2M server; M2M applications; system services (e.g., local DHCP server, local DNS server, IPv4 router, NAT); ISP network (e.g., ISP/"outer" DNS server); MCN (MNC/inner DNS server, HNB management system, SeGWs, HNB gateways, LGW aggregator, SGSN, GGSN, RNC (e.g., for handover between HNB and macrocell), STUN server); and IMS core network (e.g., IMS CN DHCP, IMS CN DNS, IMS CN x-CSCF).

The home network manager, may provide semi-static management of the home network including support of Self Organizing Network (SON) features. This function may discover the access technologies and associated functional capabilities available to the Converged Gateway.

A session manager is in the CGW platform. This function may control the transfer of media, data and voice sessions between various networks or devices shown in FIG. 52. This function may be centralized, e.g., in the H(e)NB, or distributed among home infrastructure nodes. The initiation of session transfers may be based on user interaction, or automated response based on mobility, context awareness, event-driven cues, and stored user profiles. Once initiated, the Session Manager may control the transfer, possibly involving the cellular operator and its knowledge of "registered" devices within the home, e.g., for digital rights management (DRM). This function may interact with the Content Management function for some transfers.

The Content Manager may handle functions such as content adaptation, e.g., transformation of required media formats between the home network and mobile handheld devices. This may include a content decomposition function.

The Dynamic Spectrum Manager (DSM), as shown in FIGS. 51 and 52, may be defined as the entity that facilitates assignment of the right RAT(s)/frequencies/bandwidth to the right application at the right time. The DSM may optimize utilization of available spectrum to minimize the local interference levels, satisfy the required QoS, allows spectrum aggregation using the same or different radio access technologies (RATs), and oversee the spectrum sensing and environment-based information fusion while enabling high throughput real-time multimedia content sharing among local devices.

In the context of the CGW, Dynamic Spectrum Management (DSM) may be considered as a common service providing spectrum sensing functions (SSF) and bandwidth management functions (BMF). For example, to assist with the self-organization of 802.15.4-based WPANs, the WPAN Coordinator may interact with DSM to obtain initial and alternate channels for operation. Similarly, the Bandwidth Management (BWM) Server may interact with DSM to decide on bandwidth aggregation and/or switching policies.

A security manager may include Authentication, Authorization, and Accounting (AAA) functions and may facilitate use of operator resources (e.g., providing proxy functions as needed). Also considered here are the open/closed/hybrid modes of operation of the H(e)NB and WLAN APs.

The IMS interworking functions may enable managed IMS-based services like VoIP and IPTV to be delivered to the home. Operator provided services may be accessed via remote application servers, and may also be accessed from local application servers or cached storage. Support may be provided for IMS-enabled and non-IMS-enabled devices in the home. Support for non-IMS-enabled devices may be provided by an IMS inter-working function in the converged gateway.

There may be an RF sensing module. The module may be a centralized single scanner entity as part of CGW. A embodiment may have the sensing performed in the CGW represent the interference that is seen by the entire network, in which case a single sensing node may be sufficient. The scanner outcomes may drive a SW entity ("Spectrum Sensing Function") as part of CGW to determine preemptive frequencies against interference. The scanner outcomes also may support interference mitigation and bandwidth aggregation decisions. In an embodiment the RF sensing module may be able to scan approximately 3 GHz.

Exemplary illustrations of system description of the CGW have been captured via message sequence charts (MSCs) detailing the interactions between technology elements of the system. The MSCs capture high-level flows while encapsulating example detailed messaging within individual procedure blocks.

Figure 2:
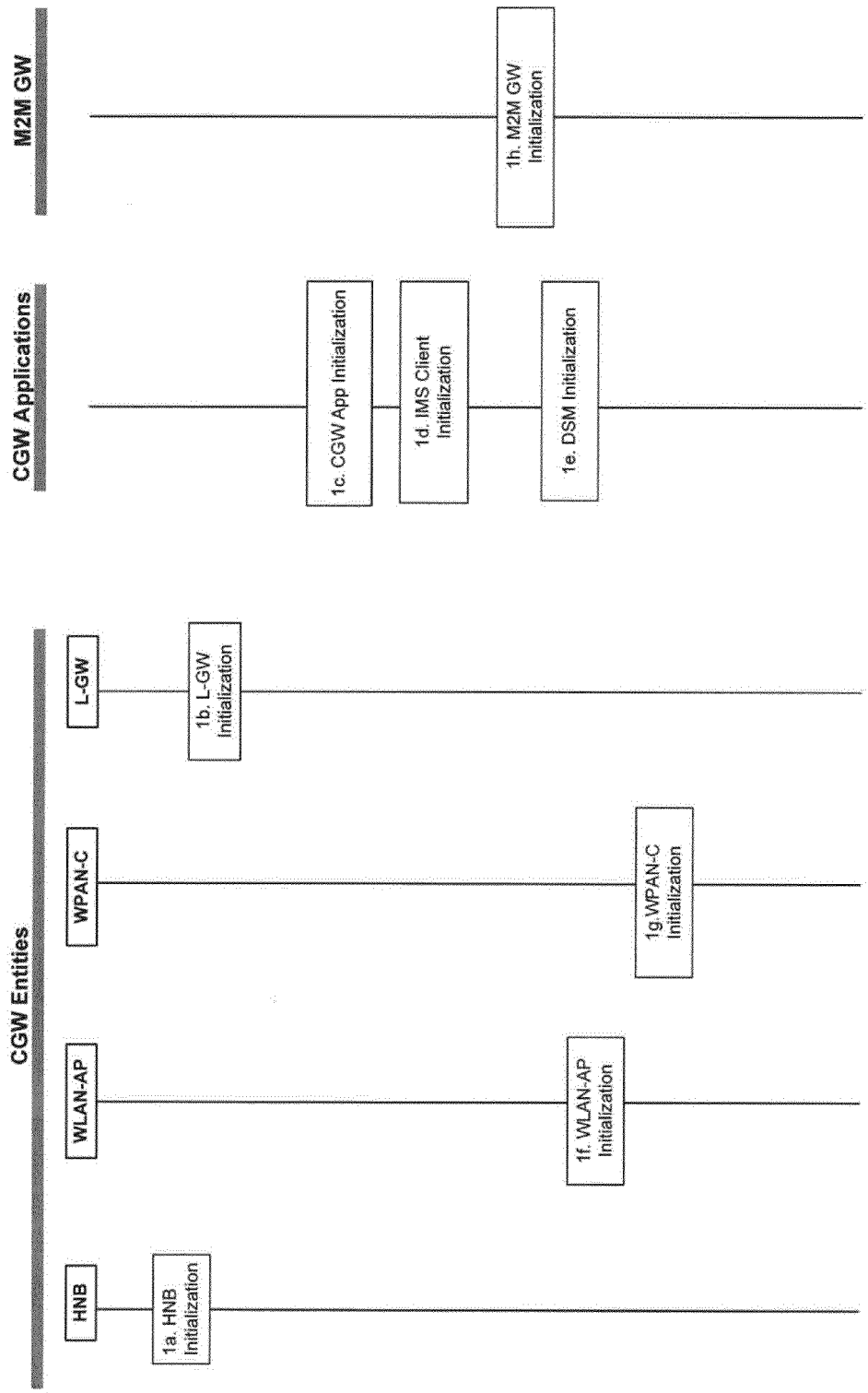
FIG. 2 is an exemplary illustration of a procedure for CGW initialization.
Figure 3:
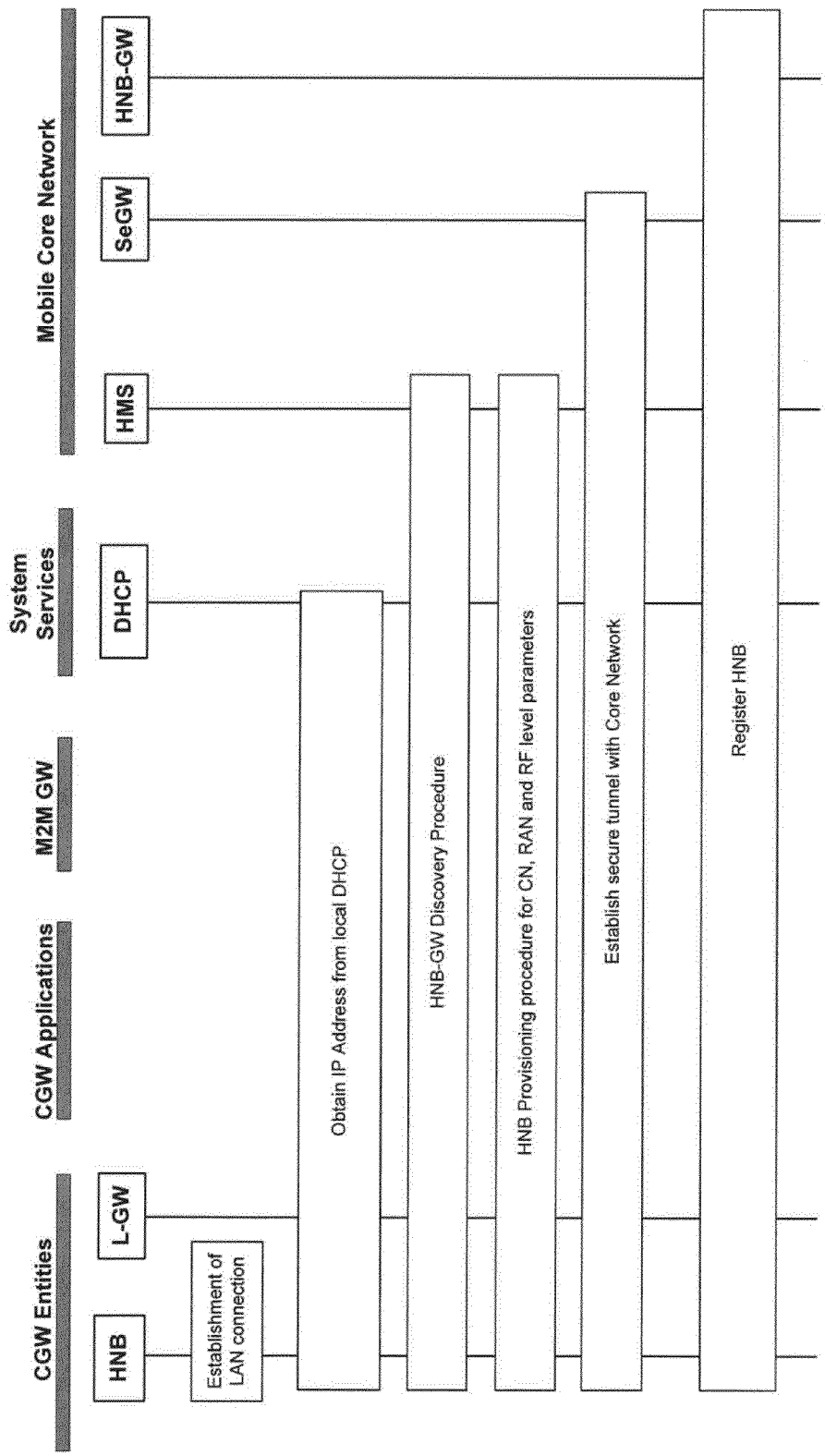
FIG. 3 is an exemplary illustration of a procedure for HNB initialization.
Figure 4:
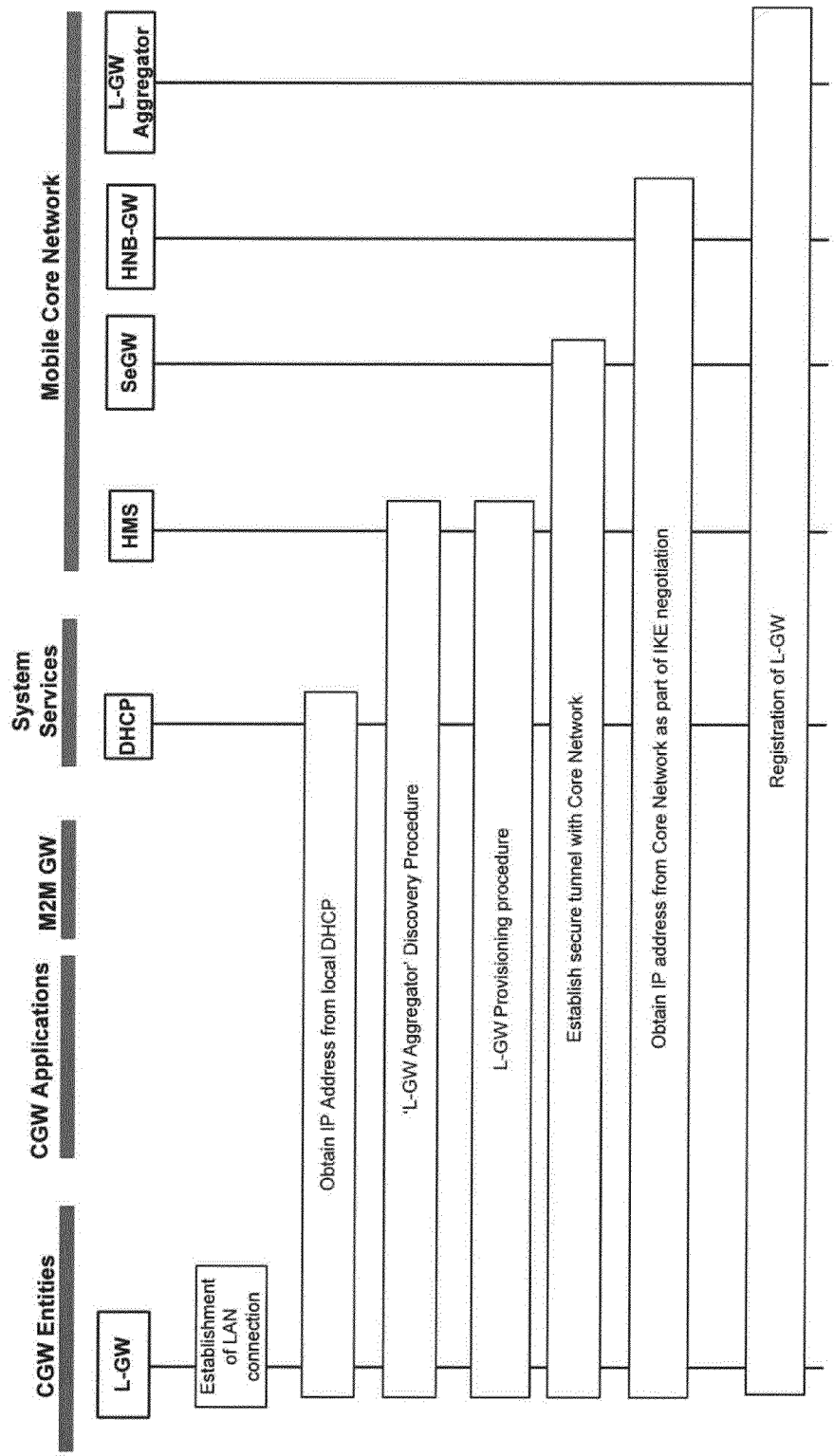
FIG. 4 is an exemplary illustration of a procedure for LGW initialization.
Figure 5:
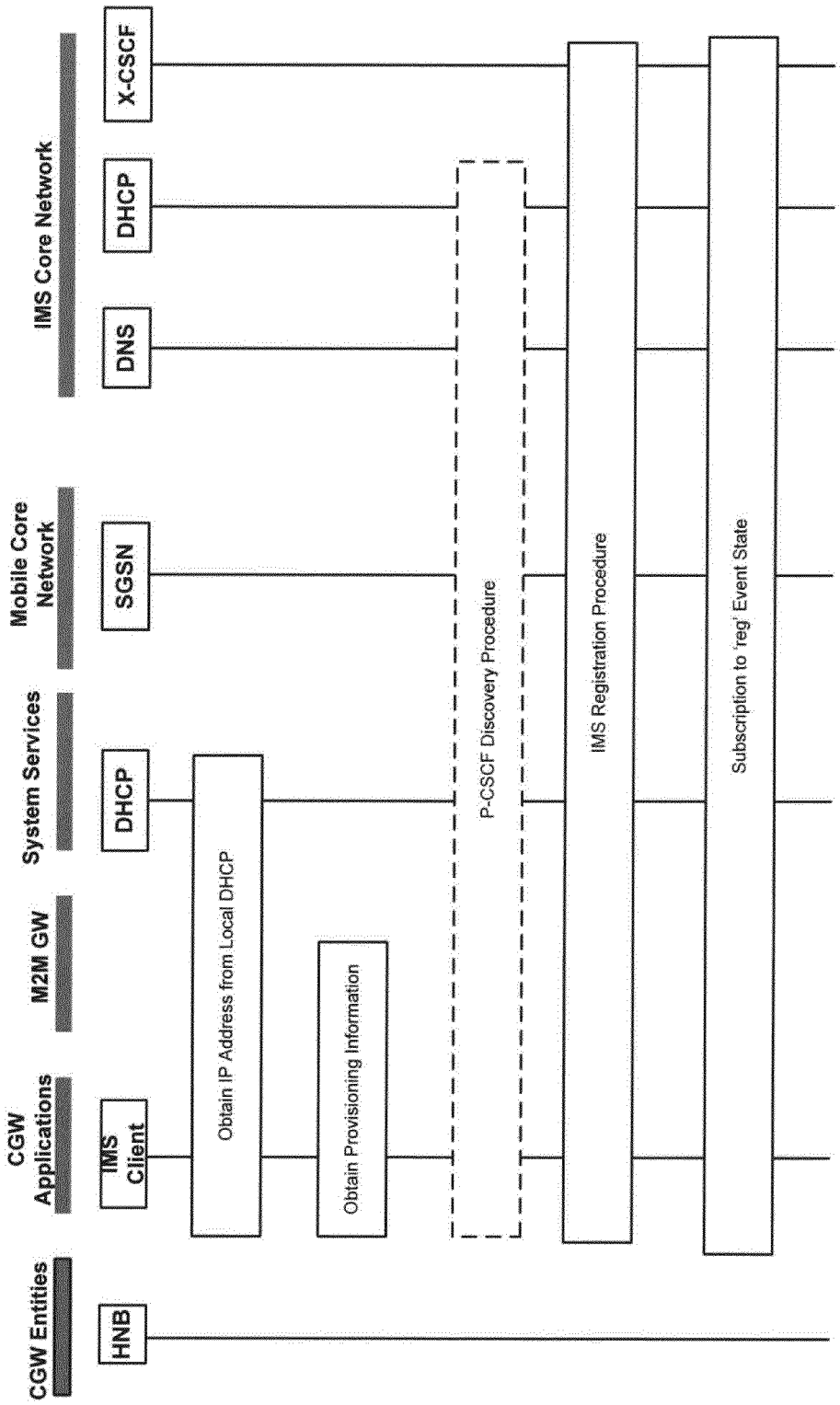
FIG. 5 is an exemplary illustration of a procedure a IMS client initialization.
Figure 6:
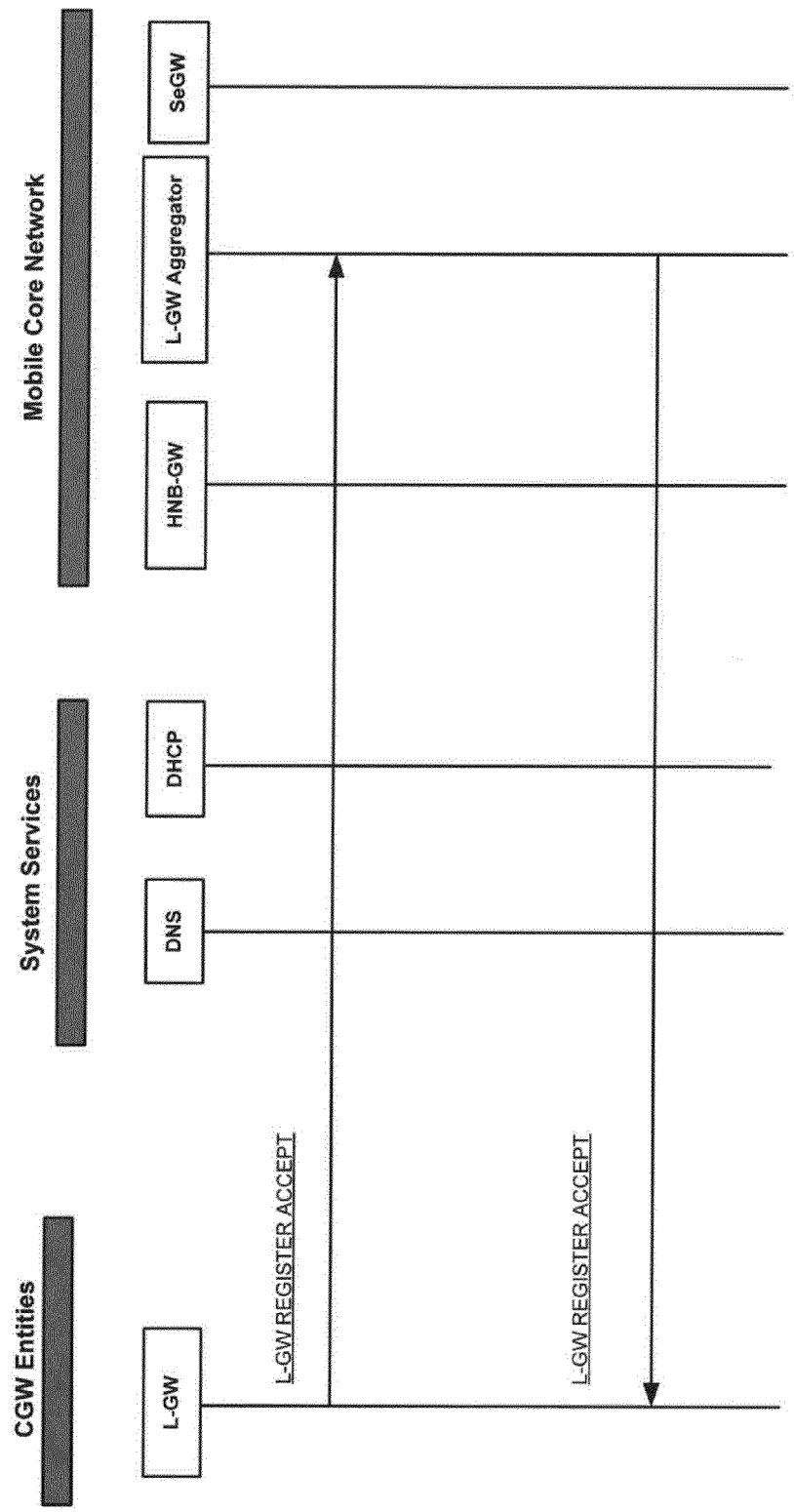
FIG. 6 is an exemplary illustration of a LGW registration.
Figure 7:
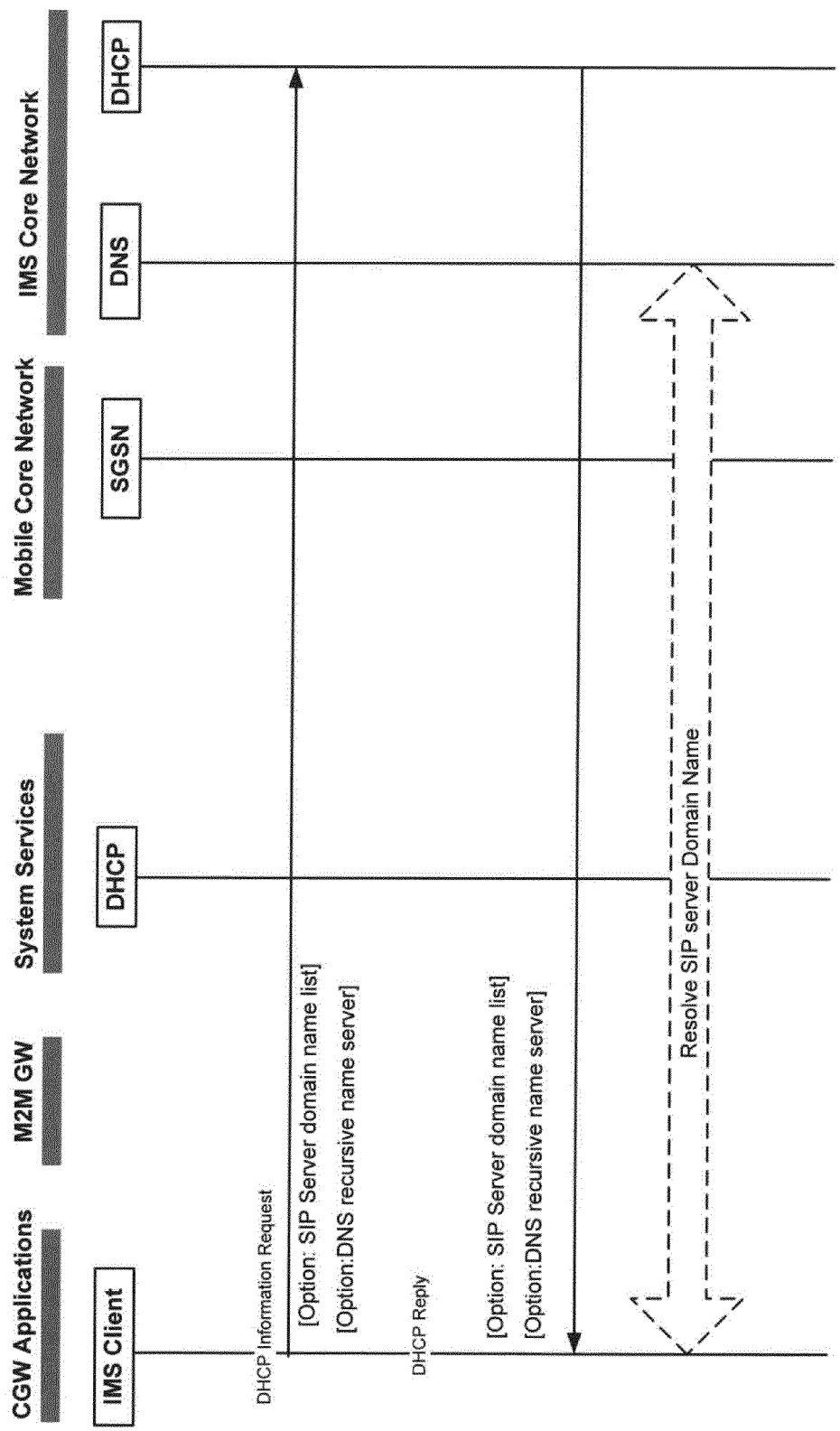
FIG. 7 is an exemplary illustration of a proxy call session control function (PCSCF) discovery procedure.
Figure 8:
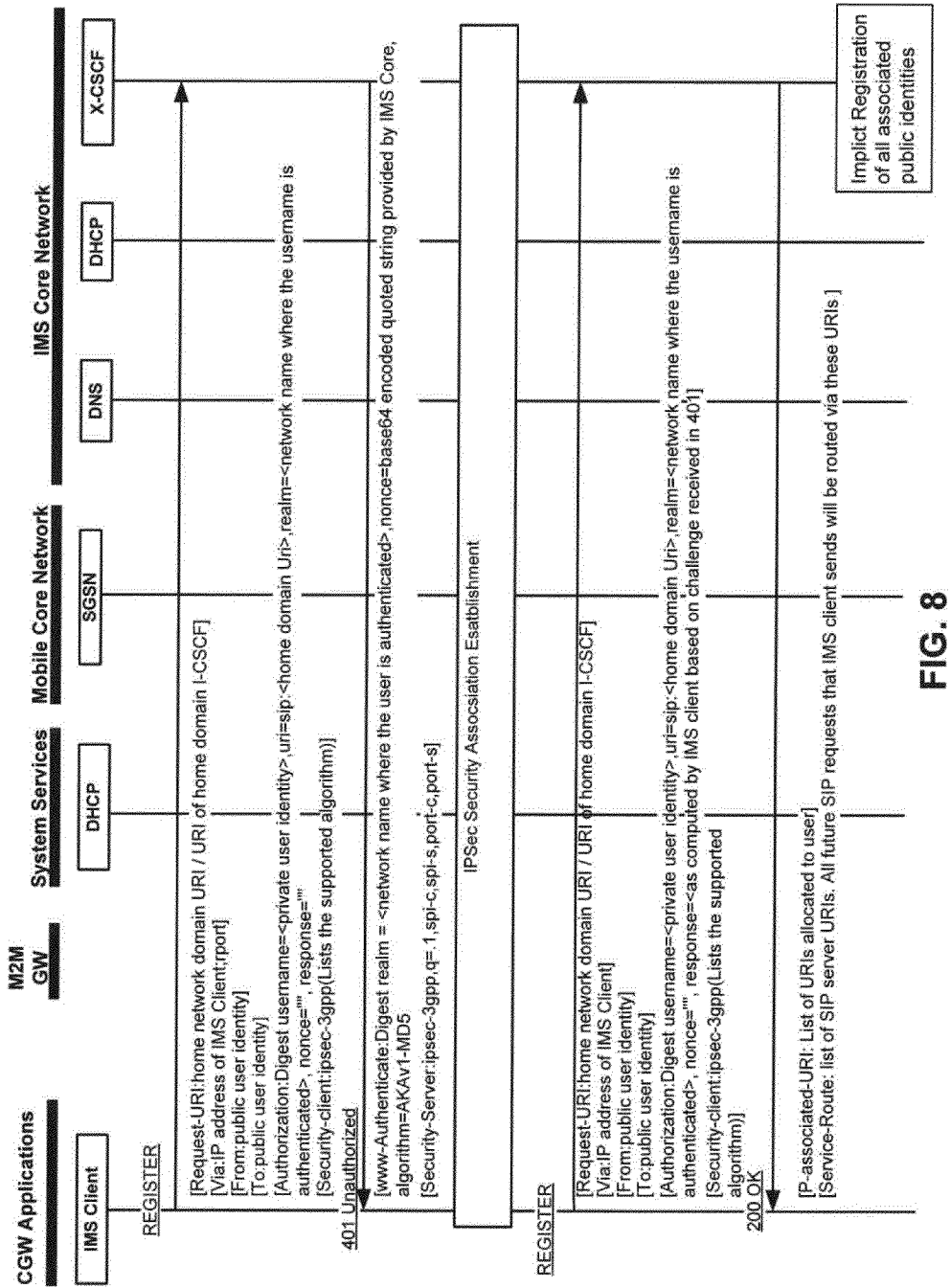
FIG. 8 is an exemplary illustration of a IMS registration procedure.
Figure 9:
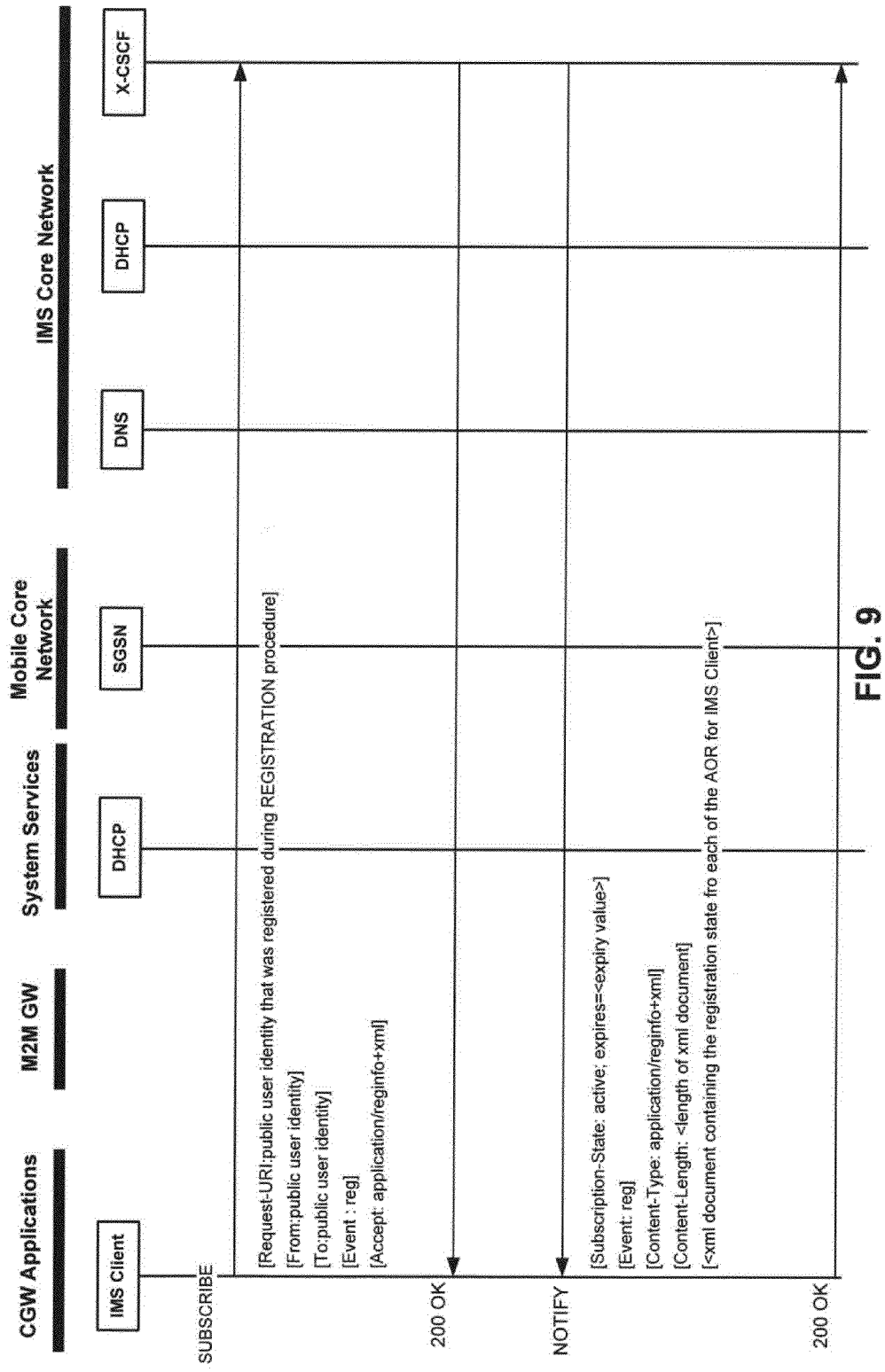
FIG. 9 is an exemplary illustration of a procedure for subscription to 'reg' Event state.

The CGW Initialization and Registration MSCs, as shown in FIG. 2 thru FIG. 9 are exemplary illustrations of the initialization of CGW entities including HNB, WLAN-AP, WPAN-C, LGW, M2M GW, and CGW Applications including DSM Spectrum Sensing initialization and IMS Client registration. FIG. 2 is an exemplary illustration of a procedure for CGW initialization. FIG. 3 is an exemplary illustration of a procedure for HNB initialization. FIG. 4 is an exemplary illustration of a procedure for LGW initialization. Note that the LGW may be a logical entity and its provisioning parameters may be similar to that of a HNB. FIG. 5 is an exemplary illustration of a procedure a IMS client initialization. FIG. 6 is an exemplary illustration of a LGW registration. FIG. 7 is an exemplary illustration of a proxy call session control function (PCSCF) discovery procedure. FIG. 8 is an exemplary illustration of a IMS registration procedure. FIG. 9 is an exemplary illustration of a procedure for subscription to 'reg' Event state.

Figure 10:
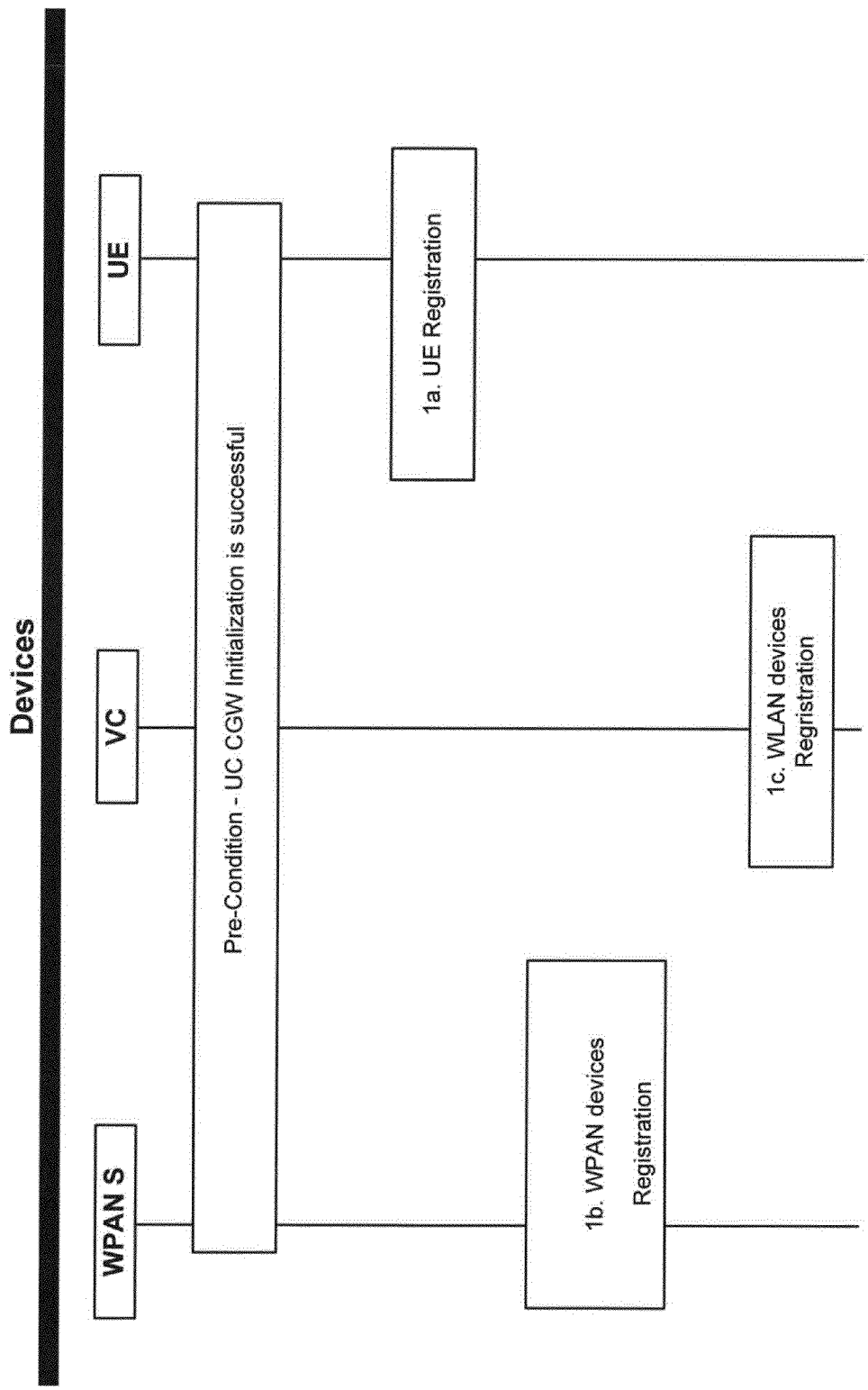
FIG. 10 is an exemplary illustration of a procedure for device registration.
Figure 11:
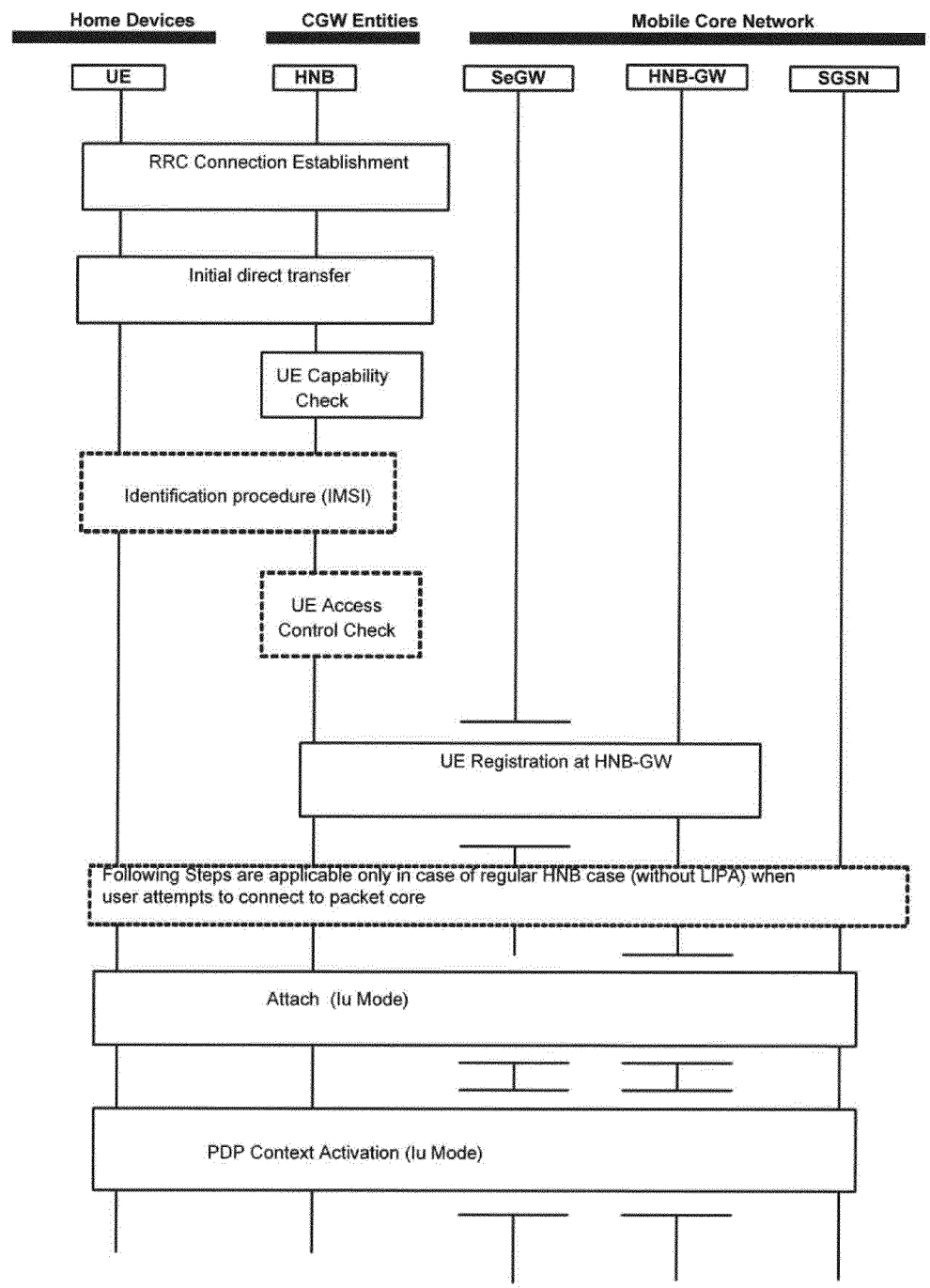
FIG. 11 is an exemplary illustration of a procedure for UE registration (NON CSG UE)
Figure 12:
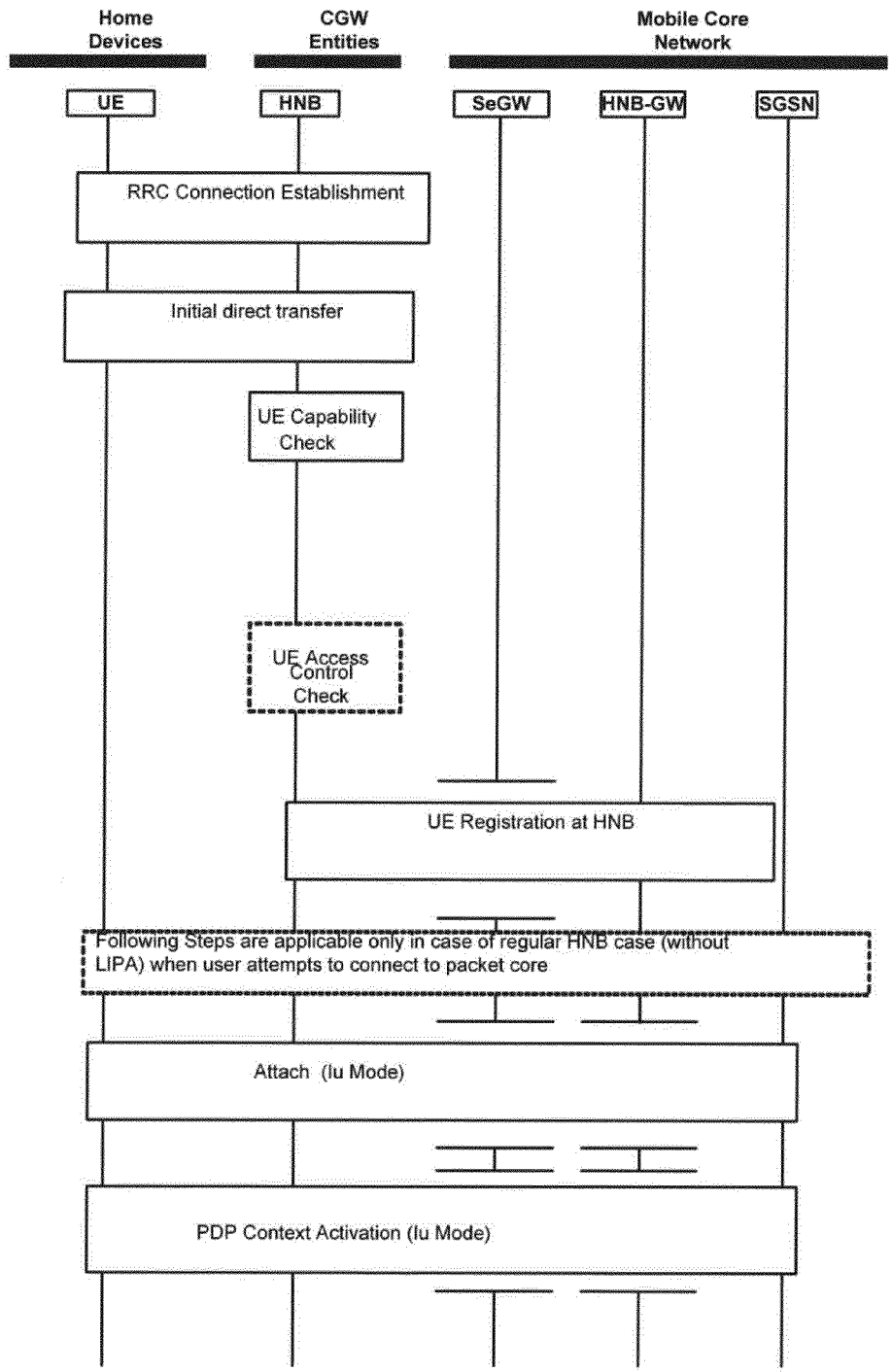
FIG. 12 is an exemplary illustration of a procedure for UE registration (CSG UE)

The Device Registration MSCs, as shown in FIG. 10 thru FIG. 12, are exemplary illustrations of the registration of UE, WLAN, and WPAN devices within the CGW, and with external operator/service provider networks. FIG. 10 is an exemplary illustration of a procedure for device registration. FIG. 11 is an exemplary illustration of a procedure for UE registration (NON CSG UE). FIG. 12 is an exemplary illustration of a procedure for UE registration (CSG UE).

Figure 13:
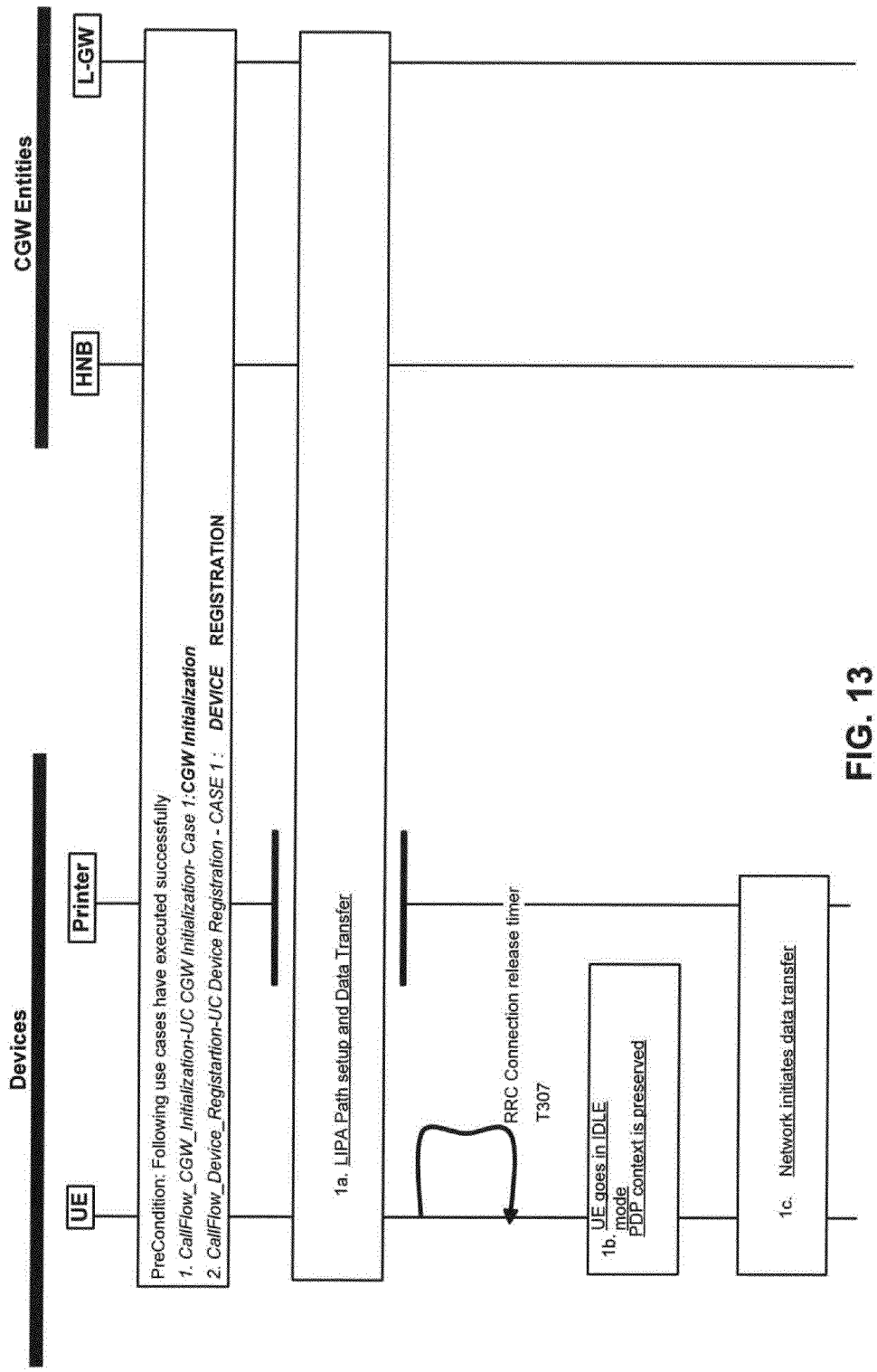
FIG. 13 is an exemplary illustration of a procedure for a UE attached to its home LGW and accessing a device on its home network.
Figure 14:
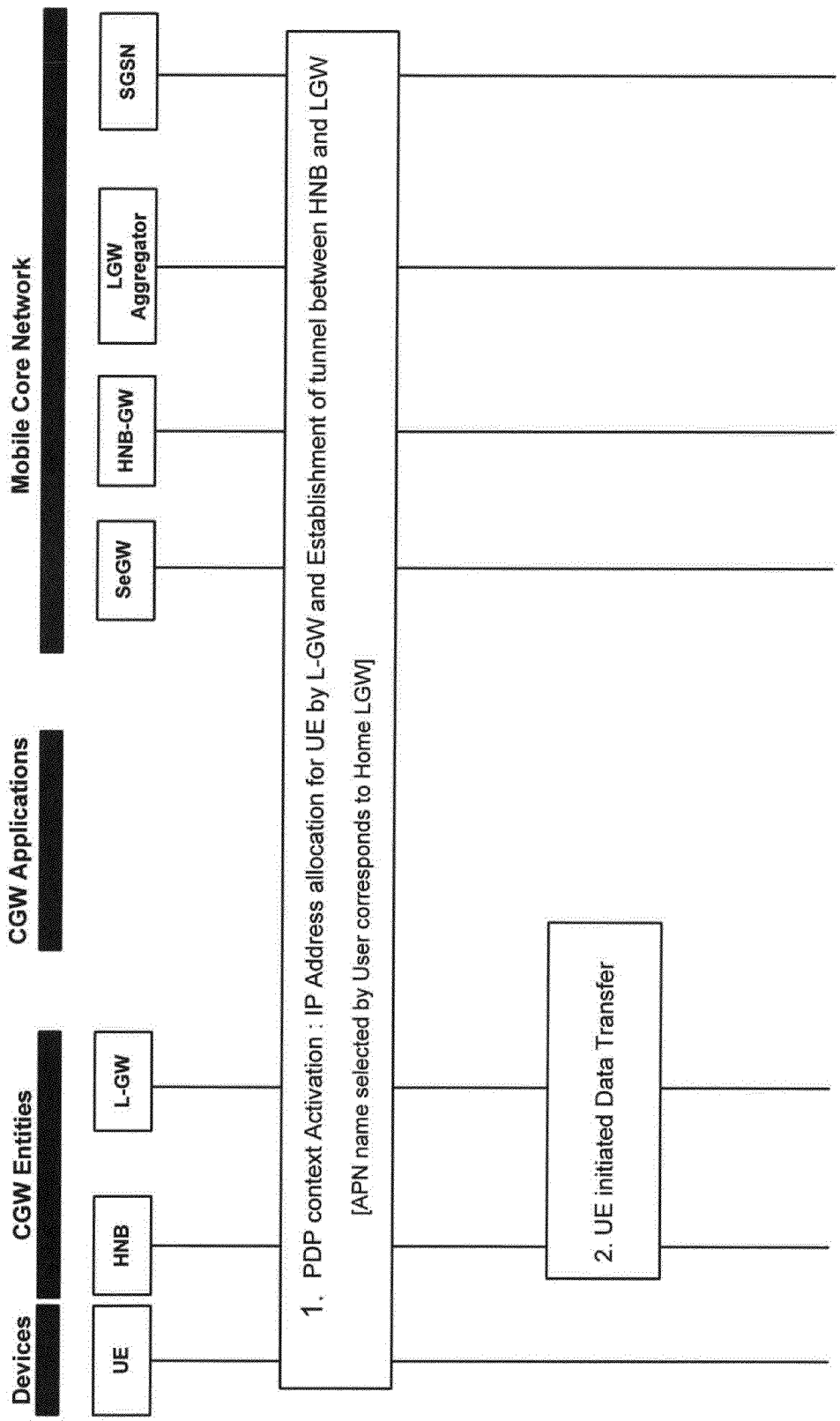
FIG. 14 is an exemplary illustration of a procedure for a LIPA path setup and data transfer.
Figure 15:
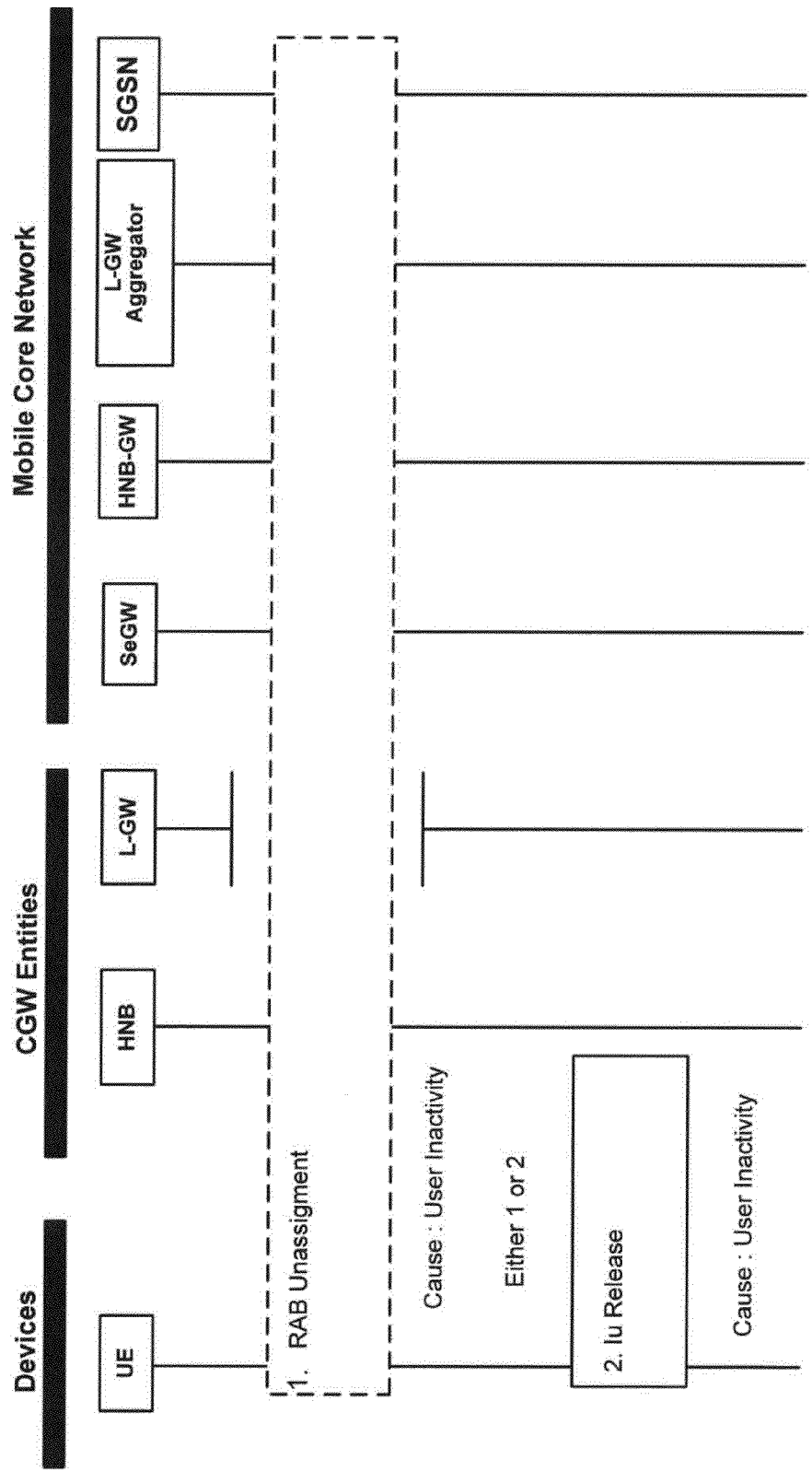
FIG. 15 is an exemplary illustration of a procedure for a UE that goes into IDLE state while preserving its PDP context.
Figure 16:
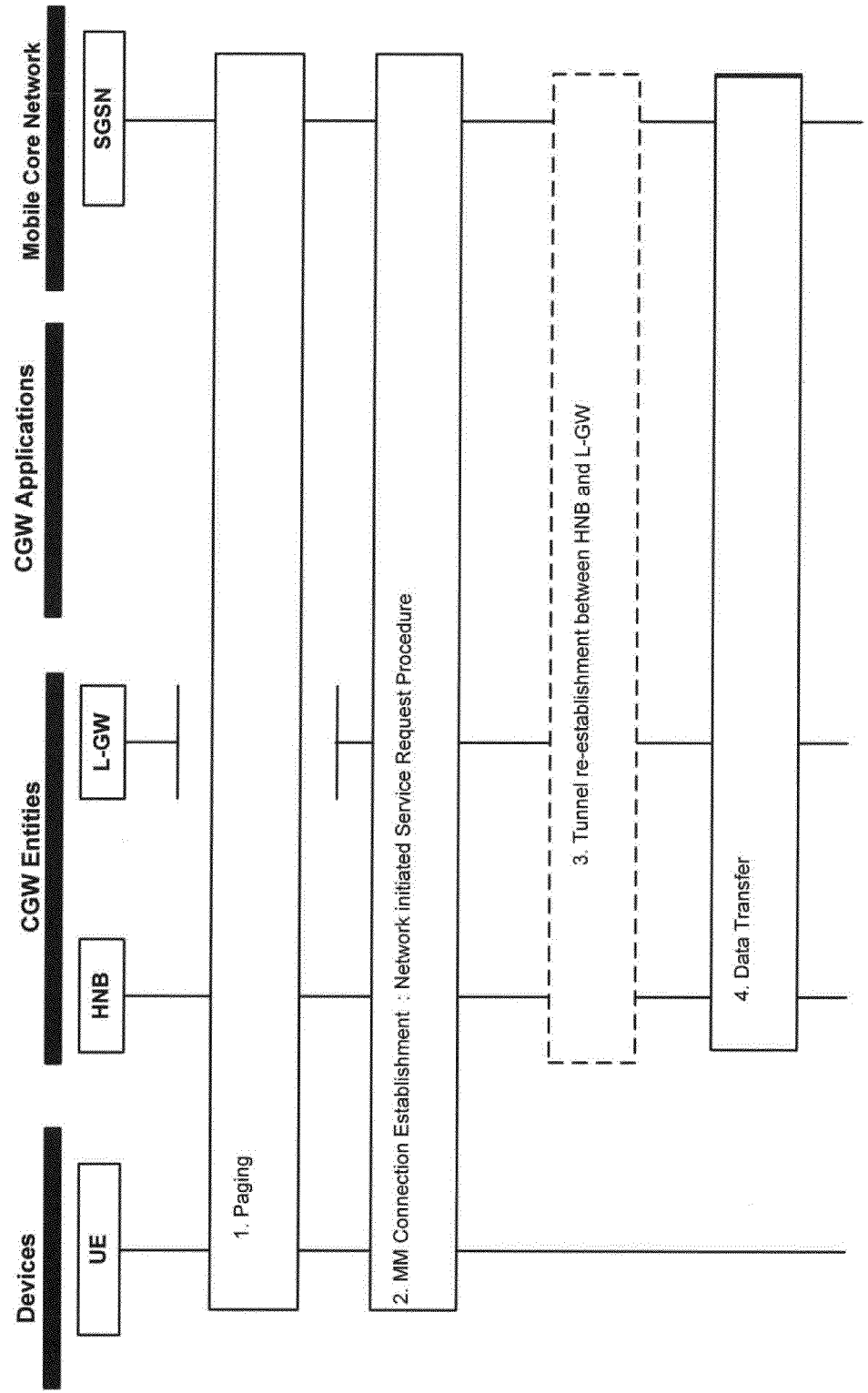
FIG. 16 is an exemplary illustration of a procedure for a UE previously attached to its home LGW and the network initiates a data transfer.
Figure 17:
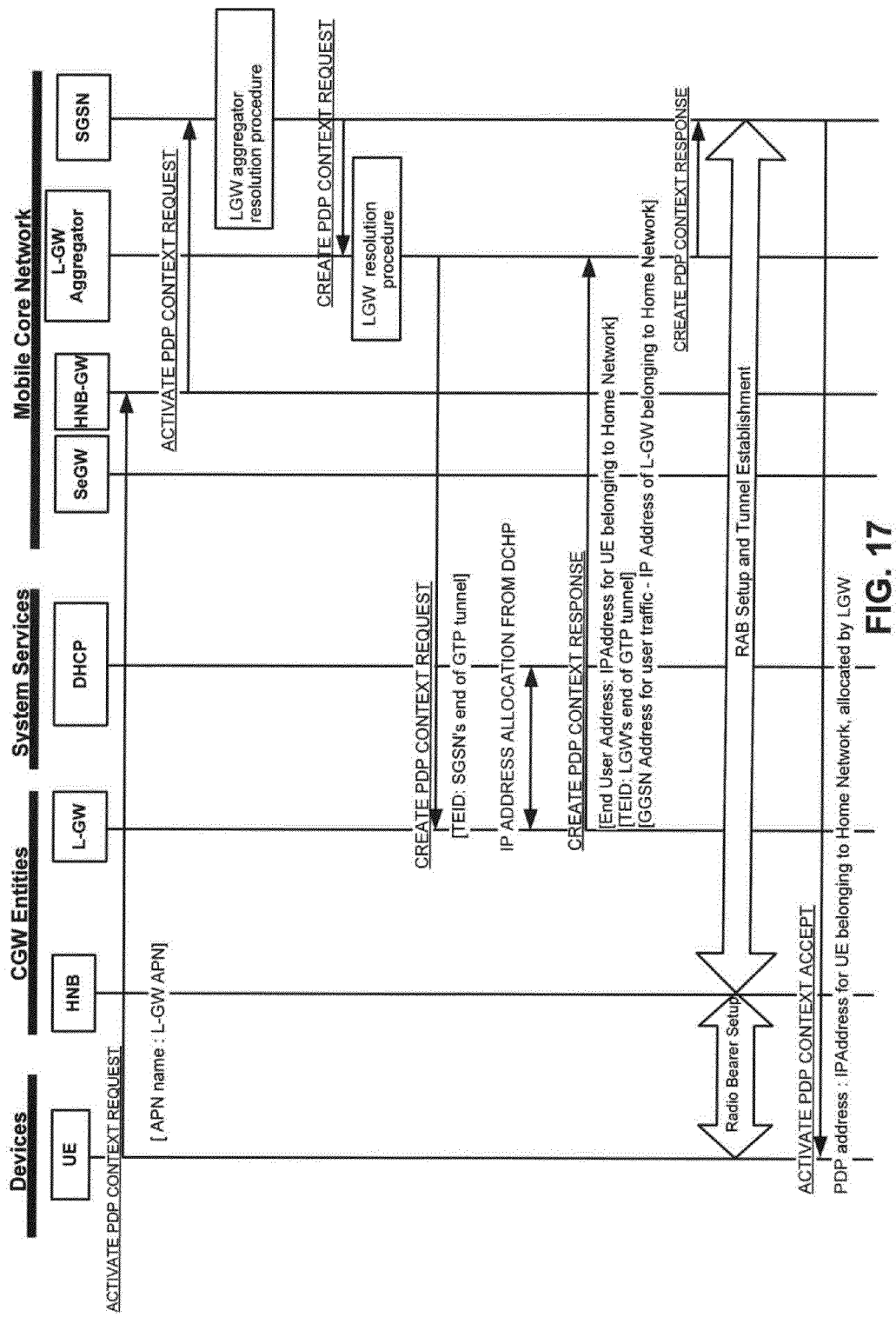
FIG. 17 is an exemplary illustration of a procedure for PDP context creation.
Figure 18:
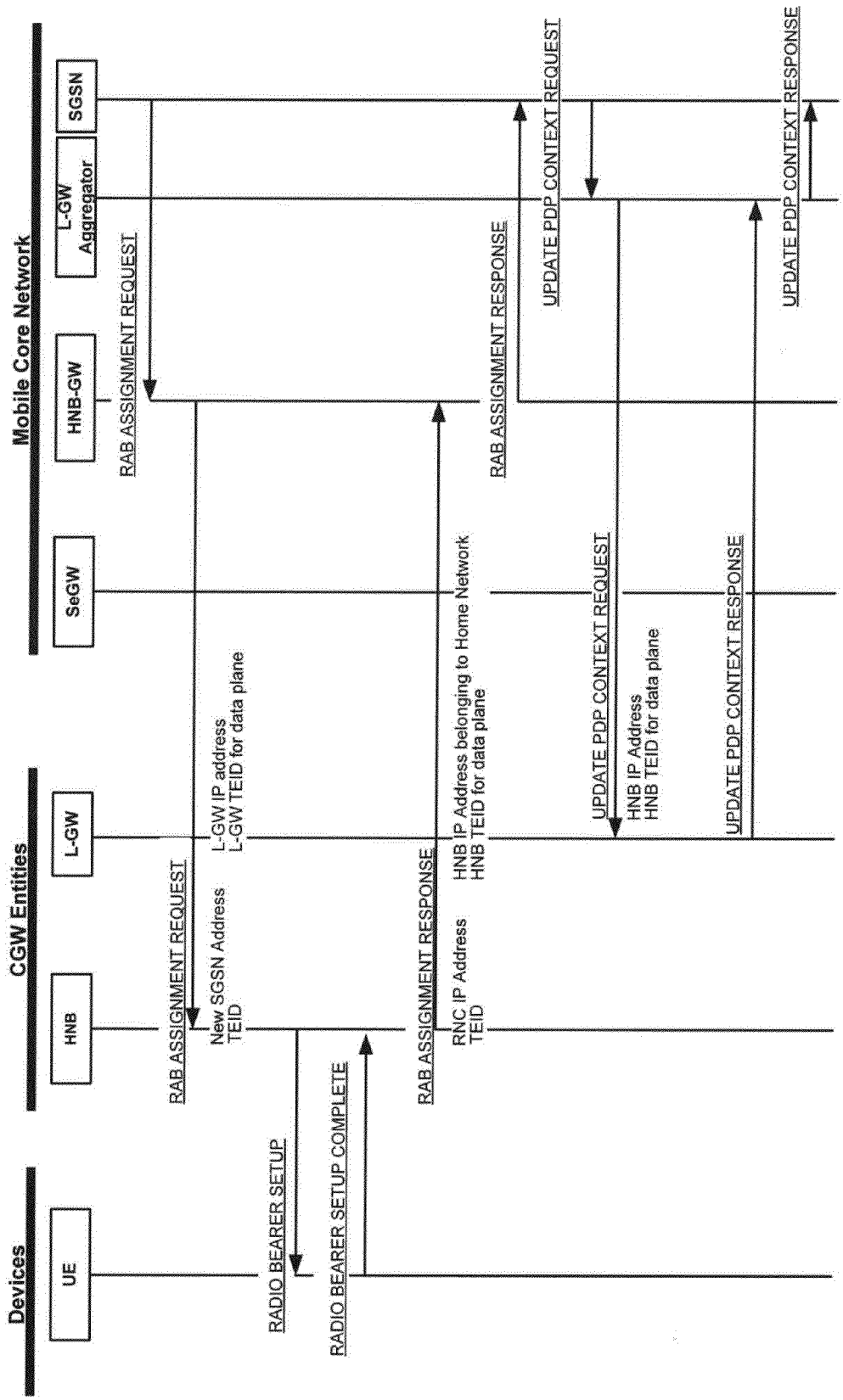
FIG. 18 is an exemplary illustration of a procedure for RAB setup and user plane tunnel establishment for one tunnel.
Figure 19:
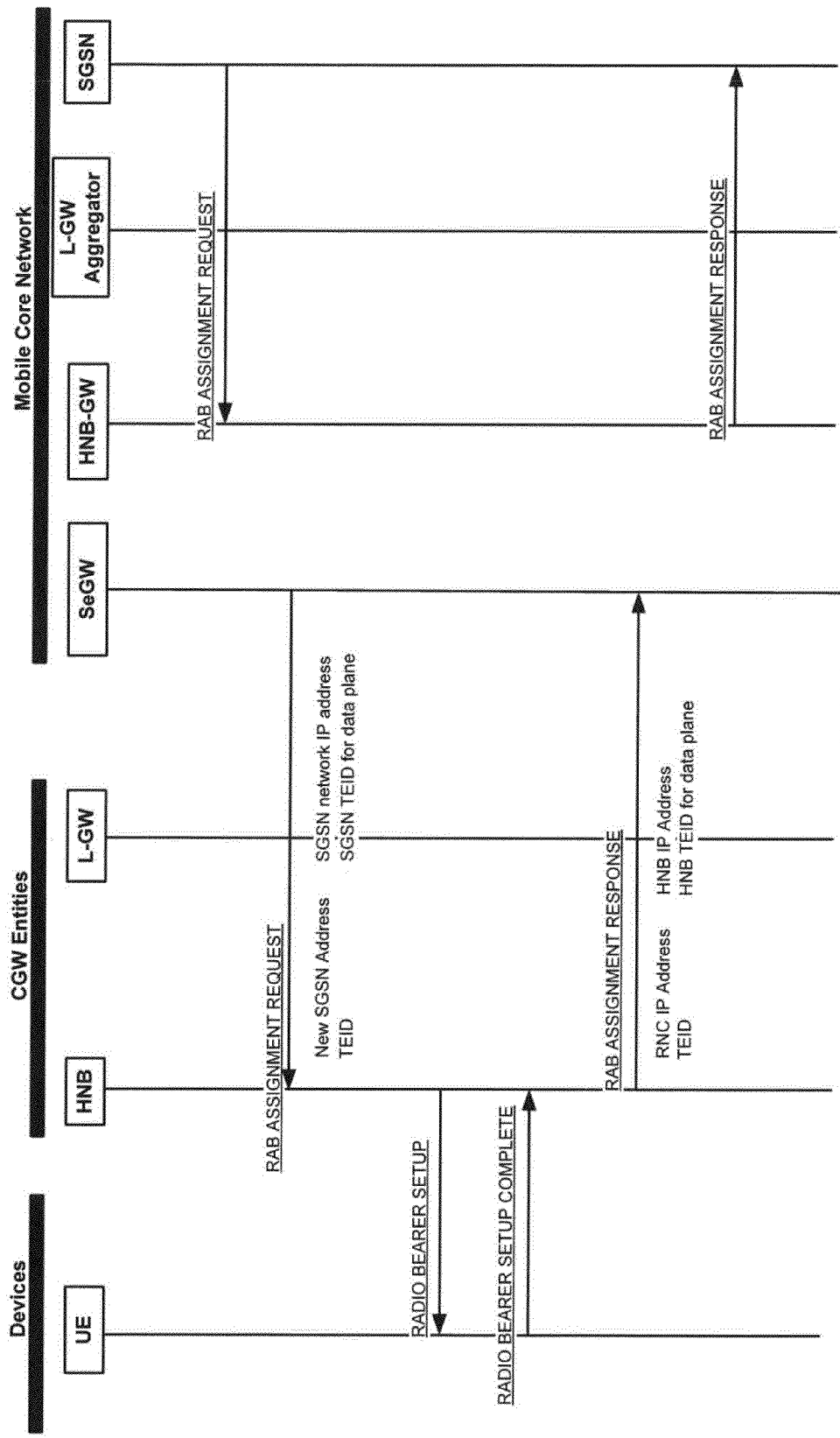
FIG. 19 is an exemplary illustration of a procedure for RAB setup and user plane tunnel establishment for two tunnels.
Figure 20:
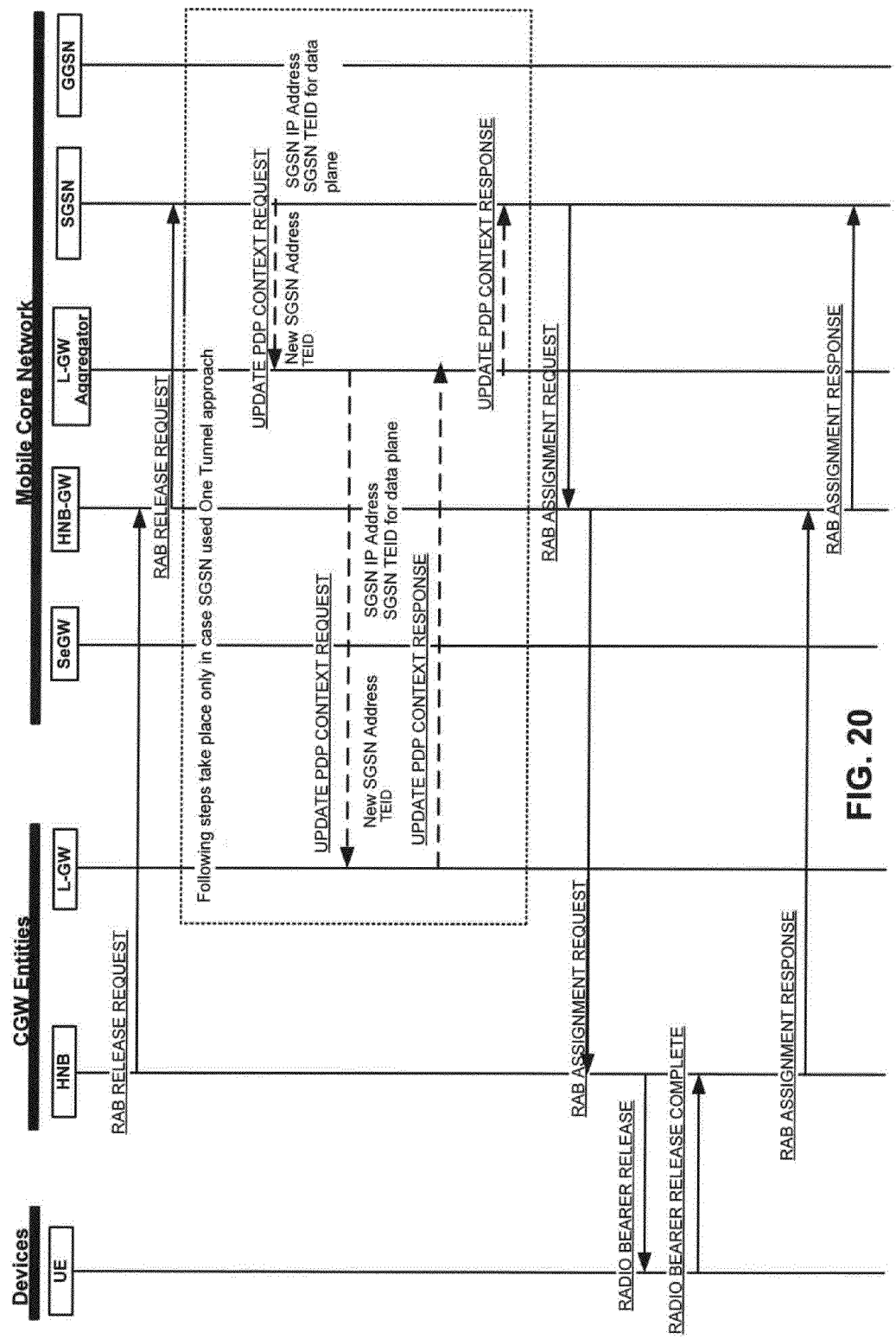
FIG. 20 is an exemplary illustration of a procedure for RAB release and PDP context preservation.
Figure 21:
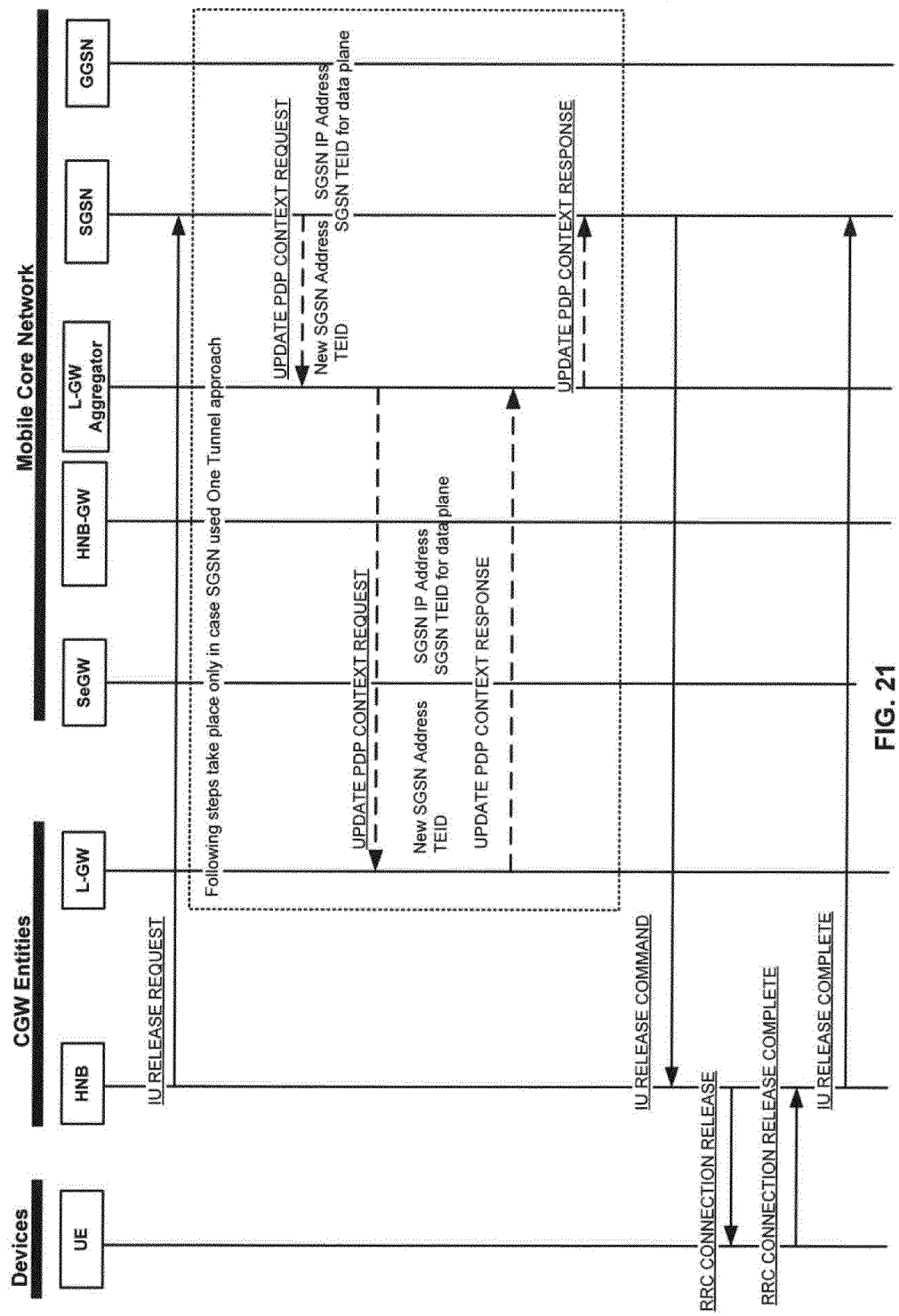
FIG. 21 is an exemplary illustration of a procedure for Iu release and PDP context preservation.

The simple LIPA MSCs, as shown in FIG. 13 thru FIG. 21, are exemplary illustrations of setup of the LIPA path and local data transfer, including transition to idle mode during periods of data inactivity with preservation of PDP context and subsequent paging with connection/tunnel re-establishment for resumption of downlink initiated LIPA sessions. FIG. 13 is an exemplary illustration of a procedure for a UE attached to its home LGW and accessing a device on its home network. FIG. 14 is an exemplary illustration of a procedure for a LIPA path setup and data transfer. FIG. 15 is an exemplary illustration of a procedure for a UE that goes into IDLE state while preserving its PDP context. FIG. 16 is an exemplary illustration of a procedure for a UE previously attached to its home LGW and the network initiates a data transfer. FIG. 17 is an exemplary illustration of a procedure for PDP context creation. FIG. 18 is an exemplary illustration of a procedure for RAB setup and user plane tunnel establishment for one tunnel. FIG. 19 is an exemplary illustration of a procedure for RAB setup and user plane tunnel establishment for two tunnels. FIG. 20 is an exemplary illustration of a procedure for RAB release and PDP context preservation. FIG. 21 is an exemplary illustration of a procedure for Iu release and PDP context preservation.

Figure 22:
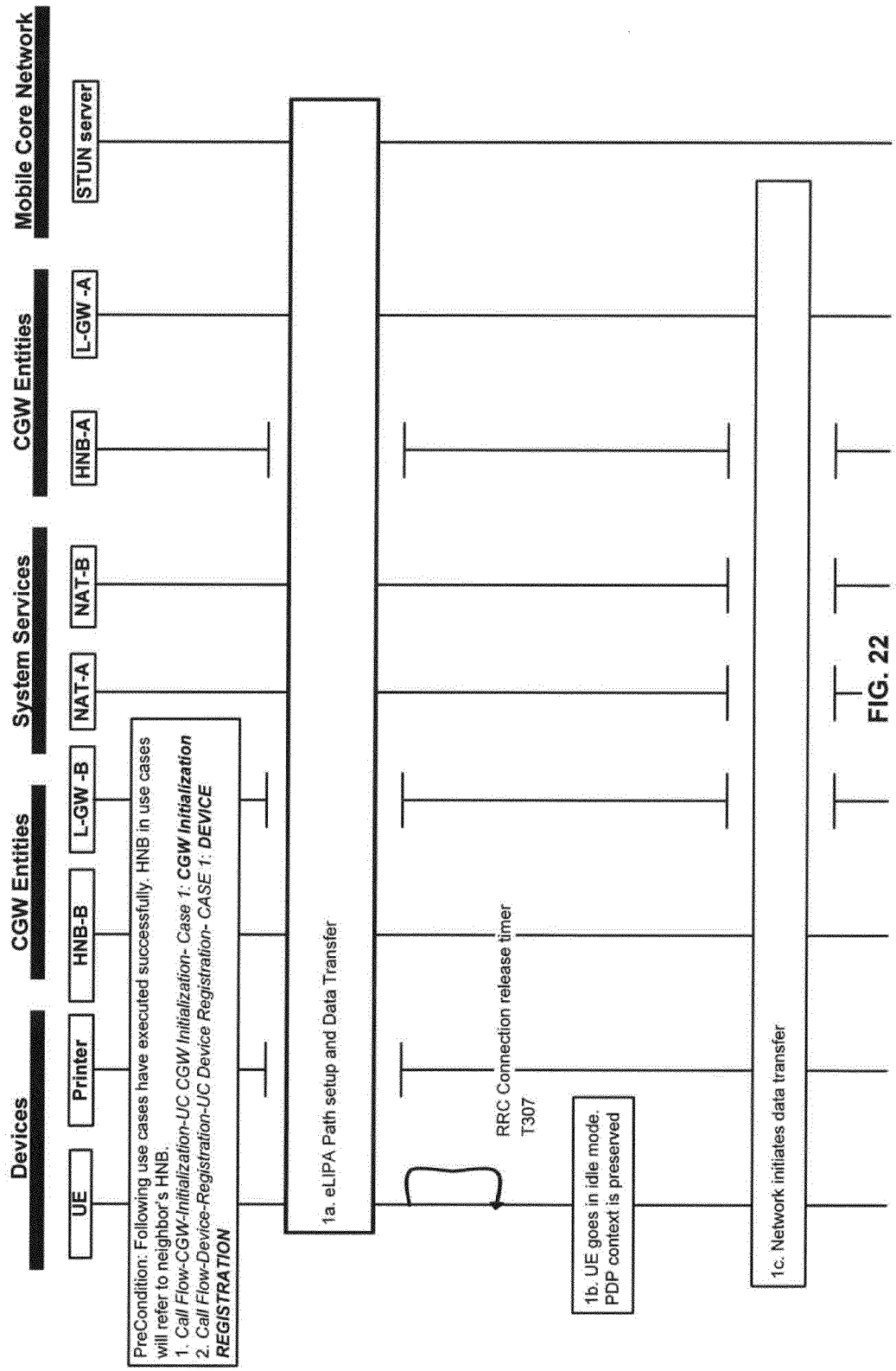
FIG. 22 is an exemplary illustration of a procedure for a UE attached to a neighbor's HNB accessing a device on the UE's home network.
Figure 23:
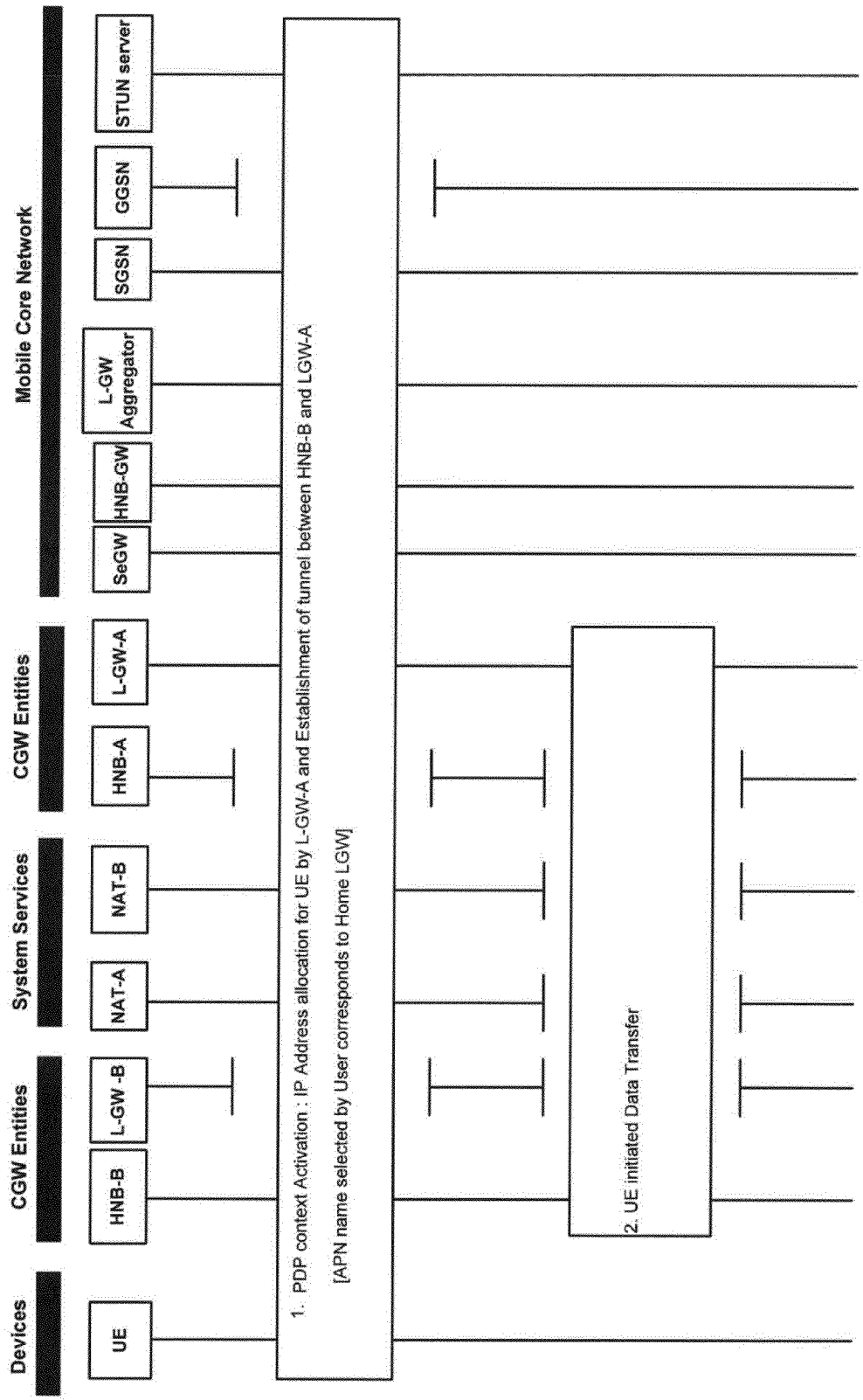
FIG. 23 is an exemplary illustration of a procedure for ELIPA path setup and data transfer.
Figure 24:
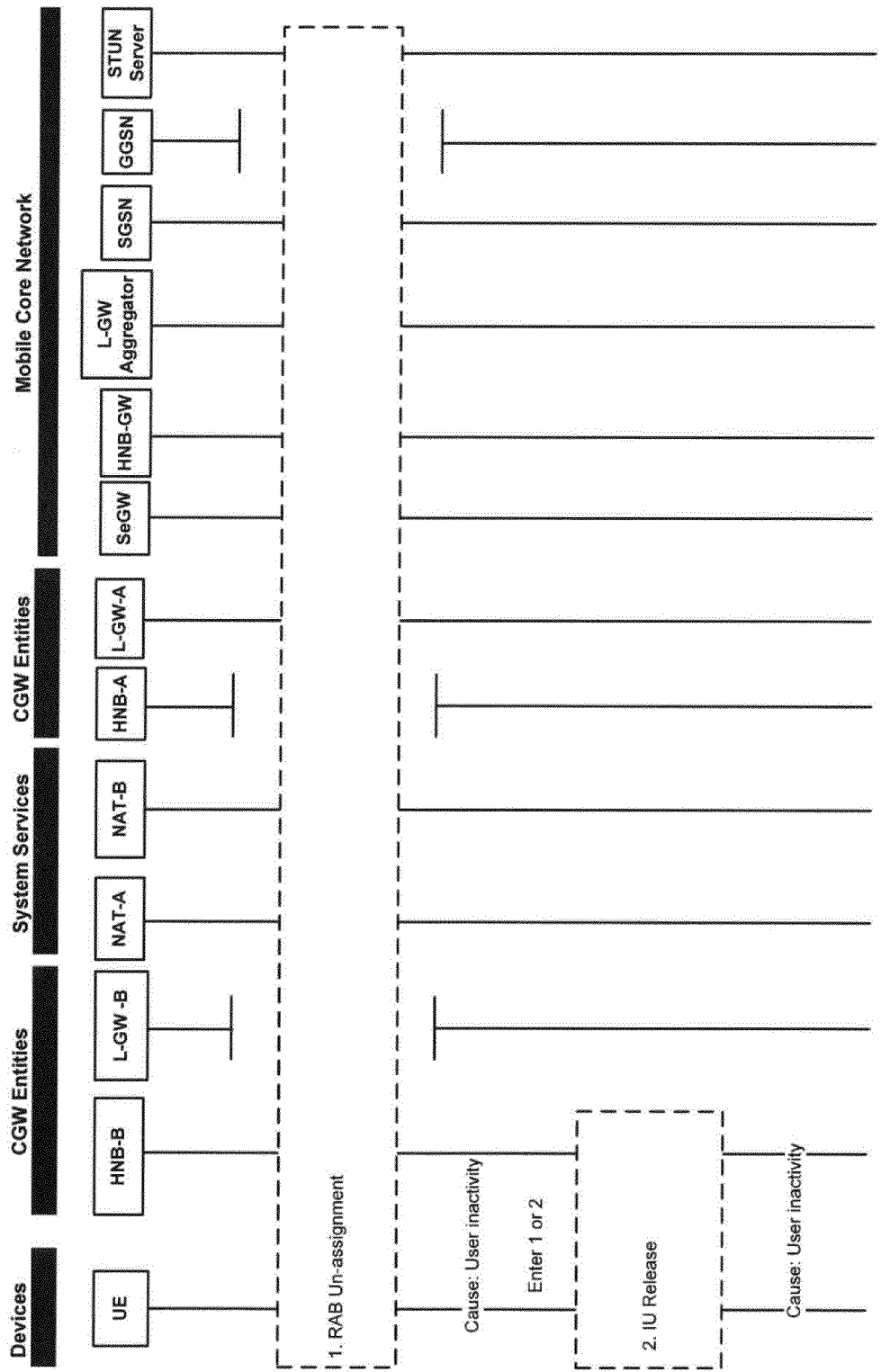
FIG. 24 is an exemplary illustration of a procedure for an attached UE going into IDLE state while its PDP context is preserved.
Figure 25:
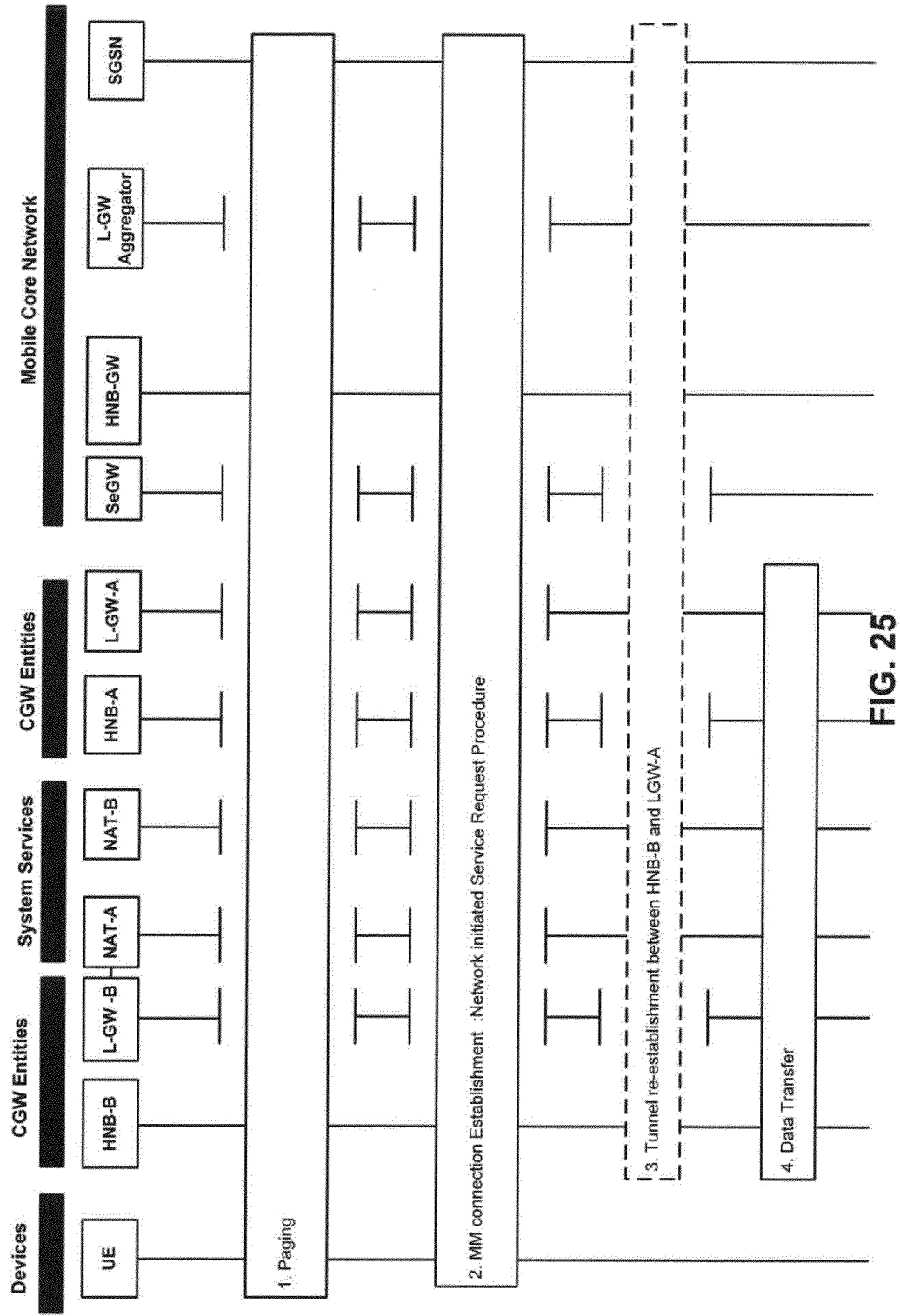
FIG. 25 is an illustration of a procedure for a UE previously attached to its home LGW and a network initiated data transfer.
Figure 26:
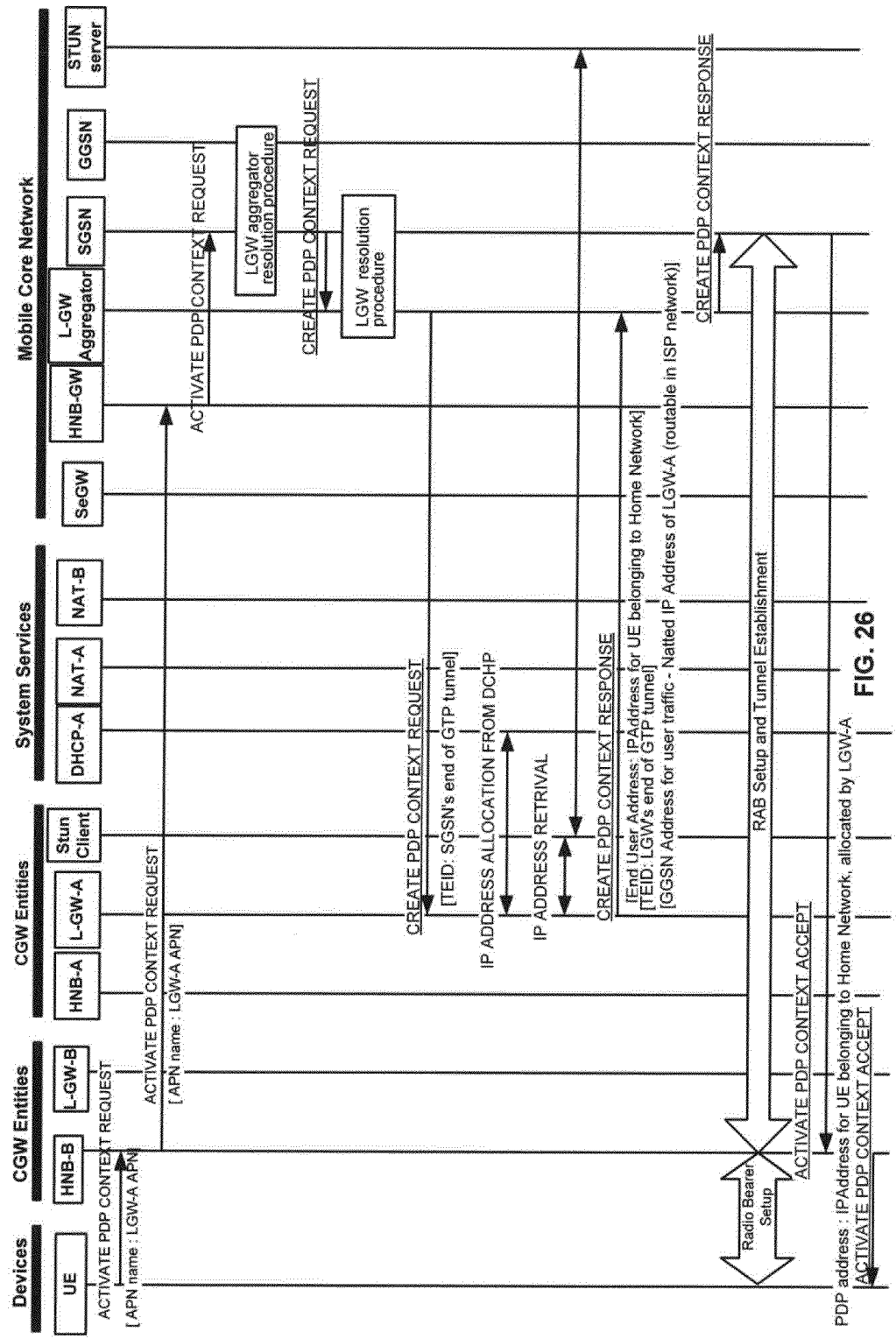
FIG. 26 is an exemplary illustration of a procedure for PDP context creation.
Figure 27:
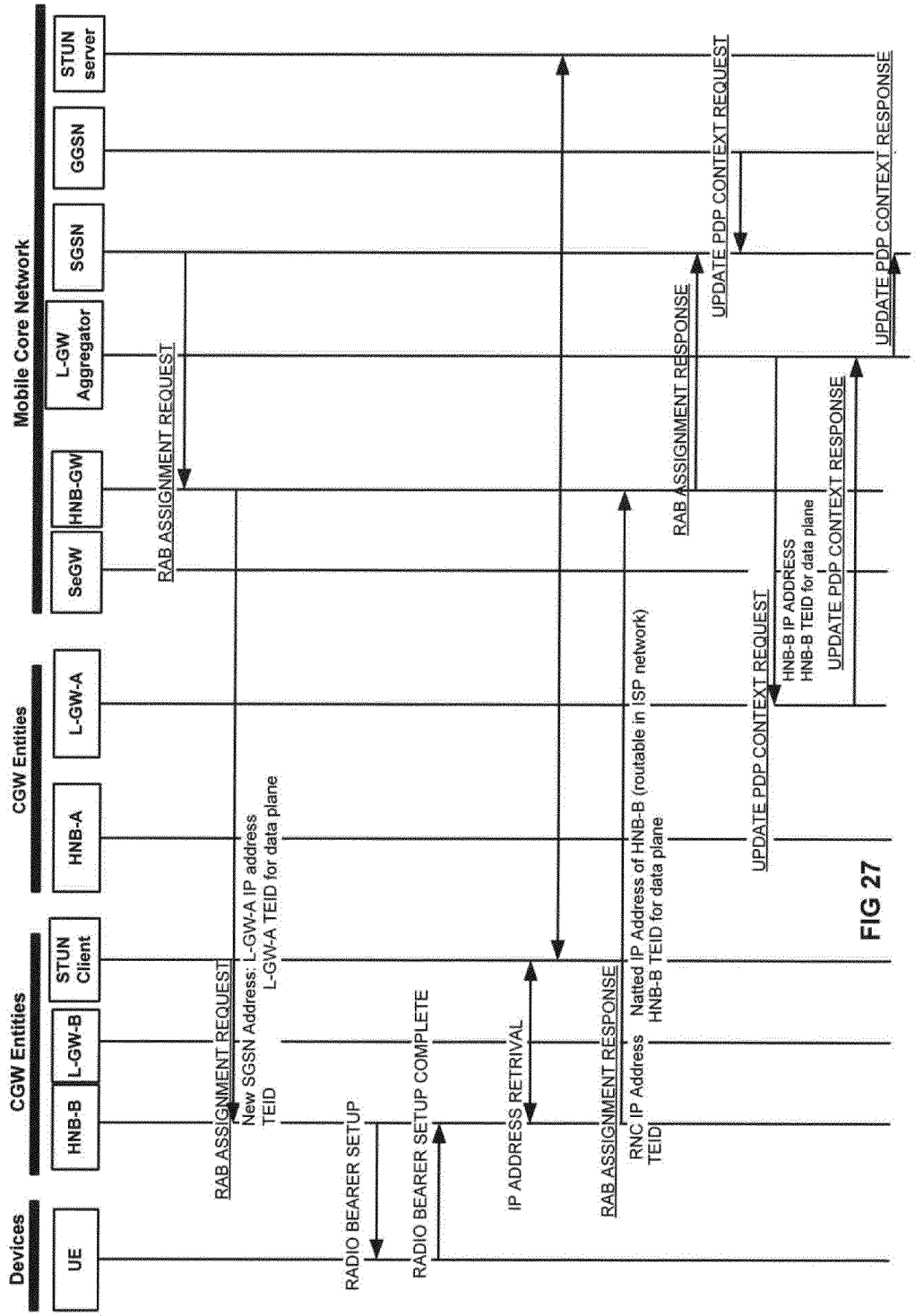
FIG. 27 is an exemplary illustration of a RAB setup and user plane establishment with one tunnel.
Figure 28:
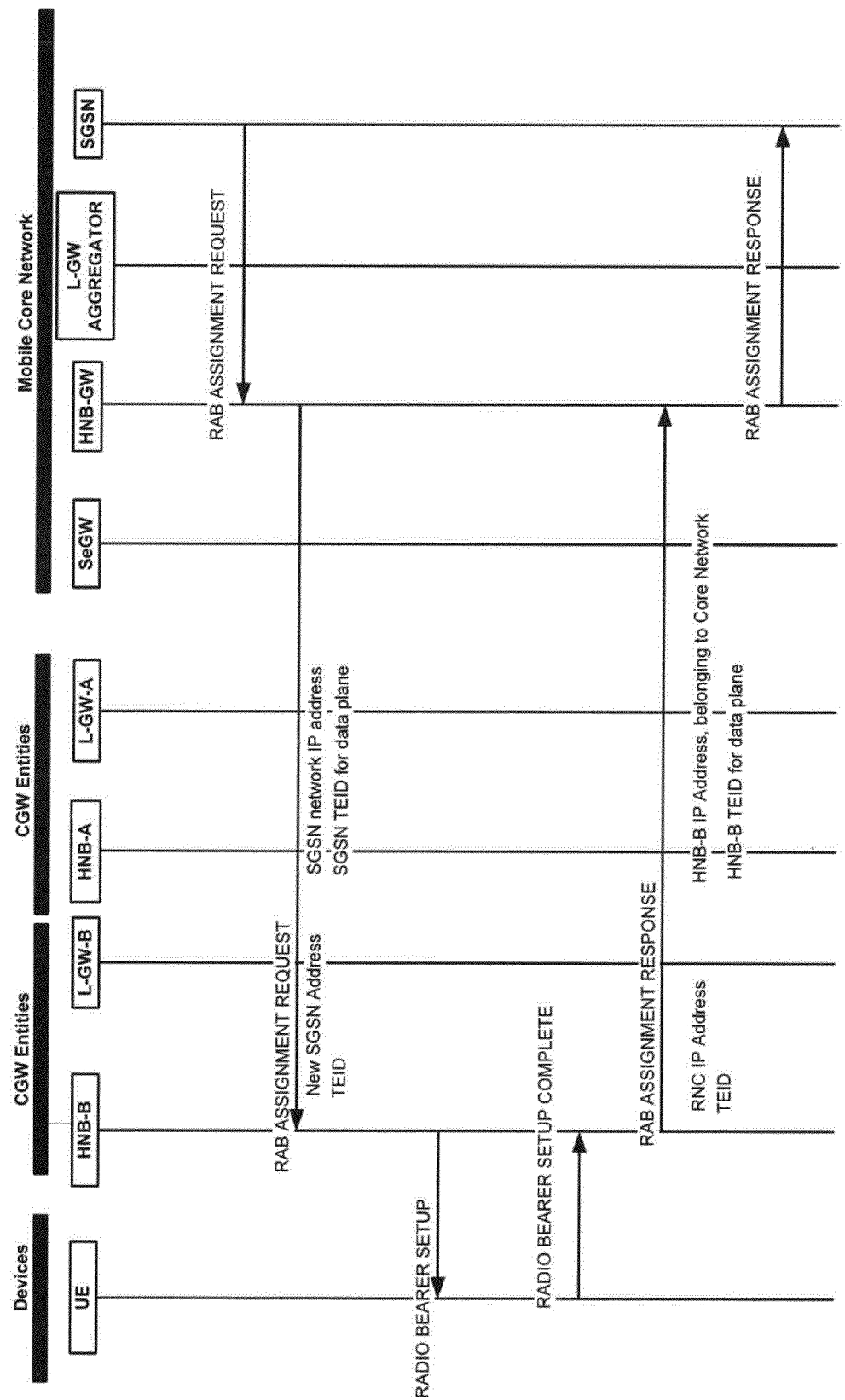
FIG. 28 is an exemplary illustration of a RAB setup and user plane tunnel with two tunnel establishment.
Figure 29:
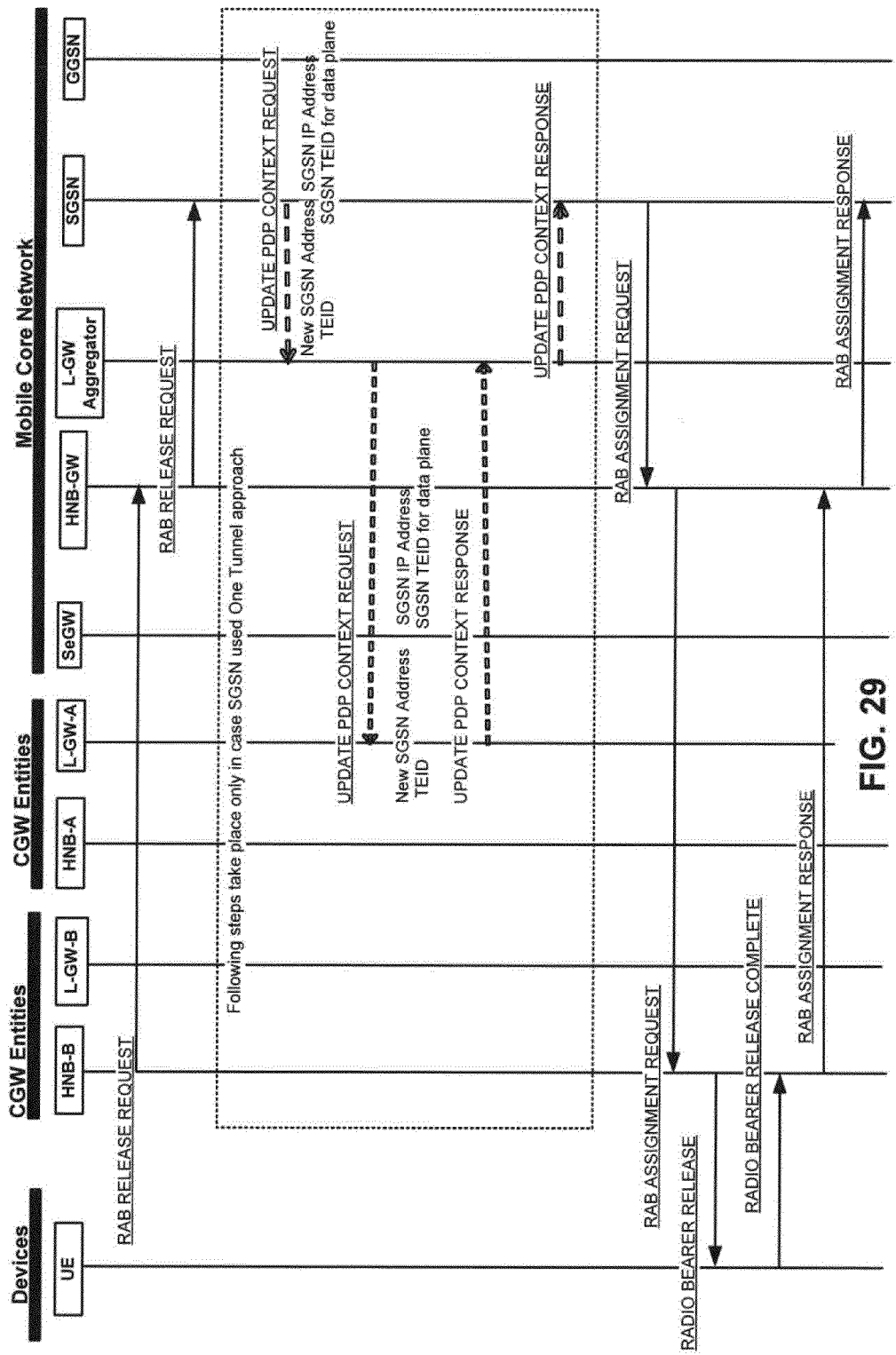
FIG. 29 is an exemplary illustration of a procedure for RAB release and PDP context preservation.
Figure 30:
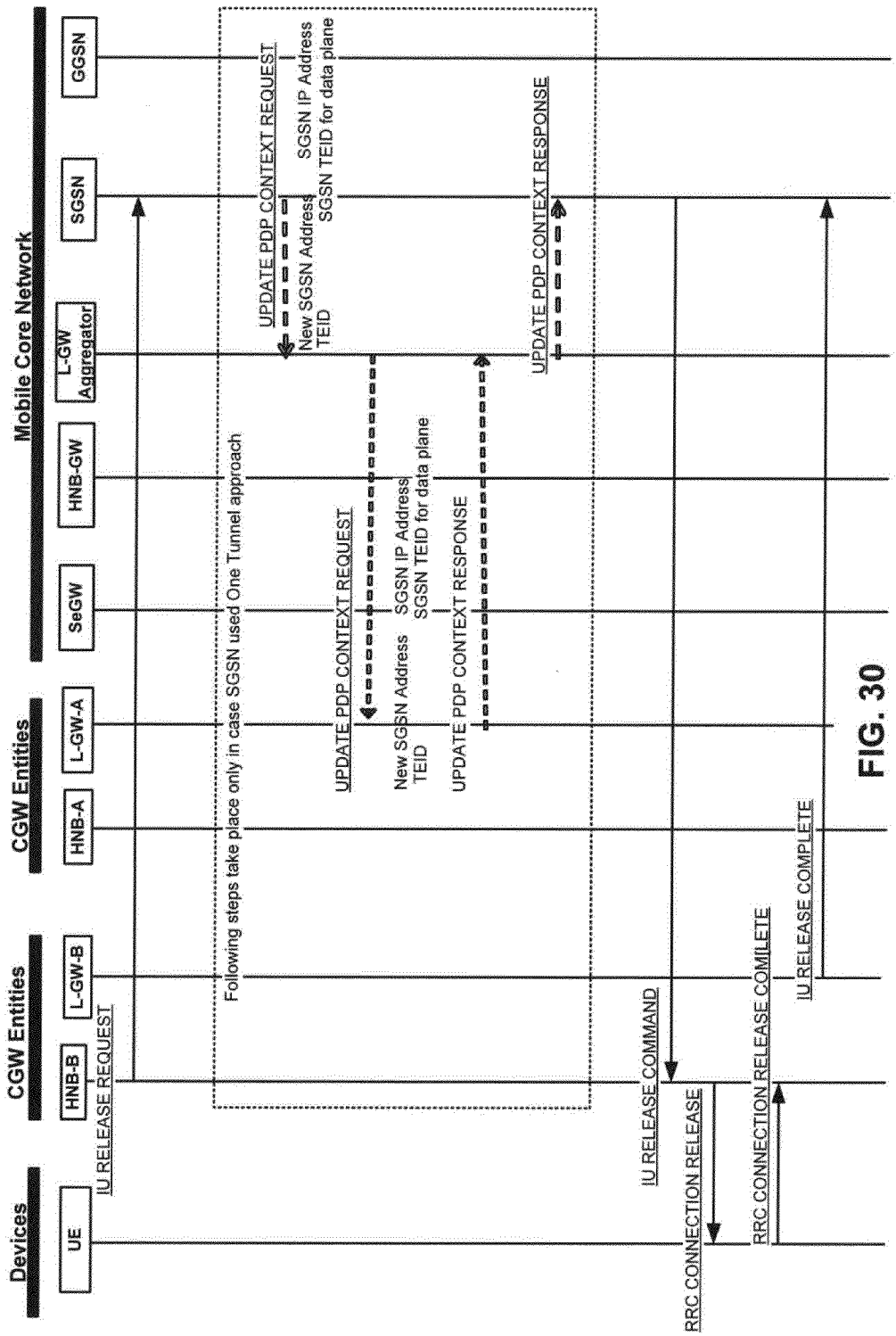
FIG. 30 is an exemplary illustration of a Iu release and PDP context preservation.

The "Extended" LIPA (E-LIPA) MSCs, as shown in FIG. 22 thru FIG. 30, are exemplary illustrations of setup of the E-LIPA path and local data transfer, including transition to idle mode during periods of data inactivity with preservation of PDP context and subsequent paging with connection/tunnel re-establishment for resumption of downlink initiated E-LIPA sessions. FIG. 22 is an exemplary illustration of a procedure for a UE attached to a neighbor's HNB accessing a device on the UE's home network. FIG. 23 is an exemplary illustration of a procedure for ELIPA path setup and data transfer. FIG. 24 is an exemplary illustration of a procedure for an attached UE going into IDLE state while its PDP context is preserved. FIG. 25 is an illustration of a procedure for a UE previously attached to its home LGW and a network initiates a data transfer. FIG. 26 is an exemplary illustration of a procedure for PDP context creation. FIG. 27 is an exemplary illustration of a RAB setup and user plan establishment with one tunnel. FIG. 28 is an exemplary illustration of a RAB setup and user plane tunnel with two tunnel establishment. FIG. 29 is an exemplary illustration of procedure for RAB release and PDP context preservation. FIG. 30 is an exemplary illustration of a Iu release and PDP context preservation.

The topology of a cellular network is changing such that HNB devices may be available and deployed in most homes. These may be offered to the end-consumer by the cellular operator and may utilize the consumers' broadband to connect the HNB to the mobile core network. The consumers' broadband modem may use a number of technologies, all of which are similar and provide a conduit from the broadband modem to the mobile core network. As UMTS and LTE become more popular, there is a need to offload traffic from the mobile core network. LIPA is one method to offload local traffic from using bandwidth on the core network. There may be times when two HNB devices that are in close proximity might have to communicate. For example, each HNB may be connected to devices that need to communicate with each other. The data that is passed during this communication may take many different paths.

In a standard implementation, the data passed between HNB devices would travel from each HNB, through the respective broadband modems, the IP backhaul and then enter the mobile core network. Once in the mobile core network, the data will be routed to an SGSN (or SGW) which will route the data back through the mobile core network to the IP backhaul. Once in the IP backhaul, the data will get routed to the proper broadband modem and then delivered to the target HNB. The target HNB will deliver it to the proper device within its sphere. This approach is less efficient because bandwidth which could be devoted to other activities is used for this reflected data. Additionally, since more network nodes are traversed, there may be a higher likelihood of data being delayed or not delivered at all. There are alternatives which would allow for data to be reflected to its intended target by traversing fewer nodes than the standard implementation. These alternatives may be described as "Extended LIPA" or "ELIPA" and perform inter-HNB communication in a more efficient manner. E-LIPA may allow devices camped on different HNB devices to communicate with minimal involvement from the complete mobile core network.

Figure 31:
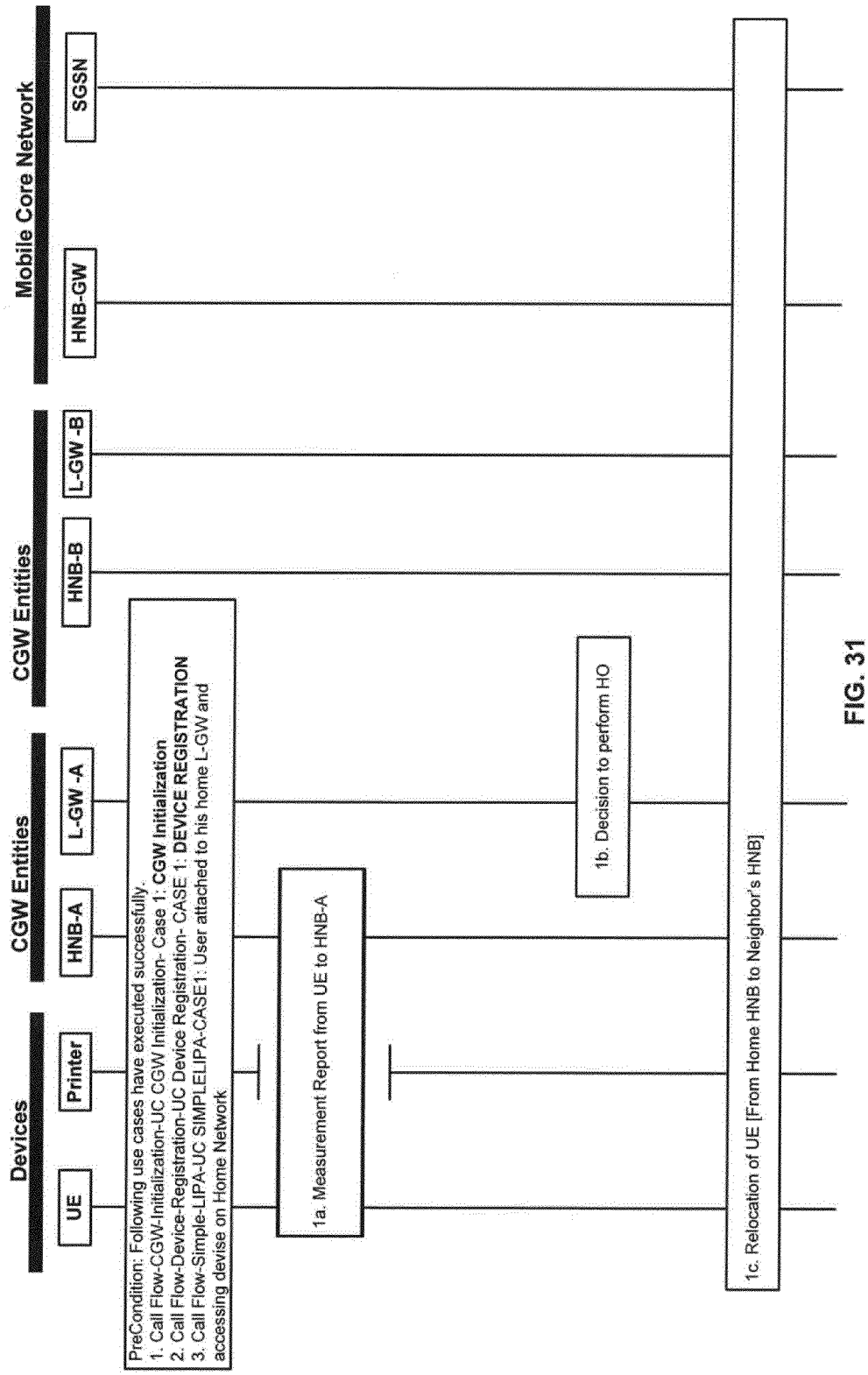
FIG. 31 is an exemplary illustration of a procedure for a UE moving to a neighbor's HNB after attachment to the UE's home LGW and the UE accessing a device in its home network.
Figure 32:
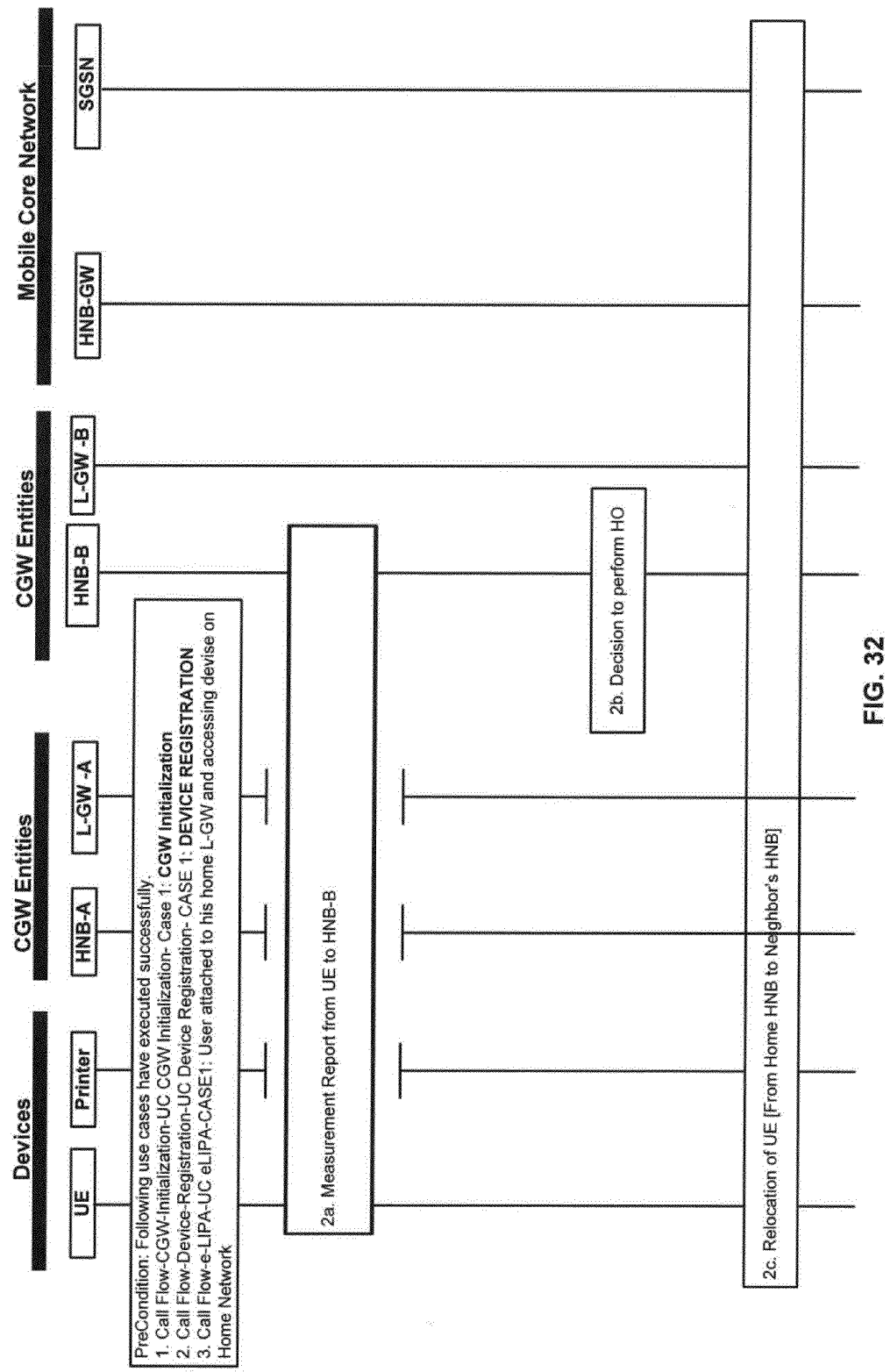
FIG. 32 is an exemplary illustration of a procedure for a UE moving to its home node B while attached to a neighbor's HNB.
Figure 33:
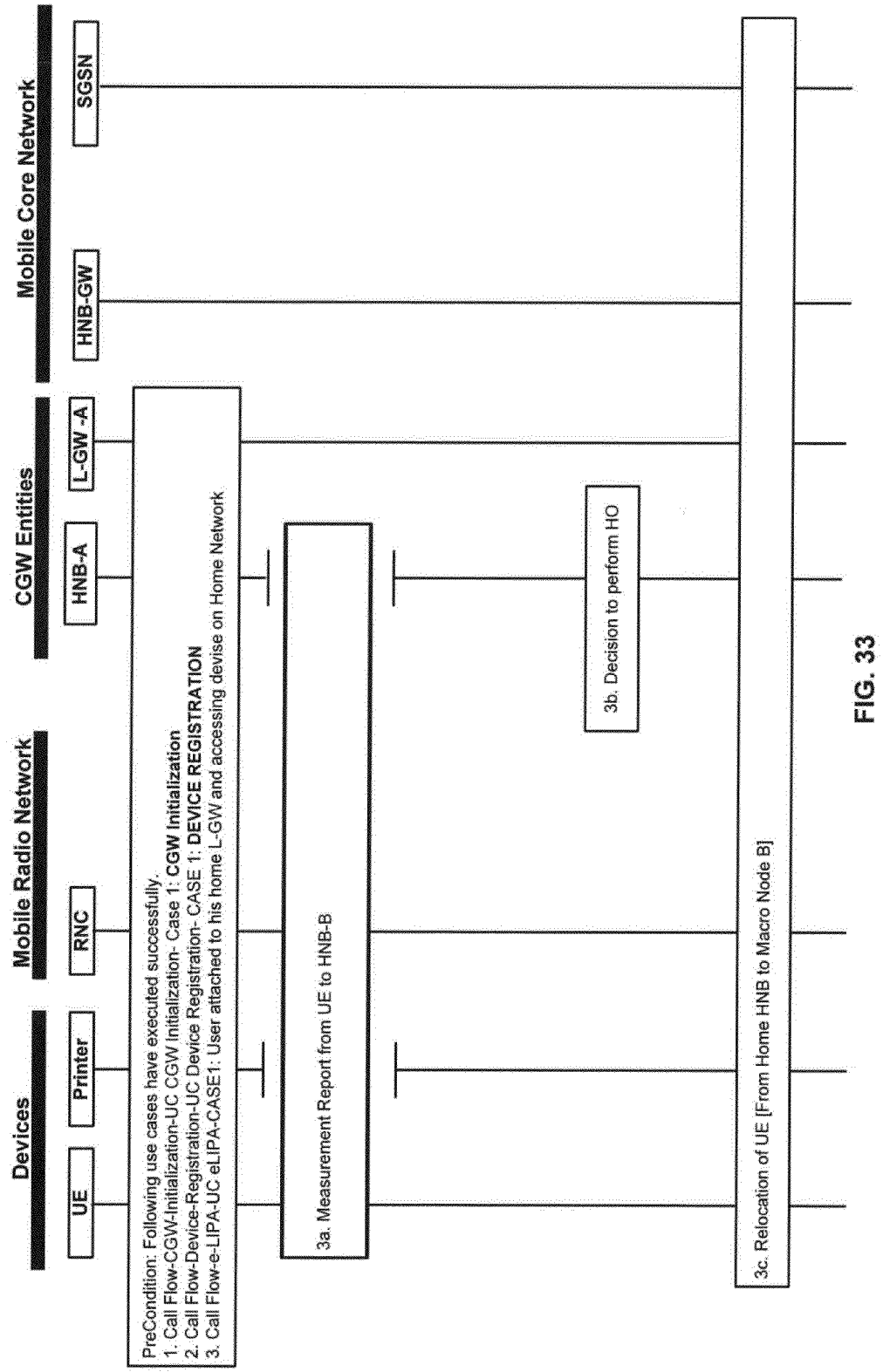
FIG. 33 is an exemplary illustration of a procedure wherein a UE attached to its home HNB moves to a macro network.
Figure 34:
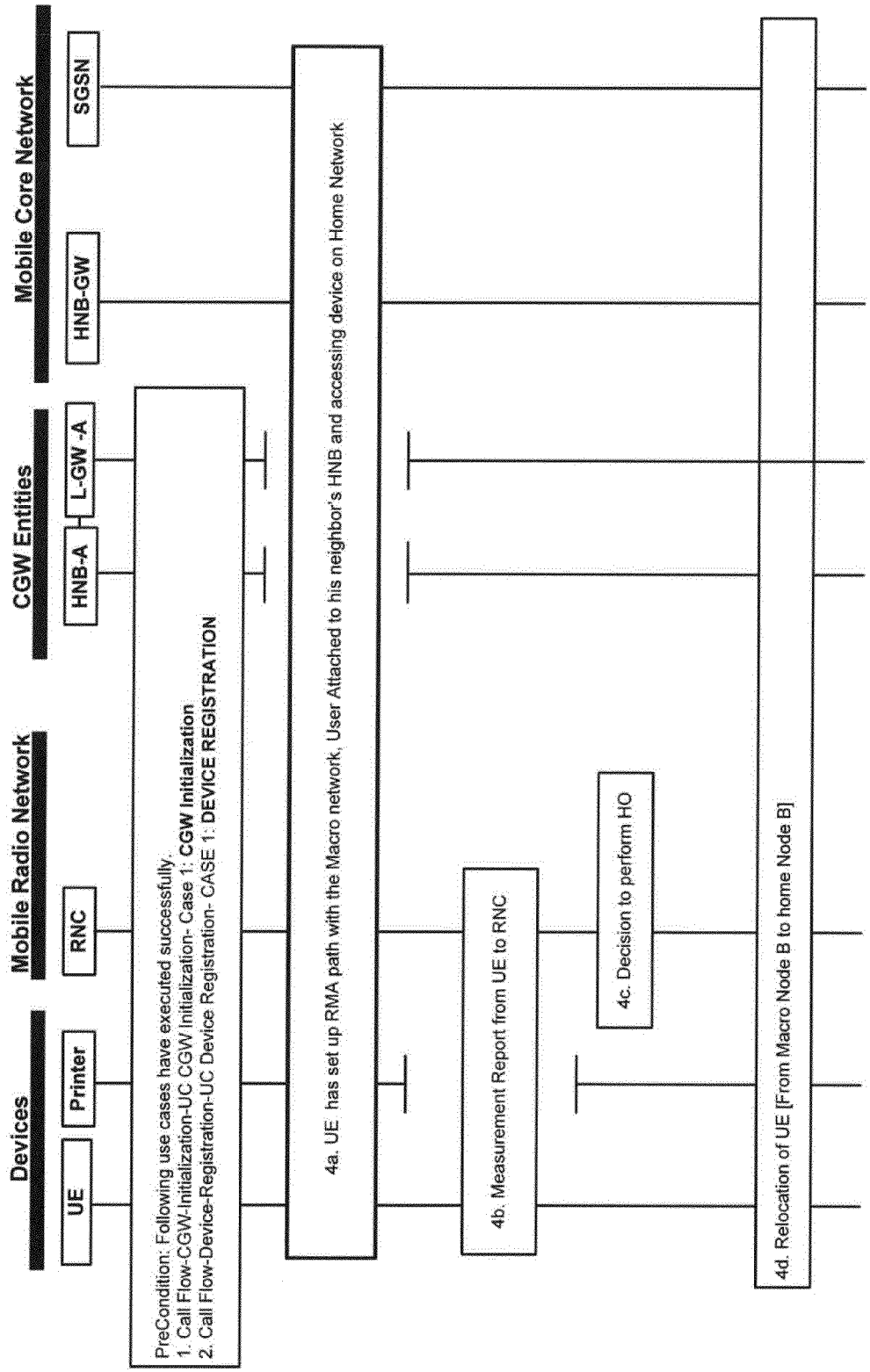
FIG. 34 is an exemplary illustration of a procedure wherein a UE attached to a macro network moves to its home network.
Figure 35A:
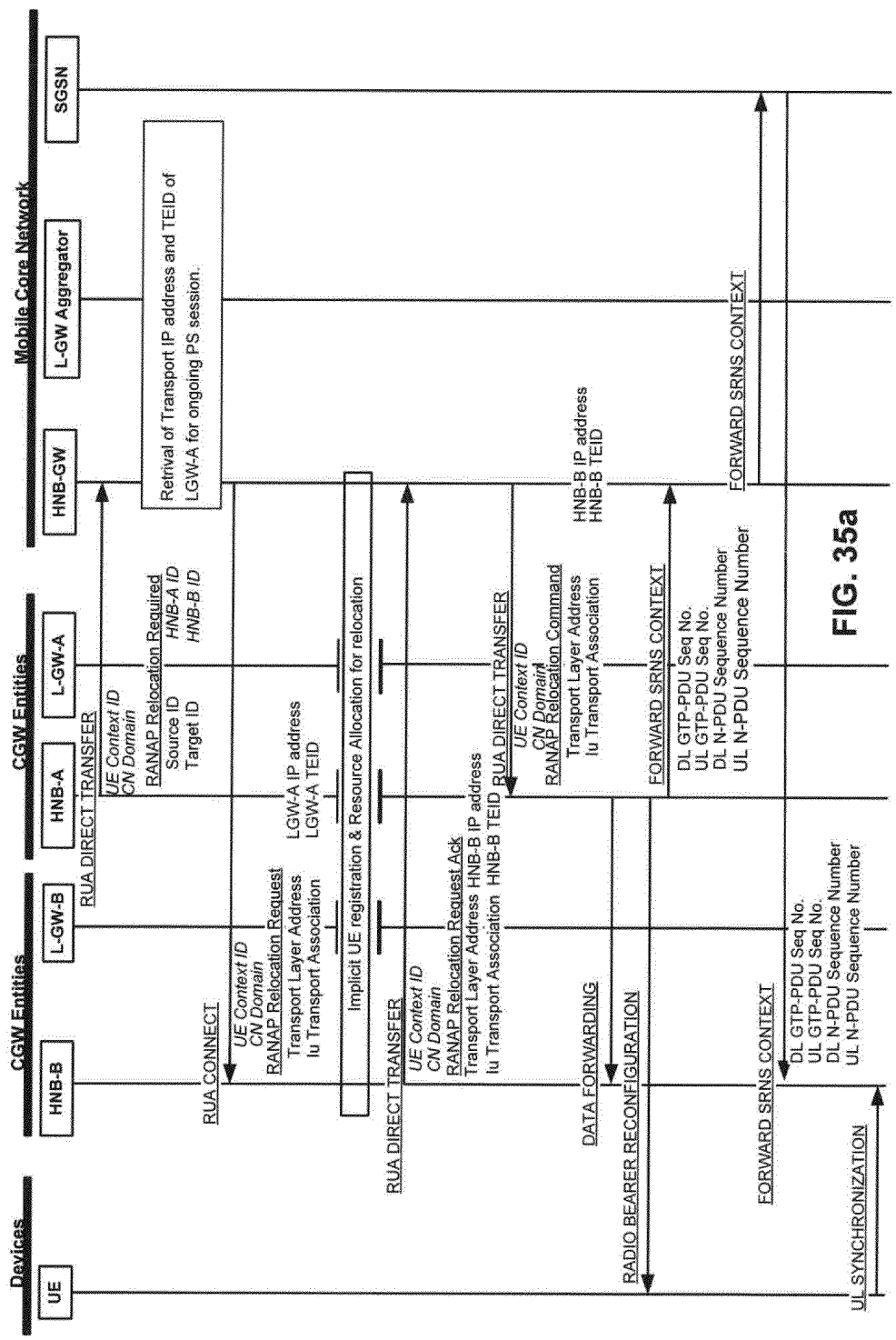
FIG. 35A is an exemplary illustration of a procedure for intra HNBGW mobility (LIPA to ELIPA)
Figure 35B:
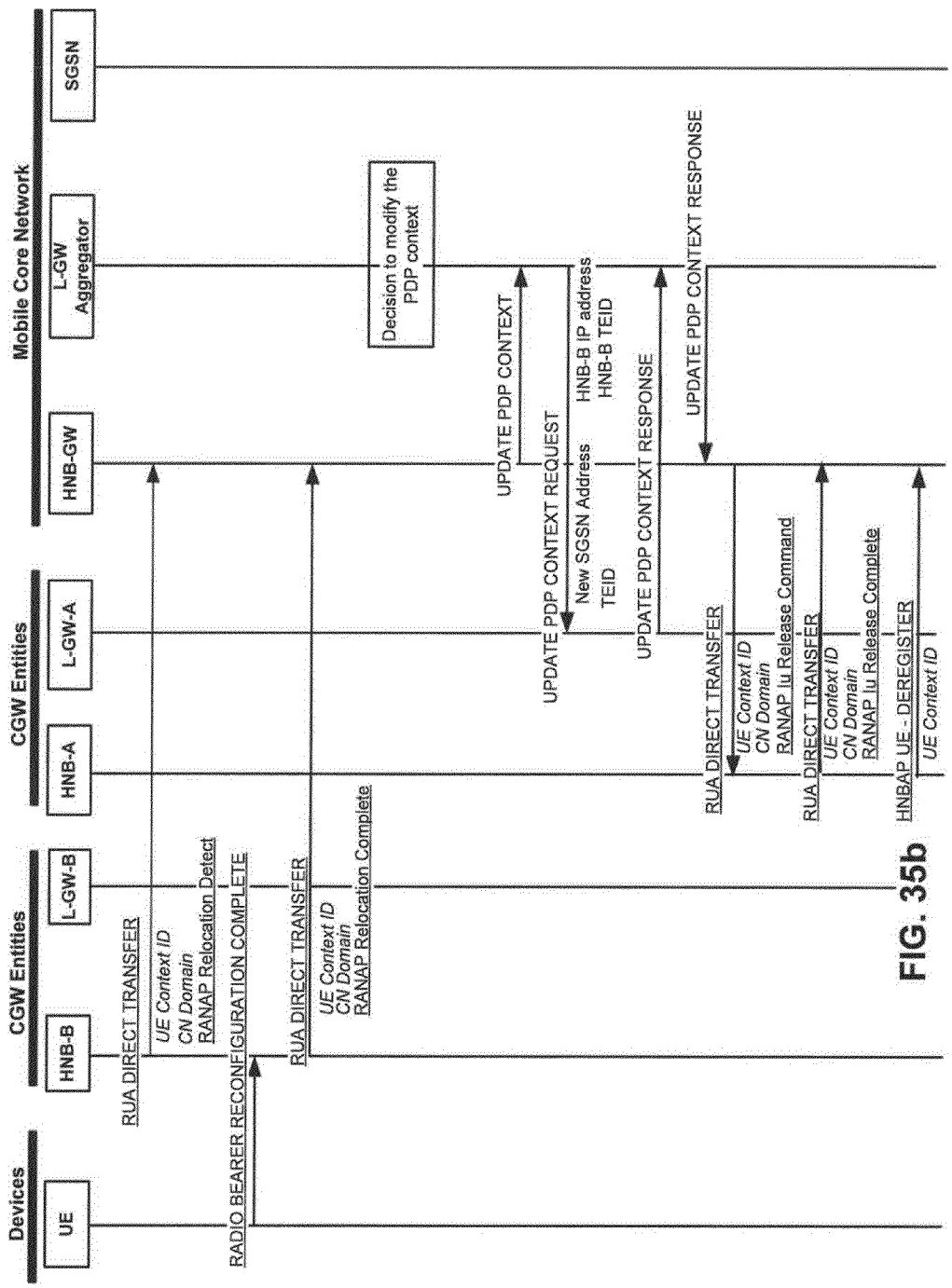
Figure 36A:
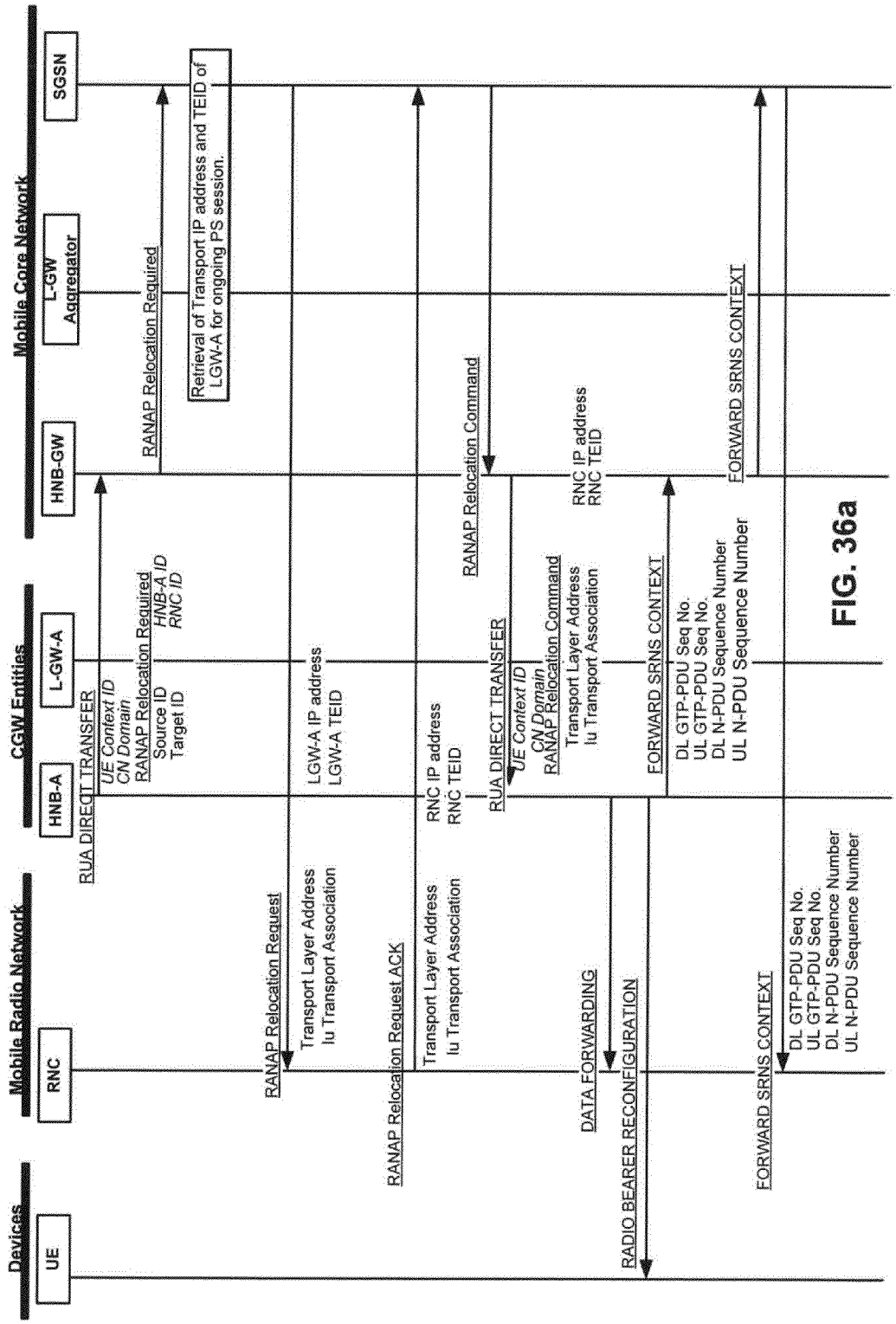
FIG. 36A is an exemplary illustration of a procedure of a UE accessing a home device and moving to a macro network (LIPA to MRA)
Figure 36B:
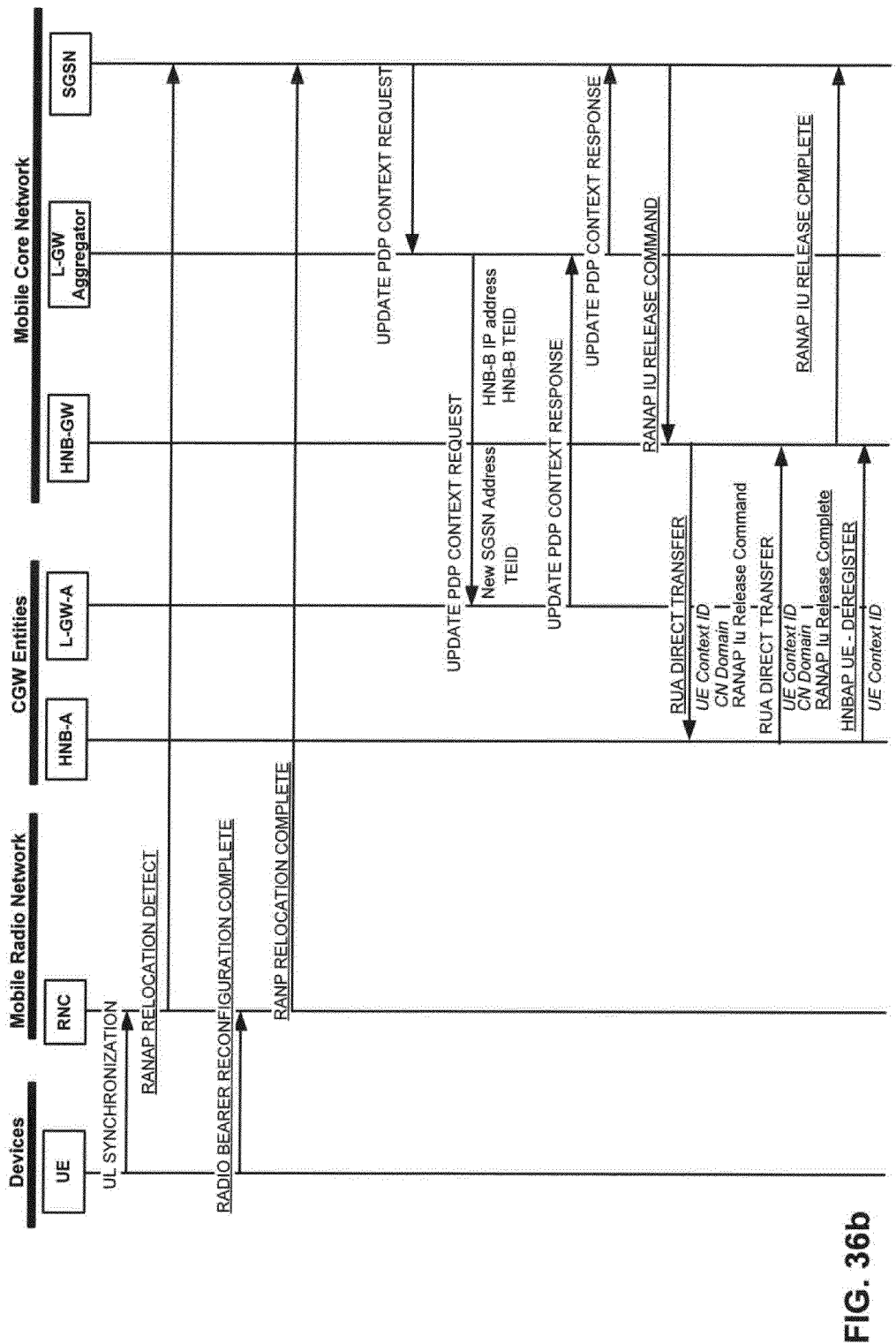
Figure 37A:
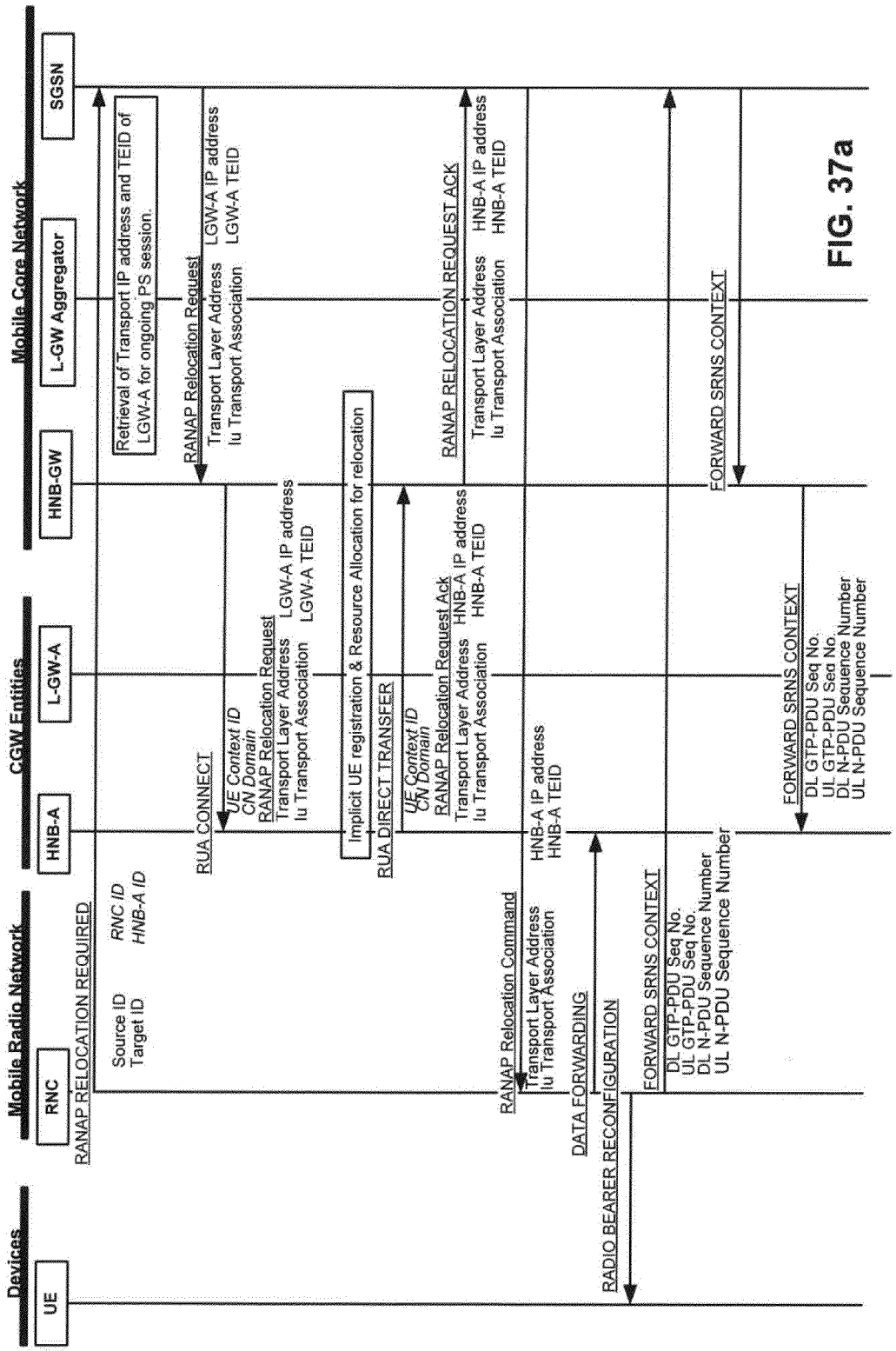
FIG. 37A is an exemplary illustration of a procedure for a UE accessing a home device via a macro network and moving to a femto network (MRA to LIPA)
Figure 37B:
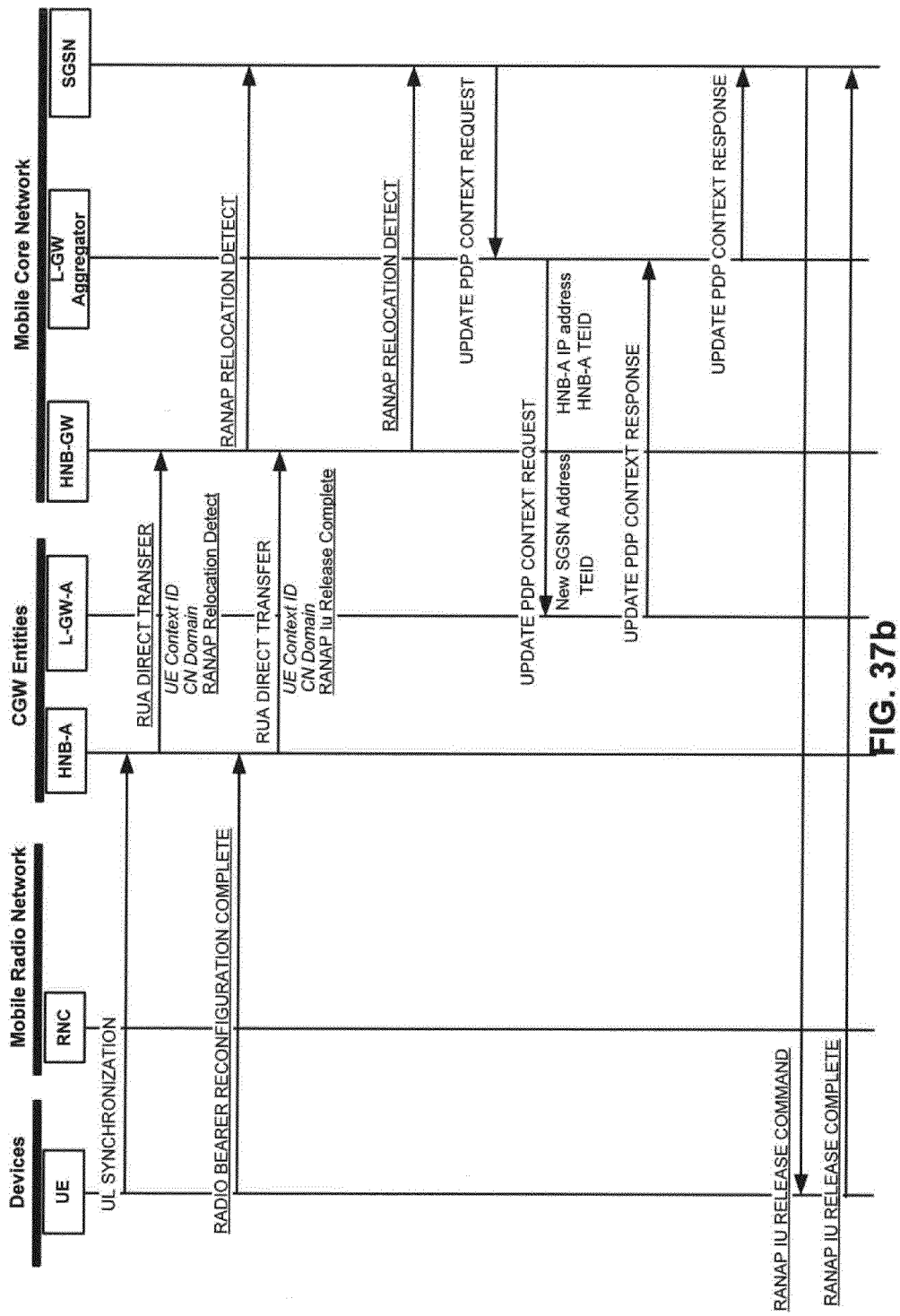

The HNB Handover MSCs, as shown in FIG. 31 thru FIG. 37B are exemplary illustrations of the active handover of packet switched (PS) sessions between HNBs, from HNB to macrocell, and from macrocell to HNB. FIG. 31 is an exemplary illustration of a procedure for a UE moving to a neighbor's HNB after being attached to the UE's home LGW and the UE accessing a device its home network. FIG. 32 is an exemplary illustration of a procedure for a UE moving to its home node B during a timeframe the UE is accessing its home network while attached to a neighbor's HNB. FIG. 33 is an exemplary illustration of a procedure wherein a UE attached to its home HNB and accessing a device on its home network, moves to a macro network. FIG. 34 is an exemplary illustration of a procedure wherein a UE attached to a macro network and accessing a device on its home network moves to its home network. FIG. 35A and FIG. 35B is an exemplary illustration of a procedure for intra HNBGW mobility (LIPA to ELIPA), wherein the FIG. 35B is a continuation of 35A. FIG. 36A and FIG. 36B is an exemplary illustration of a procedure a UE accessing a home device and moving to a macro network (LIPA to MRA), wherein FIG. 36B is a continuation of FIG. 36A. FIG. 37A and FIG. 37B is an exemplary illustration of a procedure for a UE accessing a home device via a macro network and moving to a femto network (RIMA to LIPA), wherein FIG. 37B is a continuation of FIG. 37A.

Figure 38:
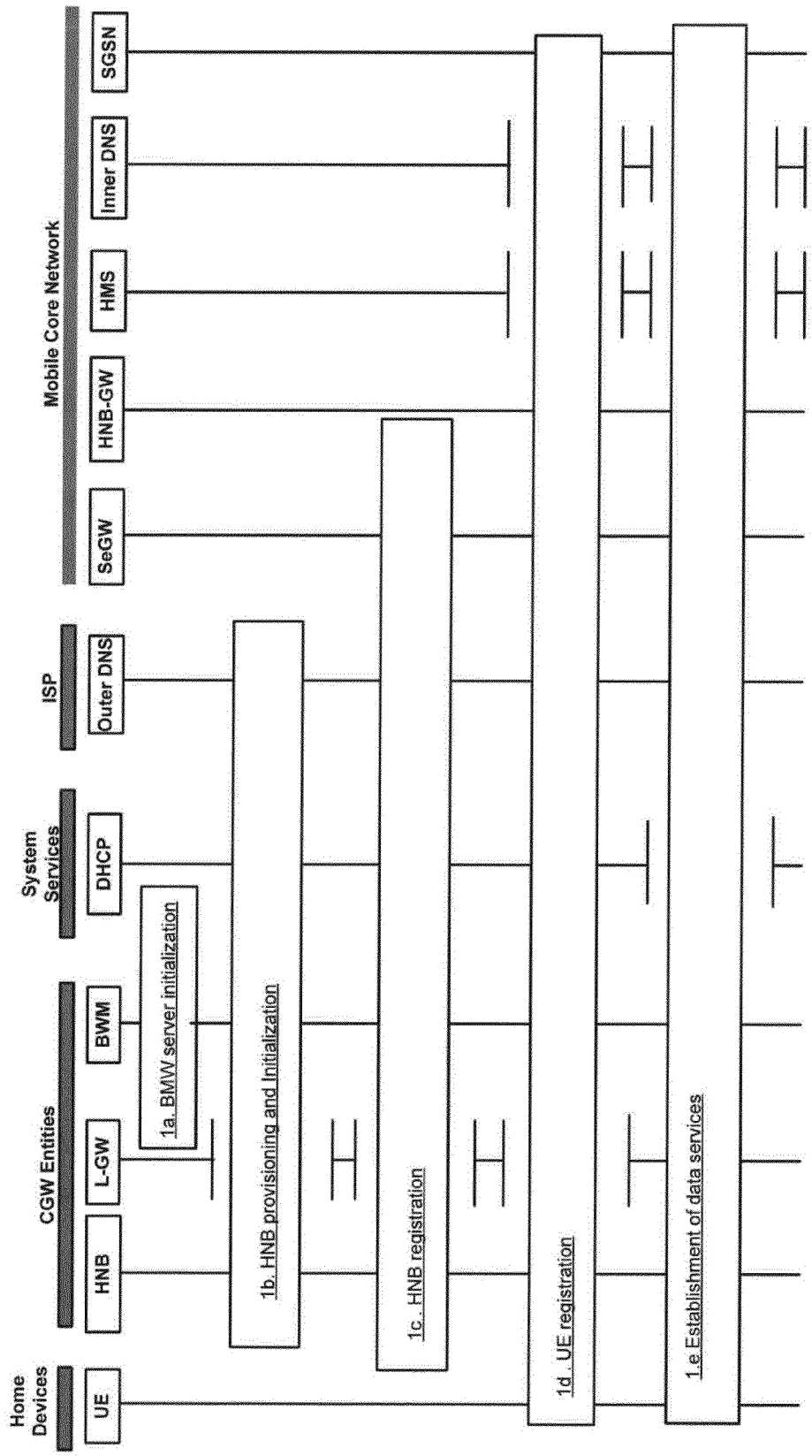
FIG. 38 is an exemplary illustration of a procedure for the establishment of data services between a UE and core network.
Figure 39:
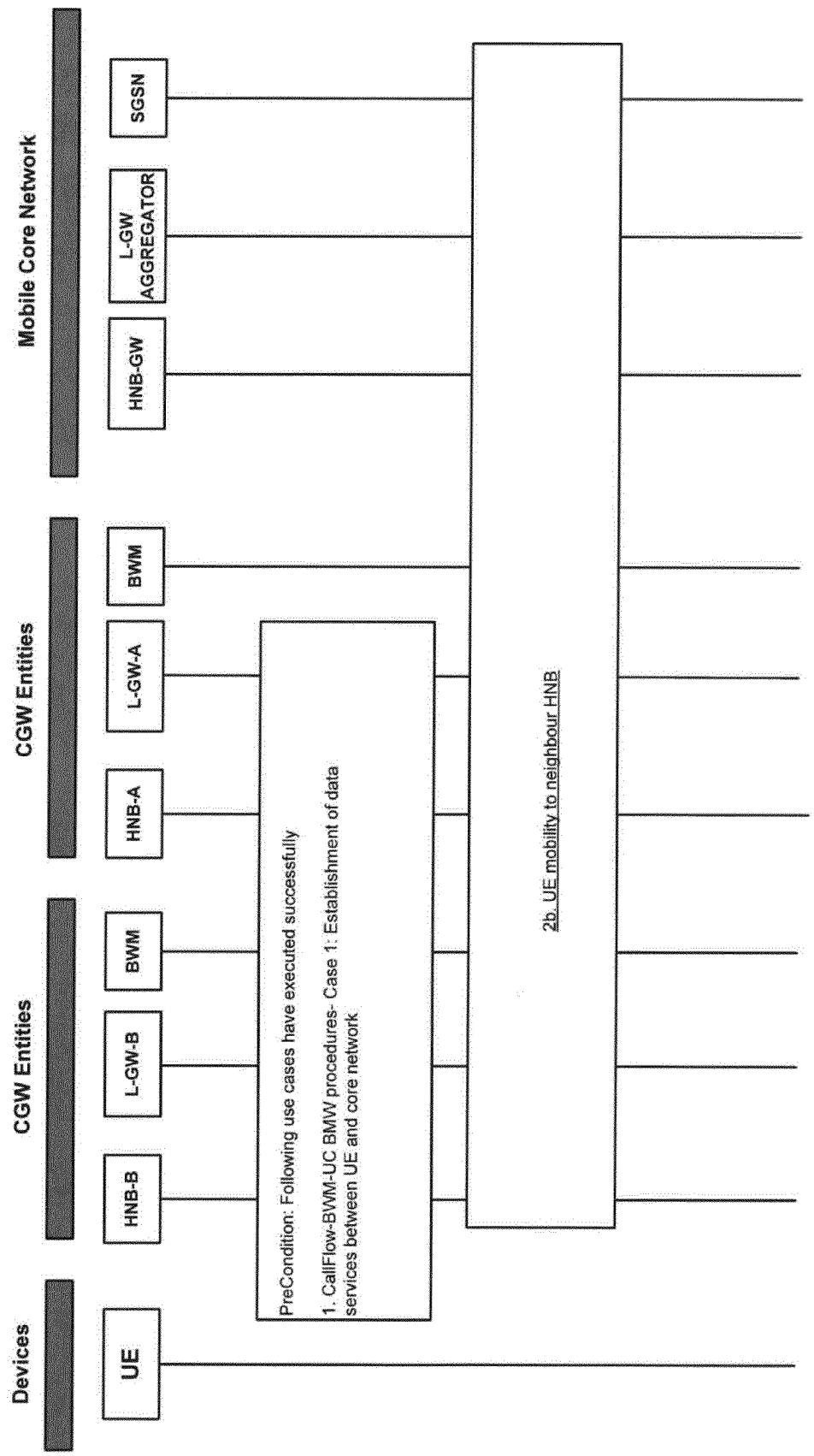
FIG. 39 is an exemplary illustration of a procedure for the mobility of a UE connected to one HNB to a neighbors home network, wherein the neighbor is connected to another HNB.
Figure 40:
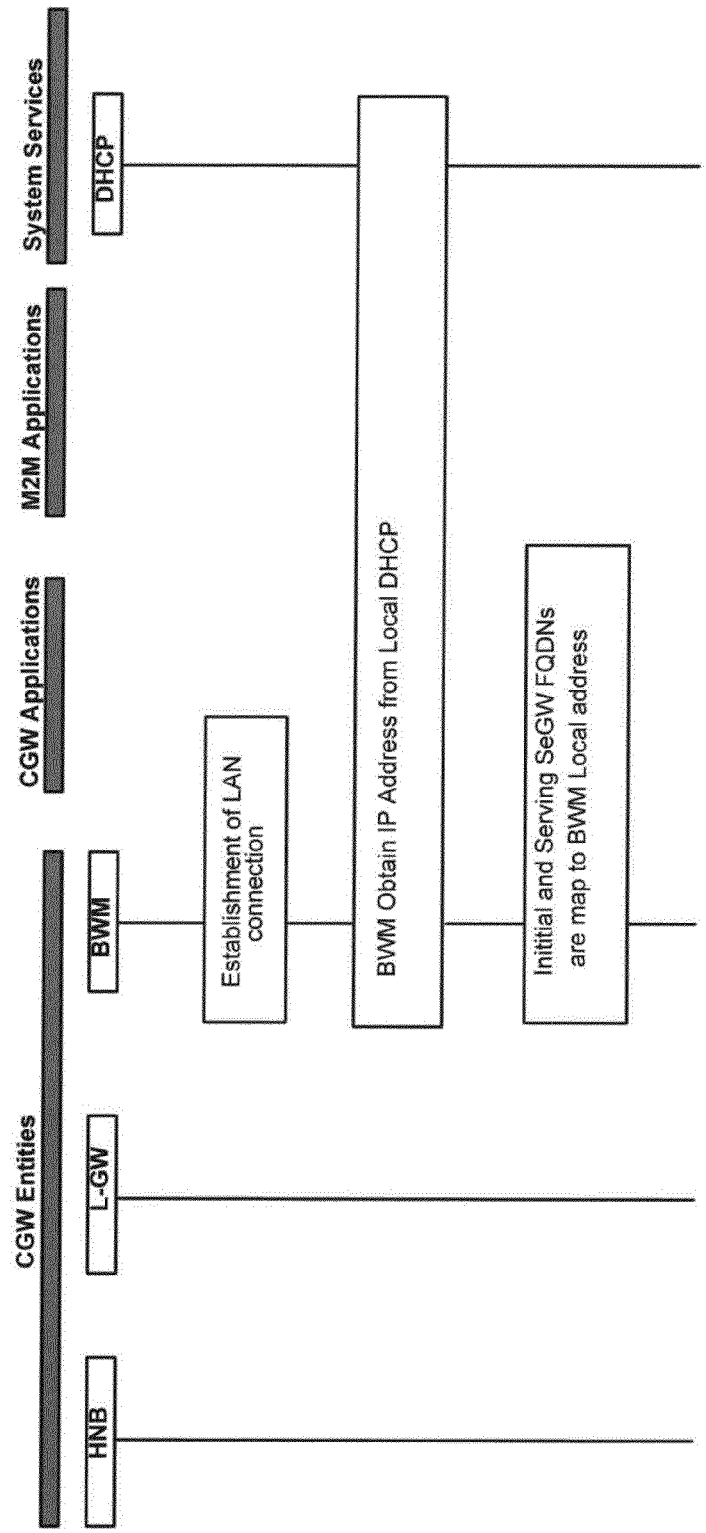
FIG. 40 is an exemplary illustration of a procedure for BWM initialization.
Figure 41:
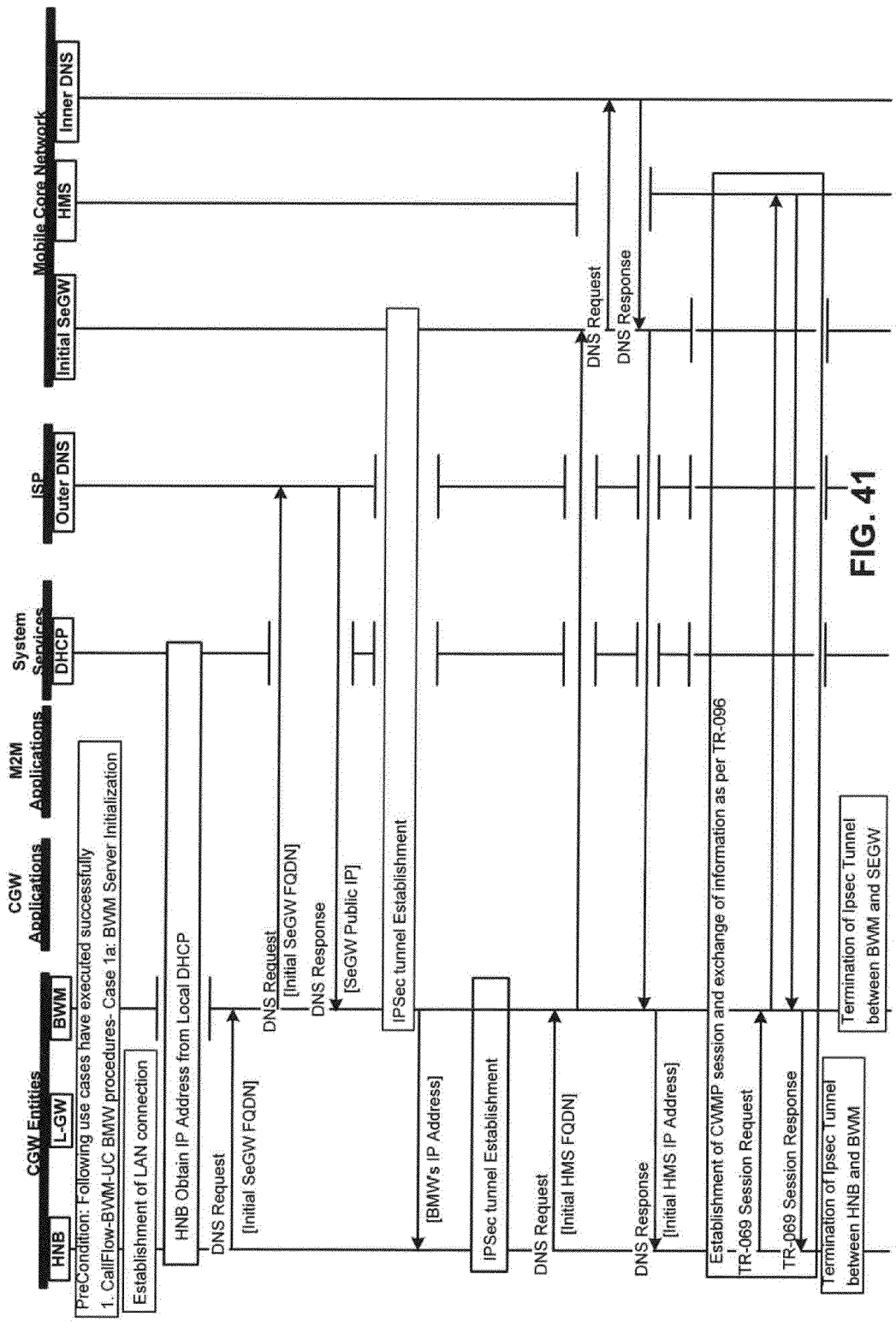
FIG. 41 is an exemplary illustration of a procedure for CGW initialization in the presence of BWM.
Figure 42:
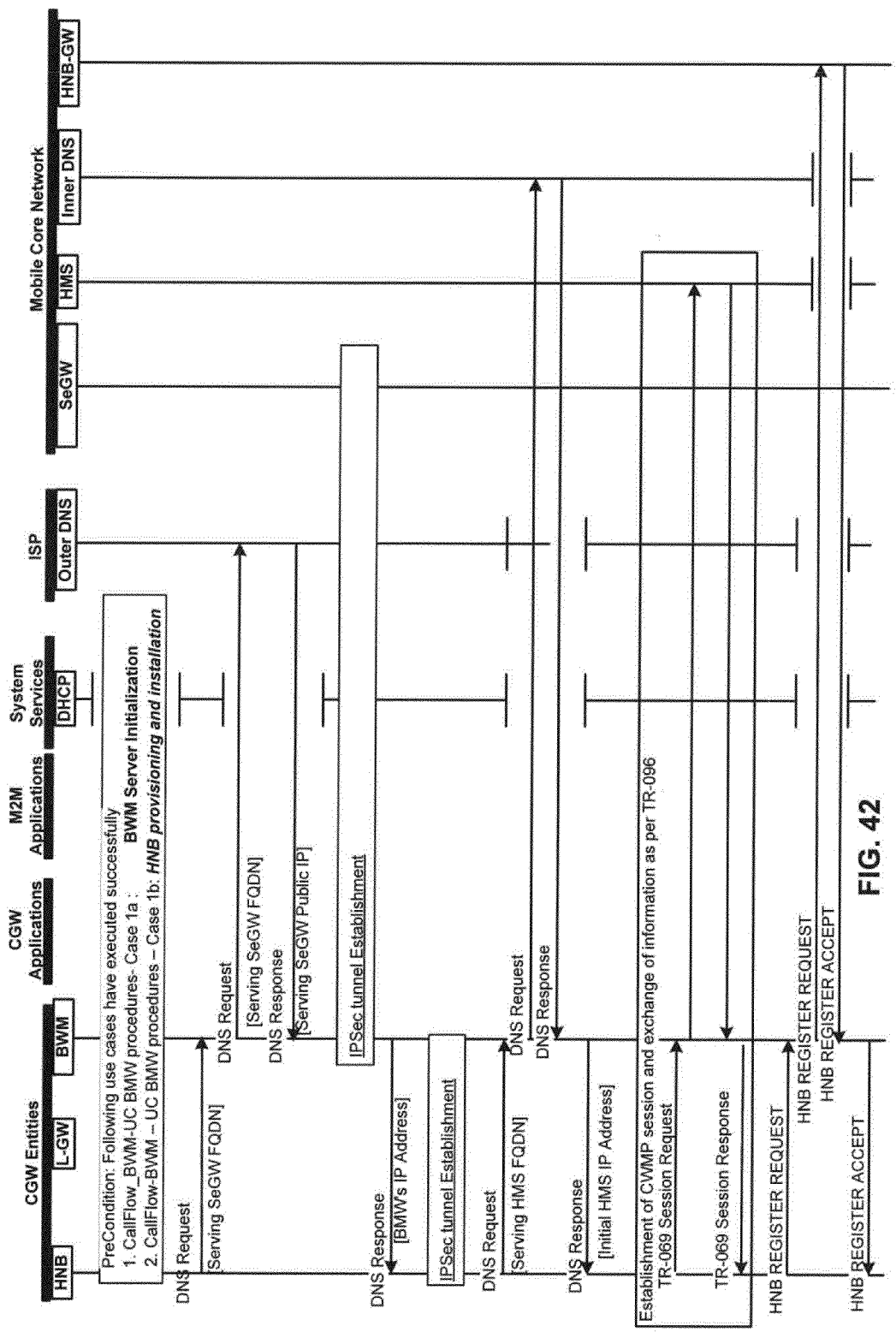
FIG. 42 is an exemplary illustration of a procedure for HNB registration.

The BWM MSCs, as shown in FIG. 38 thru FIG. 50, are exemplary illustrations of the initialization, session establishment, and mobility procedures associated with the introduction of the BWM Server within the CGW between the HNB and the MCN. FIG. 38 is an exemplary illustration of a procedure for the establishment of data services between a UE and core network. FIG. 39 is an exemplary illustration of a procedure for the mobility of UE connected to one HNB to a neighbors home network, wherein the neighbor is connected to another HNB. FIG. 40 is an exemplary illustration of a procedure for BWM initialization. FIG. 41 is an exemplary illustration of a procedure for CGW initialization in the presence of BWM. FIG. 42 is an exemplary illustration of a procedure for HNB registration.

Figure 43:
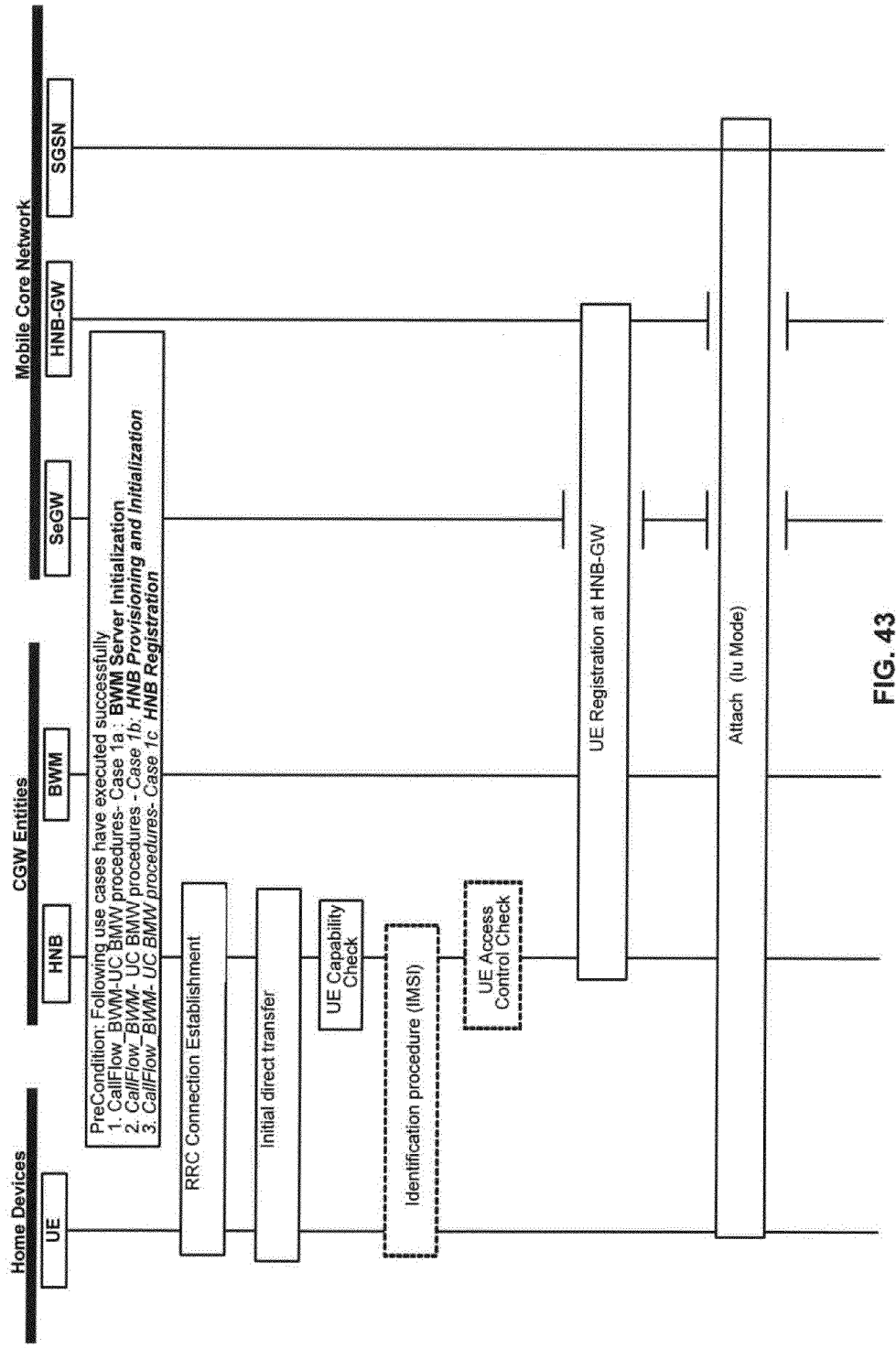
FIG. 43 is an exemplary illustration of UE registration (Non closed subscriber group (CSG) UE)
Figure 44:
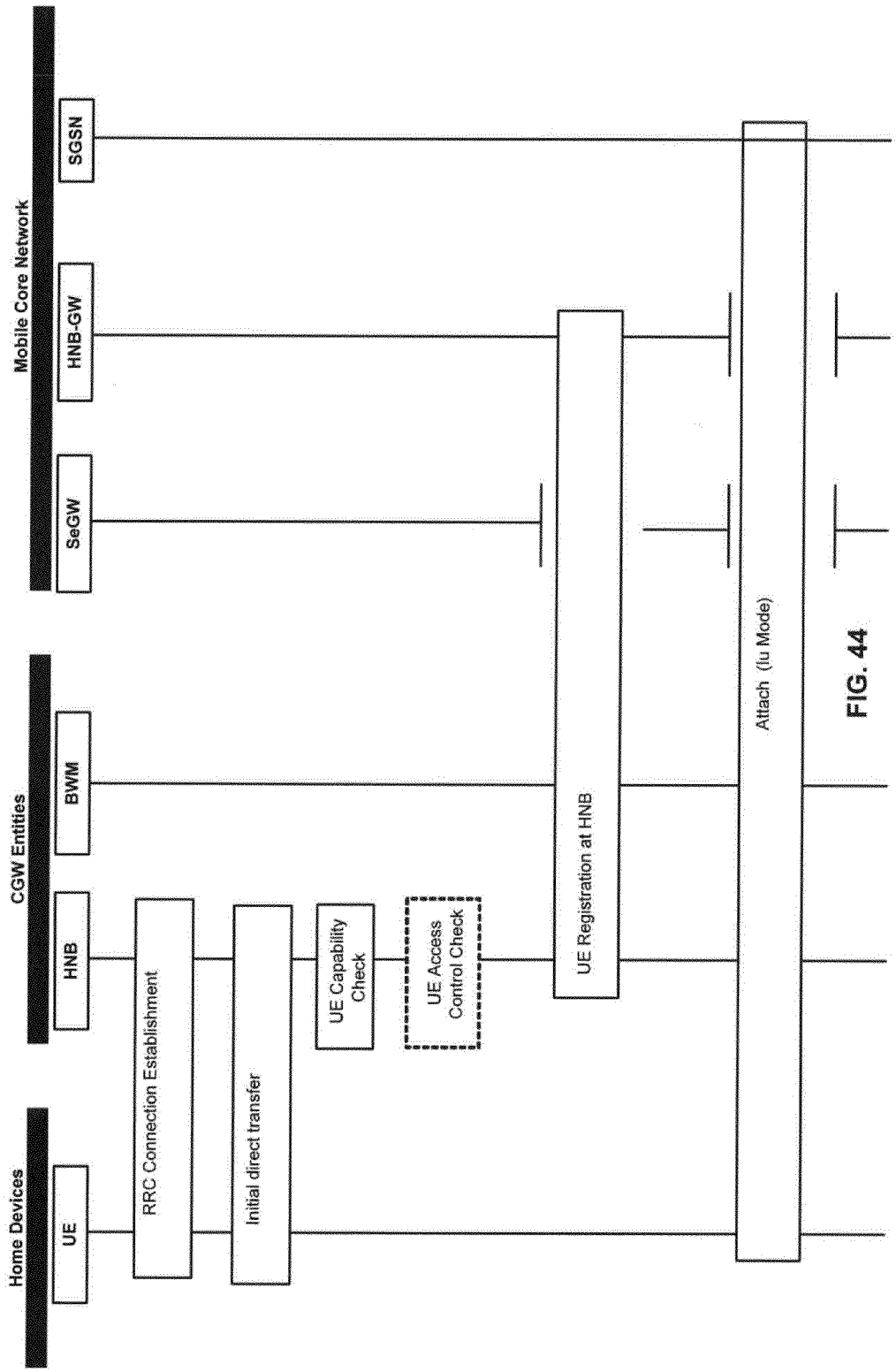
FIG. 44 is an exemplary illustration of UE registration for a CSG UE.

FIG. 43 is an exemplary illustration of UE registration (Non closed subscriber group (CSG) UE). In FIG. 43, all messages between the HNB and MCN elements may pass through the HNBGW. The role of the BWM server will be to unpack messages from one IPSec tunnel and then repack them on the other IPSec tunnel FIG. 44 is an exemplary illustration of UE registration for a CSG UE.

Figure 45:
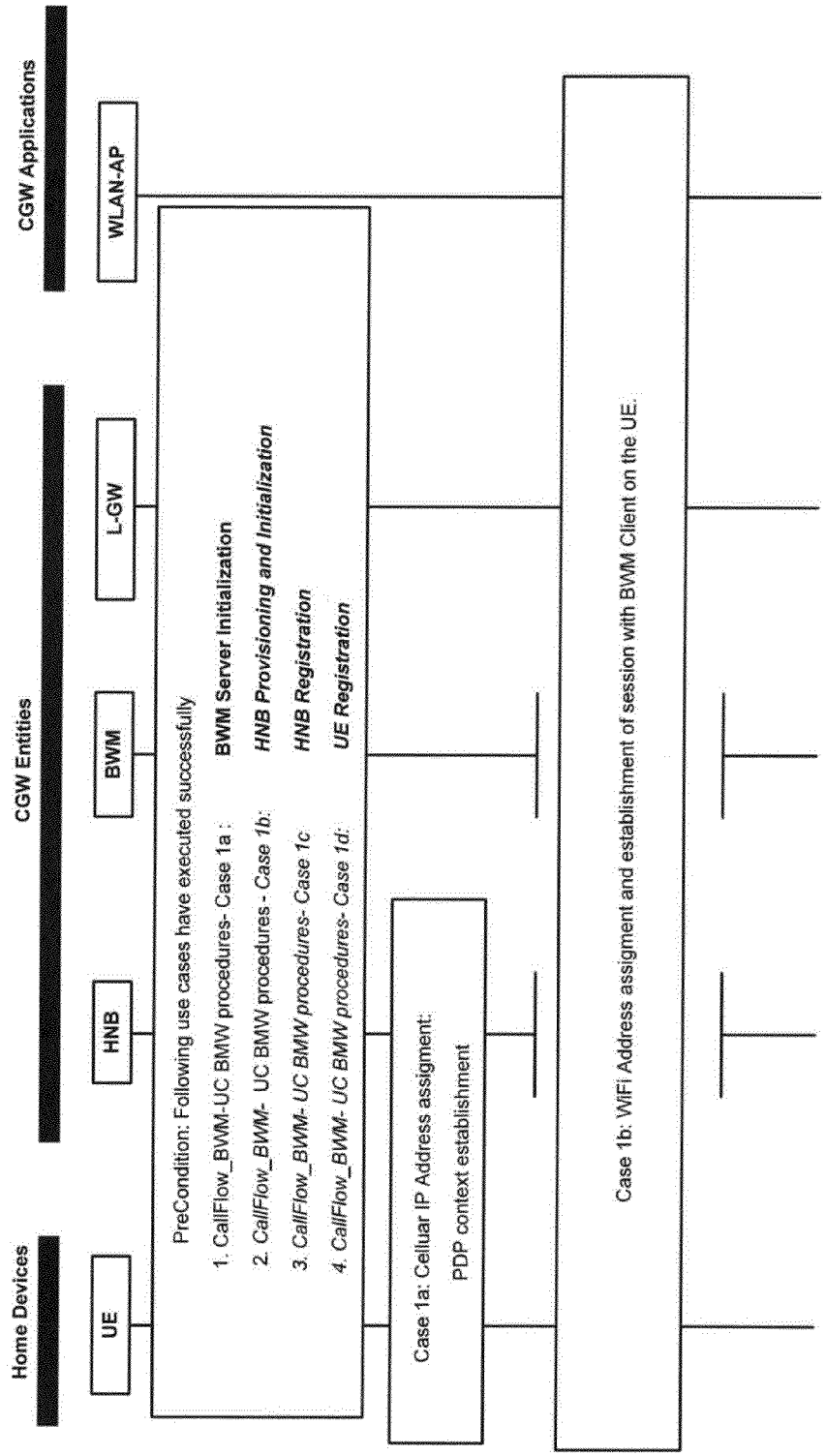
FIG. 45 is an exemplary illustration of packet switched (PS) data services establishment.
Figure 46:
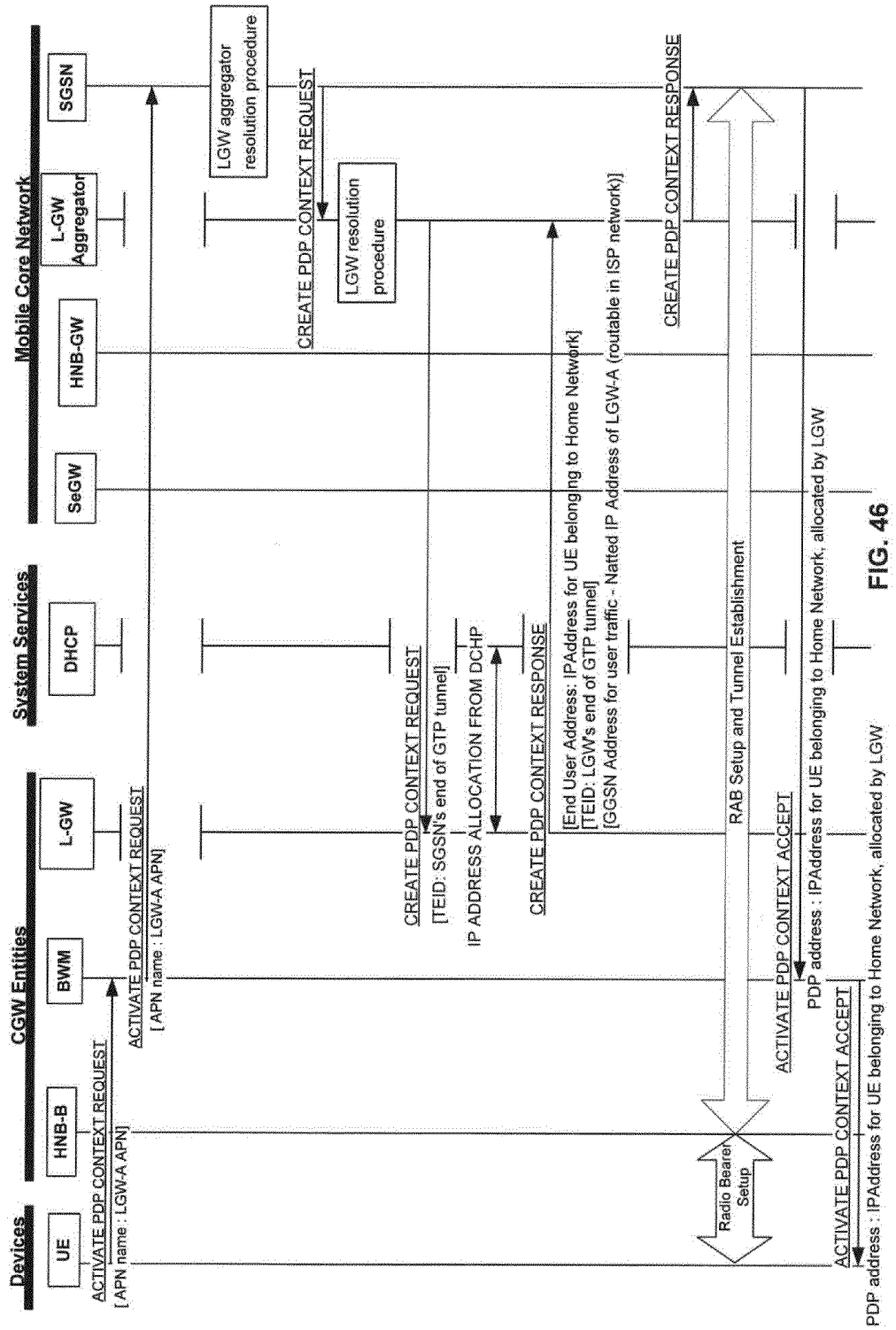
FIG. 46 is an exemplary illustration of cellular PDP context establishment.
Figure 47A:
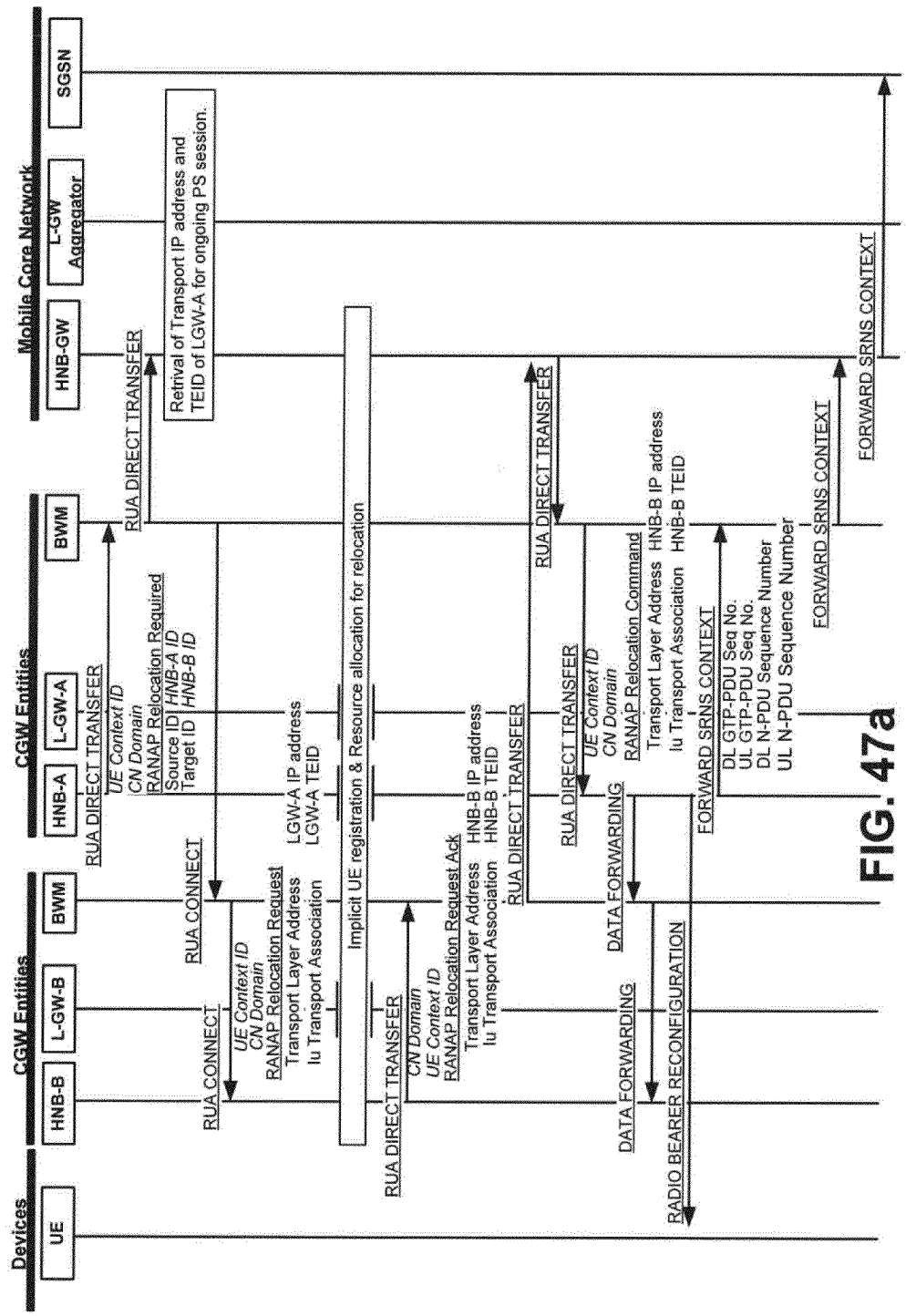
FIG. 47A is an exemplary illustration of procedures for intra HNBGW mobility (LIPA to ELIPA)
Figure 47B:
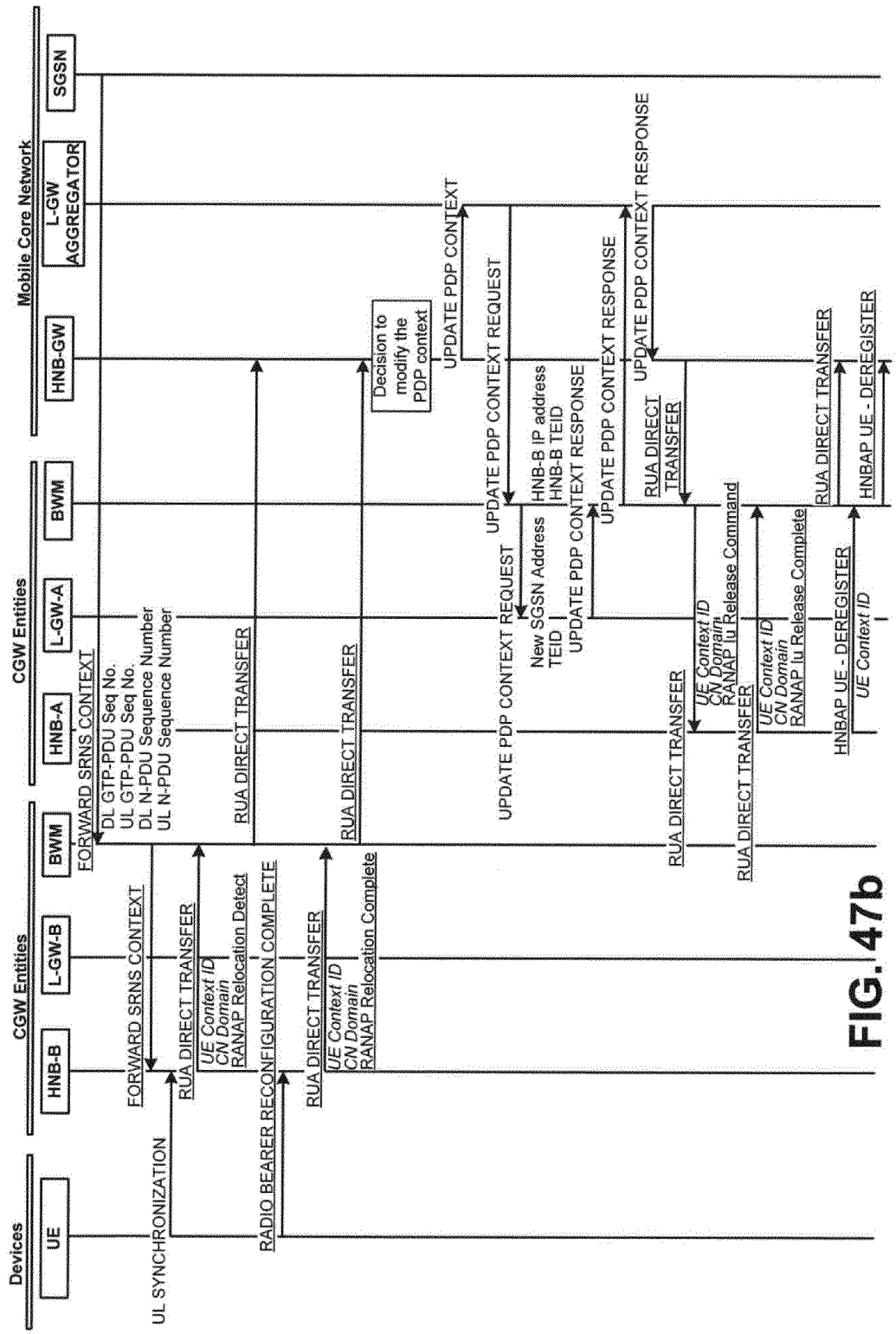
Figure 48:
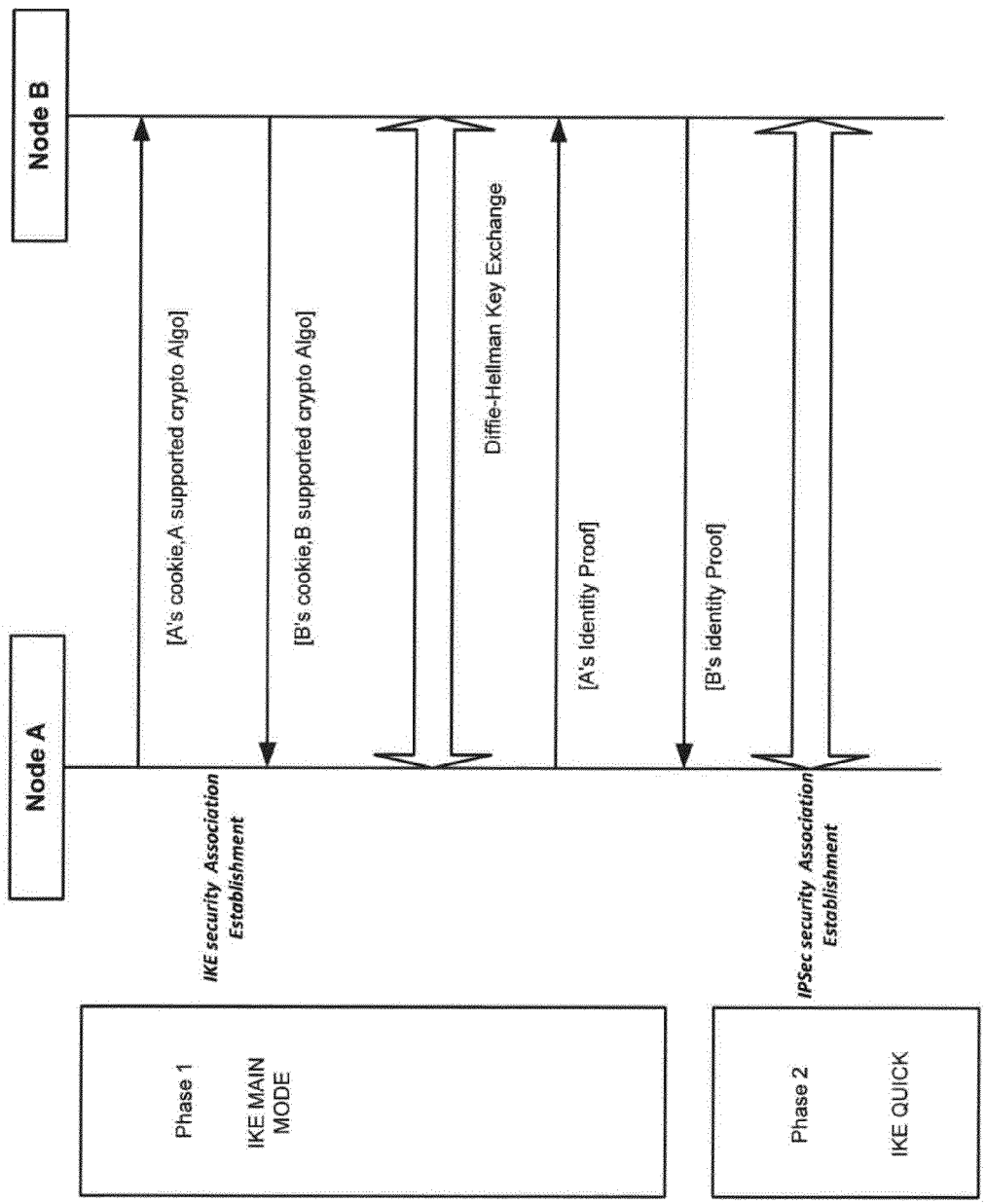
FIG. 48 is an exemplary illustration of IKE IPSec procedures between BWM and SeGW.
Figure 49:
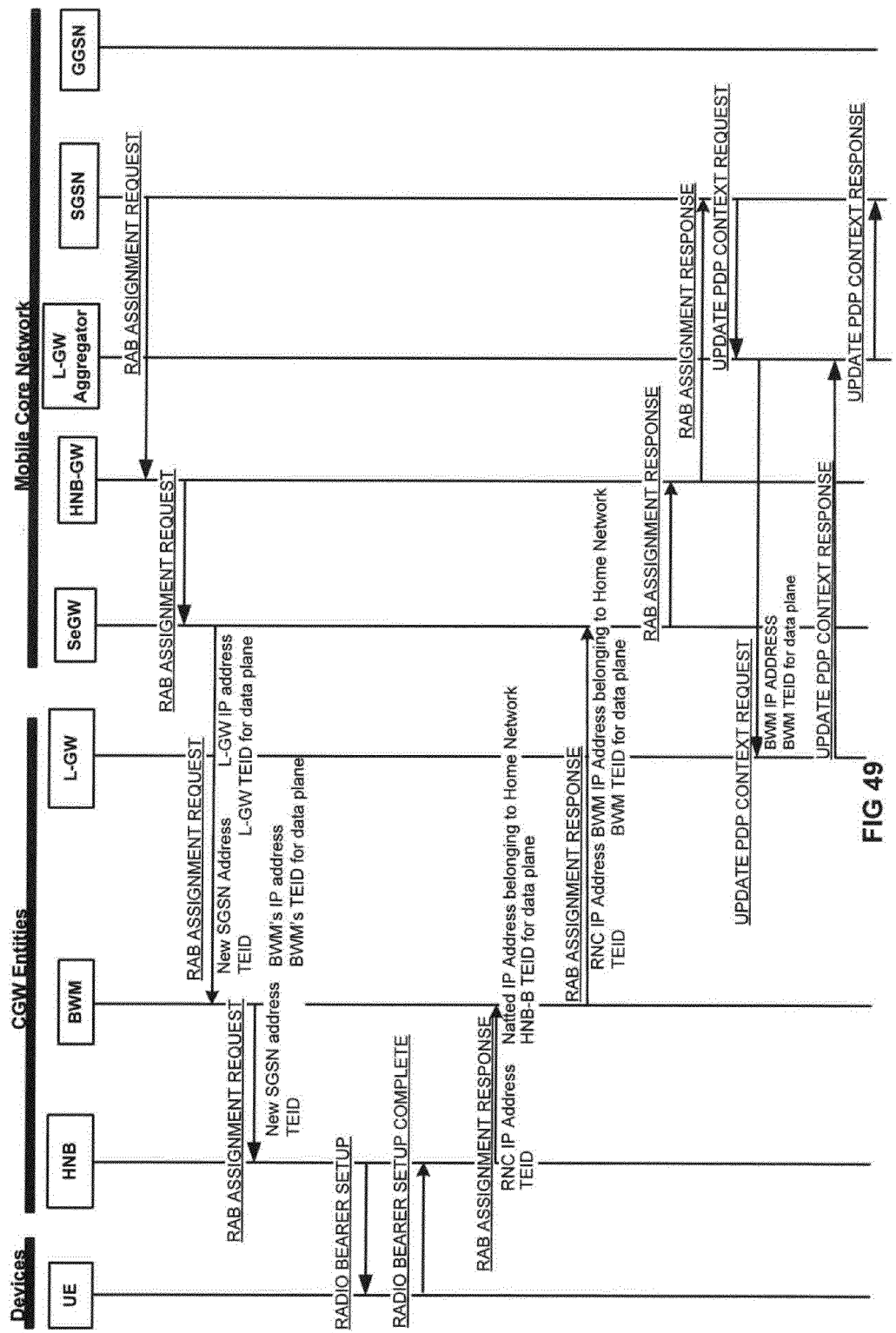
FIG. 49 is an exemplary illustration of procedures for RAB Setup and user plane establishment with one tunnel establishment.
Figure 50:
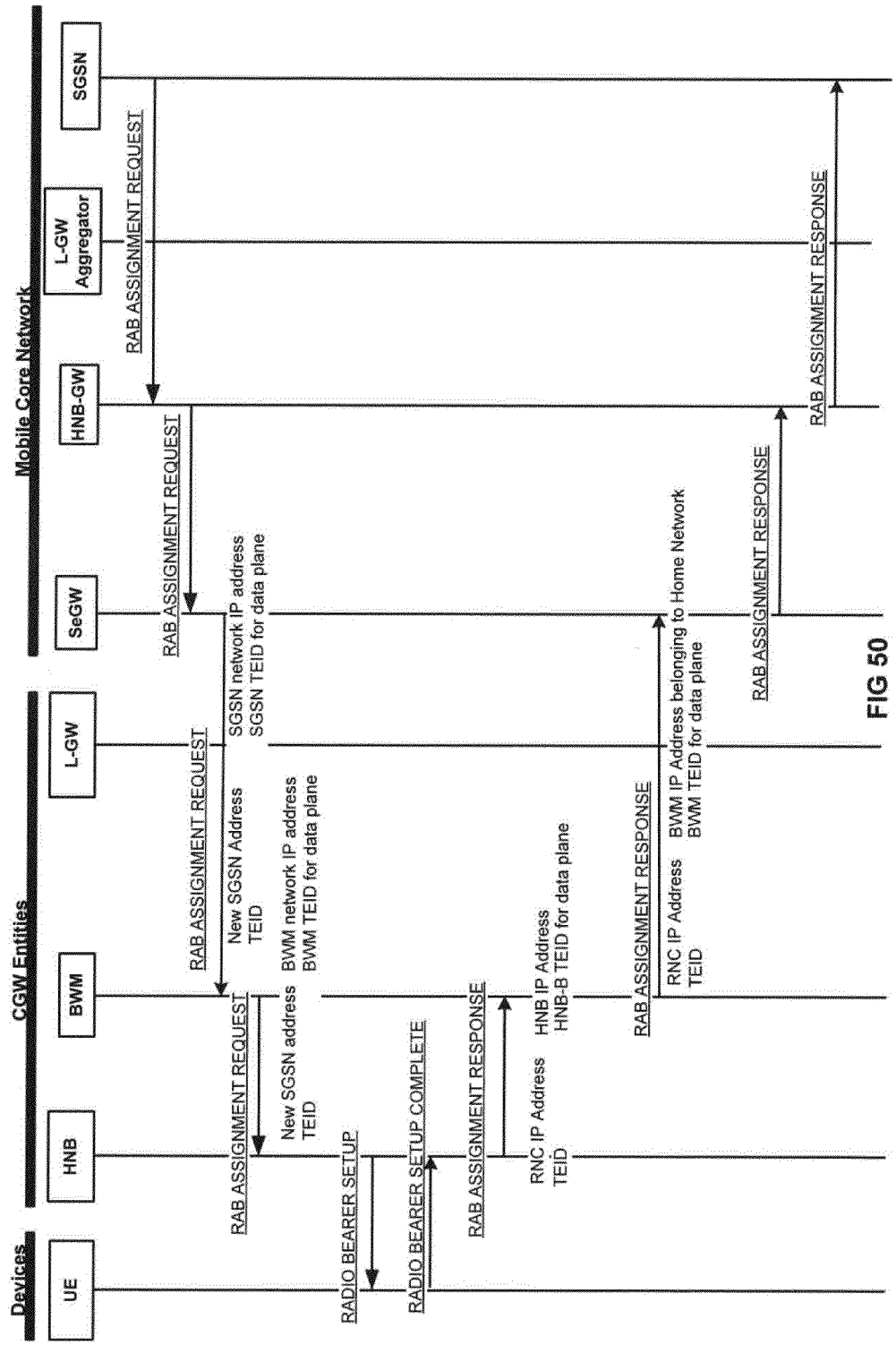
FIG. 50 is an exemplary illustration of procedures for RAB setup and user plane tunnel establishment with two tunnel establishment.

FIG. 45 is an exemplary illustration of packet switched (PS) data services establishment. FIG. 46 is an exemplary illustration of cellular PDP context establishment. FIGS. 47A and 47B is an exemplary illustration of procedures for intra HNBGW mobility (LIPA to ELIPA), wherein FIG. 47B is a continuation of FIG. 47A. FIG. 48 is an exemplary illustration of IKE IPSec procedures between BWM and SeGW. FIG. 49 is an exemplary illustration of procedures for RAB Setup and user plane establishment with one tunnel establishment. FIG. 50 is an exemplary illustration of procedures for RAB setup and user plane tunnel establishment with two tunnel establishment.

Assigning unique APNs to each LGW may lead to a large number of entries in an SGSN APN database. Consequently, in one embodiment, the LGW's IP address is resolved at runtime based on logic provided by the core network. Typically, each LGW has a unique identity pre-determined in manner similar to a HNB. Also typically a user profile in the HLR has entries for home HNB and home LGW. Under this scheme, the address resolution process may incorporate the following scenarios: 1) user is latched to his home HNB and wants to connect to his home network—Network resolves the IP address of user's home LGW; 2) user is latched to neighbor A's HNB and wants to connect to his home network—Network resolves the IP address of user's home LGW; and 3) user is latched to neighbor A's HNB and wants to connect A's network—Network resolves the IP address of Neighbor's LGW.

The are many different "digital home" use cases that would be enabled by the Hybrid Network Converged Gateway architecture. Since WiFi and Cellular accesses are expected to be available within the Integrated Home Network, one use case is where the device is a MultiRAT (e.g., dual mode WiFi & Cellular) device. The data transfer between such a device and CGW may take place in parallel on both RATs. The parallel transmission may be used to provide higher data rates or improved robustness (by providing multi RAT diversity) or provide flexibility (whereby data packets are appropriately and adaptively mapped onto each RAT depending upon various characteristics such as security, data rates, QoS, cost, robustness, channel quality etc).

In another use case, a smart phone may communicate with the CGW using the Cellular RAT (so that QoS is guaranteed, as opposed to WiFi RAT), and the CGW may communicate with the STB over Ethernet. Following the accessing of the TV Program Guide, the smart phone user may initiate a viewing session. The content, in this example, is streaming from the WAN. A variation to this use case is where the content resides in a DVR unit, which is connected to the STB. In this example, the video transfer is local to the IHN.

The CGW architecture may have the following use case categories: local access, remote access, lawful interception, mobility, home security, enterprise—small business, enterprise—network operator, enterprise—home office, self-configuration, store, carry and forward, and bandwidth aggregation.

Examples of local access include session push, local based access to network for LIPA (through CGW and peer-to-peer) and non-LIPA services, mobility within home/enterprise, parental control and guest access, support of legacy devices (non-IMS), session modification, content sharing/multicast, inter-CGW coordination, and get nearest copy.

Examples of remote access include remote access of media data, media services, and media devices within the home, remote access of security devices within the home, and remote access of appliances within the home.

Examples of lawful interception include lawful interception under LIPA scenarios, surveillance—presence, and content protection/digital rights management.

Examples of mobility include inbound mobility (macrocell-to-CGW), outbound mobility (CGW-to-macrocell), and inter-CGW. An example of home security includes notification to remote stakeholders.

Examples of a small business enterprise include customer guide in shopping center using LIPA access, IP-PABX, and mobile IP-PABX.

Examples of a network operator enterprise include new operator offers NW whose capabilities are only IMS capable (no CS domain), operator removes legacy services (removes CS domain), open access mode, hybrid access mode, offload of CS domain congestion, offload of PS domain congestion—SIPTO, improved coverage, and interoperability across providers.

Examples of a home office enterprise include access to home based content and devices, and access to outside home services.

Examples of self-configuration include built-in test/diagnostics, self healing, energy savings, self-configuration upon power up of CGW, and self configuration upon power up of devices which will access the CGW.

An example of store, carry and forward include a stationary device that uses CGW to hold data until the CGW can forward the data to its destination.

Examples of bandwidth aggregation include mega-data transfers, security—break data up over several RATS to hide traffic, an minimal error—redundant transmissions.

The term "Bandwidth Management (BWM)" may be used to refer to various ways to control multiple, simultaneously active radio links between a WTRU and a mobile core network (MCN). For example, the multiple radio links may be a cellular radio link and a WiFi radio link. The control schemes may include aggregation of the bandwidths provided by the individual radio links to serve a high bandwidth application, which may not be able to be sustained by any of the individual links. The control schemes may include steering of individual traffic flows to different radio links, so that there may be a better match between the QoS, security or some other attribute of the radio link and the corresponding requirement of the traffic flow. The control schemes may include switching over a traffic flow from one radio link to another in cases of failure or excessive degradation of a particular link. The schemes may include highly dynamic steering of individual traffic packets, for example IP packets, across the multiple radio links in concert with the changing temporal fading characteristics of the radio links. Although the BWM capability and/or control schemes may be described in relation to certain embodiments, it should be appreciated that the BWM capability and/or control schemes may be applicable to a wide variety of uses beyond the described embodiments.

Figure 54:
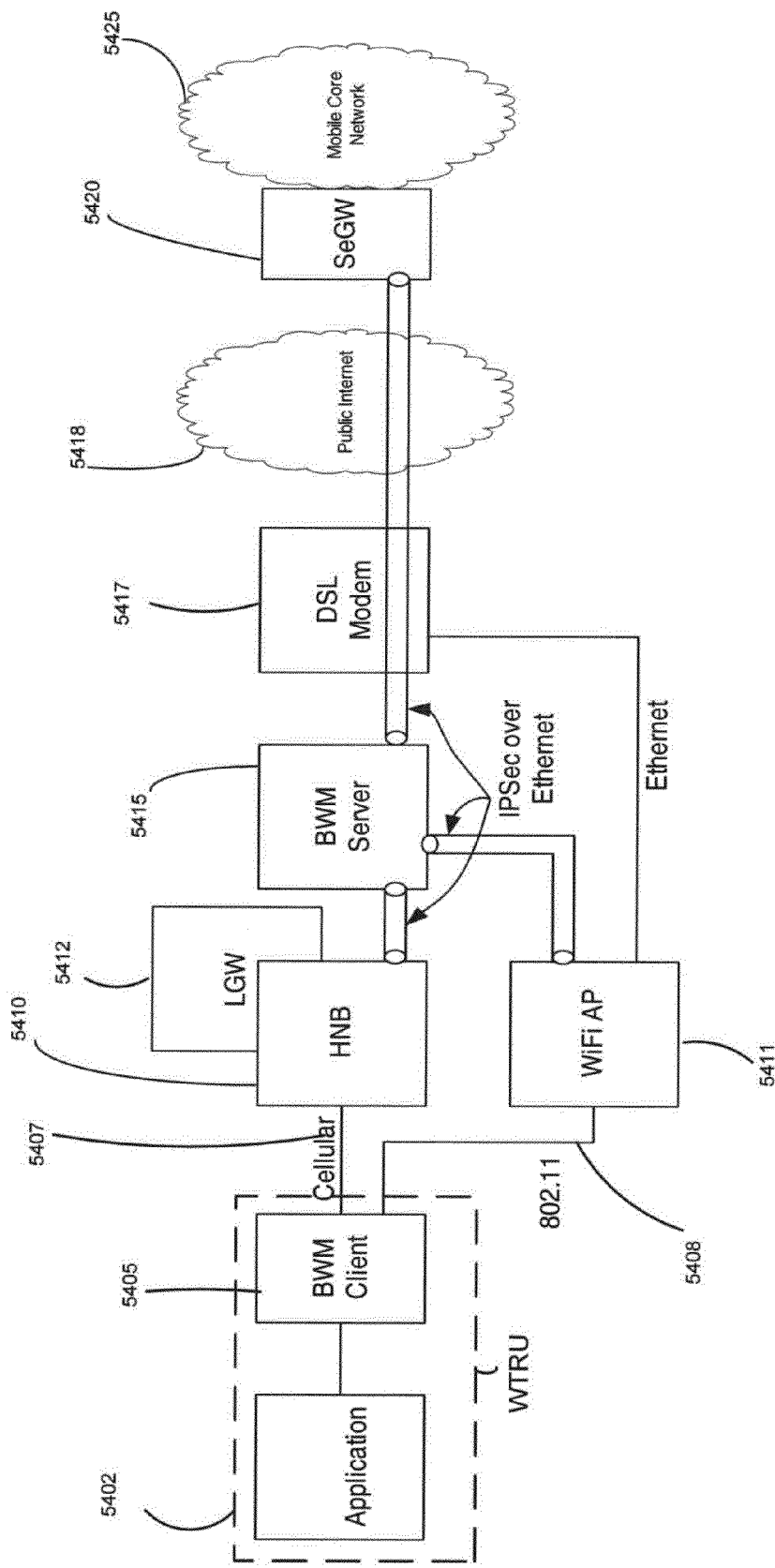
FIG. 54 is an exemplary illustration of a network layout including a BWM system.

One aspect of such a MultiRAT BWM system may be the 'anchor' point of the various radio links. One anchor point may be the MultiRAT WTRU itself. However, there may be several options as to the anchor point within the network. FIG. 54 illustrates one option, where the network anchor point may be between the HNB (or femto access point) and the (MCN)—viewed as a 'Local-MultiRAT-BWM system'—for example. The anchor-point may be 'within' the HNB itself, which leads a modified HNB architecture and may be viewed as an 'HNB-Integrated-MultiRAT-BWM system.' As another example, the anchor-point may be outside the MCN itself, which may lead to a configuration that may be viewed as a 'Macro-MultiRAT-BWM system.'

For the Local-MultiRAT-BWM system, in addition to using the cellular network between the MCN and WTRU, some data may be routed between the MCN and WTRU via a WiFi connection. This traffic offloading may be done at the IP packet level, and therefore, one IP flow may be broken up over multiple RATs for approximately simultaneous transmission. For example, as shown in FIG. 54, a BWM system may be comprised of a BWM server 5415 and a BWM client 5405. The BWM server may be placed between the HNB 5410 and SeGW edge 5420 of the MCN 5425. The BWM client may be placed within the WTRU device 5402. A local gateway (LGW) 5412, which may be a functional entity for the purposes of local IP connectivity, may be between the WTRU 5402 and other IP devices (e.g., BWM server 5415). There may be a Wifi AP 5411 that has a 802.11 interface 5408 that may connect to the WTRU 5402, and additional interfaces that may connect to the BWM server 5415 and a DSL modem 5417. The BWM server 5415 may have connections to the HNB 5410 and/or LGW 5412, the Wifi AP 5411 and the DSL modem 5417. The DSL modem 5417 connect to the public internet 5418.

A BWM server and client may form an association that may denote the available transports that exist between the client and server. In one embodiment, it may be one cellular transport and one WiFi transport. A WTRU may be capable of using multiple transports, but if only one transport is available, using BWM to perform bandwidth aggregation (BWA) may allow for handoff scenarios should another transport type become available. Multiple cellular and multiple WiFi transports may also exist, such as the following exemplary transport pairs: Cellular+WiFi, Cellular+Cellular, WiFi+WiFi, etc. When an association is performed, a policy entity within the BWM server and client may decide how best to deliver packets to the other entity (e.g., the BWM Server may decide the "best" transport to use to deliver a packet to the BWM Client). Both the BWM server and client may have a common requirement to perform this segregation of packets between the available RATs.

As shown in FIG. 54, a BWM server 5415 may be located in between a HNB 5410 and a SeGW 5420. There may be additional requirements imposed on the BWM server based on its location between the HNB 5410 and SeGW 5415. The BWM server 5415 may appear as the HNB 5410 towards the SeGW 5420 and appear as the SeGW 5420 towards the HNB 5410. In addition to BWM server's duties regarding the handling of data packets, it may need to terminate IPSec tunnels in place between the HNB 5410 and SeGW 5420 and terminate GTP tunnels between the SGSN (not shown, but it may be in MCN 5425) and HNB 5410. As the termination point for both IPSec and GTP, the BWM server 5415 may need to perform the "un-IPSec'ing" and "re-IPSecing" of packets that pass between the HNB 5410 and SeGW 5420 and may need to perform the "un-GTP'ing" and "re-GTP'ing" of packets that pass between the HNB 5410 and SGSN (not shown, but it may be in the MCN 5425). Deep packet inspection and the modification of message contents may be performed by the BWM server 5415.

Incorporation of the BWM solution within the mobile core network may provide one or more benefits. From an end-user point of view, the BWM solution may provide a better user experience. This may be realized through higher throughput and continued connectivity even in the face of environmental factors such as interference. For the operator, there may be benefits as well. The BWM solution, which relies on BWA, may be a premium service that can result in higher revenues and the offloading of traffic from the HNB cellular infrastructure. Also, the use of a WiFi access point to offload traffic may allow a MCN operator to control and offer a WiFi access point to the home owner or enterprise.

The mobile core network operator may become the provider of the WiFi access point, which may allow the operator to charge the home owner a premium. The femtocell may appear to be providing higher throughput from a user perspective. The femtocell may be able to deliver a certain maximum throughput and support a maximum number of users. With the addition of the BWM solution, the HNB may appear to offer a higher throughput and may support more users. The added throughput may go through the WiFi transport, but from a user standpoint, there may be a higher throughput and more users can use the HNB.

A protocol to enable a communications session over multiple networks may be used in multiRAT BWM. The protocol may be able to manage communications over multiple data links (e.g., radio access links) to a data network transparently to the communicating device. For example, the protocol may be a Multi-Network Transport Protocol (MNTP), such as the MNTP developed by Attila technologies.

MNTP may be considered to run over a "transparent" UDP layer. Similar transparent UDP layer protocols may be used. One reason for using MNTP is to allow a client to effectively utilize its multiple data links (e.g., radio access links) to a data network that the MNTP client (e.g., WTRU) has available in a way that may be transparent to a peer. MNTP provides a way of doing so while preserving and enhancing numerous performance characteristics of transmission control protocol (TCP). A description of how the MNTP protocol may be used in an end-to-end MultiRAT BWM system is given herein.

Implementing BWM Server systems may include one or more of the following: 1) BWM server initialization; 2) HNB initialization/provisioning; 3) HNB registration; 4) GPRS attach; 5) establishment of data services using BWM aggregation; 6) data transfer using BWM aggregation; 7) DSM interaction with the BWM Server; 8) Mobility; and 9) CS Voice.

Figure 55:
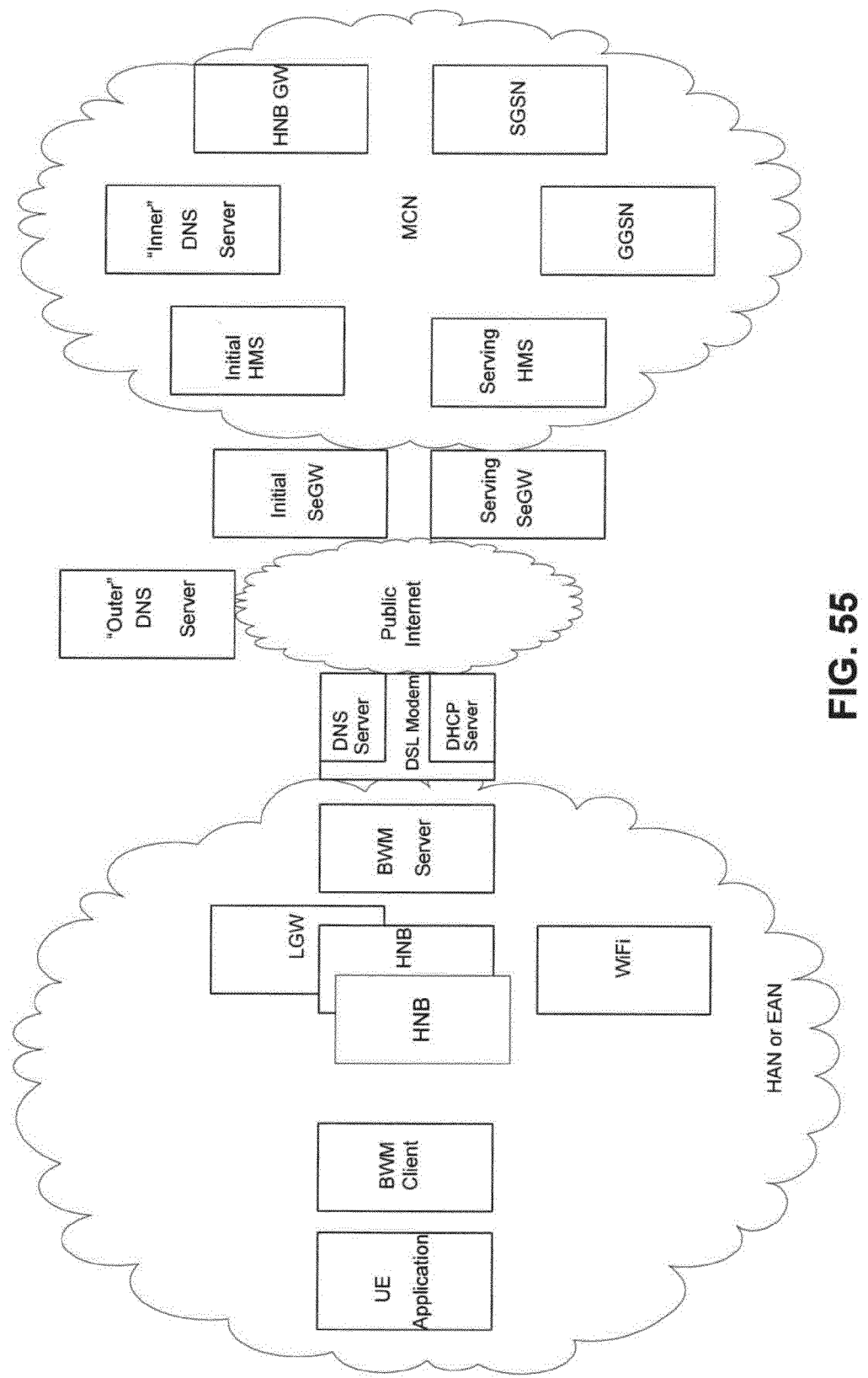
FIG. 55 is an exemplary illustration of an enterprise implementation of BWM.

Enterprise scenarios may be implemented where more than one HNB communicates with the MCN through a single (or multiple) BWM Server(s). FIG. 55 is an exemplary illustration of possible elements used in this architecture.

It should be noted that while the following discussion may focus on a PDP context through the MCN (e.g., remote IP access (RIPA)), but the same embodiments may applied to other systems, such as an LIPA connection. For an LIPA connection, the SGSN may be replaced by the LGW, which may be local within a home. Additionally, there may be the establishment of multiple PDP contexts (e.g., some combination of LIPA and RIPA) for a single WTRU.

If a WTRU only supports cellular or if a WiFi AP is not available, for whatever reason, then the BWM solution may become a pass-through. That is, there may be no bifurcation of the data stream as it may be delivered via cellular. If the cellular service is not available, there may be no data session since this solution makes use of the MCN. That is, if there is no cellular service, there may be no data connection through the MCN.

Some exemplary implementation of BWM operation when BWM is between the HNB and the MCN may include one or more of the following: 1) BWM replicating many of the NW and HNB functions; 2) BWM routing and selectively modifying signals between HNB and MCN; and 3) HNB registering normally and then providing information to BWM. For example regarding 3) above the following may occur: a) HNB may register with the core network normally as defined in standards; b) Once HNB is "operational", it may share to the BWM via signaling or via some API the network information received during the HNBGW discovery, provisioning and HNB registration process; c) HNB to SeGW IP Sec tunnel may then be torn down; d) two new IPSec tunnels may be put into place. One between the HNB and BWM and another between the BWM and SeGW. Once the tunnels are set up, this method may be the same as the other 1) and 2) above. Details regarding different methods are disclosed herein.

A BWM Server may be initialized (e.g., upon power-up). For example, the BWM Server may perform a dynamic host configuration protocol (DHCP) discovery procedure. Once this is complete, the BWM Server may have a local IP address and may have its DHCP Server established with an entry for the Initial SeGW.

A local IP address may be acquired by performing the following, resulting in the BWM server having a local IP address on the EAN or HAN. The BWM Server may broadcast a DHCP Discovery message requesting a local IP address, which may be received by a home or enterprise modem (cable/DSL). A DHCP Server within the home or enterprise modem may respond with a DHCP offer message comprising the local IP address being offered by the home or enterprise modem. This offer may also include information for a DNS server on the public Internet ("Outer" DNS Server). The BWM server may broadcast a DHCP request indicating that the offer from the above has been accepted (since multiple DHCP servers can offer an IP address). The DHCP Server within the home or enterprise modem may respond with a DHCP acknowledgment message.

The BWM Server, having a local IP address, may populate a lookup table within its DNS Server (or equivalent) to have a mapping between the Initial SeGW (in memory) and the local IP address provided by the DHCP Server. Table 1 illustrates such functionally.

TABLE 1

| FQDN | IP Address |
| --- | --- |
| Initial SeGW | Local IP address assigned by DHCP Server in home or enterprise modem |

This may be necessary in order for the HNB to regard the BWM Server as the Initial SeGW. The above describes the use of a DNS server within a BWM Server, however, other methods may be used to perform the DNS server function. For example, the BWM server may have a full DNS server or the BWM server may act as a proxy DNS server by listening to the DNS response for the Initial and Serving SeGW from the "Outer" DNS server and modify the address for these entities in the messages sent to the HNB. From a functionality standpoint, these may bring about the same result. There are different types of DNS requests that may be made by the HNB which is discussed herein.

Initializing and provisioning the HNB (e.g., upon power-up) may provide for the HNB to know the FQDN or IP address of the MCN entities that it may communicate with during the normal course of its operations. The HNB may also know about its environment and may have provided this information to the Initial HMS as well. The HNB may require a local IP address. In order to acquire an IP address the HNB may perform a DHCP discovery procedure.

A local IP address may be acquired for the HNB by performing a combination of the following, resulting in the HNB having a local IP address on the EAN or HAN. The BWM server may broadcast a DHCP Discovery message requesting a local IP address, which may be received by a home or enterprise modem (cable/DSL). A DHCP Server within the home or enterprise modem may respond with a DHCP Offer message comprising the local IP address being offered by the home or enterprise modem. This offer may also include information for a DNS Server on the public Internet ("Outer" DNS Server). The BWM Server may broadcast a DHCP Request indicating that the offer from the above has been accepted (since multiple DHCP Servers can offer an IP address). And, the DHCP server within the home or enterprise modem may respond with a DHCP Acknowledgment message.

As part of the power on and/or initialization sequence, the HNB may attempt to discern information about its environment. There are many ways for the HNB to learn about its environment. For example, the HNB may listen for macro-cells and other HNBs in the area by enabling its cellular receiver (e.g., 2G, 3G, and/or 4G). The HNB may determine its location by enabling its GPS receiver. Or, the HNB may know its location based on the public IP address of the home or enterprise modem to which it is connected. Any of these may be sufficient for the HNB to identify its location.

The HNB may communicate with the Initial SeGW after the device has been energized. The HNB may attempt to resolve the FQDN of the Initial SeGW that was pre-burnt within the HNB. This resolution may be performed with a DNS Request/Response. The BWM server may act as a DNS server (or equivalent) to the HNB for this purpose. Additionally, the BWM server may resolve the Initial SeGW FQDN by sending a DNS Request to the "Outer" DNS server on the public Internet.

The Initial SeGW discovery may be accomplished by performing one or more of the following. The HNB may send a DNS Request to the DNS Server (BWM Server) to resolve the Initial SeGW FQDN that was pre-burnt within the HNB. The DNS Server within the BWM Server may look up the Initial SeGW FQDN in its database and retrieve its local IP address. The DNS Server within the BWM Server may send this information to the HNB. The BWM Server may send a DNS Request to the "Outer" DNS Server on the public Internet with the Initial SeGW FQDN that it received from the HNB. And the "Outer" DNS Server may respond to the BWM Server with the public IP address of the Initial SeGW.

In order to provide secure communications between the HNB and the Initial SeGW, an IPSec tunnel may be established between the two entities. The process may include a pre-shared key and agreement of security algorithms between the two entities. Since the BWM Server, for example, may be placed between the HNB and Initial SeGW, two IPSec tunnels may need to be established (BWM Server-to-Initial SeGW and HNB-to-BWM Server).

An exchange of messages may allow the formation of an IPSec tunnel For an IPSec tunnel establishment between the BWM Server and Initial SeGW, one or more of the following may be performed. The BWM Server may send an IKE_SA_INIT message to the Initial SeGW (e.g., request certain encryption algorithms, authentication algorithms and DH groups). The Initial SeGW may respond with an IKE_SA_INT response (e.g., respond with selected encryption algorithm, authentication algorithm and CH group). The BWM server may send an IKE_AUTH message to the Initial SeGW. The BWM server IKE_AUTH message may include a request for an MCN IP address. The Initial SeGW may respond with an IKE_AUTH response. The Initial SeGW IKE_AUTH may include an MCN IP address. The BWM Server may send a CREATE_CHILD_SA message to the Initial SeGW. The Initial SeGW may respond with a CREATE_CHILD_SA response.

For IPSec tunnel establishment between the HNB and BWM server, the same process may be followed. The BWM Server may need the MCN IP address prior to the HNB requesting it. The HNB may need the MCN IP address so that it can use the MCN IP address as the source address for IP packets that it sends to entities within the MCN.

The HNB may be required to communicate with the Initial HMS (e.g., after establishing an IPSec tunnel). To do this, the HNB may attempt to resolve the FQDN of the Initial HMS with the "Inner" DNS server located within the MCN network. In the absence of a BWM server, the HNB would make this request to the Initial SeGW via the IPSec tunnel established previously. The Initial SeGW would un-IPSec this request and would send the packet to the "Inner" DNS Server for resolution. In the presence of a BWM Server, the process may be the same from the point of view of the HNB and Initial SeGW. The BWM server may un-IPSec and then re-IPSec the signaling between the HNB and Initial SeGW. There may be no further processing required of the BWM Server. And, the HNB may know the MCN IP address of the Initial HMS.

Initial HMS discovery may be accomplished by performing one or more of the following. The HNB may send a DNS request to the "Inner" DNS Server located within the MCN to resolve the Initial HMS FQDN pre-burnt within the HNB. The request may be sent through the IPSec tunnel to the BWM Server. The BWM Server may unpack the DNS Request and then pack it to go into the IPSec tunnel between the BWM Server and the Initial SeGW. The Initial SeGW may unpack the DNS Request and push it into the local MCN IP network to the "Inner" DNS Server. The "Inner" DNS Server may resolve the FQDN of the Initial HMS to an MCN IP address. The "Inner" DNS Server may create the DNS Response with this information and push it to the Initial SeGW. The Initial SeGW may put this packet into the IPSec tunnel between it and the BWM Server. The BWM Server may unpack this DNS Response and then pack it to go into the IPSec tunnel between the BWM Server and the HNB. The HNB may unpack this DNS Response.

The HNB may establish a TR-069 CWMP session with the Initial HMS (e.g., once the IP address of the Initial HMS is known). The session may be established so the Initial HMS can provide the IP address or FQDN of some of the MCN entities to the HNB. In the presence of a BWM server, the signaling between the HNB and Initial HMS may pass through the BWM server which may un-IPSec and re-IPSec each packet. In addition, the BWM server may have to modify or decode the Set Parameter Value message from the Initial HMS. If the Initial HMS supplies the IP Address of the Serving SeGW, the BWM server may have to modify the value to be that of its local IP address. If the Initial HMS supplies the FQDN of the Serving SeGW, the BWM server may have to update its DHCP server table by adding the Serving SeGW FQDN and the BWM Server local IP address as follows in Table 2:

TABLE 2

| FQDN | IP Address |
| --- | --- |
| Initial SeGW | Local IP address assigned by DHCP Server in home or enterprise modem |
| Serving SeGW | Local IP address assigned by DHCP Server in home or enterprise modem |

MCN entities discovery may be accomplished by performing one or more of the following. The HNB may establish a TR-069 CWMP session with the Initial HMS. The HNB may send Inform Request with the location information determined above (macro-cell info, geo-location, and IP address). The Initial HMS may respond that it received the message. The Initial HMS may send a Set Parameter Value message with the following IP addresses or FQDN: 1) Serving SeGW (may be the same as Initial SeGW); 1a) If IP address, BWM Server may modify to be its own local IP address; 1b) If FQDN, BWM Server may add entry to its DHCP Server table for this FQDN and its local IP address; 2) Serving HMS; and 3) HNBGW. The HNB may send a Set Parameter Response message to indicate to Initial HMS that it received the message. And, The TR-069 session may be terminated. The IPSec tunnels may be destroyed (e.g., once the above steps have been concluded). There maybe a requirement that even if the Serving SeGW is the same as the Initial SeGW, the tunnels still may be destroyed.

The HNB may be registered with the HNB GW in the presence of BWM. The registration may achieve one or more of the following. The HNB may have an IPSec tunnel established with the BWM Server, the BWM Server may have an IPSec tunnel established with the Serving SeGW, the HNB may have an MCN provided IP address and the HNB may know the IP address of the MCN entities.

The HNB may be required to communicate with the Serving SeGW after the initialization and provisioning of the HNB. This may be skipped, for example, if the Initial HMS provided the IP address of the Serving SeGW; or, may be required if the Initial HMS provided the FQDN of the Serving SeGW. If resolution is required, it may be with a DNS Request/Response. The BWM server may act as a DNS server (or equivalent) to the HNB for such purposes. Additionally, the BWM server may resolve the Serving SeGW FQDN by sending a DNS Request to the "Outer" DNS Server on the public Internet.

Serving SeGW discovery may be accomplished by performing one or more of the following. The HNB may send a DNS Request to the DNS server (BWM server) to resolve the Serving SeGW FQDN that was provided as noted above. The DNS server within the BWM Server may look up the Serving SeGW FQDN in its database and retrieve its local IP address. The DNS Server within the BWM Server may send this information to the HNB. The BWM Server may send a DNS Request to the "Outer" DNS Server on the public Internet with the Serving SeGW FQDN that it received from the HNB. And, the "Outer" DNS Server may respond to the BWM Server with the public IP address of the Serving SeGW.

The following procedure is similar to that associated with the HNB Initialization/Provisioning. One exception may be that the Serving SeGW may replace the Initial SeGW. In order to provide secure communications between the HNB and the Serving SeGW, an IPSec tunnel may be established between the two entities. This process may include a pre-shared key and agreement of security algorithms between the two entities. Since the BWM Server is being placed between the HNB and Serving SeGW, two IPSec tunnels may need to be established (BWM Server-to-Serving SeGW and HNB-to-BWM Server).

An exchange of messages may allow the formation of an IPSec tunnel, which is described. For an IPSec tunnel establishment between the BWM Server and Serving SeGW, one or more of the following may be performed. The BWM Server may send an IKE_SA_INIT message to the Serving SeGW (e.g., request certain encryption algorithms, authentication algorithms and DH groups). The Serving SeGW may respond with an IKE_SA_INT response (e.g., respond with selected encryption algorithm, authentication algorithm and CH group). The BWM Server may send an IKE_AUTH message to the Serving SeGW. This may include a request for a MCN IP address. The Serving SeGW may respond with an IKE_AUTH response, which may include an MCN IP address. The BWM Server may send a CREATE_CHILD_SA message to the Serving SeGW. The Serving SeGW may respond with an CREATE_CHILD_SA response.

For IPSec tunnel establishment between the HNB and BWM server, the same process may be followed. The BWM Server may need the MCN IP address prior to the HNB requesting it. The HNB may need the MCN IP address so that it can use the MCN IP address as the source address for IP packets that it sends to entities within the MCN. Once these tunnels are established, they may be used going forward to provide secure communication between the HNB and BWM server and the BWM server and the Serving SeGW.

The HNB may be required to communicate with the Serving HMS (e.g., after the establishment on an IPSec tunnel). To do this, the HNB may attempt to resolve the FQDN of the Serving HMS with the "Inner" DNS Server located within the MCN network. In the absence of a BWM Server, the HNB would make this request to the Serving SeGW via the IPSec tunnel established previously. The Serving SeGW would un-IPSec this request and would send the packet to the "Inner" DNS Server for resolution. In the presence of a BWM Server, the process may be the same from the point of view of the HNB and Serving SeGW. The BWM Server may un-IPSec and then re-IPSec the signaling between the HNB and Serving SeGW. There may be no further processing required of the BWM Server. And, the HNB may know the MCN IP address of the Serving HMS.

Initial HMS discovery may be accomplished by performing one or more of the following. The HNB may send a DNS request to the "Inner" DNS Server located within the MCN to resolve the Serving HMS FQDN determined as described above. The request may be sent through the IPSec tunnel to the BWM Server. The BWM Server may unpack the DNS Request and then pack it to go into the IPSec tunnel between the BWM Server and the Serving SeGW. The Serving SeGW may unpack the DNS Request and push it into the local MCN IP network to the "Inner" DNS Server. The "Inner" DNS Server may resolve the FQDN of the Serving HMS to an IP address. The "Inner" DNS Server may create the DNS Response with this information and push it to the Serving SeGW. The Serving SeGW may put the response packet into the IPSec tunnel between it and the BWM server. The BWM server may unpack this DNS Response and then pack it to go into the IPSec tunnel between the BWM server and the HNB. The HNB may unpack the DNS Response.

The HNB may establish a TR-069 CWMP session with the Serving HMS (e.g., once the IP address of the Serving HMS is known). This session may be established so the Serving HMS can provide the operating configuration to the HNB and the HNB can transfer its location information to the Serving HMS. In the presence of a BWM Server, the signaling between the HNB and Serving HMS may pass through the BWM Server which may un-IPSec and re-IPSec each packet.

HNB Operating Configuration discovery may be accomplished by performing one or more of the following. The HNB may establish a TR-069 CWMP session with the Serving HMS. The HNB may send Inform Request with the location information determined above (macro-cell info, geolocation, and IP address). The Serving HMS may responds that it received this message. The Serving HMS may send a Set Parameter Value message with the operating configuration in the following areas: CN, RF and/or RAN. The HNB may send a Set Parameter Response message to indicate to the Serving HMS that it received the message. The TR-069 session may be terminated.

A similar procedure may be followed to resolve the FQDN of the HNB GW to an IP address, if necessary, as was done for the discovery of the Serving HMS IP address.

The HNB may register with the HNB GW by exchanging a series of messages (e.g., once the HNB knows the IP address of the HNB GW). The registration message and response may pass through the BWM Server. The BWM Server's role may be to un-IPSec and re-IPSec each message as it passes through the BWM Server. Once the HNB is registered with the HNB GW, it may begin radiating and is "open for business" of allowing WTRUs to access the operator provided network.

Registration may be accomplished by performing one or more of the following. The HNB may send to HNB GW the HNB Register Request message with location information, identity, and operating parameters. In the location information element (IE), the HNB may use the information determined during the HNB Initialization/Provisioning procedure. In the operating parameters, the HNB may use the information received from the Serving HMS above. The HNB GW may respond to the HNB with a HNB Register Accept message. In the location information IE, the HNB may use the information determined during the HNB Initialization/Provisioning procedure. In the operating parameters, the HNB may use the information received from the Serving HMS above. The HNB may begin radiating and may be available for use by a WTRU.

A GPRS Attach procedure may be used for a WTRU registering with the MCN in the presence of the BWM Server/Client. Although the following discussion is based on a PS Attach procedure, other standard procedures (such as CS attach or combined CS/PS attach) may be used. One role of a BWM server may be to un-IPSec packets and re-IPSec packets that comprise the signaling communication between the HNB and Serving SeGW during this procedure.

Synchronization between a WTRU and the HNB and the GPRS Attach procedure may be accomplished by performing one or more of the following. The WTRU may be powered on and go through the normal procedure of synchronizing to the synch channels. The WTRU may read and perform cell search and read broadcast channel (BCH) data. And then the WTRU may start the GPRS attach procedure. It may be assumed that powering on the WTRU also powers on the BWM Client. If the WTRU and BWM Client are different physical entities, they may need to both be powered up. It may be sufficient to power them on separately, without coordination of time or sequence, for example, if they are powered on "at about the same time."

The GPRS Attach procedure, may include one or more of the following. The WTRU may send an RRC Connection Request message to the HNB (e.g., cause set to Initial Registration). The HNB may send an RRC Connection Setup message to the WTRU. The WTRU may establish the DCH and send an RRC Connection Setup Complete message to the HNB. The WTRU may, over this DCH, send a GPRS Attach message to the HNB. This may cause the HNB to send the WTRU Registration message to HNBGW. The HNBGW may send a WTRU Registration Accept message to the HNB. The HNB may then send a Connect message to SGSN with Initial WTRU Message to establish the signaling connection through HNBGW. The HNBGW may forward this message to the SGSN. The SGSN may respond to the message sent to the HNBGW. At this point, there may be a signaling connection between the WTRU and SGSN. Authentication and other signaling may then occur between the SGSN and the WTRU. The SGSN may send the Attach Accept to the WTRU. The WTRU may respond with the Attach Complete to the SGSN. The HNB may send an RRC Connection Release to the WTRU. The WTRU may respond with an RRC Connection Release Complete to the HNB.

Data services may be established on BWM equipment. As part of the procedure, a WTRU may get three IP addresses: an MCN provided IP address (RIPA), a local IP address (LIPA), and a WiFi address.

For the WTRU to acquire these three IP addresses, the WTRU may be required to perform the following: establish a RIPA PDP Context, which as explained below shows the workings of the PDP context with the BWM Server/Client in place; establish a LIPA PDP Context; and establish an association with the WiFi access point located in the CGW.

Once the WTRU has the three IP addresses (RIPA, LIPA, and WiFi), the BWM Client may form an association with the BWM server. The BWM client may require the WiFi IP address and at least one of the two cellular IP addresses (multiple radio access technologies for bandwidth aggregation). The BWM Client may share this IP address information with the BWM server indicating that it wishes to form an association. In addition, the BWM client may also require the IP address of the BWM server to form the association. It may determine this by performing a DNS Request of the BWM server. The DNS Server within the DSL modem may respond with the local IP address of the BWM server. Alternatively, the BWM server may be placed at a static IP address within the enterprise or home and the BWM client may be pre-configured with this information. Regardless of the method used, the BWM client may form an association with the BWM server to perform BWM aggregation.

For both the RIPA and LIPA PDP context activations, the BWM server may un-IPSec and then re-IPSec the signaling that traverses between the HNB and the MCN. The WTRU may have a PDP context with the MCN for RIPA, a local IP address for LIPA and a WiFi address.

RIPA PDP Context activation may be accomplished by performing one or more of the following. The WTRU may send Activate PDP Context Request message. APN may be a GGSN located within the MCN. If the APN was a LGW, the same procedure would work as it is agnostic in regard to the location of the GGSN. The SGSN may derive GGSN from APN name. The SGSN may create TEID for requested PDP context. The SGSN may send Create PDP Context Request message to the GGSN. This may establish a GTP tunnel between the SGSN and GGSN. If the APN was local, the GTP tunnel may be between the SGSN and LGW within the home. If the WTRU has requested a dynamic address, the GGSN may create an entry in the PDP context table and establish a charging ID. Entry allows GGSN to route data between the SGSN and PDN and allows the NW to charge the user. The GGSN may select the IP address. The GGSN may send the Create PDP Response to the SGSN. The RAB Assignment may be performed between the SGSN and WTRU. The SGSN may send Activate PDP Context Accept to WTRU. WTRU may now have a PDP context through the mobile core network and an IP address assigned by the GGSN.

The RAB Assignment performed between the SGSN and WTRU for the above RIPA PDP Context activation may be performed by using one or more of the following. The purpose of these steps, normally, is to establish a GTP tunnel between the SGSN and HNB and a radio bearer between HNB and UE. In this case it may be modified to establish two GTP tunnels, between the SGSN and BWM Server and between the BWM Server and HNB and the establishment of a radio bearer between the HNB and WTRU. The RAB Assignment Request/Response message pair may set up a GTP tunnel between the two entities that are exchanging this request/response pair. The SGSN may send an RAB Assignment Request to the BWM Server. The BWM Server may un-IP Sec this message and may replace the following fields with its own addresses: New SGSN Address and TEID. The BWM Server may re-IPSec this modified message to send it to the HNB. The HNB may sends a Radio Bearer Setup message to the WTRU. The WTRU may respond with Radio Bearer Setup Complete message to the HNB after it sets up the radio bearers. The HNB may send an RAB Assignment Response to the BWM Server. The BWM Server may un-IPSec this message and may replace the following fields with its own information: RNC IP Address and TEID. The BWM Server may re-IPSec this modified message to send it to the SGSN. At the end of the RAB assignment request/response signaling that passed through the BWM Server, there may be two GTP tunnels, between the BWM Server and SGSN and between the BWM Server and HNB and one radio bearer between the WTRU and the HNB. The SGSN may send Update PDP Context Request to GGSN. The GGSN may respond with Update PDP Context Response to SGSN. The Update PDP context request/response pair of messages may allow the SGSN to inform the GGSN if the QoS was modified during the radio bearer setup process between the HNB and WTRU. If the original QoS was maintained, these two messages may not be exchanged.

There may be data transfer across BWM aggregation. After the PDP context is established, where the MCN and the BWM server and client may have associated, a WTRU may want to send and receive data from sources on the network. The following describes the flow of downlink data from the SGSN to the WTRU and the flow of uplink data from the WTRU to the SGSN. For each direction an example is provided where a fixed number of packets are passed and the BWM server or BWM client decides on which RAT to transmit each packet. This discussion also assumes that in-sequence delivery may be required.

Figure 56:
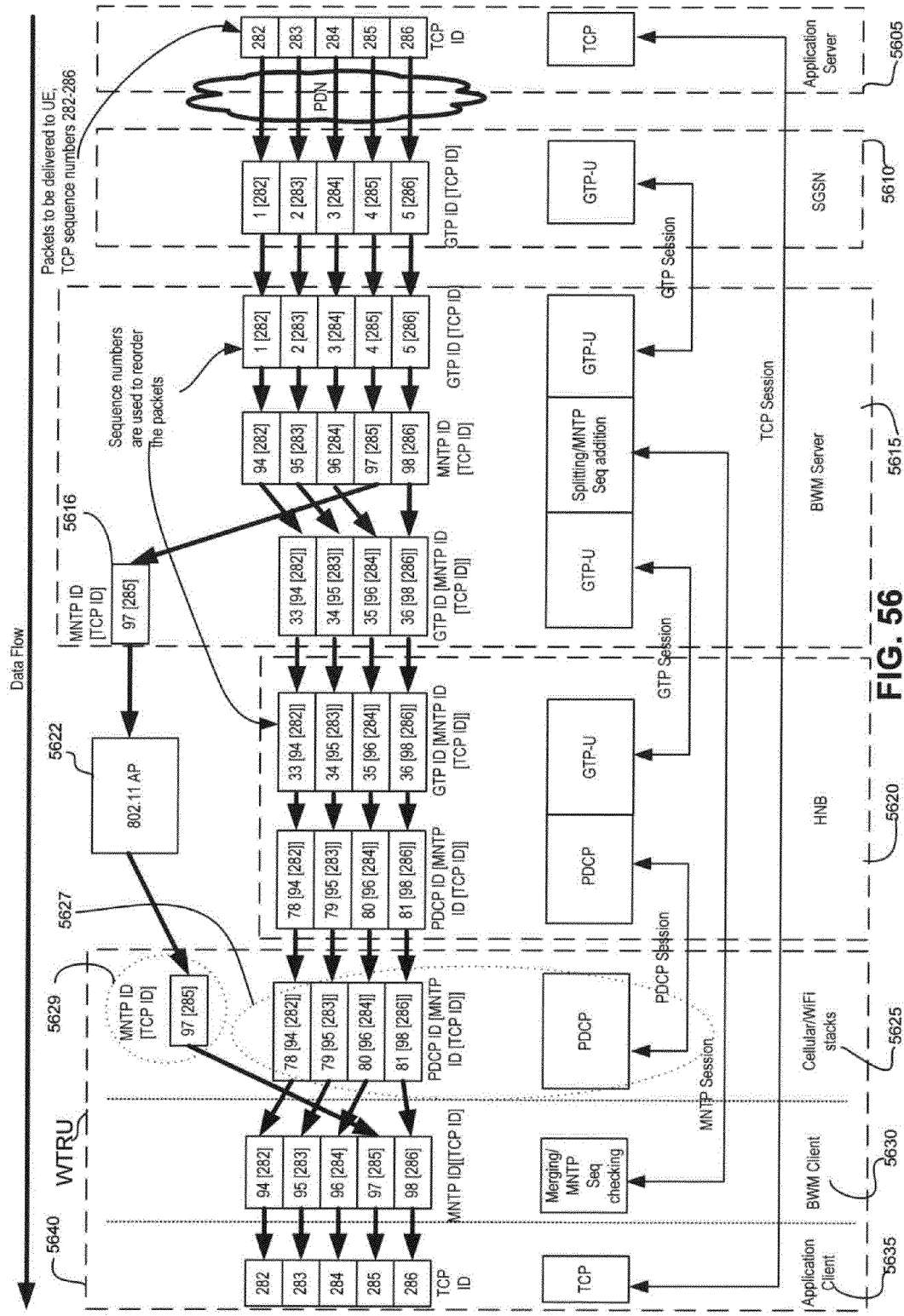
FIG. 56 is an exemplary illustration of a downlink data flow in an implementation of BWM.

FIG. 56 illustrates a data transfer example. The example assumes that there are five downlink packets to be sent to the WTRU from the SGSN. The example also assumes that four of the five packets are delivered to the WTRU by the cellular RAT and one packet is delivered to the WTRU by WiFi. In the absence of BWM, the GTP entities in the HNB and SGSN must be in-synch with regard to GTP sequence numbers. Additionally, in the absence of BWM, the PDCP entities within HNB and WTRU must be in-synch with regard to PDCP sequence number. In the presence of a BWM server placed between the HNB and the MCN, the sequence number consistency is no longer maintained. For the non-mobility case, this may not present a problem. However, this may introduce an issue should mobility occur in the presence of an in-sequence PDP context as discussed herein.

Figure 57:
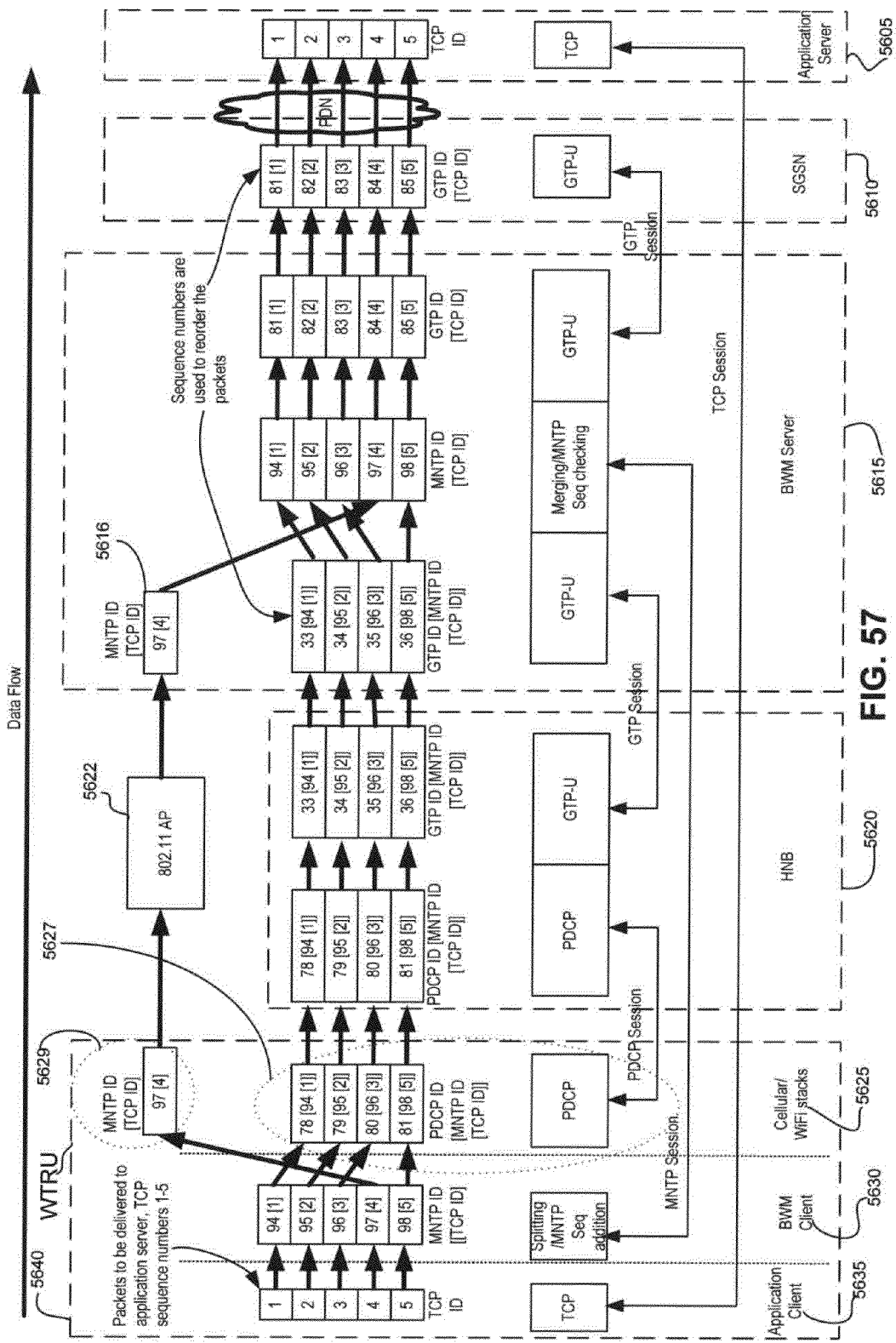
FIG. 57 is an exemplary illustration of a uplink data flow in an implementation of BWM.

As shown in FIGS. 56 and 57, the ID's for each session is listed in order as depicted in the figure (e.g., MNTP[TCP ID]). For example, packet 5616 is numbered 97[285], wherein the MNTP ID is 97 and the TCP ID is 285 in this example. Also note that different sequence numbers are used for each GTP tunnel. FIG. 56 details a flow. The application server 5605, which may be running TCP, may send five TCP packets into the MCN. Eventually, these packets may be received by the SGSN 5610. The five packets may be passed over a GTP-U tunnel between the BWM Server 5615 and SGSN 5610. As shown in FIG. 56, the sequence number of these five packets is 1-5. When the packets are received by the BWM server 5615, the GTP entity within the BWM server 5615 may reorder the packets based on their sequence numbers as per a standard. The BWM server 5615 processing may then decide to vector one packet (here, packet 5616) to the 802.11 link and the rest through the HNB 5620. For illustrative purposes, the fourth packet was selected to be routed to the 802.11 AP 5622. The BWM server 5615 may then send the remaining four packets to be delivered over cellular to the HNB 5620 (packets 1, 2, 3, and 5). The GTP entity within the BWM Server may issue these packets consecutive sequence numbers. These packets may be delivered to the GTP entity within the HNB 5620 which may reorder the packets based on the GTP sequence numbers. As the packets are reordered, they may be delivered, in order, to the PDCP entity within the HNB 5620. They may be assigned a PDCP sequence number which may be used to synchronize the communication between the PDCP entities within the HNB 5620 and WTRU 5640. The BWM client 5630 may then place packets received from the WIFI and cellular network as being recombined into their original order (1, 2, 3, 4, 5) and forward this to the Application client 5635 that is within the WTRU 5640.

FIG. 57 illustrates another data transfer example. This example assumes that there are five uplink packets to be sent from the WTRU to the SGSN. Also, assume that four of the five packets are delivered to the BWM server 315 by the cellular RAT (HNB 5620 receives four packets) and one packet is delivered to the BWM server 5615 by WiFi (802.11 AP 5622 receives one packet). In the absence of BWM, the GTP entities in the HNB and SGSN must be in-synch with regard to GTP sequence numbers. Additionally, in the absence of BWM, the PDCP entities within HNB and WTRU must be in-synch with regard to PDCP sequence number. In the presence of a BWM Server placed between the HNB and the MCN, the sequence number for the GTP packets, for example, may be changed. For the non-mobility case, this is not a problem. However, this may introduce an issue should mobility occur in the presence of an in-sequence PDP context as discussed herein.

FIG. 57 illustrates an exemplary uplink flow. Here, the application client 5635 may be using TCP and may wish to send five packets to the application server 5605 on the public internet. The BWM client 5630 may decide to pass one packet to the 802.11 interface 5629 and four packets to the cellular stack 5627. The packet that is delivered to the 802.11 AP 5622 may then be passed to the BWM server 5612. The four packets that are passed to the cellular stack 5627 may enter the PDCP entity within the WTRU 5640. The PDCP may assign them a PDCP sequence number and the packets may be sent to the PDCP entity within the HNB 5620. When the PDCP entity in the HNB 5620 receives these packets, it may reorder the packets based on the PDCP sequence number as per the relevant standards. The PDCP entity within the HNB 5620 may pass these packets to the GTP entity within the HNB 5620. It may assign GTP sequence numbers and pass them to the GTP entity within the BWM server 5615. When these packets are received by the GTP entity within the BWM server 5615, they may be reordered based on the GTP sequence numbers assigned by the HNB 5620. The BWM server aggregation "functionality" may merge these four packets with the one packet received over the 802.11 connection, being recombined into their original order (1, 2, 3, 4, and 5). These packets may then be passed to the GTP entity within the BWM server 5615 that is connected to the SGSN 5610. This process may assign GTP sequence numbers to these packets and send them to the SGSN 5610. The GTP entity within the SGSN 5610 may accept the five packets and may reorder them based on the GTP sequence numbers assigned by the GTP entity within the BWM server 5615. The SGSN 5610 may then forward these packets to the GGSN (not shown) in accordance with standard procedures.

There may be DSM interaction with the BWM server. The DSM component of the CGW may perform an analysis of the spectrum within the home or enterprise. Based on this analysis it may decide which portions of the spectrum are occupied and which are not currently in use. Given that the BWM entities may be required to make decisions on how to segregate the data between the cellular and WiFi RATs for example, the DSM may be required to communicate this information to the BWM server.

When the BWM server possesses this information it may share it with the BWM client. When the BWM client possesses this information, it may decide the segregation of the uplink data between the cellular and WiFi RATs for example.

DSM information dissemination from the DSM to the BWM server and BWM client may be accomplished by performing one or more of the following. If the DSM module is a standalone, IP addressable device, the BWM server may perform a DNS Request to learn the IP address of the DSM module. If it is a module within the CGW, the BWM server may take appropriate means to learn the "address" of the DSM device. The BWM server may send a request to the DSM module requesting it to subscribe to the frequency use information within the DSM module. The DSM module may respond to the BWM server by accepting this request. The DSM module may send its learned spectrum usage information to the BWM server. This may be done periodically, or may be done once. The BWM server may share this information with the BWM client. And, the BWM entities may use this information as needed to help determine the segregation of the uplink data between the Cellular and WiFi RATs.

There are several types of mobility that are possible, including the following examples: a Macrocell or HNB without BWM Server to HNB with or without BWM server (Inbound) and HNB with BWM Server to macrocell or HNB with or without BWM server (Outbound).

For inbound mobility, from a macrocell or HNB without a BWM server, if the target CGW does not have a BWM server, the standard mobility procedures may be used to complete the handover. Once the handover is complete, if the new HNB has a BWM server, the BWM server in the new HNB and the BWM client in the WTRU may attempt to perform an association. If the target CGW does have a BWM server, the standard mobility procedures may be used to complete the handover as well. However, the BWM server in the target CGW may need to be aware of this handover and may need to establish a GTP tunnel between itself and the target HNB. This may be accomplished by performing deep packet inspection of the RANAP signaling from the SGSN to the target HNB which performs the handover. When the handover is complete, if the new HNB has a BWM server, the BWM server in the new HNB and the BWM client in the WTRU may attempt to perform an association.

For outbound mobility, the standard mobility procedures may be used, but may be augmented with several possible alternatives to allow for a (near seamless) transition from the source HNB to a macrocell or other HNB. Prior to exploring possible outbound solutions to perform a near seamless handover, a discussion is presented to illustrate possible challenges of performing a handover in the presence of a BWM server. One area that the BWM server may need to be involved with is the handling of GTP sequence numbers during mobility. There may be a requirement that the GTP sequence number be maintained between the HNB and SGSN to allow for an in-sequence, lossless link. However, the introduction of the BWM server may introduce factors that make this maintenance a challenge. First, the introduction of the BWM server may cause two GTP tunnels to be in place, each with their own GTP sequence number. Were it not for the addition of an 802.11 RAT to either remove (for DL) or add (for UL) packets, there would be a 1-to-1 correspondence between the GTP tunnels. Software could be used to maintain this 1-to-1 mapping or the sequence numbers of a specific packet in either GTP tunnel may be the same. As such, there may be no issue. However, with the addition of the 802.11 RAT, there may no longer be a 1-to-1 relationship between the packets in the two GTP tunnels. The GTP tunnel between the HNB and BWM Server may have fewer packets than the GTP tunnel between the BWM Server and the SGSN, as was shown in FIG. 3C and FIG. 4C.

Figure 58:
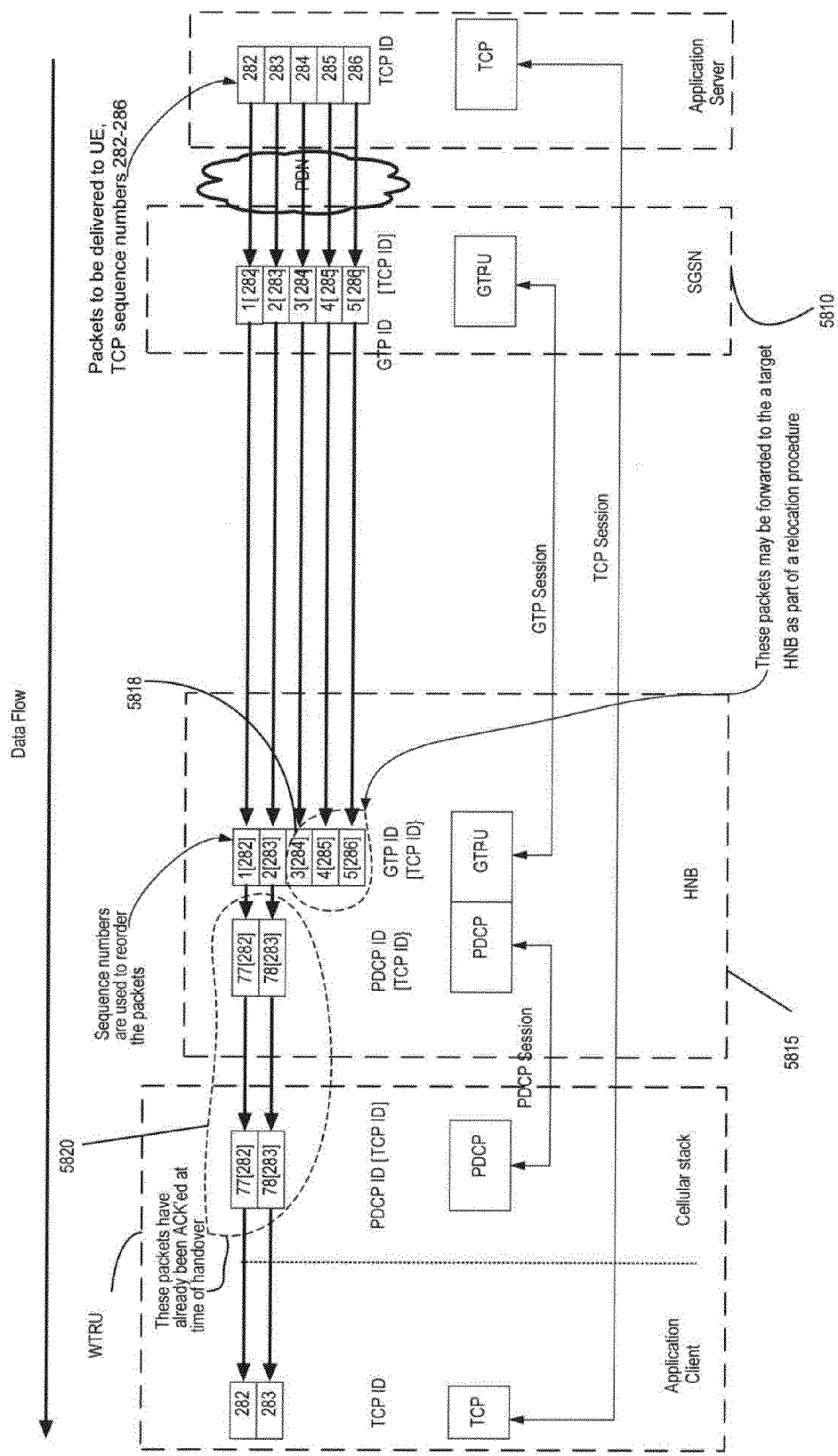
FIG. 58 is an exemplary illustration of a downlink cellular data flow that does not use BWM.

In the absence of a BWM server, for downlink data, the sequence numbers are shown in FIG. 58. The maintenance of the sequence numbers between the source HNB 5815, target HNB (not shown), and SGSN 5810 may be important to allow for the target HNB to "pick-up" the data connection where the source HNB 5815 "left off" In FIG. 58, for example, two packets 5820 have already been Ack'd at time of handover. Three packets 5818 will be forwarded to the target HNB as part of the relocation procedure. The GTP sequences in the three packets 5818 are critical since both the target HNB and source HNB 5815 and SGSN 5810 must all have a common sequence number basis. Additionally, the source HNB 5815 will send the target HNB the Forward SRNS Context which will contain the following: 1) next DL PDCP sequence number equals 79; and 2) next GTP sequence number equals 6. However, the introduction of the BWM server with multiple RATs may violate this tenant unless the BWM server acts to correct the GTP sequence numbers to a common basis with the SGSN and target HNB.

Figure 59:
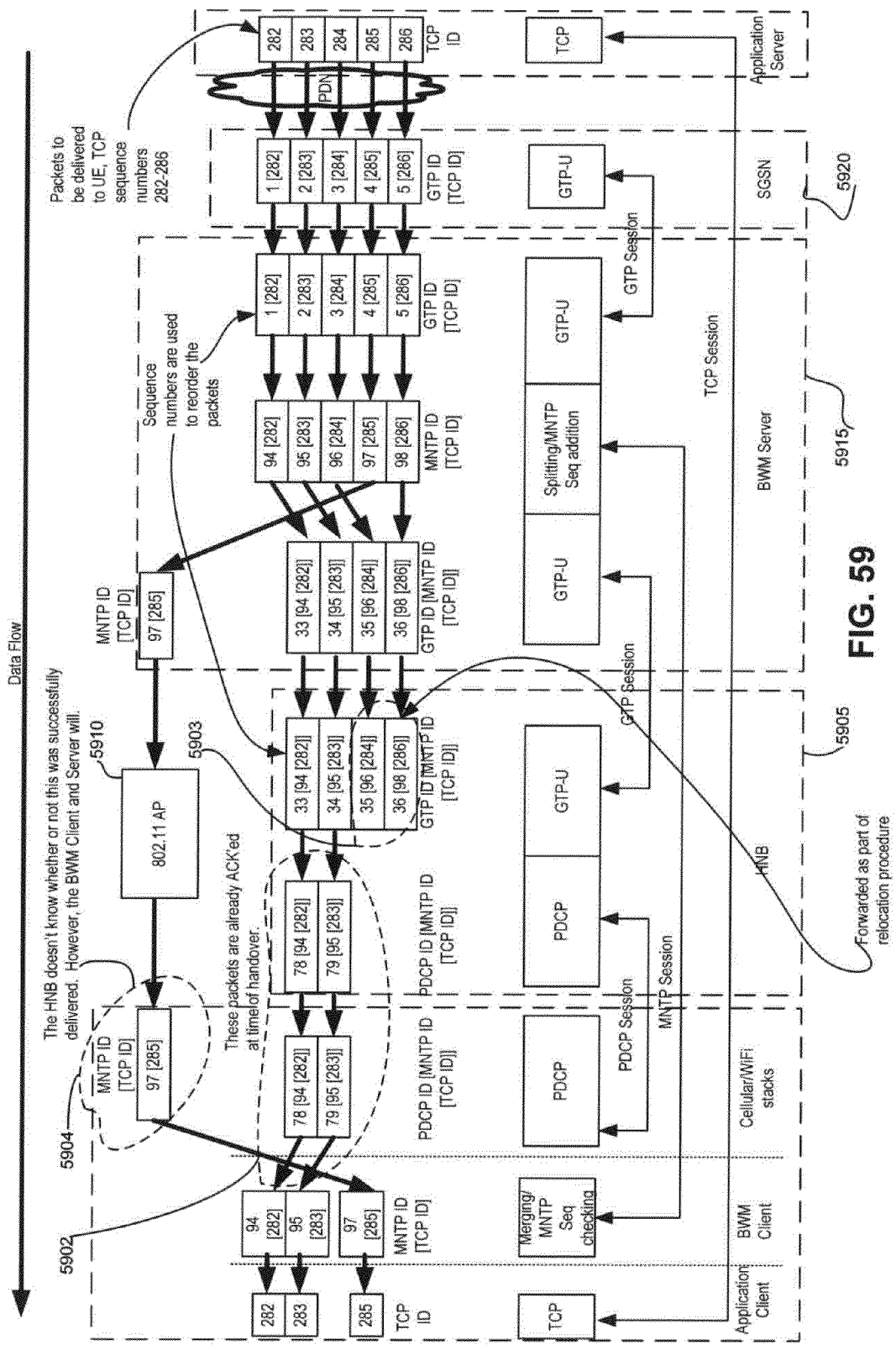
FIG. 59 is an exemplary illustration of a downlink data flow across BWM entities with mobility.

FIG. 59 is an exemplary illustration of BWM with mobility for downlink data. In the presence of a BWM server, for downlink data, possible sequence numbers are illustrated in FIG. 59. As shown in FIG. 59, one packet may be vectored to the 802.11 AP 5910 for delivery while the other four packets may be sent to the HNB 5905 over the BWM server 5915 to HNB 5905 GTP tunnel The GTP sequence numbers may not map 1-to-1 since one packet in the middle of the GTP stream received from the SGSN 5920 was split off to the 802.11 AP 5910. When relocation occurs, the HNB 5905 may forward packet 35 and 36 5903 to the BWM server 5915 since those are the packets that were not delivered. However, the BWM server 5915 should not just forward these packets. If the BWM server 5915 just forwarded the packets, the SGSN 5920 and target HNB (not shown) would think the data session should resume at the wrong place in its GTP sequence. If the BWM server 5915 just modified the GTP sequence number as the packets pass through it, then the GTP sequence numbers may not be consecutive (in-sequence lossless data may require consecutive).

The BWM server 5915, as shown in FIG. 59, may need to detect the first forwarded data message (e.g., by performing deep packet inspection), extract the GTP sequence number, look the sequence number up in its list of sequence number mapping between the two GTP tunnels and forward all of the packets to the SGSN 5920 from this sequence number to the end of what it currently has received from the GTP tunnel with the SGSN 5920. The 802.11 routed packet 5904 must be dealt with as the HNB 5905 will not know whether or not the 802.11 5904 packet was successfully delivered, however the BWM client and server will. In addition, the 802.11 packet 5904 may be part of the group of forwarded packets during relocation. In this case, the packet may get forwarded to the target HNB and be delivered via cellular. If the 802.11 packet 5902 is not in the group of forwarded packets, the packet may be lost and a higher layer retransmission scheme (TCP, for example) may correct the problem. If so, the BWM Server may not need to forward the other forwarded data messages received from the HNB 5905. These HNB 5905 data messages may be discarded. Additionally, the Forward SRNS Context message may pass through the BWM server 5915 and may require a modification. The next expected GTP DL sequence number may have to be changed to the GTP sequence number used in the first forwarded data message by the BWM server 5915 similar to what is described above.

The forwarding procedure as just illustrated may require the maintenance of a buffer of packets received on the GTP tunnel between the BWM server 5915 and SGSN 5920. Since there may be no feedback from the HNB 5905 as to the delivery of packets, a large buffer may be used and may be configured to wrap-around to save a certain number of the latest packets. Alternatively, the BWM server 5915 may use the acknowledged information from the BWM server/client to know which MNTP packets were received by the BWM client and which may be left unacknowledged at the time of relocation. The BWM server 5915 may create the messages with the packets which have not yet been acknowledged by the BWM server 5915 and forward these to the target HNB (not shown).

Figure 60:
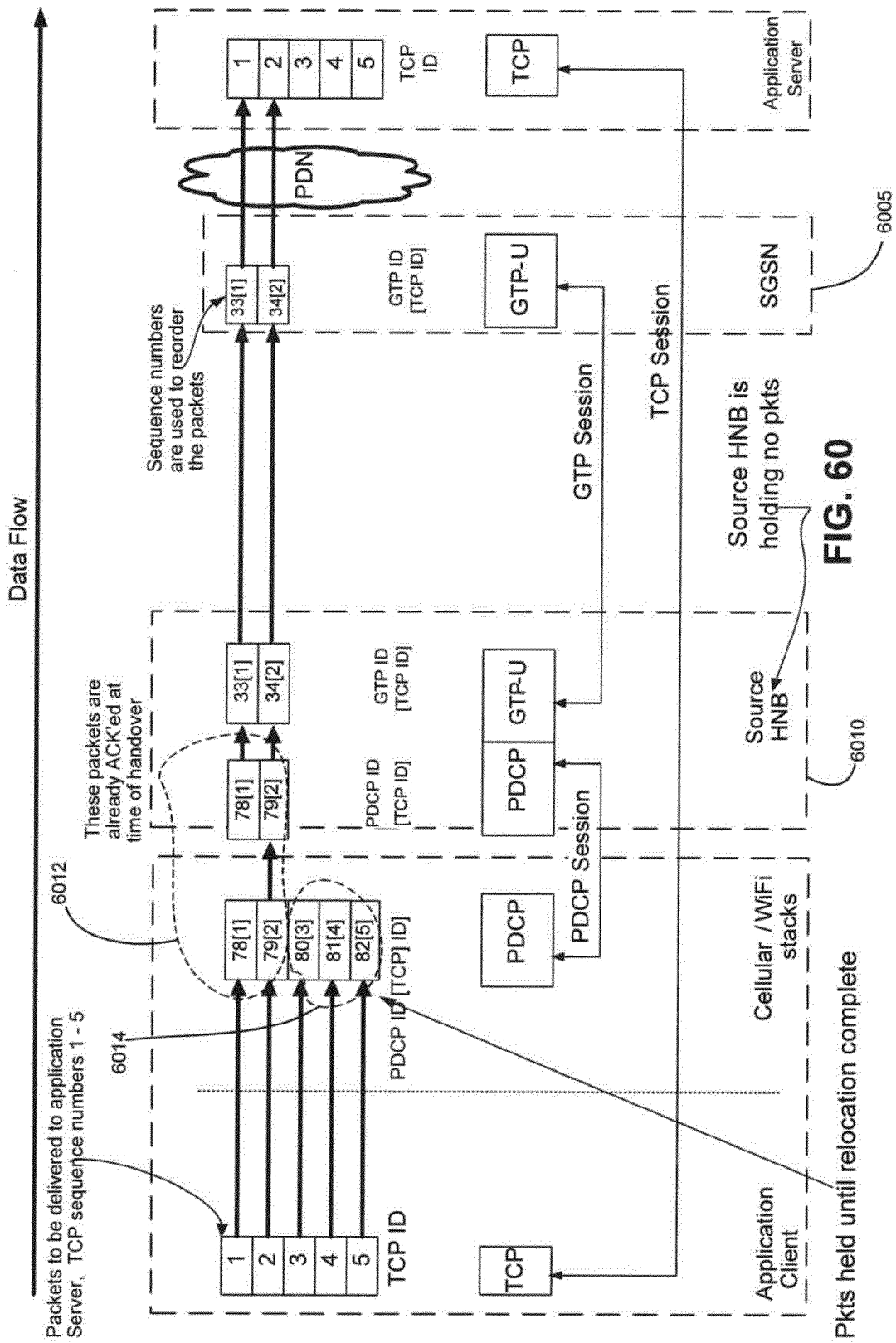
FIG. 60 is an exemplary illustration of an uplink cellular data flow that does not use BWM.

In the absence of a BWM server, for uplink data, a sequence numbering example is illustrated in FIG. 60. Given that there may be no uplink packets held within the source HNB 6010 at relocation, the process may be simpler for uplink data. Packets 6012 may already be ACK'ed at time of handover, while packets 6014 which include PDCP sequence number packets 80, 81, and 82 may be held in the WTRU until relocation has been completed. For UL, the source HNB 6010 may be holding no packets that need to be forwarded as part of the relocation process. At the time of relocation, the source HNB 6010 may create and send the Forward SRNS Context message, which may comprise the next PDCP UL sequence number and next GTP UL sequence number. For example, in FIG. 60, the next PDCP UL sequence number may be 80 and the next GTP UL sequence number may be 35. As is the case for downlink, the maintenance of the same GTP sequence number basis may be important so that the source HNB 6010, target HNB (not shown), and SGSN 6005 may be synchronized to provide in-sequence, lossless delivery of the uplink data. However, the introduction of a BWM Server with multiple RATs may violate this requirement unless the BWM Server acts to fix the GTP sequence numbers to a common basis with the SGSN 6005 and target HNB.

Figure 61:
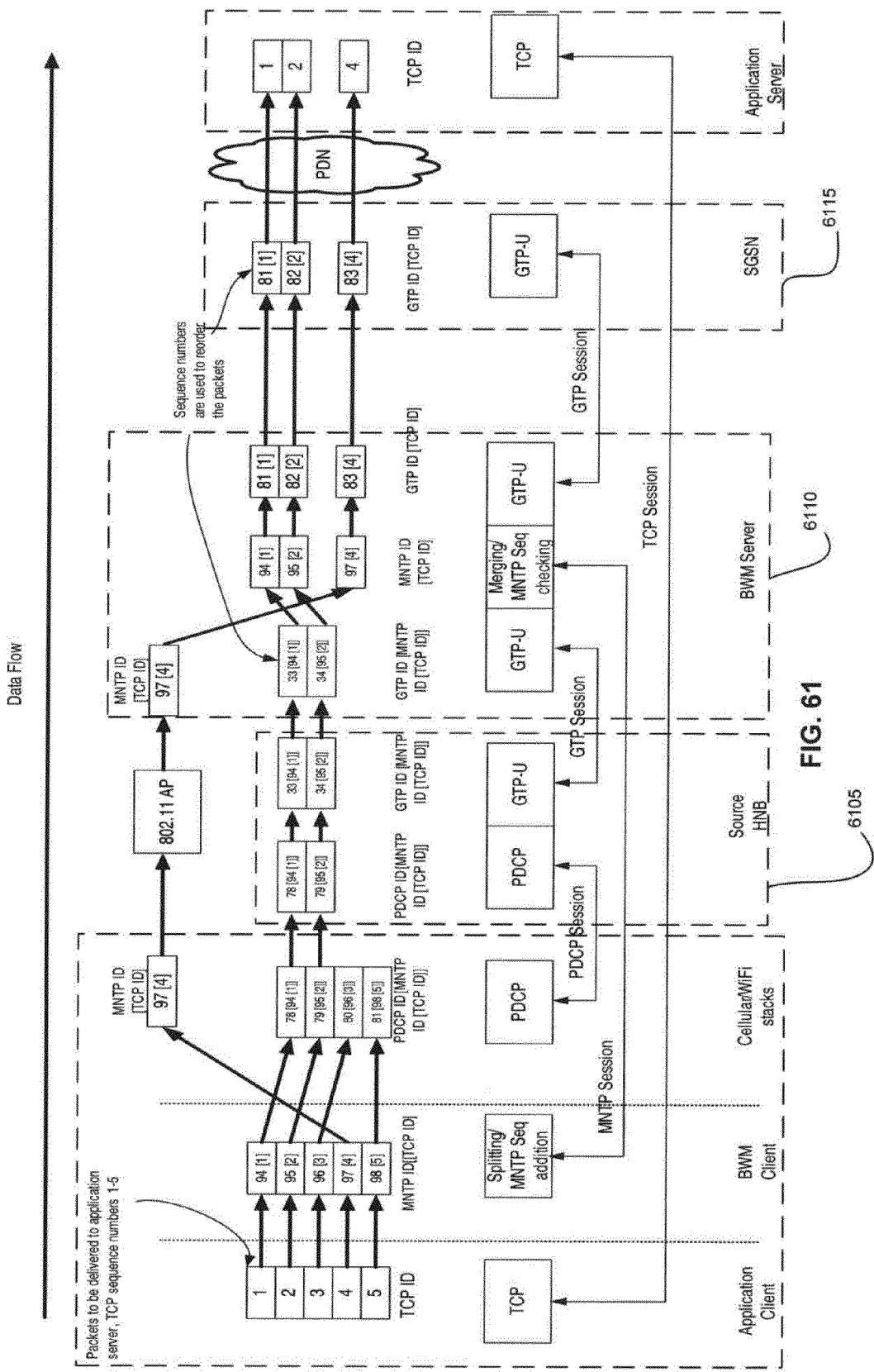
FIG. 61 is an exemplary illustration of an uplink data flow across BWM entities with mobility.

FIG. 61 is an exemplary illustration of BWM with mobility for downlink data. In the presence of a BWM Server, for uplink data, possible sequence numbers are illustrated in FIG. 61. As shown in FIG. 61, when relocation occurs, the source HNB 6105 may create the Forward SRNS Context message with the next expected PDCP UL sequence number and next expected GTP UL sequence number based on its GTP tunnel with the BWM server 6110. If the BWM server 6110 were to forward this message to the SGSN 6115 and target HNB (not shown) unaltered, the target HNB may think the next UL packet it needed to acquire would be incorrect. Therefore, the BWM server 6110 may need to capture this message and modify it such that the next expected GTP UL sequence number field was set based on the BWM server 6110 to SGSN 6115 GTP tunnel sequence numbers.

Possible alternatives on how to solve the problem of maintaining GTP sequence numbers are found herein. If a PDP Context is established as in-sequence lossless delivery required, an alternative is that the BWM server becomes a pass through and all packets to and from the WTRU are delivered via the cellular link. In this way, there is a 1-to-1 mapping between the GTP tunnels between the HNB and BWM server and the BWM server and SGSN. This alternative may be simpler and more limiting as it excludes certain traffic from benefiting from BWM. The changes to the described procedures may be that the BWM server may need to recognize the PDP Context and then not perform BWM, if in-sequence lossless delivery is required. The mobility procedure used for this alternative would be standard.

If a PDP Context is established as in-sequence lossless delivery required, an alternative is that the BWM server/client may perform their normal function of steering packets between the 802.11 AP and the cellular link and the BWM server may have to perform the corrections to the GTP sequence numbers as described above. This alternative may be more complex but more encompassing as traffic can benefit from BWM. The changes to the standard procedure may include processes drawn from the above discussion relating to sequence numbers. The promulgated procedure may delineate processes to perform mobility in the presence of a BWM server from one HNB (with a BWM Server) to another HNB (without a BWM Server) or to a macrocell (without a BWM Server). The procedure may be based on internal LIPA call flow message sequence charts.

When a WTRU begins to move away from a HNB (source HNB) to which it is connected, the WTRU may be configured to perform measurements. Once the measurements are taken by the WTRU, the measurements may be sent to the source HNB. The source HNB may decide that a handover is required and may begin the handover process.

Once the source HNB decides that a handover is required, it may originate the signaling needed to effectuate the handover. These steps are as per the defined standards. However, the BWM Server may need to be cognizant of the relocation to prepare for the extinguishment of the BWM session. In addition, the BWM server may be required to un-IPSec and re-IPSec each signal that passes through the BWM server.

This relocation preparation may be accomplished by performing one or more of the following. The source HNB may decide that relocation is required to target HNB. The HNB may send a RANAP Relocation Required message to the HNBGW. The BWM Server may recognize this message and inform the BWM Client to begin shutting down the session, which may comprise the following. The BWM Server may not accept anymore DL packets to send to the BWM Client. It may, however, continue to send whatever packets it currently possesses to the BWM Client and may continue to accept whatever UL packets are received from the BWM Client. The BWM Client may not accept anymore UL packets to send to the BWM Server. It may, however, continue to send whatever packets it currently possesses to the BWM Server and may continue to accept whatever DL packets are received from the BWM Server. The BWM session may end. If there is a large amount of data, it may take some time to clear out what is left. The BWM Server/Client may need to possess the ability to set a maximum time that BWM session has to end and whatever is not cleaned up in that time may be dropped.

Further, regarding the relocation preparation, the HNBGW may send an HNB application part (HNBAP) WTRU Registration Request message to the target HNB. The Target HNB may respond with an HNBAP WTRU Register Accept message. The HNBGW may send an RANAP Relocation Request to the target HNB. The Target HNB may send an RANAP Relocation Request Ack to the HNBGW. The HNBGW may send an RANAP Relocation Command to the source HNB. The HNB may stop data transfer with the WTRU. The source HNB may begin replicating and sending the unacknowledged downlink packets it possesses to the target HNB (as per the standards). This may be done at the IP layer. Since both the source and target HNB have IP addresses on the MCN, these packets may be routed. Packets received by the source HNB from this point until the WTRU has been de-registered may be forwarded to the target HNB. The BWM server may need to act at this point to "fix" the sequence numbers as described above, such as when the BWM server/client performs its normal function of actively organizing and steering packets to/from the 802.11 AP and the cellular link.

When the MCN components have been configured for handover, a source HNB may command a WTRU to relocate to the target HNB. The WTRU may reconfigure to the target HNB parameters and synchronize to it. Once synchronized at the physical layers, the WTRU and target HNB may exchange the last received PDCP sequence information to synchronize the PDCP entities in the HNB and WTRU. These processes, with perhaps the exception of the addition of the BWM server and client actions, may be accomplished per the standards. In addition, the BWM server may be required to un-IPSec and re-IPSec each signal that passes through the BWM server.

WTRU relocation may be accomplished by performing one or more of the following. The source HNB may send a Physical Channel Reconfiguration to the WTRU. The source HNB may send the Forward SRNS Context message to the target HNB. The BWM server may need to "fix" the GTP sequence numbers as described above. The WTRU may perform synchronization to the target HNB. The PDCP in the WTRU may send the PDCP in the target HNB the PDCP sequence number of the last received DL packet. This may allow the target HNB to know the last DL packet actually received by the WTRU. The PDCP in the target HNB may send the PDCP in the WTRU the PDCP sequence number of the last received UL packet. This may allow the WTRU to know the last UL packet actually received by the UTRAN. The target HNB may send an RANAP Relocation Detect to the HNBGW. The WTRU may complete the synchronization to the target HNB.

When a WTRU has synchronized to the target HNB, the relocation process may be complete. The resources on the source HNB may be released and the WTRU may be deregistered from the source HNB. The PDP context may be updated in the SGSN so that the GTP tunnel has been moved to the target HNB. These processes may be accomplished via the standards. In addition, the BWM server may be required to un-IPSec and re-IPSec each signal that passes through the BWM server.

Relocation completion may be accomplished by performing one or more of the following. The target HNB may send an RANAP Relocation Complete message to the HNBGW. The HNBGW may send an Update PDP Context Request to the SGSN. This may indicate the GTP endpoint has changed from the source HNB (the BWM Server) to the target HNB. The SGSN may update the PDP context. The SGSN may send a PDP Context Response to the HNBGW. The SGSN may no longer send downlink packets to the source HNB (BWM server). The HNBGW may send an RANAP Iu Release Command to the source HNB. The source HNB may send an RANAP Release Complete message to the HNBGW. And, the HNBGW may send an HNBAP WTRU De-Register message to the source HNB.

The BWM server may support CS voice. In this mode, the function of the BWM server may be to act as a pass-through between the HNB and Serving SeGW. For packets flowing in either direction, the BWM server may un-IPSec the packets that are received from either the HNB or the Serving SeGW, or, re-IPSec these packets and send them to their destination (either the HNB or the Serving SeGW).

Establishing a Mobile Originated (MO) CS voice call may comprise one or more of the following actions. The WTRU may send an RRC Connection Request message to the HNB. The Cause may be set to mobile originated (MO) voice call. The HNB may send an RRC Connection Setup message to the WTRU. The WTRU may establish the DCH and send an RRC Connection Setup Complete message to the HNB. The WTRU may send a connection management (CM) Service Request to the HNB. The HNB may send a RANAP Initial WTRU message, encapsulating the CM Service Request, to the BWM server. The BWM server may un-IPSec and re-IPSec this message as it is sent to the Serving SeGW. The Serving SeGW may un-IPSec this message and send it to the MSC/VLR/HLR within the MCN. The MSC/VLR/HLR within the MCN may send a RANAP Direct Transfer message, encapsulating an Authentication Request, to the Serving SeGW. The Serving SeGW may IPSec this message and send it to the BWM Server. The BWM server may un-IPSec and re-IPSec this message as it is sent to the HNB. The HNB may un-IPSec this message and send it over the air to the WTRU. The WTRU may perform the needed authentication and send an Authentication Response to the HNB. The HNB may encapsulate this response in a RANAP Direct Transfer message and send it to the BWM Server. The BWM server may un-IPSec and re-IPSec this message as it is sent to the Serving SeGW. The Serving SeGW may un-IPSec this message and send it to the MSC/VLR/HLR within the MCN.

Continuing the above regarding the establishment of a MO CS voice call, the MSC/VLR/HLR within the MCN may send a RANAP Security Mode Command to the Serving SeGW. The Serving SeGW may IPSec this message and send it to the BWM server. The BWM server may un-IPSec and re-IPSec this message as it is sent to the HNB. The HNB may un-IPSec this message and send it over the air to the WTRU. The WTRU may perform the needed security functions and send a Security Mode Complete message to the HNB. The HNB may IPSec this message and send it to the BWM server. The BWM Server may un-IPSec and re-IPSec this message as it is sent to the Serving SeGW. The Serving SeGW may un-IPSec this message and send it to the MSC/VLR/HLR within the MCN. The MSC/VLR/HLR within the MCN may send a RANAP Direct Transfer message, encapsulating the TIMSI Reallocation Command message, to the Serving SeGW. The Serving SeGW may IPSec this message and send it to the BWM Server. The BWM Server may un-IPSec and re-IPSec this message as it is sent to the HNB. The HNB may un-IPSec this message and send the TMSI Reallocation Command to the WTRU. The WTRU may respond with the TMSI Reallocation Complete message to the HNB. The HNB may IPSec this message and send it to the BWM server. The BWM Server may un-IPSec and re-IPSec this message as it is sent to the Serving SeGW. The Serving SeGW may un-IPSec this message and send it to the MSC/VLR/HLR.

Continuing the above regarding the establishment of a MO CS voice call, the WTRU may send a Setup message to the HNB. The HNB may send a RANAP Direct Transfer message, which encapsulates the Setup message, to the BWM Server. The BWM Server may un-IPSec and re-IPSec Direct Transfer message, which may encapsulate the Setup message as it is sent to the Serving SeGW. The Serving SeGW may un-IPSec Direct Transfer message, which may encapsulate the Setup message and may send it to the MSC/VLR/HLR. The MSC/VLR/HLR may respond with a RANAP Direct Transfer message, encapsulating the Call Proceeding message, to the Serving SeGW. The Serving SeGW may IPSec RANAP Direct Transfer message which may encapsulate the Call Proceeding message and send it to the BWM Server. The BWM server may un-IPSec and re-IPSec this message as it is sent to the HNB. The HNB may un-IPSec this message and send the Call Proceeding message to the WTRU. The MSC/VLR/HLR may send a RANAP RAB Assignment Request message to the Serving SeGW. The Serving SeGW may IPSec this message and send it to the BWM server. The BWM server may un-IPSec and re-IPSec this message as it is sent to the HNB. This RAB Assignment Request message may not be used by the BWM server in a similar manner to the RAB Assignment Request message that is sent to the HNB during the establishment of a packet switched service. The BWM server may ignore the RAB Assignment Request message when it is used to setup a CS service, such as a voice call. The HNB may un-IPSec this message and send a Radio Bearer Setup message to the WTRU over the air.

Continuing the above regarding the establishment of a MO CS voice call, the WTRU may setup the radio bearers and reply with the Radio Bearer Setup Response to the HNB. The HNB may send the RANAP RAB Assignment Response message to the BWM server. The RAB Assignment Response message may not need to be heeded by the BWM server for the same reasons as set for the RAB Assignment Request message process above. The BWM server may un-IPSec and re-IPSec this message as it is sent to the Serving SeGW. The Serving SeGW may un-IPSec this message and send it to the MSC/HLR/VLR. The MSC/VLR/HLR may then setup the call with the other device being called, e.g., the device of the dialed number. The MSC/VLR/HLR may send a RANAP Direct Transfer message, encapsulating an Alert message, to the Serving SeGW. The Serving SeGW may IPSec the RANAP Direct Transfer message which is encapsulating the Alert message and send it to the BWM server. The BWM server may un-IPSec and re-IPSec the RANAP Direct Transfer message which is encapsulating the Alert message as it is sent to the HNB. The HNB may un-IPSec the Direct Transfer message and send the Alert message to the WTRU over the air. As the call is being answered on the device being called, the MSC/HLR/VLR may send a RANAP Direct Transfer message, encapsulating a Connect message, to the Serving SeGW. The Serving SeGW may IPSec the RANAP Direct Transfer message which is encapsulating the Connect message and send it to the BWM server. The BWM server may un-IPSec and re-IPSec the RANAP Direct Transfer message which is encapsulating the Connect message and send it to the HNB. The HNB may un-IPSec Direct Transfer message and send the Connect message to the WTRU over the air. The WTRU may send a Connect Acknowledge message to the HNB. The HNB may send a RANAP Direct Transfer message, encapsulating the Connect Acknowledge message, to the BWM Server. The BWM Server may un-IPSec and re-IPSec this message as it is sent to the Serving SeGW. The Serving SeGW may un-IPSec this message, and send it to the MSC/VLR/HLR. The call is now "up" and adaptive multi rate (AMR) packets may flow between the two devices, via the HNB to BWM server to Serving SeGW to MSC path. The BWM server may un-IPSec and re-IPSec each AMR packet as it passes between the HNB and Serving SeGW. At some point, either the WTRU or the device to which the voice call is made may end the call. The signaling that travels between the MCN and the WTRU may be passed through the BWM server. The BWM Server may need to un-IPSec and re-IPSec each of these messages as it travels between the HNB and the Serving SeGW. Upon establishing a Mobile Originated (MO) CS voice call, a WTRU may have a voice call in place on the MCN through the BWM server.

The systems and methods described herein may allow multiple HNBs to communicate with the MCN without a one to one mapping of HNBs to BWM servers. For example, multiple HNBs may communicate with the MCN through a single BWM Server. Also, multiple HNBs may communicate with the MCN through multiple BWM Servers, where there may be multiple HNBs to each BWM Server.

Enterprise scenarios to implement the disclosed systems and methods may include non-BWM scenarios and BWM scenarios. Although the use of one or more BWM servers is being introduced, legacy configurations may continue to be used. For example, a non-BWM scenario may be implemented (e.g., when one or more BWM Servers are not used or become unavailable).

In a non-BWM scenario (i.e., a non-BWM enterprise scenario), relating to the MCN's SeGW, multiple HNBs may be directly connected to the MCN's SeGW(s). The SeGW(s) may be in the Internet and may act as an entry point into the MCN. The MCN may allocate the SeGW(s) to the enterprise HNBs. Each HNB may establish a secure tunnel directly with an allocated SeGW. Multiple SeGWs may be considered for reasons of load balancing, or for reasons of discriminating Initial and Serving SeGWs, or for both.

In another non-BWM scenario, relating to a SeGW chain in the enterprise and MCN, multiple HNBs may be connected to enterprise SeGW(s) (it may also be viewed as enterprise Femto aggregator(s)). Each HNB may establish a secure tunnel directly with the allocated enterprise SeGW. The enterprise SeGW(s) in turn may multiplex the HNB traffic over secured tunnels to the MCN's SeGW(s). Again, multiple SeGWs (both within the enterprise and in the Internet/MCN) may be considered for reasons of load balancing, or for reasons of discriminating Initial and Serving SeGWs, or for both.

In a BWM scenario (i.e., a BWM enterprise scenario), relating to the MCN's SeGW, multiple HNBs may be connected to a BWM server, and, the BWM server may be connected to multiple SeGWs (for load balancing or for Initial/Serving SeGW). Here, the BWM server may manifest as the enterprise SeGW (femto aggregator).

In another BWM scenario, relating to the MCN's SeGW, multiple HNBs may be connected to multiple BWM servers, and, the BWM servers may be connected to multiple SeGWs (e.g., for load balancing or for Initial/Serving SeGW). Here also, the BWM servers may manifest as the enterprise SeGWs.

In another BWM scenario, relating to a SeGW chain in the enterprise and MCN, instead of having 3-stage security tunnels between HNB←→BWM, BWM←→enterprise SeGW and enterprise SeGW←→MCN SeGW, the BWM may manifest itself as the enterprise SeGW or as an application on enterprise SeGW/femto aggregator.

In the above scenarios, each enterprise BWM server may manifest as an enterprise-level SeGW. Modifications and/or changed/added configurations may be needed to support the concept of multiple HNBs connecting through a single BWM Server to the MCN through multiple (MCN) SeGWs. Possible modifications and/or configurations may include one or more of the following: 1) modification of the IKE protocol; 2) configuration of the "Outer" DNS Server(s) response to an HNB request to resolve SeGW FQDN (Initial and Serving); 3) configuration of DNS Server (within DSL modem) response to HNB request to resolve BWM Server FQDN when a BWM Server is available; and 4) HNB configured with burnt-in FQDN for Initial SeGW, for example, "operatorX-segw."

As part of a HNB bringup, it may initiate internet key exchange (IKE) message exchange with a SeGW. As part of the BWM Scenarios, a HNB may initiate the IKE message exchange with a BWM server—the BWM server may manifest as the enterprise SeGW or an application over enterprise SeGW. However, the BWM server may need to know with which MCN SeGW it may need to create a secure association. One possibility is that the enterprise SeGW (BWM server) may have its own policies as to how it may "broker" traffic to/from HNB security associations with traffic to/from MCN SeGW security associations. This may imply that the MCN SeGW "attempted" by the HNBs, which may be known to the HNB through preburnt Initial SeGW FQDN configuration or through dynamic TR69 discovery of Serving SeGW FQDN, may be overridden by policies in the BWM server. In such a case, the BWM server may have a separate OAM interface (e.g., TR69) with the MCN that may enable the MCN to influence the SeGW selection policy at the BWM server and thereby orchestrate the SeGW selection by the BWM server. This may require enhancement to the MCN (and its protocols) to realize the BWM server as an Access Network entity within the enterprise.

Another possibility, for determining which MCN SeGW the BWM server may need to create a secure association, which may avoid enhancements in the MCN, may be for the BWM server to honor the HNB's existing policies/mechanisms to select the MCN SeGW although "brokered" through the BWM server. The HNB may have the MCN SeGW information (preburnt Initial SeGW FQDN and/or dynamically discovered Serving SeGW through TR69) and the IKE protocol may be modified to inform the BWM Server of this information. The IKE protocol may be modified in such a way as to add an information element to an existing message. When the HNB initiates the IKE process, it may inform the BWM Server of the FQDN of the MCN SeGW (Initial or Serving) to which it wishes to connect. The BWM server may then use this information to create a secure association with the "intended" MCN SeGW or multiplex if a secure association already exists with the "intended" MCN SeGW. However, in the "Non-BWM scenario," when a HNB initiates an IKE process directly to a MCN SeGW, the MCN SeGW may receive this additional information element and discard it. This makes the IKE protocol change local between the HNB and BWM server.

The protocol change in IKE process at the HNB and BWM server may proceed as follows. As per IKEv2 protocol (RFC 4306) the Configuration Payload (CP) in the IKE process may be used to exchange configuration information between IKE peers during the process where the IRAC requests an IP address from the IRAS. Configuration payloads may be of type CFG_REQUEST/CFG_REPLY or CFG_SET/CFG_ACK. CFG_REQUEST and CFG_SET payloads may be added to a IKE request. They may allow an IKE endpoint to request data from its peer. "CFG_SET/CFG_ACK" may allow an IKE endpoint to push configuration data to a peer. RFC 4306 may define Configuration Attributes that may be exchanged in the Configuration Payload. RFC 4306 may also provide mechanisms to extend the Configuration Attributes in the Configuration Payload. While Configuration Attribute values 0-15 may be specifically defined in RFC 4306, values 16-16383 may be reserved to LANA and values 16384-32767 may be for private use among mutually consenting parties.

Relating to the disclosed systems and methods, the HNB (the IRAC) may make use of the Configuration Payload CFG_ SET in the IKE_AUTH message to convey the target MCN SeGW FQDN in a new Configuration Attribute to the BWM Server (the IRAS). This may be an LANA registered Configuration Attribute value or a Configuration Attribute value of private use. This may mean that the HNB IRAC, in its IKE exchange, may inform the destination domain with which it wants to connect, where the BWM IRAS is the gateway to multiple MCN SeGWs.

| Attribute Type | Value | Multi-valued | Length |
| --- | --- | --- | --- |
| TARGET_SECURITY_DOMAIN | xxxx | No | 0 or more octets |

TARGET_SECURITY_DOMAIN may be a string of printable ASCII characters that is not NULL terminated The change in IKE process at MCN SeGW (but as per existing protocol, i.e., no change in IKE protocol) may proceed as follows. RFC 4306 may provide mechanisms for the IRAC to request multiple private addresses from the IRAS, so that the BWM may use them to reserve a pool of private addresses from MCN SeGW and allocate them one-by-one to the HNBs in their respective IKE requests. The MCN SeGW may be able to handle this. During IKE_AUTH exchange, the IKE IRAC (BWM server) may request a range of IP addresses to be allocated to it by the IRAS (the MCN SeGW) through mechanisms facilitated by the Traffic Selector (TS) Payload. The TS Payload may allow the IRAC to specify TS_IPV4_ADDR RANGE as the TS type and the IRAS to return an address range bounded within a Starting Address and an Ending Address.

Configuration changes for transactions with the "Outer" DNS may be a configuration level change. A protocol change may not be necessary. The operator may register its FQDN names for the SeGWs with the "Outer" DNS Servers. Currently, the operators may have a public IP address mapped to the FQDN name for each SeGW (Initial and Serving). The HNB today may perform an 'A' type Resource Record (RR) query that the "Outer" DNS resolves to an IPv4 address (the IPv4 address of the MCN SeGW).

With regard to the configuration changes for transactions with the "Outer" DNS, the HNB may need to make a NAPTR query for the MCN SeGW FQDN. The "Outer" DNS Server configuration may be modified so that it is able to handle a NAPTR query and may be capable of translating the MCN SeGW FQDN into two FQDNs, the FQDN for the BWM server and the FQDN of the MCN SeGW. The BWM server FQDN may be the same for all HNBs for all enterprises. The two FQDNs may have different "ORDER" values or the same "ORDER," but different "PREFERENCE" values, so as to give higher priority to the BWM server FQDN. As an outcome of the NAPTR query, the HNB may first try to resolve the FQDN of the BWM server ('A' type RR query). If a BWM server is present within the premise, then this attempt may be successful. The local DNS server within an enterprise may respond to the query and resolve it to the IP address of the BWM server. If a BWM server is not present within a premise, then this attempt may fail (in the absence of a BWM server, the local DNS server may not respond and the "Outer" DNS server may also return a failure), and, the HNB may attempt to resolve the FQDN of the MCN SeGW.

The DNS server within the DSL modem (local DNS Server) may need to be configured such that it can resolve the FQDN of the BWM server to the BWM servers local IP address. If more than one BWM server is present, the DNS server within the DSL modem may be configured to return the local IP address of all the BWM servers present within the premise. This may invoke configuration issues and with no change to behavior of Local DNS Server.

Figure 62:
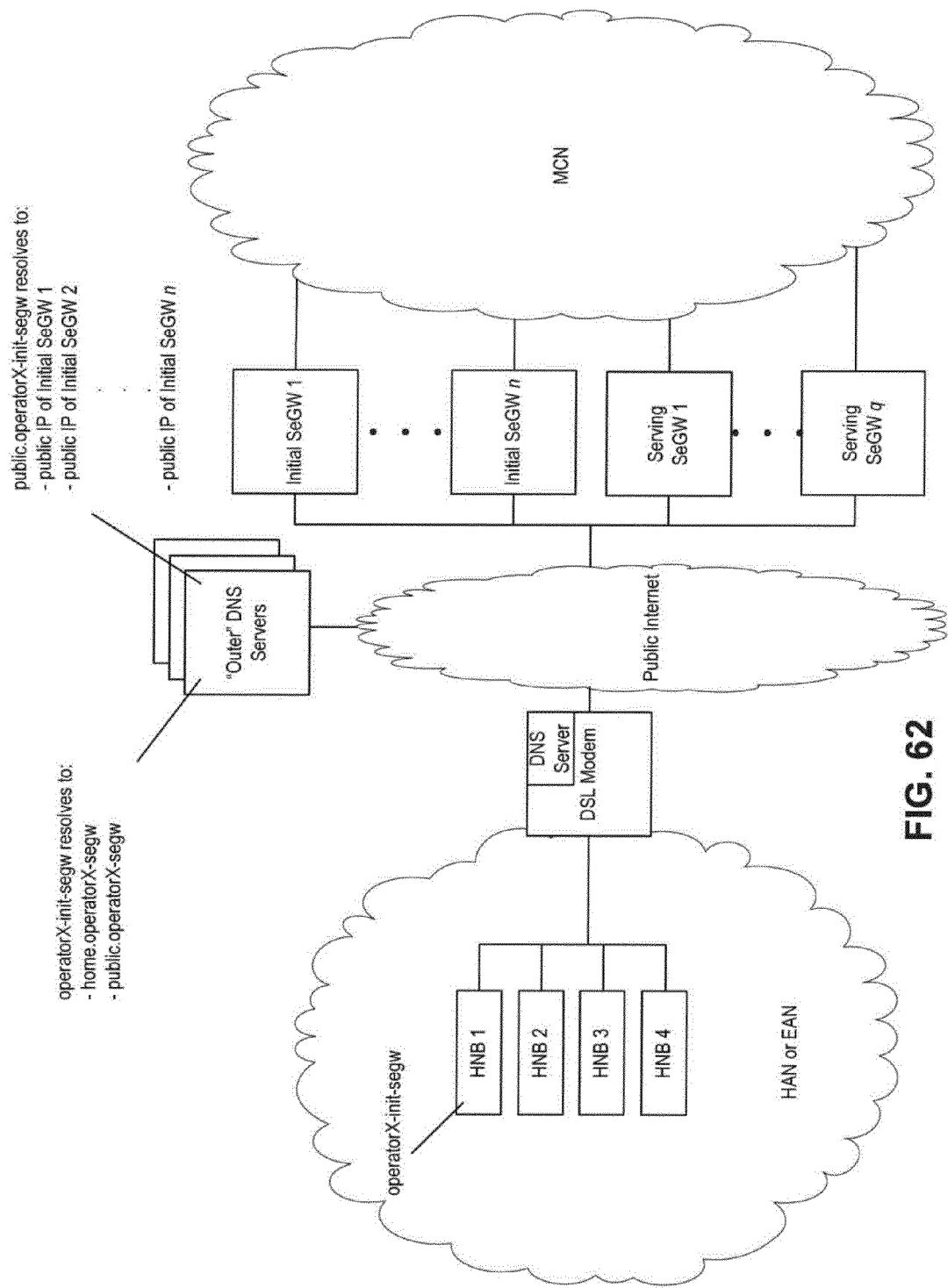
FIG. 62 is an exemplary illustration of an enterprise scenario with no BWM server.

As discussed above, there may be no BWM server within the home or enterprise (e.g., may not exist, may not be available, etc.) and the HNBs may connect to the SeGWs using the IP addresses as provided by the "Outer" DNS Server. FIG. 62 illustrates an exemplary enterprise scenario with no BWM server. The operator may have several Initial and Serving SeGWs which the HNB may attach to and each of the public IP addresses of these may have been registered with the "Outer" DNS servers. The "Outer" DNS server may be configured to handle both 'A' type and 'NAPTR" type DNS RR queries. Types of HNBs may be: 1) HNBs which make 'A' type DNS RR queries; and 2) HNBs that have been enhanced to make "NAPTR" type DNS RR queries (although there is no BWM Server in this scenario). The solution may be applicable for both types of HNBs.

Connecting one or more HNBs to the MCN in a no BWM server scenario may comprise one or more of the following. An HNB may have initial SeGW burnt-in, assume "operatorX-init-segw." When an HNB is powered on, it may broadcast a DNS Request to resolve "operatorX-init-segw." This may be an "A" type query or a "NAPTR" type query. The DNS Server in the DSL modem may not resolve this, so, it may be broadcast onto the public internet where it may be seen by the "Outer" DNS Servers. Depending on the DNS RR query type, the "Outer" DNS Servers may resolve this to: 1)

two FQDNs and return a 'NAPTR' type RR DNS Response to the HNB containing 1a) home.operatorX-init-segw—primary and/or 1b) public.operatorX-init-segw—secondary; or 2) an IP address of a MCN SeGW and return an 'A' type RR DNS Response to the HNB. If it was a 'A' type RR response, the HNB may be able to create an IPSec tunnel with the Initial SeGW. If it was a 'NAPTR' RR response, the HNB may attempt to resolve home.operatorX-init-segw by broadcasting an 'A' type RR DNS Request to the DNS Server in the DSL modem.

Continuing the above regarding connecting one or more HNBs to the MCN in a single BWM server scenario, the DNS Server within the DSL modem may attempt to resolve home.operatorX-init-segw. Since it may not exist, there may be no response and the request may get broadcast onto the public internet where it may be seen by the "Outer" DNS Servers. The "Outer" DNS Servers may also not be able to resolve home.operatorX-init-segw. HNB may receive no response to the DNS Request and may then try to resolve public.operatorX-init-segw by broadcasting a DNS Request. The DNS Server within the DSL modem may attempt to resolve public.operatorX-init-segw and may be unable to. It may then send the DNS Request on the public internet where the DNS Request may be seen by the "Outer" DNS Servers. The "Outer" DNS servers may resolve this to a list of IP addresses of the Initial SeGWs and return this information to the HNB via a DNS Response. The "Outer" DNS servers may use whatever technique is typically used to ensure load balancing, such as, but not limited to, ordering the list of IP address in a round-robin fashion. The HNB may now be able to create an IPSec tunnel with the Initial SeGW. When the HNB has this tunnel in place with the Initial SeGW it may go through the initialization and provisioning steps outlined earlier. The MCN may provide the information on the Serving SeGW to the HNB. It may not matter whether or not the Serving SeGW is unique since each HNB may individually go through the above steps to connect with the network.

Figure 63:
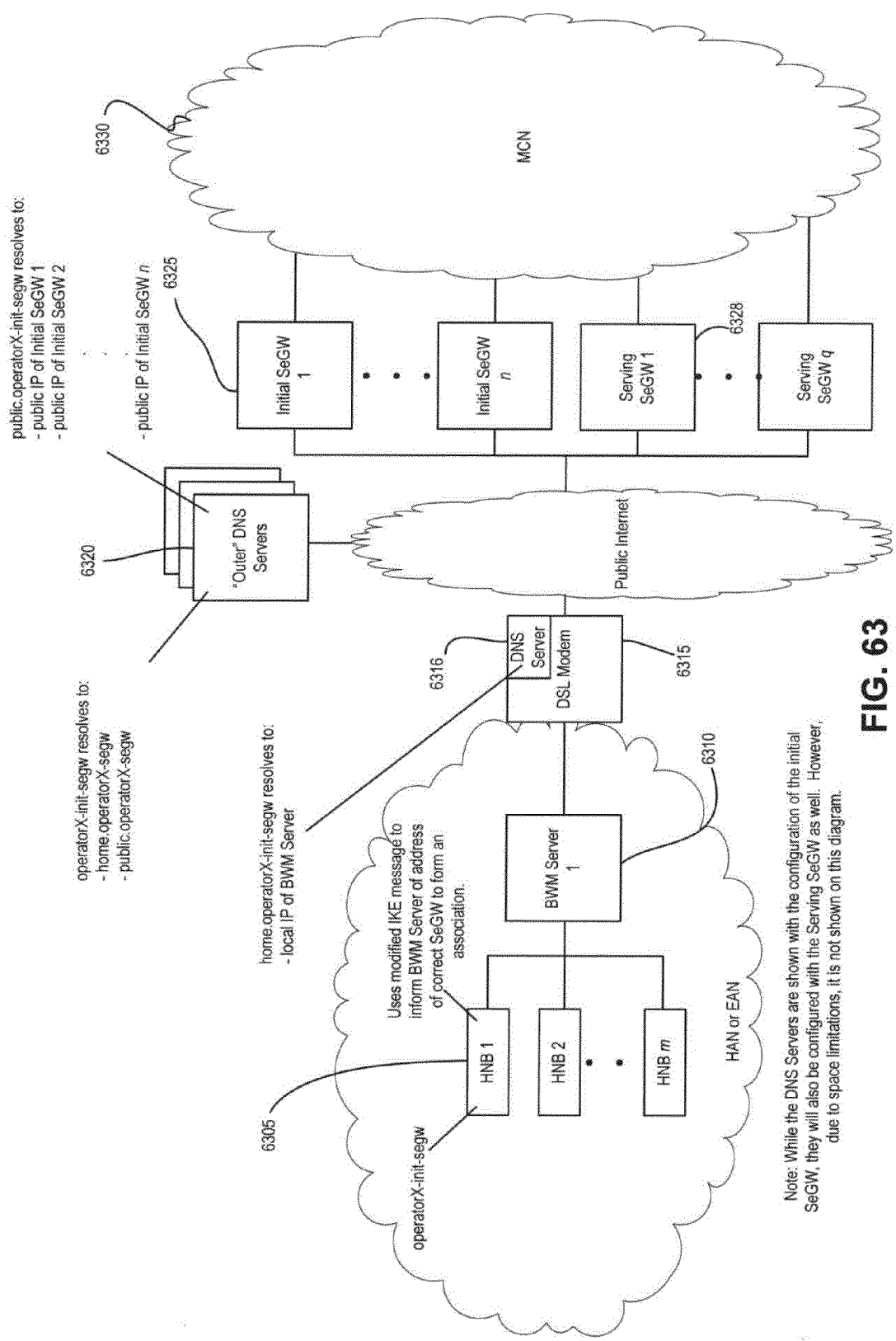
FIG. 63 is an exemplary illustration of an enterprise scenario with one BWM server.

There may be just one BWM server within the home or enterprise. FIG. 63 illustrates an exemplary enterprise scenario with one BWM server. There may be one BWM server within the home or enterprise and the HNBs may connect to the SeGWs using the IP addresses as provided by the "Outer" DNS server by going through the BWM server. The BWM server may be able to attach to the correct Initial SeGW since the HNB may pass this IP address to it by the modified IKE protocol message. Also, it may be assumed that the operator has several Initial and Serving SeGWs that the HNB can attach and each of the public IP addresses of these may have been registered with the "Outer" DNS Servers.

For example, with reference to FIG. 63, connecting one or more HNBs to the MCN in a single BWM server scenario may comprise one or more of the following. A BWM server 6310 may be powered on, and may retrieve a local IP address from the DSL Modem 6315. The DNS server 6316 within the DSL Modem 6315 may register the local IP address with an association between the FQDN and local IP address. The HNB 6305 may have initial SeGW burnt-in, assume "operatorX-init-segw." When the HNB 6305 is powered on, it may broadcast a "NAPTR" type RR DNS Request to resolve "operatorX-init-segw." The DNS Server 6316 in the DSL modem 6315 may be unable to resolve this, so it may broadcast onto the public internet where it may be seen by one or more "Outer" DNS servers. A "Outer" DNS server 6320 may resolve "operatorX-init-segw" to two FQDNs and return a DNS Response to the HNB 6305: 1) home.operatorX-init-segw—primary and/or 2) public.operatorX-init-segw—secondary. The HNB 6305 may then attempt to resolve home.operatorX-init-segw by broadcasting an 'A' type RR DNS Request to the DNS server 6316 in the DSL modem 6315. The DNS server 6316 within the DSL modem 6315 may attempt to resolve home.operatorX-init-segw. Since DNS server 6316 may be able to resolve the FQDN, it may create and send a DNS response with the local IP address of the BWM server 6310.

Continuing the above regarding connecting one or more HNBs to the MCN in a single BWM server scenario, the HNB 6305 may now be able to create an IPSec tunnel with the BWM server 6310. The HNB 6305 may initiate creation of a secure association between itself and the BWM server 6310, the HNB 6305 may include the public.operatorX-init-segw FQDN that may be part of the enterprise solution. This may be associated with the change that may be needed to the current IKE procedures. Essentially, the change may allow a 'first node,' during the security association process, to inform a 'second node' of the name (FQDN) of a 'third node,' which may be used for the purpose of establishing another security association with it. This mechanism may allow a chain of security associations to be established, thereby extending the capability of the existing IKE procedure to establish a security association between two nodes via a set of intermediate nodes. In other words, the enhanced IKE may establish a secure 'path' as opposed to a secure 'link.' This information may be retained, while in the non-BWM scenario mentioned herein it may not be retained.

Continuing the above regarding connecting one or more HNBs to the MCN in a single BWM server scenario, the BWM server 6310 may attempt to resolve the public.operatorX-init-segw by broadcasting an 'A' type RR DNS Request. The DNS server 6316 within the DSL modem may attempt to resolve public.operatorX-init-segw and be unable to. It may then send the DNS Request on the public internet where it may be seen by the "Outer" DNS Server 6320. The "Outer" DNS server 6320 may resolve public.operatorX-init-segw to a list of IP addresses of the Initial SeGWs and return this information to the HNB 6305 via a DNS Response. The "Outer" DNS Server 6320 may use whatever technique is typically used to ensure load balancing, such as, but not limited to, ordering the list of IP address in a round-robin fashion. The BWM server 6310 may now be able to create an IPSec tunnel with the Initial SeGW 6325, for example. The MCN may provide a MCN IP address, or range of MCN IP addresses, to the BWM server 6310. When the BWM server 6310 has an IPSec tunnel established with the Initial SeGW 6325, it may complete the establishment of the IPSec tunnel with the HNB 6305. The BWM server 6310 may use the MCN provided IP address while the HNB 6310 may use the local IP address provided by the DHCP server within the DSL modem 6315. For a message sent from the HNB 6305 to the MCN 6330, the BWM server 6310 may change the source IP address to the MCN 6330 provided IP address. For a message sent from the MCN 6330 to the HNB 6305, the BWM server 6310 may change the destination IP address to the local IP address of the HNB 6305. The HNB 6305 may connect to the MCN 6330 elements that provide the FQDN of the Serving SeGW 6328, for example, as discussed earlier, assume "operatorX-serving-segw." The HNB 6305 may tear-down the IPSec tunnel between itself and the BWM server 6310. The BWM server 6310 may tear-down the IPSec tunnel between itself and the Initial SeGW 6325. The HNB 6310 may go through the same process as discussed in paragraphs above, for example, to resolve the FQDN of the Serving SeGW 6328 and for the establishment of an IPSec tunnel between it and the BWM server 6310 and the BWM server 6310 and the Serving SeGW 6328.

Continuing the above regarding connecting one or more HNBs to the MCN in a single BWM server scenario, each HNB may go through the same process to connect to the mobile core network. The process may allow for flexibility of different HNBs connecting to different SeGWs through the same BWM Server. The MCN may be given a single MCN IP address or may be given a range of MCN IP addresses. A BWM server may manage and allocate these MCN-allocated IP addresses from the pool or IP range that it is provided. As and when HNBs connect/disconnect, a BWM server may manage the allocation pool. During a first contact between a SeGW and a BWM server, the BWM server may request the pool of addresses or a single address. If the BWM Server is already connected to the SeGW, then it may already have a pool of addresses that it may assign to a HNB that initiates contact. If it does not, then it may request a MCN allocated IP address from the MCN.

Figure 64:
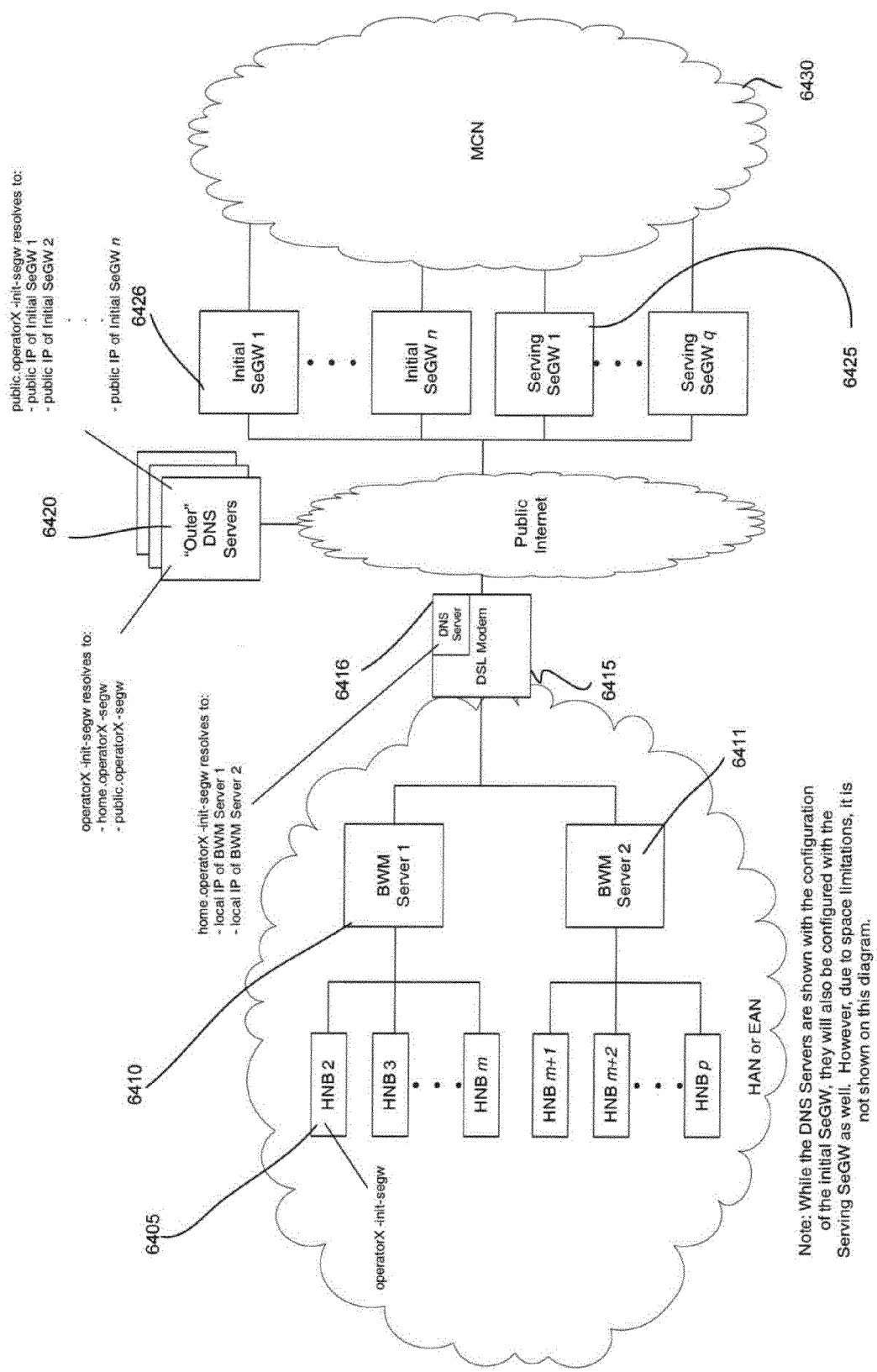
FIG. 64 is an exemplary illustration of an enterprise scenario with multiple BWM servers.

There may be multiple BWM servers within the home or enterprise. FIG. 64 illustrates an exemplary enterprise scenario with multiple BWM servers. The HNBs may connect to the SeGWs using the IP addresses as provided by the "Outer" DNS server by going through these BWM servers. The selection of which BWM server the HNB may attach to may be handled as part of the normal DNS process. BWM servers may be powered on and registered with the DNS Server within the DSL modem, and, the DNS server may use whatever technique is typically used to ensure load balancing, such as, but not limited to, ordering the list of IP address in a round-robin fashion. When a BWM server has been selected, the BWM server may be able to attach to the correct Initial SeGW since the HNB may pass this IP address or FQDN to it by the modified IKE protocol message. Also, it may be assumed that the operator has several Initial and Serving SeGWs which the HNB may attach and each of the public IP addresses of these may have been registered with the "Outer" DNS servers (see FIG. 64).

For example, with reference to FIG. 64, connecting one or more HNBs to the MCN in a multiple BWM Server scenario may comprise one or more of the following. BWM servers, for example BWM Server1 6410 and BWM Server2 6411, may be powered on and may get a local IP address from a DSL Modem 6415. A DNS server 6416 within the DSL Modem 6415 may register these local IP addresses with an association between the FQDN and local IP addresses. An HNB2 6405 for example, may have an initial SeGW1 6426 burnt-in, assume "operatorX-init-segw." When an HNB is powered on, it may broadcast a "NAPTR" type RR DNS Request to resolve "operatorX-init-segw." The DNS server 6416 in the DSL modem 6415 may resolve operatorX-init-segw, so it may be broadcast onto the public internet where it may be seen by a "Outer" DNS server 6420. The "Outer" DNS server may resolve operatorX-init-segw to two FQDNs and may return a DNS Response to the HNB2 6405: 1) home.operatorX-init-segw—primary and/or 2) public.operatorX-init-segw—secondary. The HNB2 6405 may then attempt to resolve home.operatorX-init-segw by broadcasting an 'A' type RR DNS Request to DNS server 6416 in DSL modem 6415. The DNS server 6416 within the DSL modem 6415 may attempt to resolve home.operatorX-init-segw. Since the DNS server 6416 may be able to resolve the FQDN, it may create and send a DNS response with the local IP addresses of BWM Server1 6410 and BWM Server2 6411. The DNS server 6416 within the DSL modem 6415 may use whatever technique is typically used to ensure load balancing, such as, but not limited to, ordering the list of IP address in a round-robin fashion.

In addition, with reference to FIG. 64, connecting one or more HNBs to the MCN in a multiple BWM Server scenario, the HNB2 6405 may be able to create an IPSec tunnel with the selected BWM server (for example BWM Server1 6410 is selected). When the HNB2 6405 initiates the creation of a secure association between itself and BWM Server1 6410, the HNB2 6405 may include the public.operatorX-init-segw FQDN that is part of the enterprise solution. This information may be retained, while in the non-BWM scenario it may not be retained. The selected BWM server 6410 may attempt to resolve the public.operatorX-init-segw by broadcasting a 'A' type RR DNS Request. The DNS server 6416 within the DSL modem 6415 may attempt to resolve public.operatorX-init-segw and be unable to. It may then send the DNS Request on the public internet where it may be seen by the "Outer" DNS Server 6420. The "Outer" DNS server 6416 may resolve this to a list of IP addresses of the Initial SeGWs and return this information to the HNB 6405 via a DNS Response. The "Outer" DNS server 6420 may use whatever technique is typically used to ensure load balancing, such as, but not limited to, ordering the list of IP address in a round-robin fashion. The selected BWM server 6410 may now be able to create an IPSec tunnel with the Initial SeGW 6426, for example. The MCN 6430 may provide a MCN IP address, or range of MCN IP addresses, to the BWM Server1 6410. When the selected BWM Server1 6410 has an IPSec tunnel established with the Initial SeGW 6426, it may complete the establishment of the IPSec tunnel with the HNB2 6405. The MCN IP address may be provided to the HNB 6405. The HNB2 6405 may connect to the MCN 6430 elements which provide the FQDN of the Serving SeGW 6425, for example, as discussed earlier, assume "operatorX-serving-segw." The HNB2 6405 may tear-down the IPSec tunnel between itself and the selected BWM server1 6410. The selected BWM Server1 6410 may tear-down the IPSec tunnel between itself and the Initial SeGW 6426. The HNB2 6405 may go through a similar process as defined earlier regarding the Initial SeGW 6426 to resolve the FQDN of the Serving SeGW1 6425 and for the establishment of an IPSec tunnel between the HNB2 6405 and the selected BWM Server1 and the Serving SeGW1 6425. Each HNB can go through a similar process to connect to the mobile core network. The above process may allow for the flexibility of different HNBs connecting to different SeGWs through the different BWM Servers.

Figure 65:
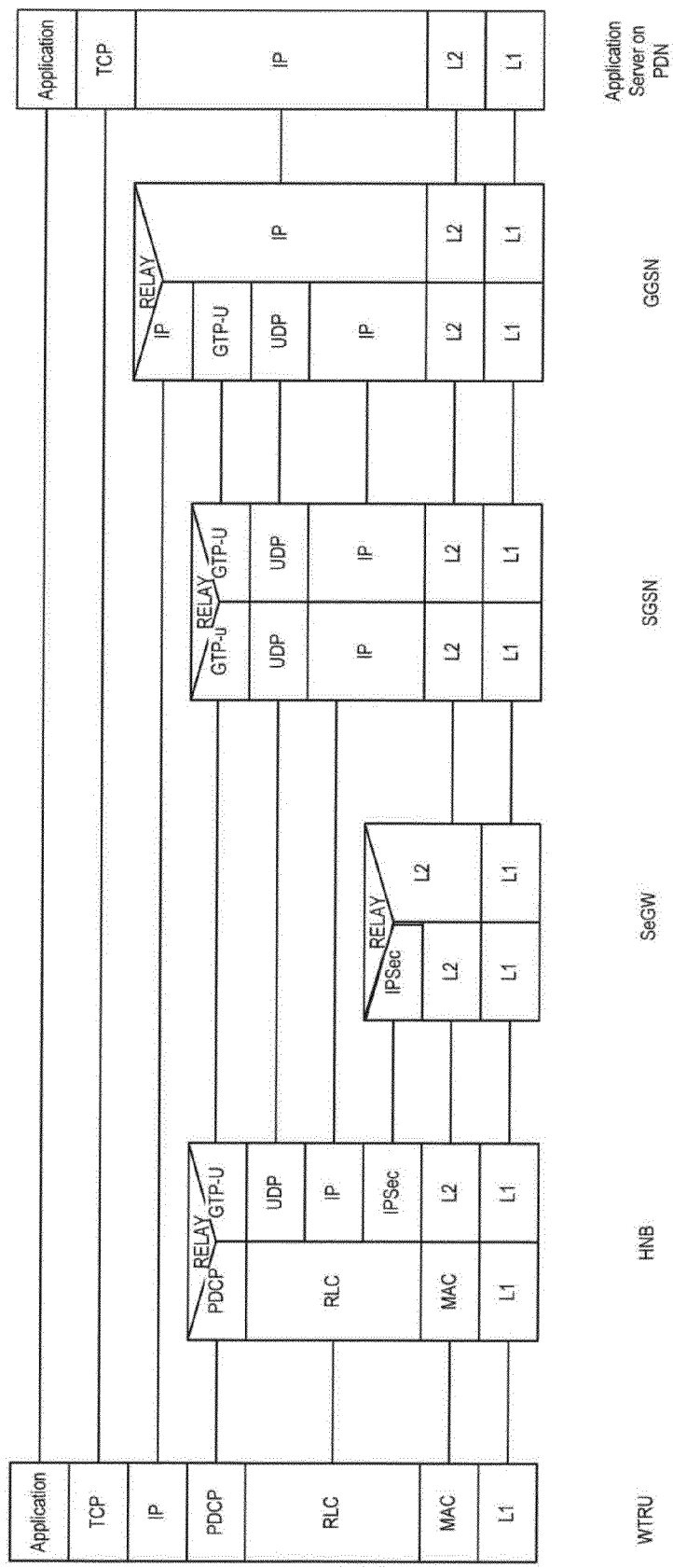
FIG. 65 is an exemplary illustration of a data path layer topology with no BWM server.
Figure 66:
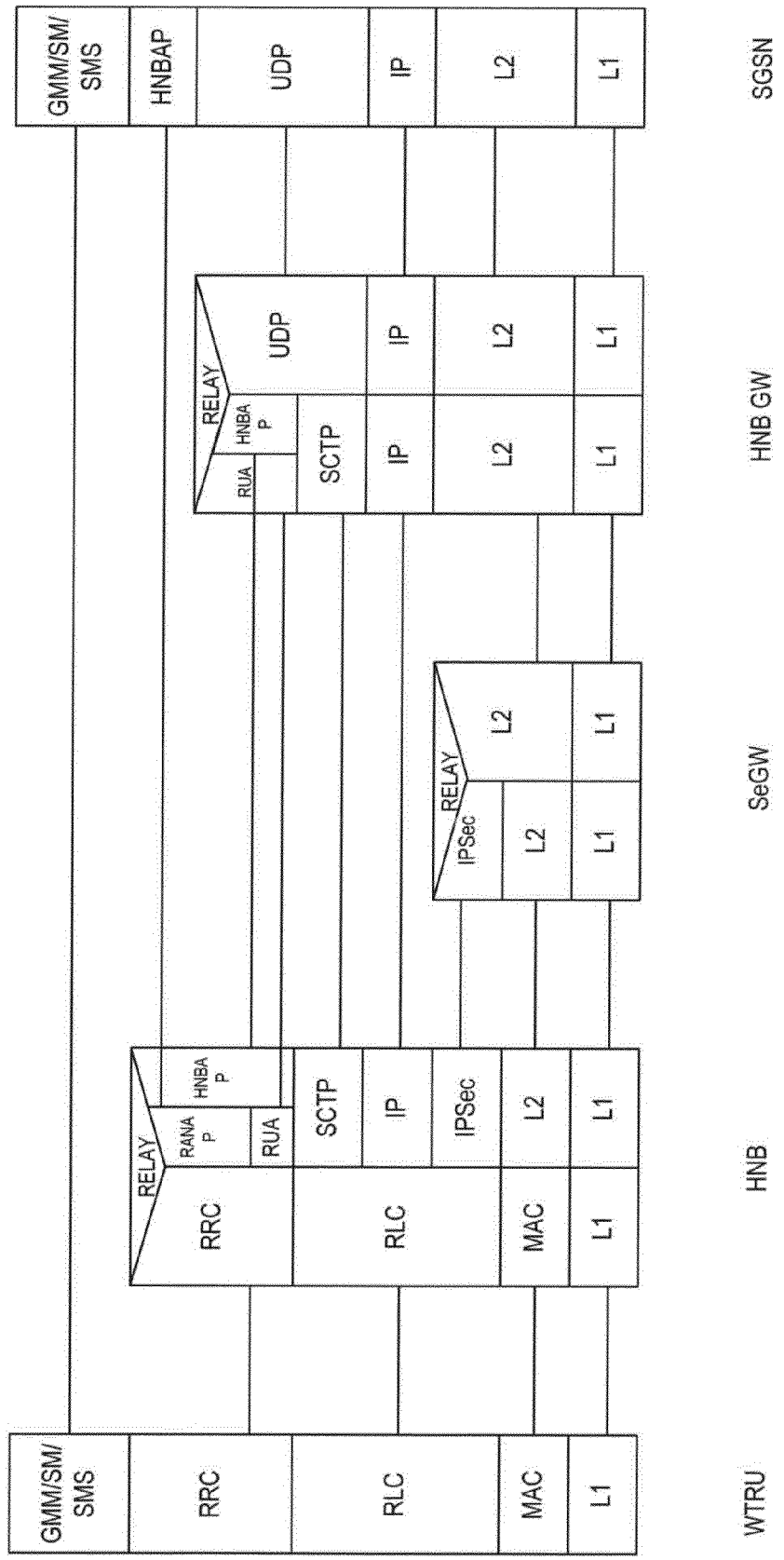
FIG. 66 is an exemplary illustration of a control path layer topology with no BWM server.
Figure 67:
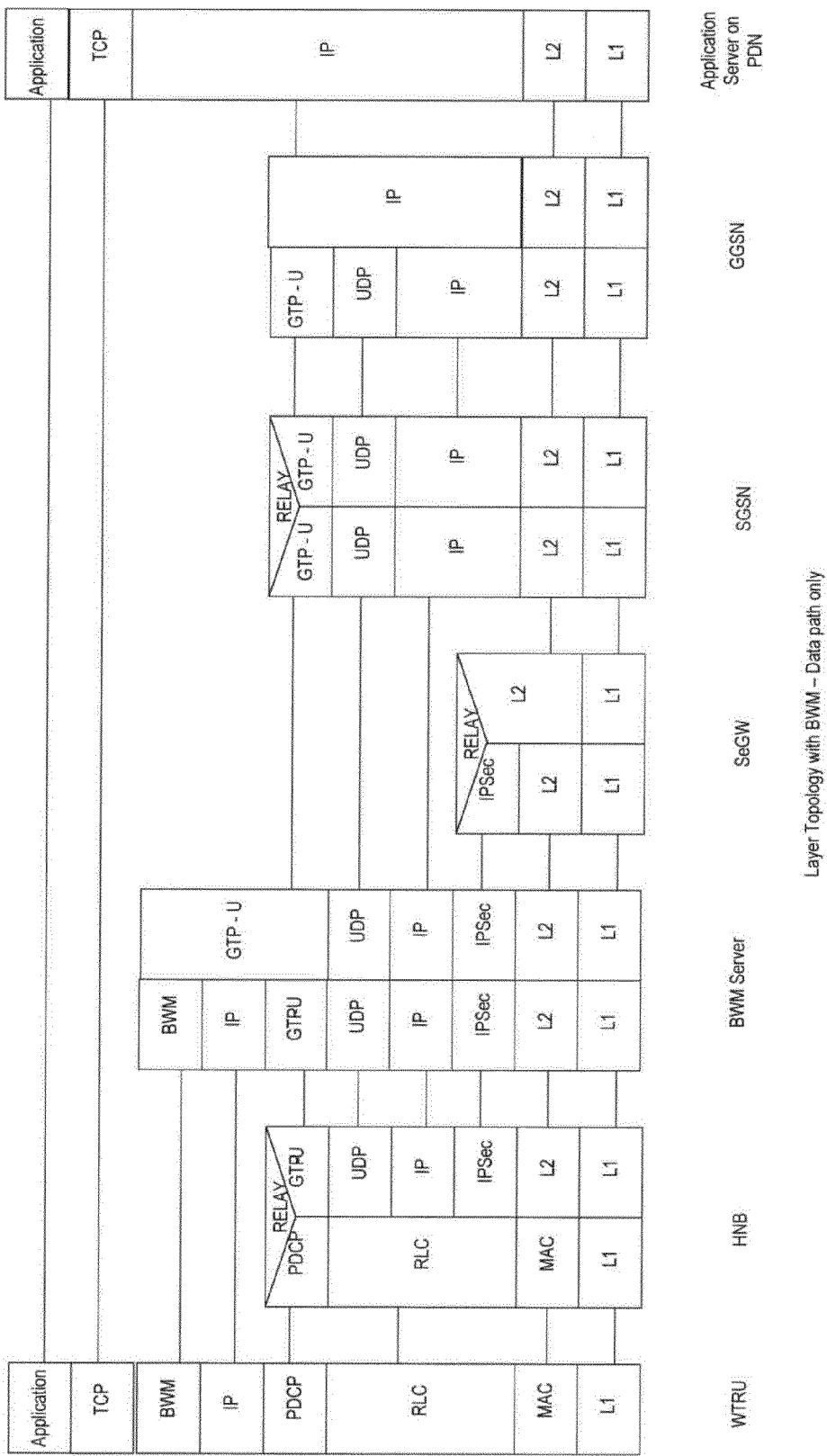
FIG. 67 is an exemplary illustration of a data path layer topology with a BWM server.
Figure 68:
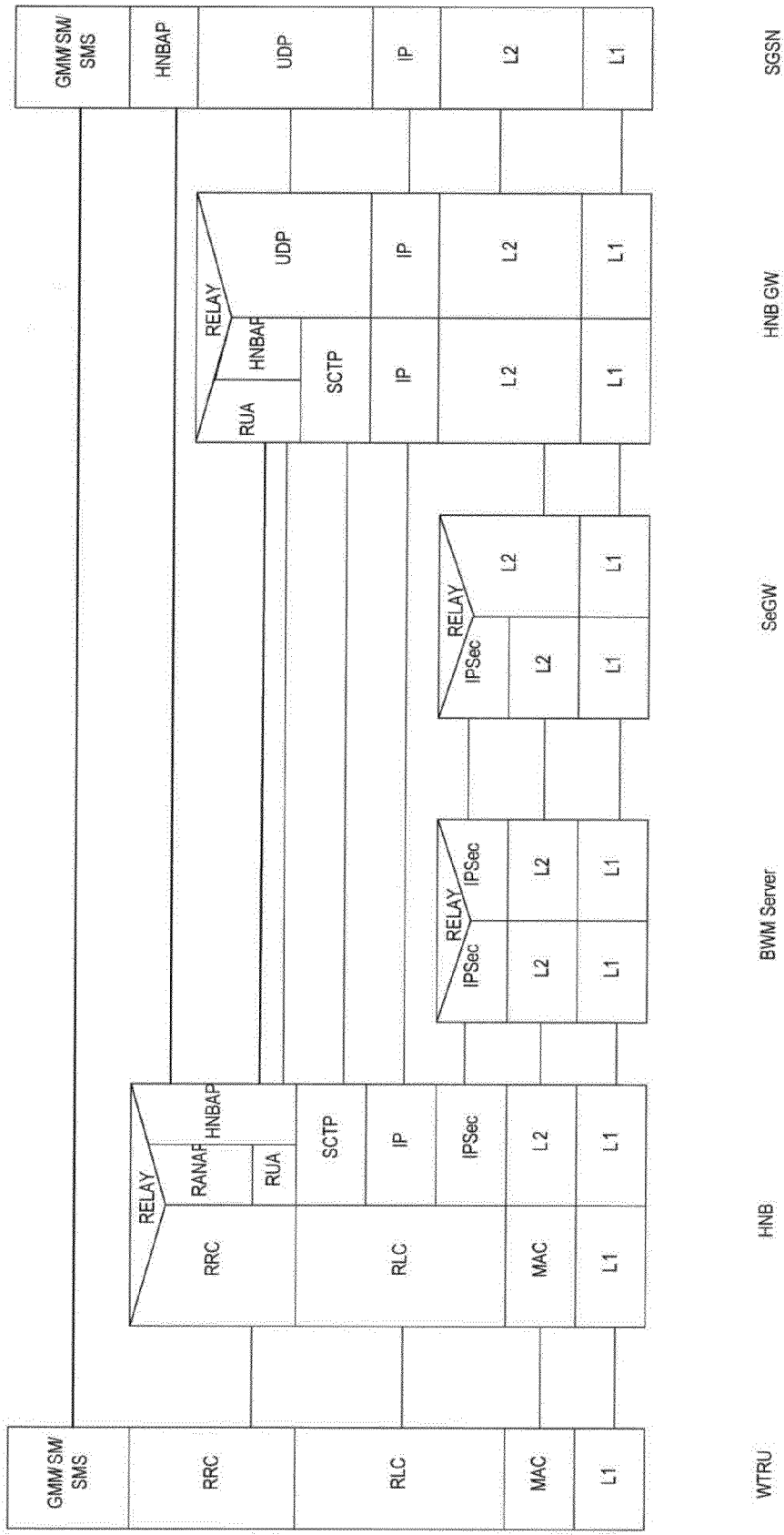
FIG. 68 is an exemplary illustration of a topology with a BWM server.

The following illustrates exemplary source and destination addresses of packets that may be routed between a WTRU and a BWM server, either through a WiFi or cellular connection, and between the BWM server and the application to which the WTRU is communicating:

For packets routed through the MCN:
Uplink
MNTP/IP Packets over WiFi
Source=WTRU WiFi
Destination=BWM Server
MNTP/IP Packets over Cellular
   Source=WTRU Cellular
   Destination=BWM Server
TCP/IP Packets to the Core Network
Source=WTRU Cellular
Destination=Application Server
Downlink
TCP/IP Packets from the Core Network
Source=Application Server
Destination=WTRU Cellular
MNTP/IP Packets over Cellular
   Source=BWM Server
   Destination=WTRU Cellular MNTP/IP Packets over WiFi
   Source=BWM Server
   Destination=WTRU WiFi
For packets routed directly to the public Internet from the BWM Server:
  Uplink
  MNTP/IP Packets over WiFi
  Source=WTRU WiFi
  Destination=BWM Server
  TCP/IP Packets to the Core Network
  Source=BWM Server
  Destination=Application Server
  Downlink
  TCP/IP Packets from the Core Network
    Source=Application Server
    Destination=BWM Server
  MNTP/IP Packets over WiFi
    Source=BWM Server
    Destination=WTRU WiFi FIG. 65 and FIG. 66 show an exemplary topology of entities in the absence of BWM. FIG. 67 and FIG. 68 show an exemplary topology of entities in the presence of BWM. A data path is shown in FIG. 65 and FIG. 67, while a control path is shown in FIG. 66 and FIG. 68. FIG. 67 illustrates an exemplary implementation of a BWM protocol as well as other protocols mentioned herein to assist in the implementation of BWM.

Figure 69:
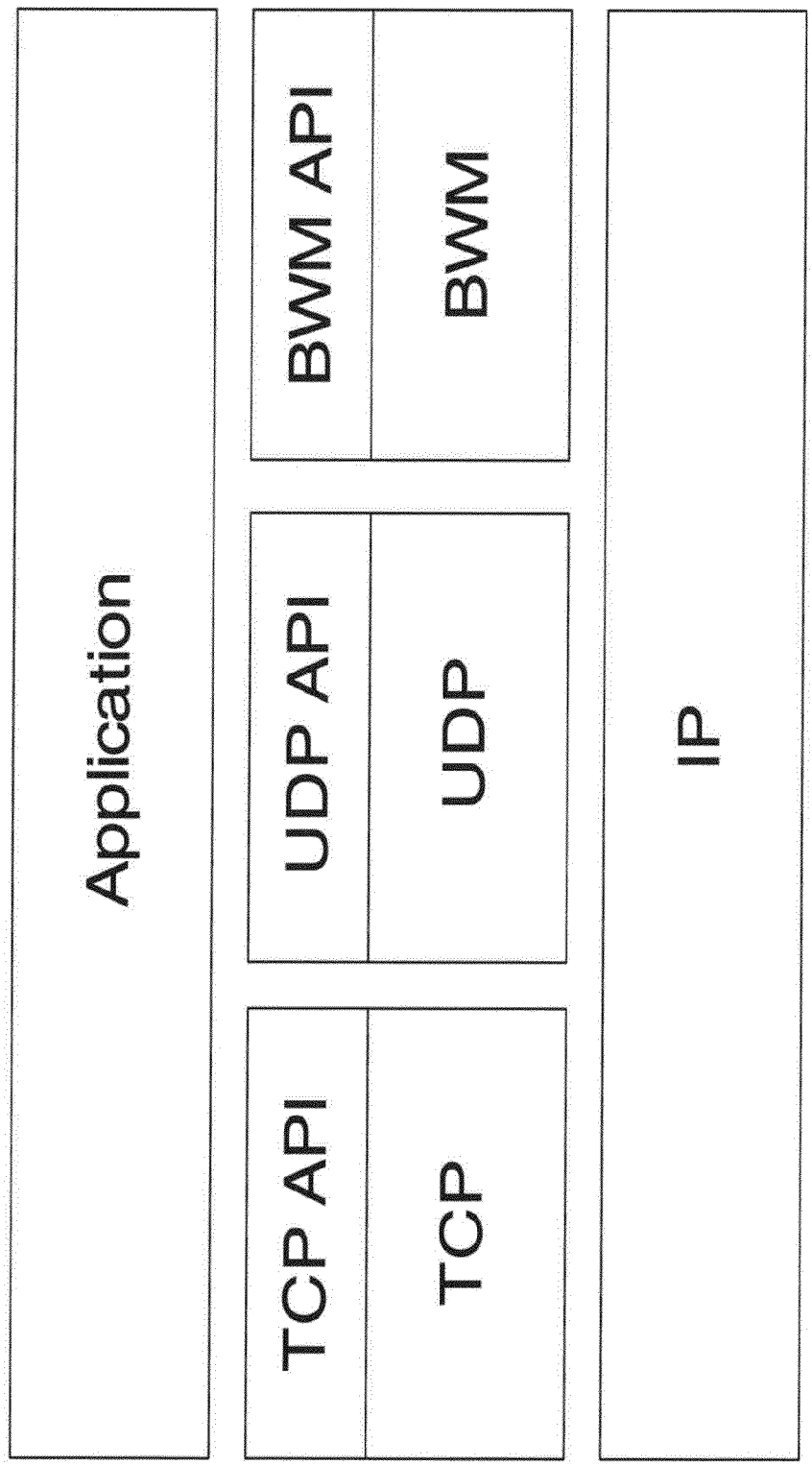
FIG. 69 is an exemplary illustration of protocol stack with BWM.

In porting the BWM client to a single device (e.g., a smartphone), there are various ways to insert the BWM protocol into the existing internet protocol stack. Several options are identified herein. One option may be to add BWM as a separate Transport Layer protocol with its own API as shown in FIG. 69. Applications desiring to use BWM may need to do so explicitly, calling its API instead of, for example, the TCP or UDP API. This may not allow legacy applications to use BWM without being modified. If a session is started using BWm, and subsequently the device loses access to the BWM server, the session may be terminated.

BWM may be added as a transport layer protocol as shown in FIG. 70B. This may allow it to be enabled (FIG. 70B) or disabled at run time (FIG. 70A). When enabled, calls to TCP and UDP API's may be intercepted and the BWM transport layer protocol may run in TCP/UDP's place. Applications may think they are using TCP or UDP. Legacy application may continue to work seamlessly. If BWM is enabled, and a session is started, the session may use BWM, and may continue to do so until the session terminates. If BWM is subsequently disabled, any ongoing session may be terminated. If the device loses access to the BWM Server, any ongoing session may be terminated. If BWM is disabled, and a session is started, the session may use TCP or UDP, and may continue to do so until the session terminates. If BWM is subsequently enabled, any ongoing session may be terminated.

Figures 71A, 71B:
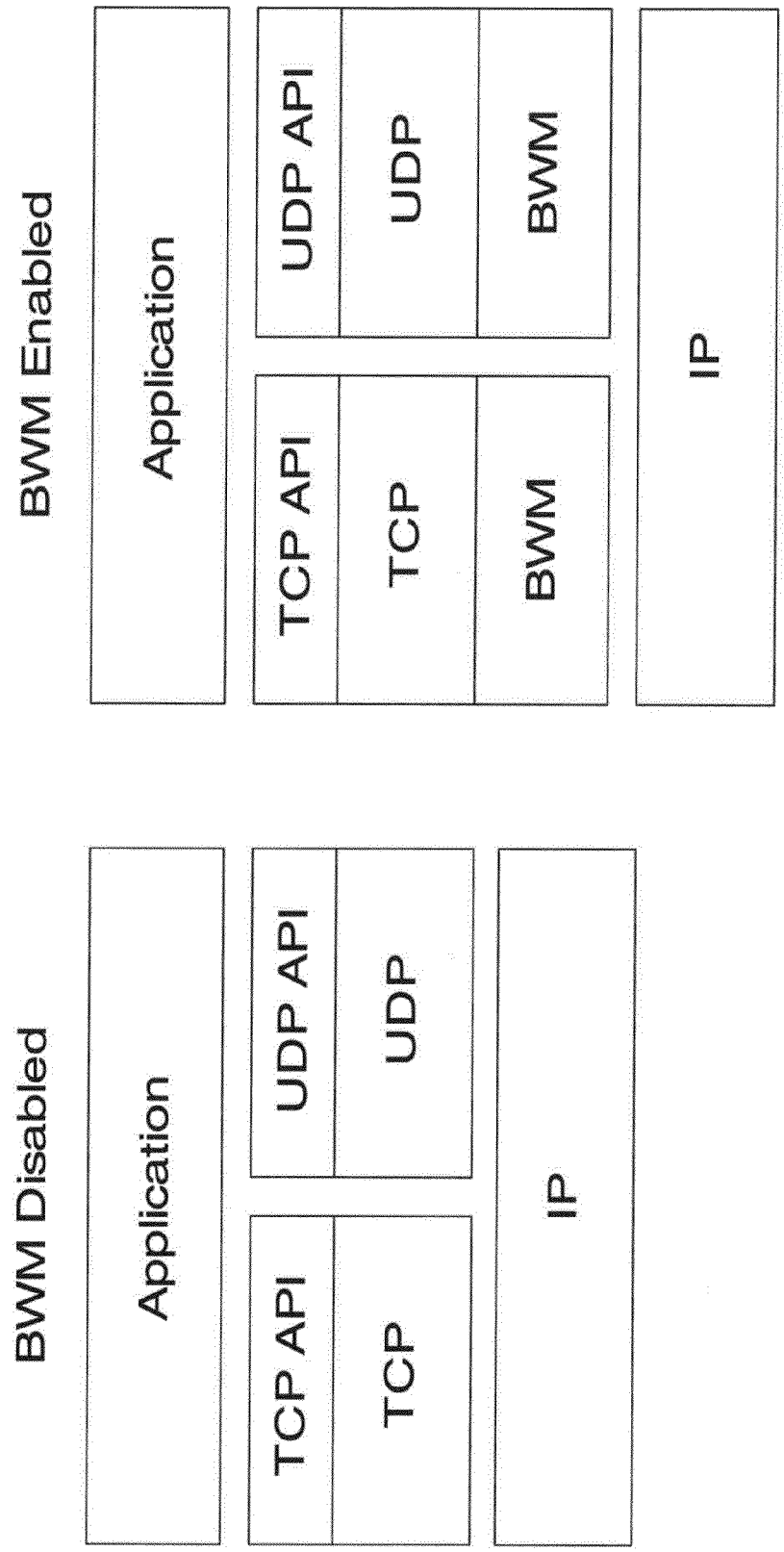
FIG. 71A is an exemplary illustration of a data protocol with BWM.
FIG. 71B is an exemplary illustration of a data protocol with BWM.

BWM may be added between the transport and internet Layers. This may allow it to be enabled (FIG. 71B) or disabled (FIG. 71A) at run time. When enabled, BWM may run underneath TCP or UDP as shown in FIG. 71B. Applications may use TCP or UDP. Legacy applications may continue to work seamlessly. If BWM is enabled, and a session is started, the session may use BWM underneath TCP or UDP. If BWM is subsequently disabled, any ongoing session reverts to using straight TCP or UDP. If the device loses access to the BWM server, ongoing sessions may revert to using just TCP or UDP. If BWM is disabled, and a session is started, it may use just TCP or UDP. If BWM is subsequently enabled, any ongoing session may being using BWM underneath TCP or UDP.

IPSec tunnel establishment may be important to BWM architecture. It may be required that a BWM server establish an IPSec tunnel with a SeGW (as a HNB would). It may also be required that a BWM server interact with the HNB when it attempts to establish an IPSec tunnel. This behavior imitates what the SeGW does when the HNB attempts to create an IPSec tunnel in the absence of the BWM server.

The BWM server may be required to support 3GPP TS 33.210, v9.0 and IETF RFC 4306. Described below are processes between a HNB and SeGW that may be performed to establish an IPSec tunnel. These messages may be sent via UDP/IP between the two entities that wish to establish a security association. The BWM server may be required to support these steps.

Six messages may be used to create the IPSec tunnel, three requests from the HNB and three responses from the SeGW. Each pair of these messages (request/response pair) may have specific functions. The first pair may be sent in the clear (no encryption) and the HNB may send a suite of proposed security parameters. The SeGW may respond with its choice for the security parameters, from those offered by the HNB. The second pair may also be sent in the clear and may consist of a request.

For IKEv2, the sequence may be as follows:
HNB may send an IKE_SA_MIT message to the SeGW with the following parameters:
  IKE Header
  Exchange type=34 (IKE_SA_NIT)
  Initiator bit=TRUE (Initiator of the request/reply pair)
  Response bit=FALSE
  Security Association Payload
  Encryption Algorithm: 3DES in CBC mode or AES in CBC mode
  Pseudo-Random function (hash algorithm): HMAC-SHA 1
  Integrity Algorithm: HMAC-SHA 1-96
  Diffie-Hellman group: Group 2 Or Group 14
  Key Exchange Payload
  DH Group #=2 (1024-bit MODP) or 14 (2048-bit MODP)
  Key Exchange Data=DH Public Value
  Nonce Payload
  Ni/Nr=Values used to ensure liveness SeGW may respond with an IKE_SA_NIT message to the HNB with the following parameters:
  IKE Header
  Exchange type=34 (IKE_SA_INIT)
  Initiator bit=FALSE
  Response bit=TRUE (Responder of the request/reply pair)
  Security Association Payload
  For each area (encryption, integrity, DH group, and hash), the SeGW may select one of the proposed options by the HNB. This message indicates to the HNB which was selected.
  Key Exchange Payload
  DH Group #=May be the same as the IKE_SA_MIT message from the HNB
  Key Exchange Data=DH Public Value
  Nonce Payload
  Ni/Nr=Values used to ensure liveness HNB may send an IKE_AUTH message to the SeGW with the following parameters:
  IKE Header
  Exchange type=35 (IKE_AUTH)
  Initiator bit=TRUE (Initiator of the request/reply pair)
  Response bit=FALSE SeGW may respond with an IKE_SA_NIT message to the HNB with the following parameters:
 IKE Header
 Exchange type=35 (IKE_AUTH)
 Initiator bit=FALSE
 Response bit=TRUE (Responder of the request/reply pair)
 HNB may send a CREATE_CHILD_SA message to the SeGW with the following parameters:
 IKE Header
 Exchange type=36 (CREATE_CHILD_ID)
 Initiator bit=TRUE (Initiator of the request/reply pair)
 Response bit=FALSE
 SeGW may respond with a CREATE_CHILD_SA message to the HNB with the following parameters:
 IKE Header
 Exchange type=36 (CREATE_CHILD_ID)
 Initiator bit=FALSE
 Response bit=TRUE (Responder of the request/reply pair)
 An exemplary listing of protocol and ports used to send and receive specific information is shown below.
 GTP-C—UDP/IP using port number 2123
 GTP-U—UDP/IP using port number 2152
 GTP'—TCP/IP or UDP/IP using port 3386
 DHCP data to server—UDP/IP using port number 67
 DHCP data to client—UDP/IP using port number 68
 DNS—Usually UDP/IP using port number 53, but if the DNS response is large enough, TCP/IP using port number 53 is employed
 FTP—TCP/IP using port 21 for control and port 20 for data
 BGP—TCP/IP using port 179
 HTTP—TCP/IP using port 80
 IMAP—TCP/IP or UDP/IP using ports 143, 220, and 993
 IRC—TCP/IP using ports 113, 194, 531, 6679 through 6697, and 31456
 NNTP—TCP/IP using port 119
 NNTPS—TCP/IP using port 563
 NTP—UDP/IP using port 123
 POP—TCP/IP using ports 109, 110, 995, and 1109
 RIP—UDP/IP using port 520
 RTP—UDP/IP using ports between 1024 and 65535
 RTSP—TCP/IP or UDP/IP using port 554
 SIP—TCP/IP, UDP/IP, or SCTP/IP using ports 5060, 5061, or 5070
 SMTP—TCP/IP using ports 25, 465, or 587
 SNMP—UDP/IP using ports 161, 162, or 199

Figure 72:
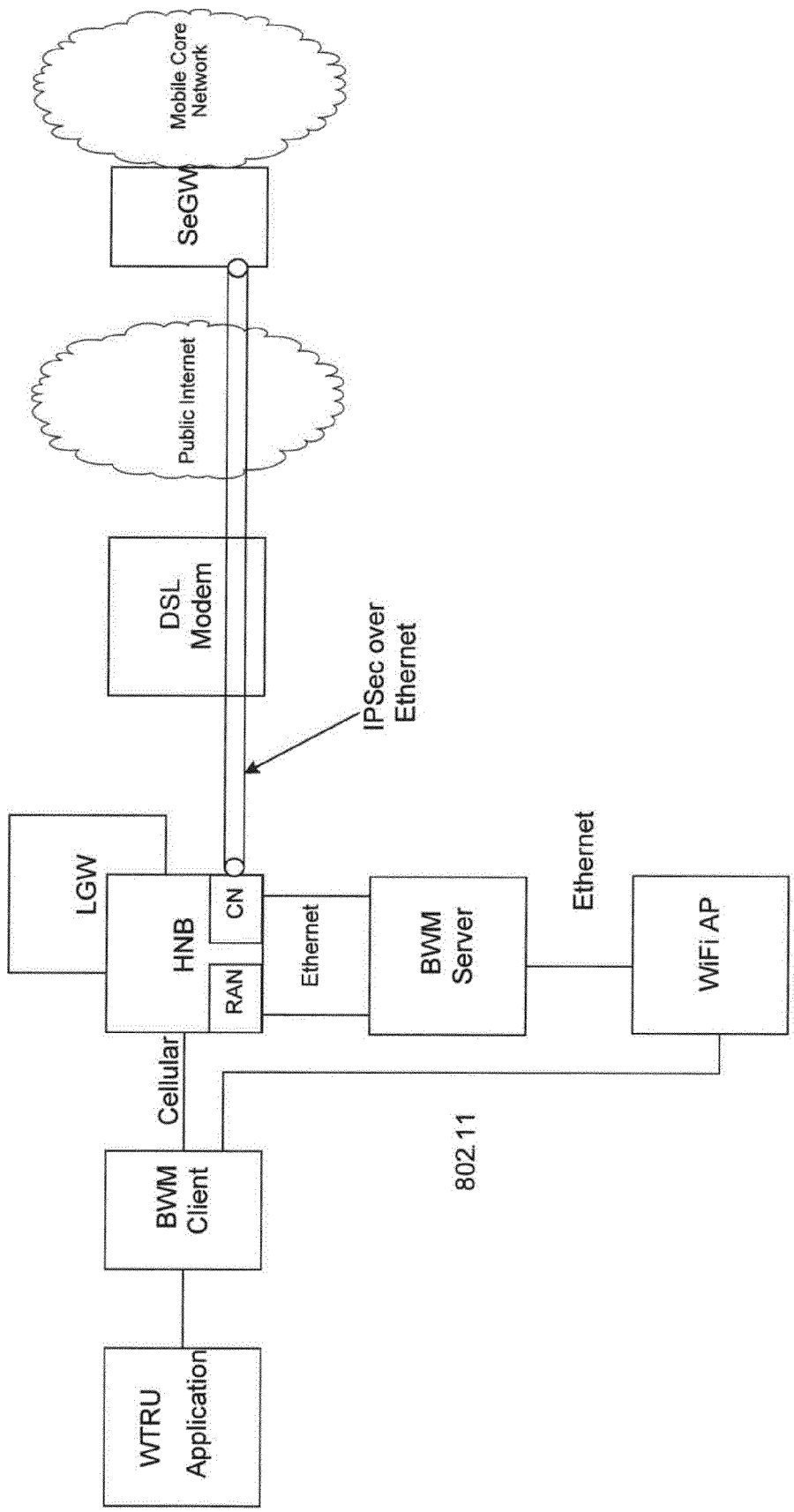
FIG. 72 is an exemplary illustration of a BWM server sitting between the CN and RAN portions of the HNB.

Other possible architectures may be used to effectuate BWM within the HNB environment. One possible architecture is shown in FIG. 72. In this configuration, the BWM server may sit between the CN and RAN portions of the HNB. An advantage of this configuration may be that the HNB is allowed to naturally terminate the IPSec and GTP tunnels that exist between the HNB and the SeGW and SGSN, respectively. A disadvantage of this configuration may be that it is customized to the specific HNB implementation and may not be an agnostic solution.

Figure 73:
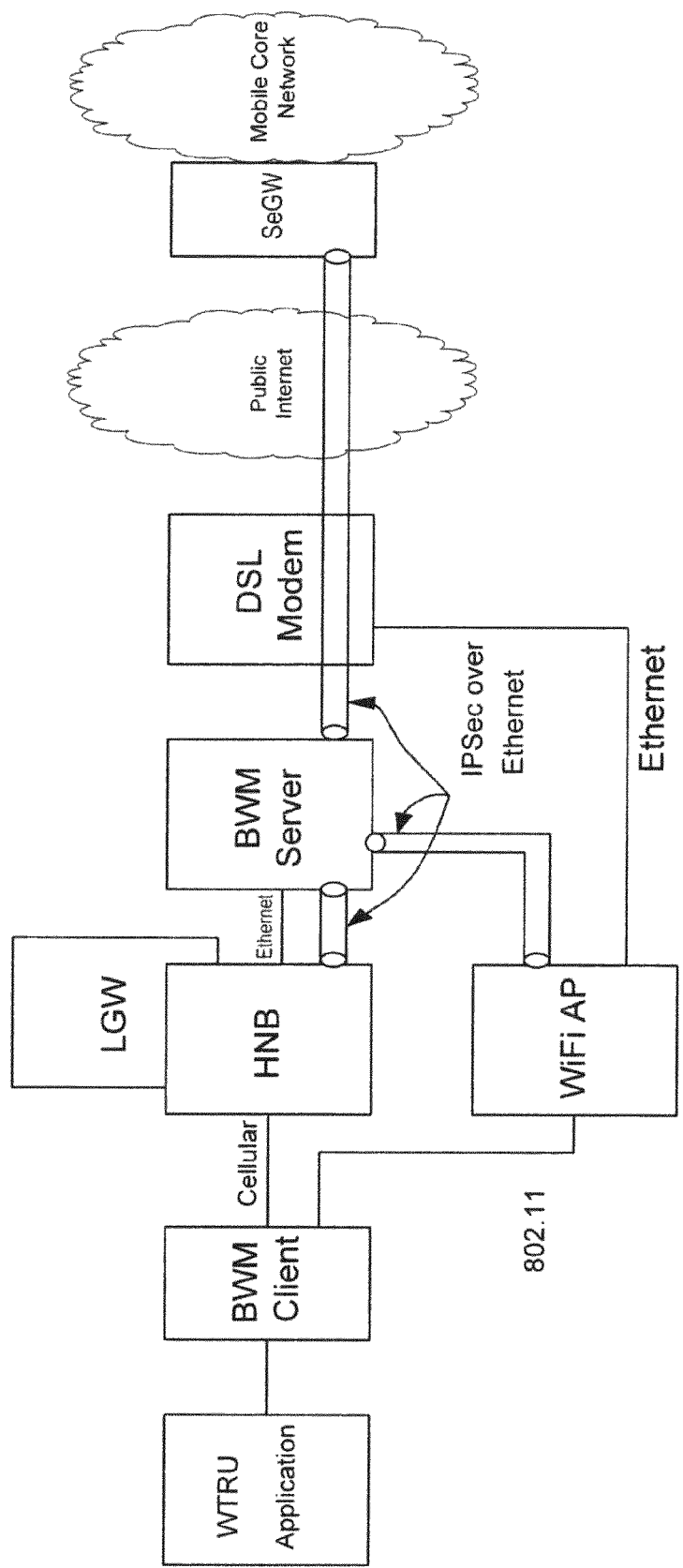
FIG. 73 is an exemplary illustration of a BWM server sitting between the HNB and the SeGW of the MCN.

Another possible architecture is shown in FIG. 73. In this configuration, the BWM server may sit between the HNB and the SeGW of the MCN. However, a difference with earlier configurations may be that the BWM server acts as a pass through during HNB configuration and is then informed of the network supplied configuration by the introduction of a new protocol between the HNB and the BWM server. An advantage of this configuration may be that the HNB is allowed to perform its function without the imposition of the BWM server between it and the SeGW of the MCN. A disadvantage of this configuration may be that the HNB now must support the new protocol that may be used to ferry configuration information from it to the BWM server. Unlike other architectures, the HNB may have to be modified to implement this configuration.

Figure 74:
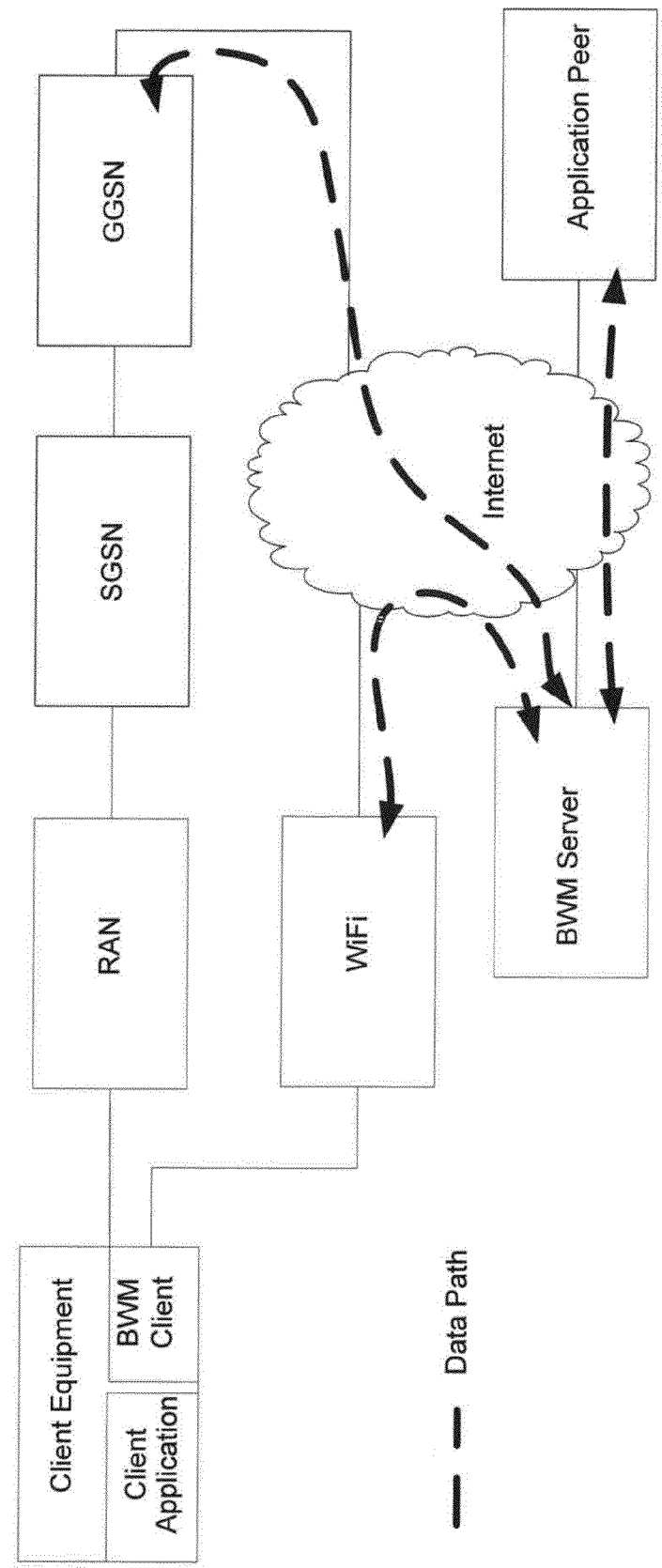
FIG. 74 is an exemplary illustration of a BWM server sitting somewhere on the Internet.
Figure 75:
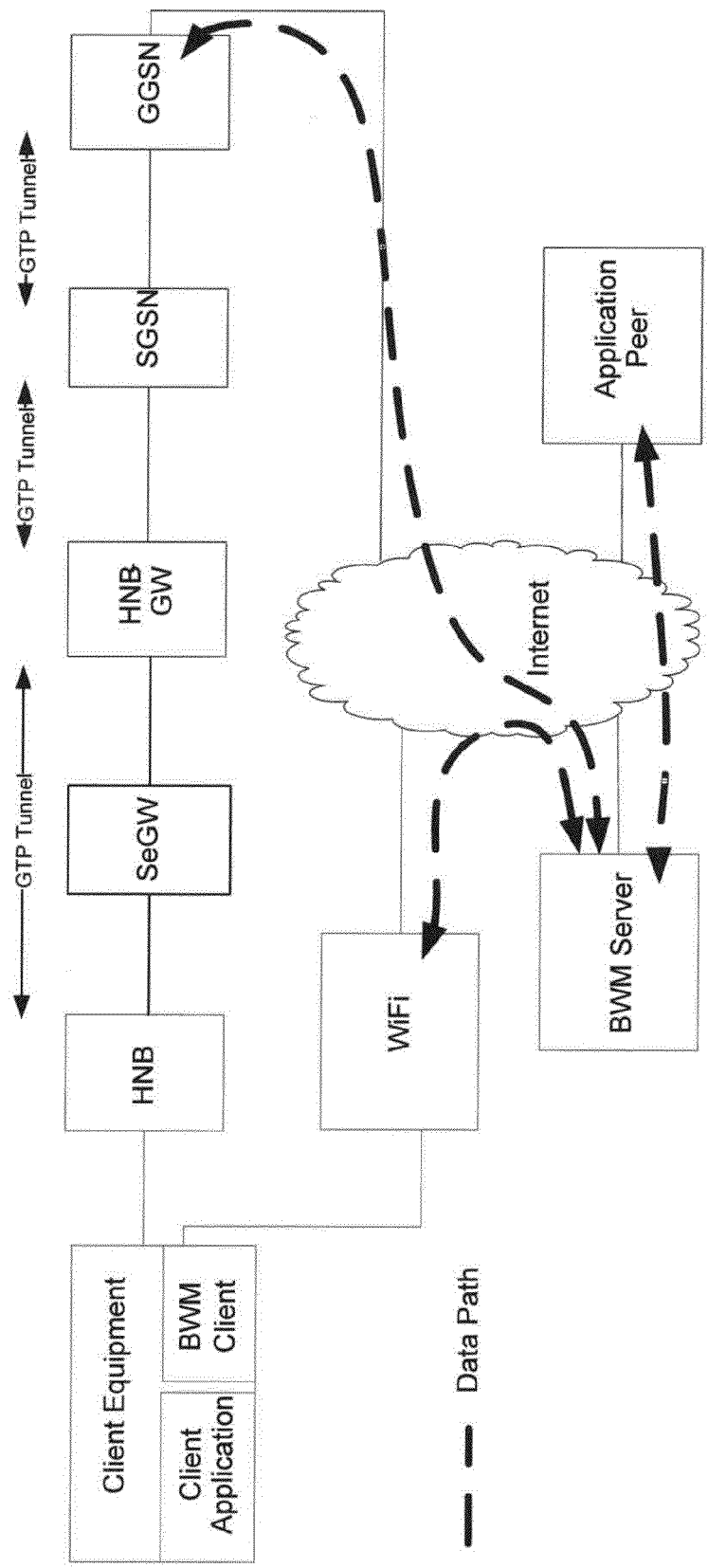
FIG. 75 is an exemplary illustration of a BWM server sitting somewhere on the Internet.

FIG. 74-FIG. 26 are additional exemplary illustrations of implementations of BWM architectures. In FIG. 74, the BWM client may be connected to the Internet via cellular and 802.11 based links. Here, the BWM server may reside somewhere in the Internet. When the Client Application sends packets to the Peer, the packets may be intercepted by the BWM client. The BWM client may decide which connections to use to route this data to its destination. The BWM server may receive these packets from the multiple IP connections and forward the packets to the Application Peer using a standard Transport Layer protocol (e.g. TCP). To both the Client Application and the Application Peer, the actions of the BWM client and server may be transparent. When the Peer sends packets to the Client, the process described above may be performed in reverse. FIG. 75 is similar to FIG. 74, but has extra equipment and shows that a tunneling protocol may be used between the BWM server and the BWM client.

Figure 76:
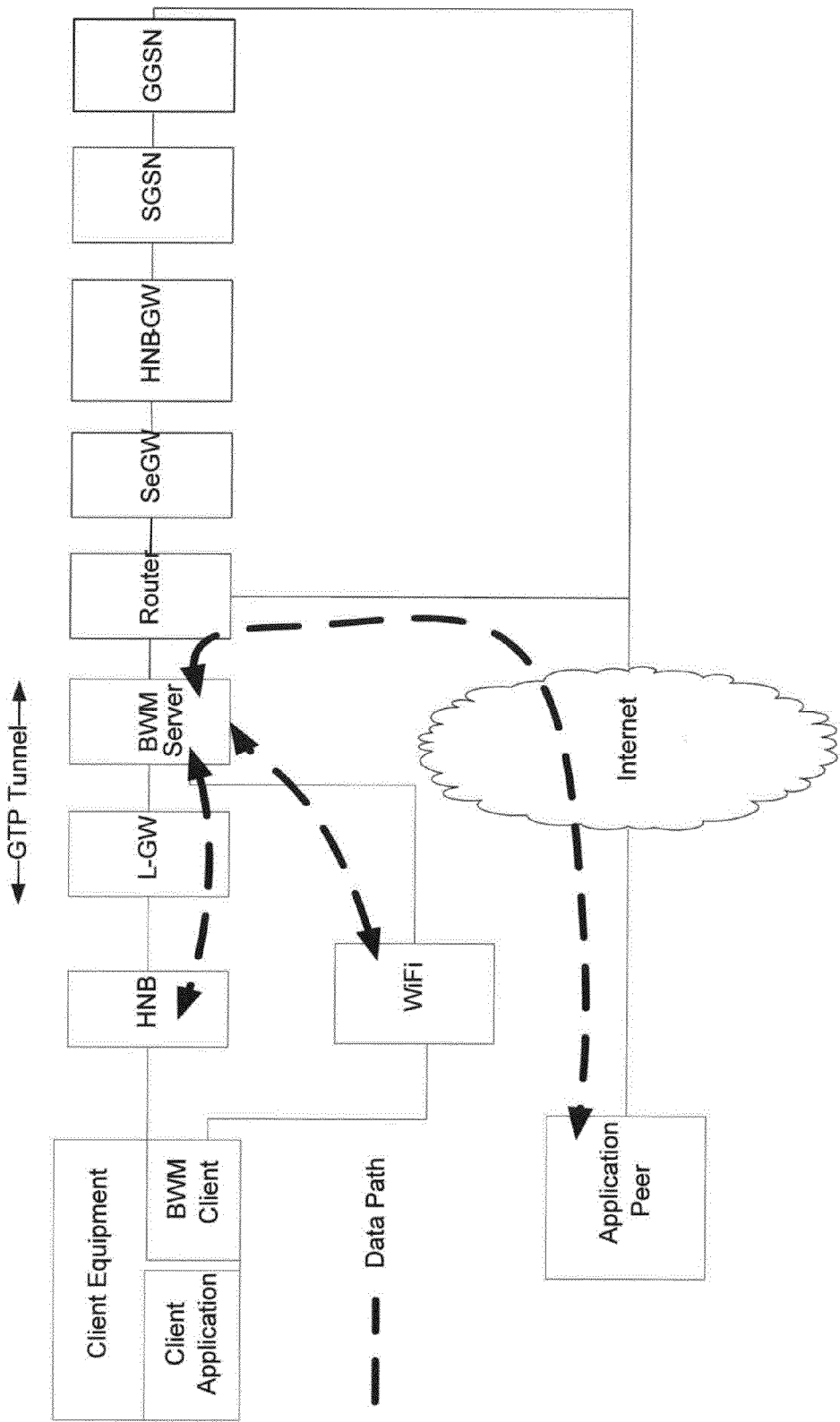
FIG. 76 is an exemplary illustration of BWM implemented in a selected IP traffic offload (SIPTO) network configuration.
Figure 77:
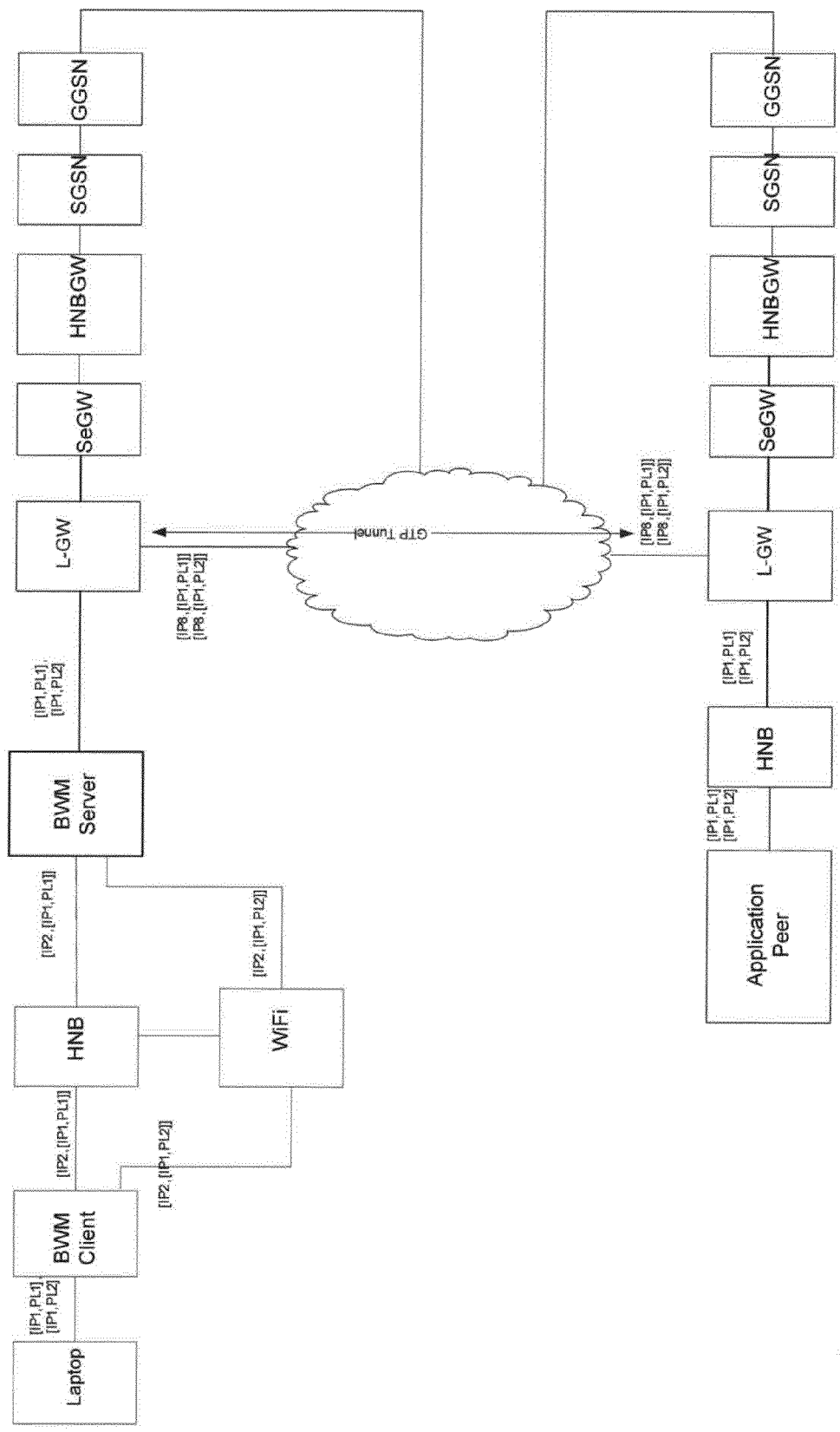
FIG. 77 is an exemplary illustration of BWM implemented in an extended local internet protocol (ELIPA) network configuration.

FIG. 76 is an exemplary illustration of a configuration for the placement of BWM technology when SIPTO is present within the cellular network. The placement of the SIPTO breakout point within the cellular network allows the data to bypass (and as a result offload) the core network from moving data packets between devices on the mobile network and the Internet. The placement of the BWM server may be between the router that performs the SIPTO and the local gateway (LGW) which is part of the home network. The BWM server may perform the same function as described in previous sections. FIG. 77 an exemplary illustration of BWM implemented in an ELIPA case.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method of managing bandwidth over multiple radio access technology (RAT) links, the method comprising:
 establishing a first internet protocol based tunnel between a bandwidth management (BWM) server and a first communications device that has a first RAT link to a wireless transmit receive unit (WTRU);
 establishing a second internet protocol based tunnel between the BWM server and a second communications device;
 establishing a communications interface between the BWM server and a third communications device that has a second RAT link to the WTRU, wherein the first RAT link uses a first RAT and the second RAT link uses a second RAT that is different from the first RAT;

receiving a communication for the WTRU over the second tunnel; and dividing the communication, by the BWM server, into a first portion for transmission over the first RAT link and a second portion for transmission over the second RAT link.

2. The method of claim 1, wherein the communication is divided in accordance with one or more radio conditions associated with the first RAT link.

3. The method of claim 1, wherein the BWM server terminates and reestablishes a tunneling protocol between the first communications device and the third communications device.

4. The method of claim 1, further comprising transmitting the first portion and the second portion to the WTRU approximately simultaneously.

5. A device comprising a processor configured to:
establish a first internet protocol based tunnel with a first communications device that has a first radio access technology (RAT) link to a wireless transmit receive unit (WTRU);
establish a second internet protocol based tunnel with a second communications device;
establish a communications interface with a third communications device that has a second RAT link to the WTRU, wherein the first RAT link uses a first RAT and the second RAT link uses a second RAT that is different from the first RAT;
receive a communication for the WTRU over the second tunnel;
divide the communication into a first portion and a second portion; and
transmit the first portion over the first RAT link and the second portion over the second RAT link.

6. The device of claim 5, wherein the communication is divided in accordance with a type of an application communicating with the WTRU.

7. The device of claim 5, wherein the communication is divided in accordance with respective radio conditions of at least one of the first RAT link and the communications interface.

8. The device of claim 5, wherein the processor is further configured to perform deep packet inspection.

9. The device of claim 5, wherein the processor is further configured to add a protocol sequence number to a packet associated with the communication.

10. The device of claim 5, wherein the second tunnel is a general packet radio service (GPRS) tunneling protocol tunnel.

11. The device of claim 5, wherein the second tunnel is an internet protocol security tunnel.

12. The device of claim 5, wherein the first tunnel is a general packet radio service (GPRS) tunneling protocol (GTP) tunnel.

13. The device of claim 5, wherein the first tunnel is an internet protocol security tunnel.

14. The device of claim 5, wherein the processor is further configured to process the communication based on Multi-Network Transport Protocol (MNTP).

15. The device of claim 5, wherein the second communications device is a core network device.

16. The device of claim 5, wherein the third communications device is a wireless fidelity (WiFi) access point.

17. The device of claim 5, wherein the second communications device is a local gateway (LGW).

18. The device of claim 5, wherein the first communications device is at least one of a Home NodeB (HNB) or a Home eNodeB (HeNB).

19. The device of claim 5, wherein the first portion comprises substantially an entirety of the communication.

20. The device of claim 5, wherein the first portion and the second portion are transmitted approximately simultaneously.

* * * * *